US011029958B1

(12) United States Patent
Zhang et al.

(10) Patent No.: US 11,029,958 B1
(45) Date of Patent: Jun. 8, 2021

(54) APPARATUSES, METHODS, AND SYSTEMS FOR CONFIGURABLE OPERAND SIZE OPERATIONS IN AN OPERATION CONFIGURABLE SPATIAL ACCELERATOR

(71) Applicant: Intel Corporation, Santa Clara, CA (US)

(72) Inventors: Chuanjun Zhang, Santa Clara, CA (US); Kermin E. Chofleming, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/729,372

(22) Filed: Dec. 28, 2019

(51) Int. Cl.
*G06F 9/30* (2018.01)

(52) U.S. Cl.
CPC .......... *G06F 9/3016* (2013.01); *G06F 9/3001* (2013.01)

(58) Field of Classification Search
None
See application file for complete search history.

(56) References Cited

U.S. PATENT DOCUMENTS 6,226,735 B1 * 5/2001 Mirsky .................. G06F 7/505 708/209
6,883,084 B1 * 4/2005 Donohoe ............ G06F 9/30101 712/1
7,213,128 B2 * 5/2007 Paver .................. G06F 9/30014 712/22
7,315,932 B2 * 1/2008 Moyer ................ G06F 9/30036 712/22
7,836,284 B2 * 11/2010 Dockser ................ G06F 9/3885 712/229
10,572,376 B2 * 2/2020 Fleming, Jr. .......... G06F 12/109
2002/0087846 A1 * 7/2002 Nickolls ............. G06F 15/8061 712/229
2004/0001445 A1 * 1/2004 Stansfield ........ H03K 19/17796 370/254
2014/0082267 A1 * 3/2014 Yoo ......................... G06F 3/061 711/103
2015/0242308 A1 * 8/2015 Kim ........................ G06F 11/27 711/105

* cited by examiner

*Primary Examiner* — Eric Coleman
(74) *Attorney, Agent, or Firm* — Nicholson De Vos Webster & Elliott LLP

(57) ABSTRACT

Systems, methods, and apparatuses relating to configurable operand size operation circuitry in an operation configurable spatial accelerator are described. In one embodiment, a hardware accelerator includes a plurality of processing elements, a network between the plurality of processing elements to transfer values between the plurality of processing elements, and a first processing element of the plurality of processing elements including a first plurality of input queues having a multiple bit width coupled to the network, at least one first output queue having the multiple bit width coupled to the network, configurable operand size operation circuitry coupled to the first plurality of input queues, and a configuration register within the first processing element to store a configuration value that causes the configurable operand size operation circuitry to switch to a first mode for a first multiple bit width from a plurality of selectable multiple bit widths of the configurable operand size operation circuitry, perform a selected operation on a plurality of first multiple bit width values from the first plurality of input queues in series to create a resultant value, and store the resultant value in the at least one first output queue.

24 Claims, 104 Drawing Sheets

```
void func (int x,y) {
    x = x * y;
    return x;
}
```
PROGRAM SOURCE
FIG. 3A
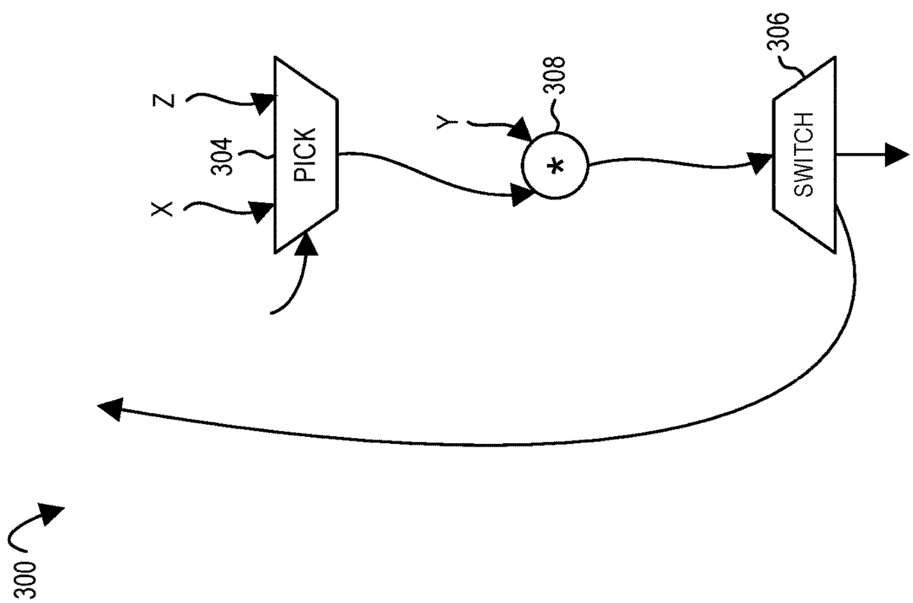
DATAFLOW GRAPH
FIG. 3B
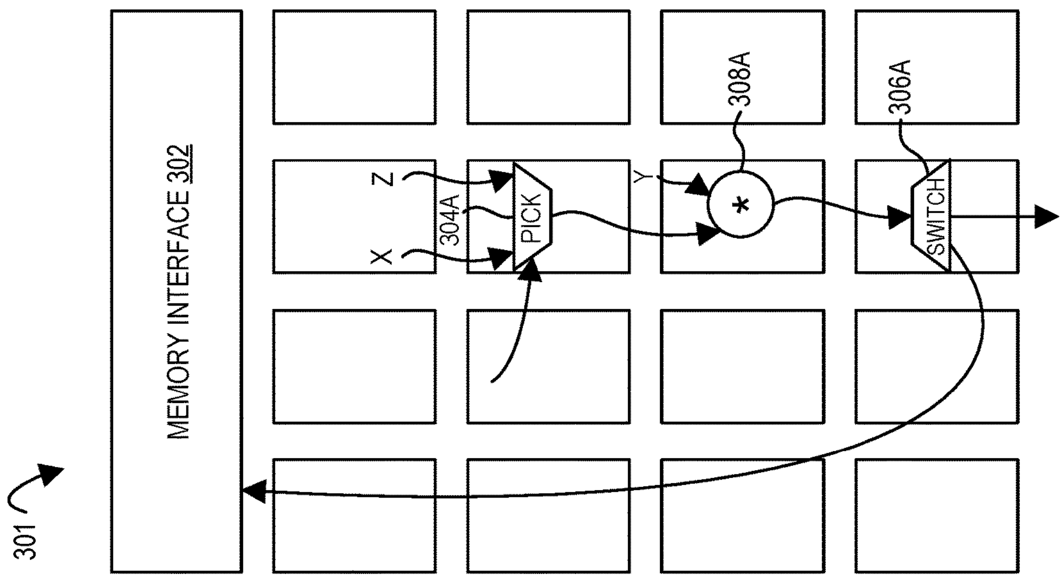
CONFIGURED CSA
FIG. 3C

500

```
void memcpy(void *A, void *B, int N) {
     for(int index = 0; index < N; index++) {
          a[index] = b[index]
     }
}
```

```
Header: Determiner
if(CondDeq && NotEmpty) {
  if(Head + 1 > capacity) {
      Head <= 0;
  } else {
      Head <= Head + 1
  }
}
```

1600

```
Tail: Determiner
if(Ready && Valid) {
  if(Tail + 1 > capacity) {
      Tail <= 0;
  } else {
      Tail <= Tail + 1
  }
}
```

Count: Determiner
Count <= Count + (Ready && Valid)* - (CondDeq && NotEmpty)*
*Assumes conversion of boolean value true to integer 1 and false to integer 0
1700

FIG. 17

Enqueue = Valid && Ready 1800

FIG. 18

Not Full (Ready) = Count < CAPACITY 1900

FIG. 19

Not Empty = Count > 0 2000

FIG. 20

Valid = Count > 0 2100

```
Tail: Determiner
if(NotFull && CondEnq) {
if(Tail + 1 > capacity) {
    Tail <= 0;
} else {
    Tail <= Tail + 1
}
}
```

2500

```
Header: Determiner
if(Ready && Valid) {
if(Head + 1 > capacity) {
    Head <= 0;
} else {
    Head <= Head + 1
}
}
```

Count: Determiner 2700
Count <= Count + (NotFull && CondEnq)* - (Ready && Valid)*
*Assumes conversion of boolean value true to integer 1 and false to integer 0

FIG. 27

Enqueue = Valid && Ready 2800

FIG. 28

NotFull (Ready) = Count < CAPACITY 2900

FIG. 29

NotEmpty = Count > 0 3000

FIG. 30

Valid = Count > 0 3100

FIG. 31

```
ld32 Rdata, Raddr
ld32 Rdata2, Raddr2
mul32 Rv0, Rdata, 17
mul32 Rv1, Rdata2, Rdata2
add32 Rres, Rv0, Rv1
st32 Raddr, Rres
ld32 Rdata3, Raddr3
```

SEQUENTIAL ASSEMBLY 6802

FIG. 68A

```
.lic .i32 data; .lic .i64 addr;
.lic .i32 data2; .lic .i64 addr2;
.lic .i32 data3; .lic .i64 addr3;
.lic .i32 v0; .lic .i32 v1; .lic .i32 res
ld32 data, addr
ld32 data2, addr2
mul32 v0, data, 17
mul32 v1, data2, data2
add32 res, v0, v1
st32 addr, res, done, %ign
ld32 data3, addr3, %ign, done
```

DATAFLOW ASSEMBLY 6804

FIG. 68B

DATAFLOW GRAPH 6806

```
if (i < n)
    y = x + a;
else
    y = i + x;
```

C SOURCE CODE 6902

FIG. 69A

```
.lic .i1 test
cmplts32 test, i, n
switch32 %ign, aT, test, a
switch32 iF, %ign, test, i
switch32 xF, xT, test, x
add32 yT, xT, aT      # True path
add32 yF, iF, xF      # False path
pick32 y, test, yF, yT
add32 z, y, 1
```

DATAFLOW ASSEMBLY 6904

FIG. 69B

DATAFLOW GRAPH 6906

```
int i = 0;
int sum = 0;
do {
    sum = sum + i;
    i = i + 1;
} while (i < n);
return sum;
```

C SOURCE CODE 7002

FIG. 70A

```
# Loop control channels.
.lic .i1 picker
.lic .i1 switcher

# Offset values in picker with an initial 0.
.curr picker; .value 0; .avail 0

# Generate value of i for each loop iteration
pick32 top_i, picker, init_i, loopback_i
add32 bottom_i, top_i, 1
switch32 %ign, loopback_i, switcher, bottom_i

# Repeat value of n for each execution of the loop.
pick32 loop_n, picker, init_n, loopback_n
switch32 %ign, loopback_n, switcher, loop_n

# Comparison at the bottom of the loop.
cmplts32 switcher, bottom_i, loop_n
mov1 picker, switcher

# Add up the sum around the loop iteration.
pick32 top_sum, picker, init_sum, loopback_sum
add32 bottom_sum, top_sum, top_i
switch32 out_sum, loopback_sum, switcher, bottom_sum
```

DATAFLOW ASSEMBLY 7004

FIG. 70B

DATAFLOW GRAPH 7006

9400

| | INPUT QUEUE ID | OUTPUT QUEUE ID | DEPENDENCY QUEUE ID | MEMOP |
|---|---|---|---|---|
| LOGICAL | CHANNEL 0 5810 | COMPL. CHAN. 1 5820 | DEPLN: CHANNEL B0 DEPOUT: COUNTER C0 5830 | LOAD 5840 |
| BINARY (PROVISIONAL) | 001 | 010 | 1000/0001 | 00 |

FIG. 94

APPARATUSES, METHODS, AND SYSTEMS FOR CONFIGURABLE OPERAND SIZE OPERATIONS IN AN OPERATION CONFIGURABLE SPATIAL ACCELERATOR

TECHNICAL FIELD

The disclosure relates generally to electronics, and, more specifically, an embodiment of the disclosure relates to configurable operand size operation circuitry in a configurable spatial accelerator.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 3A illustrates a program source according to embodiments of the disclosure.

FIG. 3B illustrates a dataflow graph for the program source of FIG. 3A according to embodiments of the disclosure.

FIG. 3C illustrates an accelerator with a plurality of processing elements configured to execute the dataflow graph of FIG. 3B according to embodiments of the disclosure.

FIG. 5 illustrates a program source according to embodiments of the disclosure.

FIG. 17 illustrates a count determiner state machine according to embodiments of the disclosure.

FIG. 18 illustrates an enqueue determiner state machine according to embodiments of the disclosure.

FIG. 19 illustrates a Not Full determiner state machine according to embodiments of the disclosure.

FIG. 20 illustrates a Not Empty determiner state machine according to embodiments of the disclosure.

FIG. 21 illustrates a valid determiner state machine according to embodiments of the disclosure.

FIG. 27 illustrates a count determiner state machine according to embodiments of the disclosure.

FIG. 28 illustrates an enqueue determiner state machine according to embodiments of the disclosure.

FIG. 29 illustrates a Not Full determiner state machine according to embodiments of the disclosure.

FIG. 30 illustrates a Not Empty determiner state machine according to embodiments of the disclosure.

FIG. 31 illustrates a valid determiner state machine according to embodiments of the disclosure.

FIG. 68A illustrates sequential assembly code according to embodiments of the disclosure.

FIG. 68B illustrates dataflow assembly code for the sequential assembly code of FIG. 68A according to embodiments of the disclosure.

FIG. 69A illustrates C source code according to embodiments of the disclosure.

FIG. 69B illustrates dataflow assembly code for the C source code of FIG. 69A according to embodiments of the disclosure.

FIG. 70A illustrates C source code according to embodiments of the disclosure.

FIG. 70B illustrates dataflow assembly code for the C source code of FIG. 70A according to embodiments of the disclosure.

FIG. 94 is a block diagram of an exemplary load operation, both logical and in binary according to embodiments of the disclosure.

FIG. 100D is a block diagram illustrating the fields of the specific vector friendly instruction format in FIG. 100A that make up the augmentation operation field 9950 according to one embodiment of the disclosure.

FIG. 101 is a block diagram of a register architecture according to one embodiment of the disclosure FIG. 102A is a block diagram illustrating both an exemplary in-order pipeline and an exemplary register renaming, out-of-order issue/execution pipeline according to embodiments of the disclosure.

FIG. 102B is a block diagram illustrating both an exemplary embodiment of an in-order architecture core and an exemplary register renaming, out-of-order issue/execution architecture core to be included in a processor according to embodiments of the disclosure.

FIG. 103A is a block diagram of a single processor core, along with its connection to the on-die interconnect network and with its local subset of the Level 2 (L2) cache, according to embodiments of the disclosure.

FIG. 103B is an expanded view of part of the processor core in FIG. 103A according to embodiments of the disclosure.

FIG. 104 is a block diagram of a processor that may have more than one core, may have an integrated memory controller, and may have integrated graphics according to embodiments of the disclosure.

FIG. 105 is a block diagram of a system in accordance with one embodiment of the present disclosure.

FIG. 106 is a block diagram of a more specific exemplary system in accordance with an embodiment of the present disclosure.

Figure 107:
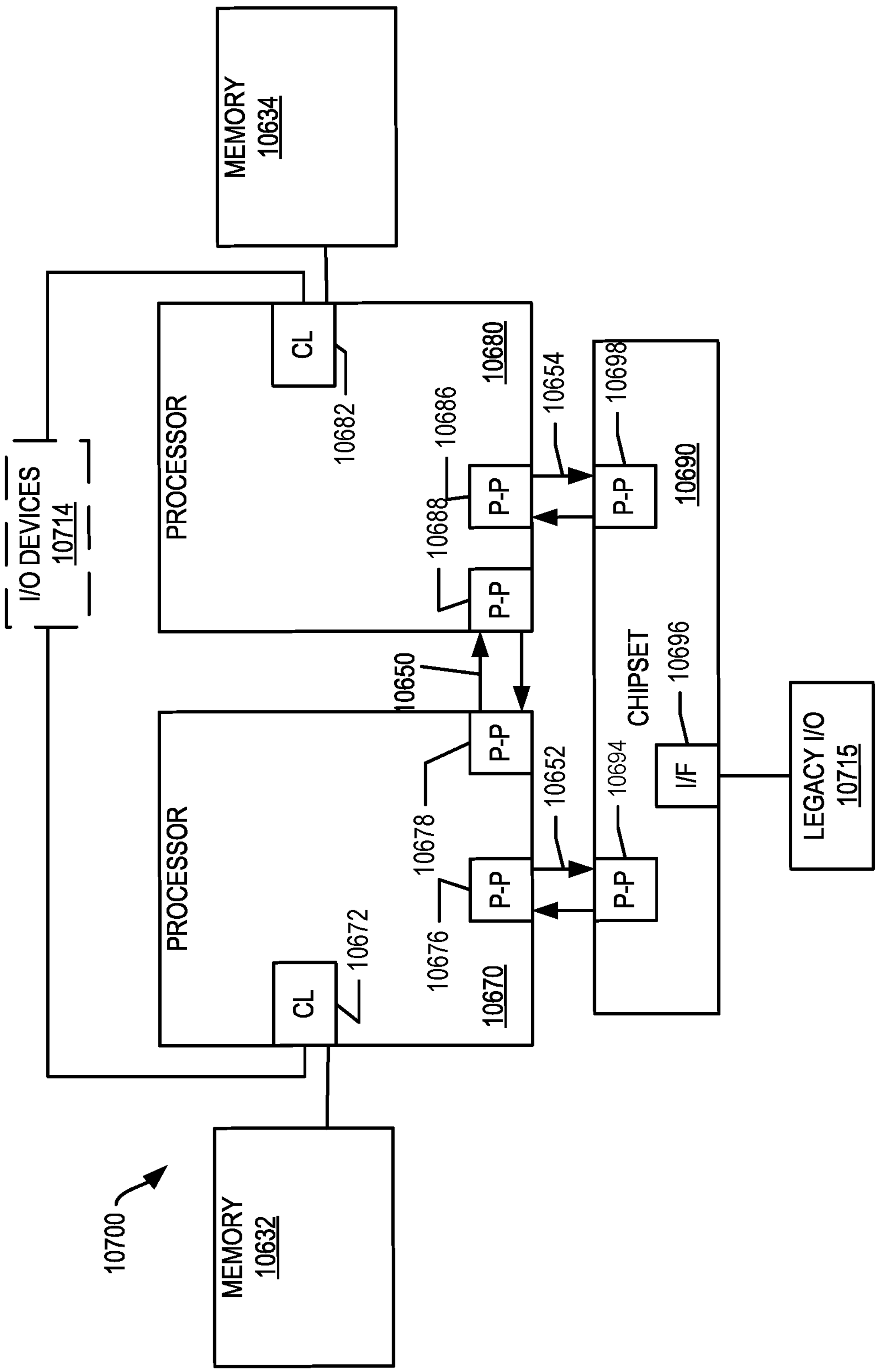

FIG. 107, shown is a block diagram of a second more specific exemplary system in accordance with an embodiment of the present disclosure.

Figure 108:
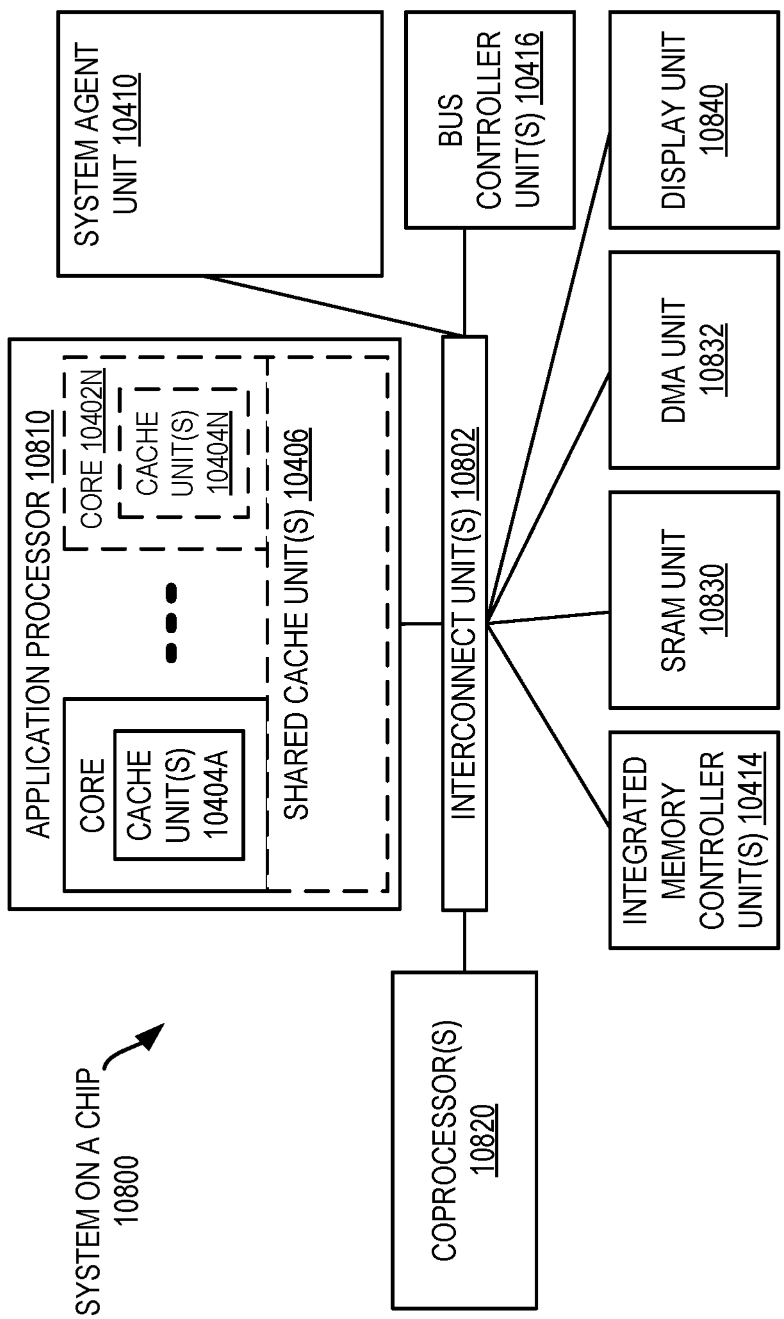

FIG. 108, shown is a block diagram of a system on a chip (SoC) in accordance with an embodiment of the present disclosure.

Figure 109:
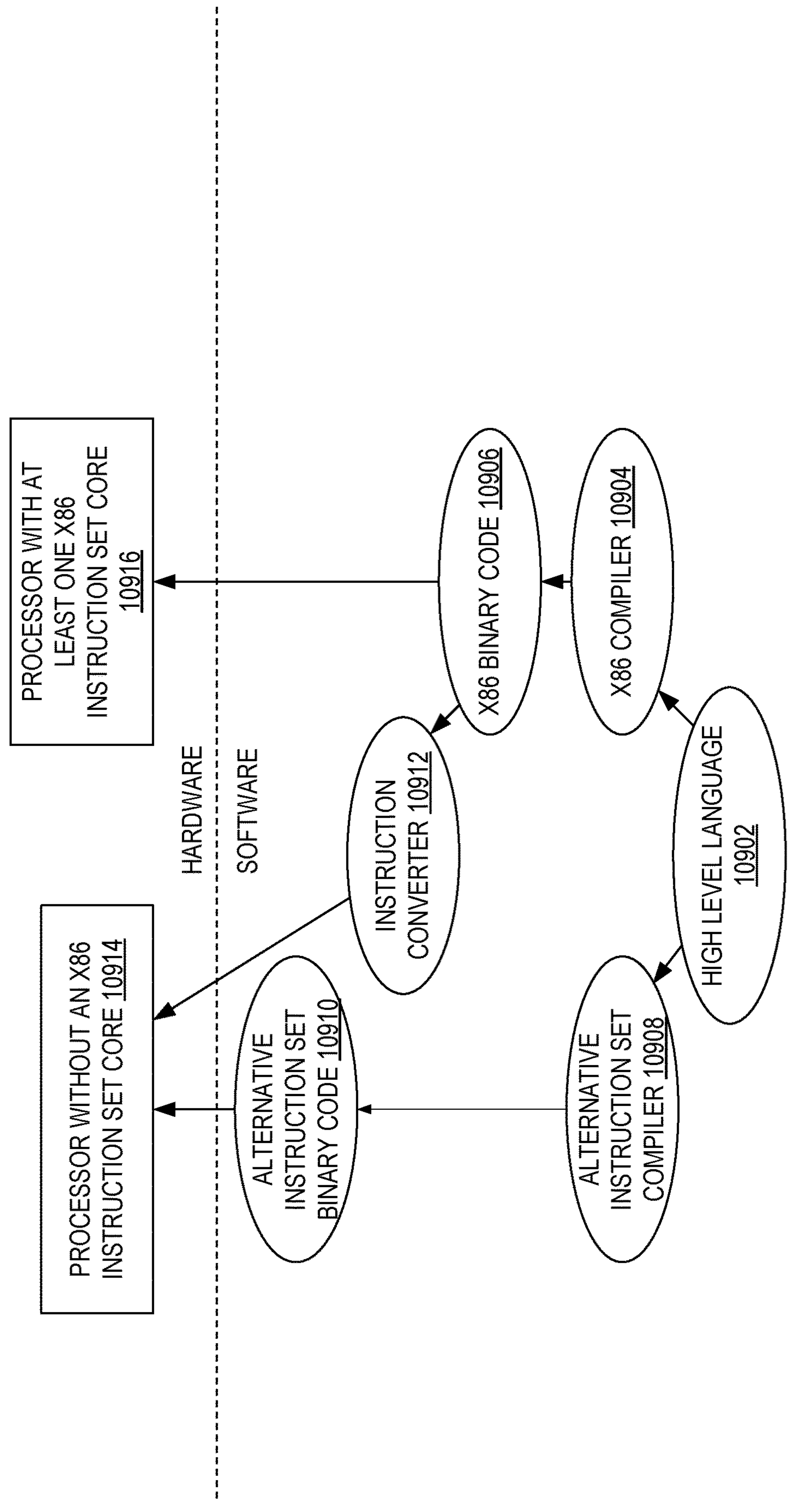

FIG. 109 is a block diagram contrasting the use of a software instruction converter to convert binary instructions in a source instruction set to binary instructions in a target instruction set according to embodiments of the disclosure.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. One non-limiting example of an operation is a blend operation to input a plurality of vectors elements and output a vector with a blended plurality of elements. In certain embodiments, multiple operations are accomplished with the execution of a single instruction.

Exascale performance, e.g., as defined by the Department of Energy, may require system-level floating point performance to exceed 10^18 floating point operations per second (exaFLOPs) or more within a given (e.g., 20 MW) power budget. Certain embodiments herein are directed to a spatial array of processing elements (e.g., a configurable spatial accelerator (CSA)) that targets high performance computing (HPC), for example, of a processor. Certain embodiments herein of a spatial array of processing elements (e.g., a CSA) target the direct execution of a dataflow graph to yield a computationally dense yet energy-efficient spatial microarchitecture which far exceeds conventional roadmap architectures. Certain embodiments herein overlay (e.g., high-radix) dataflow operations on a communications network, e.g., in addition to the communications network's routing of data between the processing elements, memory, etc. and/or the communications network performing other communications (e.g., not data processing) operations. Certain embodiments herein are directed to a communications network (e.g., a packet switched network) of a (e.g., coupled to) spatial array of processing elements (e.g., a CSA) to perform certain dataflow operations, e.g., in addition to the communications network routing data between the processing elements, memory, etc. or the communications network performing other communications operations. Certain embodiments herein are directed to network dataflow endpoint circuits that (e.g., each) perform (e.g., a portion or all) a dataflow operation or operations, for example, a pick or switch dataflow operation, e.g., of a dataflow graph. Certain embodiments herein include augmented network endpoints (e.g., network dataflow endpoint circuits) to support the control for (e.g., a plurality of or a subset of) dataflow operation(s), e.g., utilizing the network endpoints to perform a (e.g., dataflow) operation instead of a processing element (e.g., core) or arithmetic-logic unit (e.g. to perform arithmetic and logic operations) performing that (e.g., dataflow) operation. In one embodiment, a network dataflow endpoint circuit is separate from a spatial array (e.g. an interconnect or fabric thereof) and/or processing elements.

Below also includes a description of the architectural philosophy of embodiments of a spatial array of processing elements (e.g., a CSA) and certain features thereof. As with any revolutionary architecture, programmability may be a risk. To mitigate this issue, embodiments of the CSA architecture have been co-designed with a compilation tool chain, which is also discussed below.

INTRODUCTION

Figure 1:
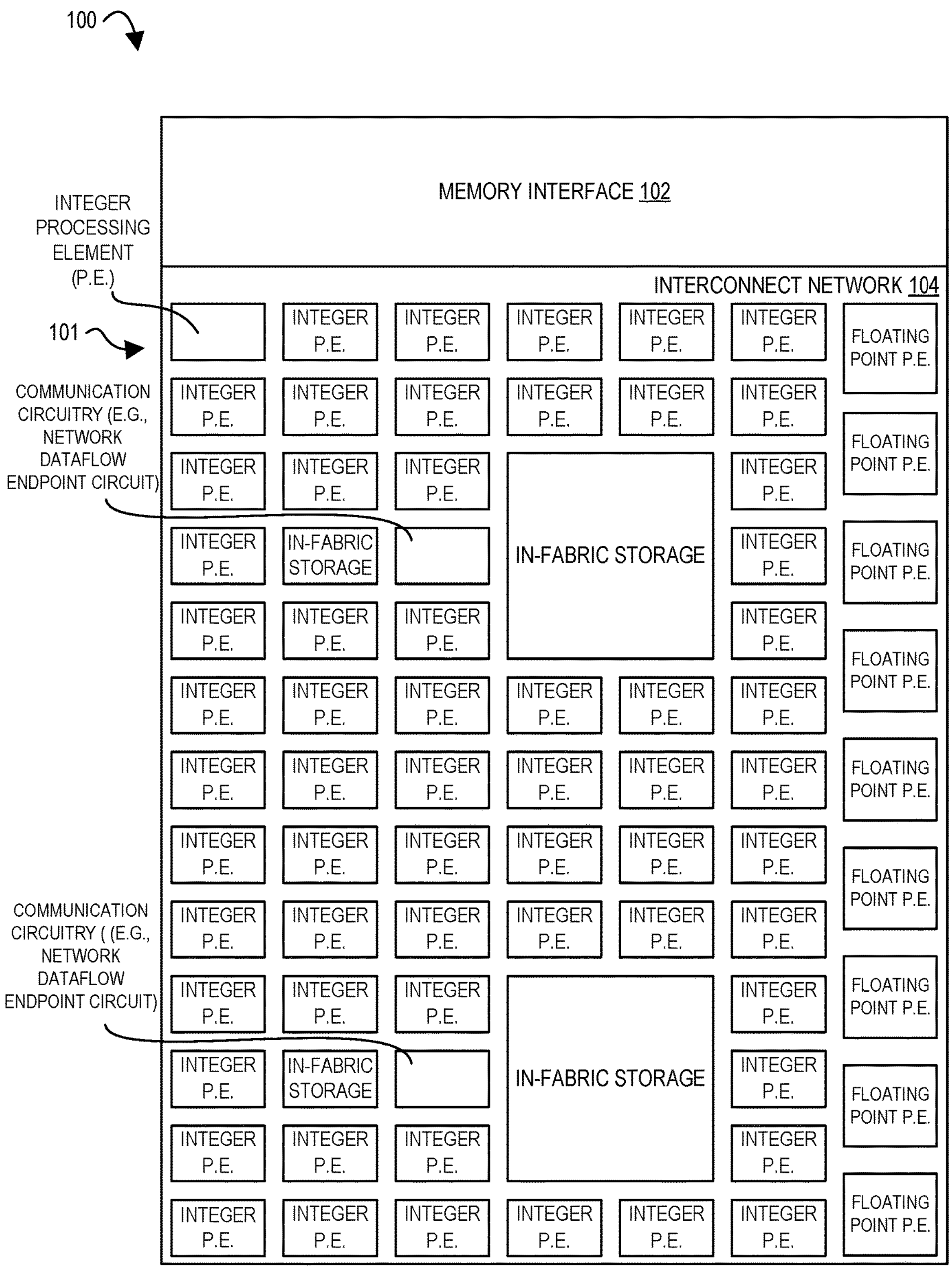
FIG. 1 illustrates an accelerator tile according to embodiments of the disclosure.

Exascale computing goals may require enormous system-level floating point performance (e.g., 1 ExaFLOPs) within an aggressive power budget (e.g., 20 MW). However, simultaneously improving the performance and energy efficiency of program execution with classical von Neumann architectures has become difficult: out-of-order scheduling, simultaneous multi-threading, complex register files, and other structures provide performance, but at high energy cost. Certain embodiments herein achieve performance and energy requirements simultaneously. Exascale computing power-performance targets may demand both high throughput and low energy consumption per operation. Certain embodiments herein provide this by providing for large numbers of low-complexity, energy-efficient processing (e.g., computational) elements which largely eliminate the control overheads of previous processor designs. Guided by this observation, certain embodiments herein include a spatial array of processing elements, for example, a configurable spatial accelerator (CSA), e.g., comprising an array of processing elements (PEs) connected by a set of lightweight, back-pressured (e.g., communication) networks. One example of a CSA tile is depicted in FIG. 1. Certain embodiments of processing (e.g., compute) elements are dataflow operators, e.g., multiple of a dataflow operator that only processes input data when both (i) the input data has arrived at the dataflow operator and (ii) there is space available for storing the output data, e.g., otherwise no processing is occurring. Certain embodiments (e.g., of an accelerator or CSA) do not utilize a triggered instruction.

FIG. 1 illustrates an accelerator tile 100 embodiment of a spatial array of processing elements according to embodiments of the disclosure. Accelerator tile 100 may be a portion of a larger tile. Accelerator tile 100 executes a dataflow graph or graphs. A dataflow graph may generally refer to an explicitly parallel program description which arises in the compilation of sequential codes. Certain embodiments herein (e.g., CSAs) allow dataflow graphs to be directly configured onto the CSA array, for example, rather than being transformed into sequential instruction streams. Certain embodiments herein allow a first (e.g., type of) dataflow operation to be performed by one or more processing elements (PEs) of the spatial array and, additionally or alternatively, a second (e.g., different, type of) dataflow operation to be performed by one or more of the network communication circuits (e.g., endpoints) of the spatial array.

The derivation of a dataflow graph from a sequential compilation flow allows embodiments of a CSA to support familiar programming models and to directly (e.g., without using a table of work) execute existing high performance computing (HPC) code. CSA processing elements (PEs) may be energy efficient. In FIG. 1, memory interface 102 may couple to a memory (e.g., memory 202 in FIG. 2) to allow accelerator tile 100 to access (e.g., load and/store) data to the (e.g., off die) memory. Depicted accelerator tile 100 is a heterogeneous array comprised of several kinds of PEs coupled together via an interconnect network 104. Accelerator tile 100 may include one or more of integer arithmetic PEs, floating point arithmetic PEs, communication circuitry (e.g., network dataflow endpoint circuits), and in-fabric storage, e.g., as part of spatial array of processing elements 101. Dataflow graphs (e.g., compiled dataflow graphs) may be overlaid on the accelerator tile 100 for execution. In one embodiment, for a particular dataflow graph, each PE handles only one or two (e.g., dataflow) operations of the graph. The array of PEs may be heterogeneous, e.g., such that no PE supports the full CSA dataflow architecture and/or one or more PEs are programmed (e.g., customized) to perform only a few, but highly efficient operations. Certain embodiments herein thus yield a processor or accelerator having an array of processing elements that is computationally dense compared to roadmap architectures and yet achieves approximately an order-of-magnitude gain in energy efficiency and performance relative to existing HPC offerings.

Certain embodiments herein provide for performance increases from parallel execution within a (e.g., dense) spatial array of processing elements (e.g., CSA) where each PE and/or network dataflow endpoint circuit utilized may perform its operations simultaneously, e.g., if input data is available. Efficiency increases may result from the efficiency of each PE and/or network dataflow endpoint circuit, e.g., where each PE's operation (e.g., behavior) is fixed once per configuration (e.g., mapping) step and execution occurs on local data arrival at the PE, e.g., without considering other fabric activity, and/or where each network dataflow endpoint circuit's operation (e.g., behavior) is variable (e.g., not fixed) when configured (e.g., mapped). In certain embodiments, a PE and/or network dataflow endpoint circuit is (e.g., each a single) dataflow operator, for example, a dataflow operator that only operates on input data when both (i) the input data has arrived at the dataflow operator and (ii) there is space available for storing the output data, e.g., otherwise no operation is occurring.

Certain embodiments herein include a spatial array of processing elements as an energy-efficient and high-performance way of accelerating user applications. In one embodiment, applications are mapped in an extremely parallel manner. For example, inner loops may be unrolled multiple times to improve parallelism. This approach may provide high performance, e.g., when the occupancy (e.g., use) of the unrolled code is high. However, if there are less used code paths in the loop body unrolled (for example, an exceptional code path like floating point de-normalized mode) then (e.g., fabric area of) the spatial array of processing elements may be wasted and throughput consequently lost.

One embodiment herein to reduce pressure on (e.g., fabric area of) the spatial array of processing elements (e.g., in the case of underutilized code segments) is time multiplexing. In this mode, a single instance of the less used (e.g., colder) code may be shared among several loop bodies, for example, analogous to a function call in a shared library. In one embodiment, spatial arrays (e.g., of processing elements) support the direct implementation of multiplexed codes. However, e.g., when multiplexing or demultiplexing in a spatial array involves choosing among many and distant targets (e.g., sharers), a direct implementation using dataflow operators (e.g., using the processing elements) may be inefficient in terms of latency, throughput, implementation area, and/or energy. Certain embodiments herein describe hardware mechanisms (e.g., network circuitry) supporting (e.g., high-radix) multiplexing or demultiplexing. Certain embodiments herein (e.g., of network dataflow endpoint circuits) permit the aggregation of many targets (e.g., sharers) with little hardware overhead or performance impact. Certain embodiments herein allow for compiling of (e.g., legacy) sequential codes to parallel architectures in a spatial array.

In one embodiment, a plurality of network dataflow endpoint circuits combine as a single dataflow operator, for example, as discussed in reference to FIG. 46 below. As non-limiting examples, certain (for example, high (e.g., 4-6) radix) dataflow operators are listed below.

An embodiment of a "Pick" dataflow operator is to select data (e.g., a token) from a plurality of input channels and provide that data as its (e.g., single) output according to control data. Control data for a Pick may include an input selector value. In one embodiment, the selected input channel is to have its data (e.g., token) removed (e.g., discarded), for example, to complete the performance of that dataflow operation (or its portion of a dataflow operation). In one embodiment, additionally, those non-selected input channels are also to have their data (e.g., token) removed (e.g., discarded), for example, to complete the performance of that dataflow operation (or its portion of a dataflow operation).

An embodiment of a "PickSingleLeg" dataflow operator is to select data (e.g., a token) from a plurality of input channels and provide that data as its (e.g., single) output according to control data, but in certain embodiments, the non-selected input channels are ignored, e.g., those non-selected input channels are not to have their data (e.g., token) removed (e.g., discarded), for example, to complete the performance of that dataflow operation (or its portion of a dataflow operation). Control data for a PickSingleLeg may include an input selector value. In one embodiment, the selected input channel is also to have its data (e.g., token) removed (e.g., discarded), for example, to complete the performance of that dataflow operation (or its portion of a dataflow operation).

An embodiment of a "PickAny" dataflow operator is to select the first available (e.g., to the circuit performing the operation) data (e.g., a token) from a plurality of input channels and provide that data as its (e.g., single) output. In one embodiment, PickSingleLeg is also to output the index (e.g., indicating which of the plurality of input channels) had its data selected. In one embodiment, the selected input channel is to have its data (e.g., token) removed (e.g., discarded), for example, to complete the performance of that dataflow operation (or its portion of a dataflow operation). In certain embodiments, the non-selected input channels (e.g., with or without input data) are ignored, e.g., those non-selected input channels are not to have their data (e.g., token) removed (e.g., discarded), for example, to complete the performance of that dataflow operation (or its portion of a dataflow operation). Control data for a PickAny may include a value corresponding to the PickAny, e.g., without an input selector value.

An embodiment of a "Switch" dataflow operator is to steer (e.g., single) input data (e.g., a token) so as to provide that input data to one or a plurality of (e.g., less than all) outputs according to control data. Control data for a Switch may include an output(s) selector value or values. In one embodiment, the input data (e.g., from an input channel) is to have its data (e.g., token) removed (e.g., discarded), for example, to complete the performance of that dataflow operation (or its portion of a dataflow operation).

An embodiment of a "SwitchAny" dataflow operator is to steer (e.g., single) input data (e.g., a token) so as to provide that input data to one or a plurality of (e.g., less than all) outputs that may receive that data, e.g., according to control data. In one embodiment, SwitchAny may provide the input data to any coupled output channel that has availability (e.g., available storage space) in its ingress buffer, e.g., network ingress buffer in FIG. 47. Control data for a SwitchAny may include a value corresponding to the SwitchAny, e.g., without an output(s) selector value or values. In one embodiment, the input data (e.g., from an input channel) is to have its data (e.g., token) removed (e.g., discarded), for example, to complete the performance of that dataflow operation (or its portion of a dataflow operation). In one embodiment, SwitchAny is also to output the index (e.g., indicating which of the plurality of output channels) that it provided (e.g., sent) the input data to. SwitchAny may be utilized to manage replicated sub-graphs in a spatial array, for example, an unrolled loop.

Certain embodiments herein thus provide paradigm-shifting levels of performance and tremendous improvements in energy efficiency across a broad class of existing single-stream and parallel programs, e.g., all while preserving familiar HPC programming models. Certain embodiments herein may target HPC such that floating point energy efficiency is extremely important. Certain embodiments herein not only deliver compelling improvements in performance and reductions in energy, they also deliver these gains to existing HPC programs written in mainstream HPC languages and for mainstream HPC frameworks. Certain embodiments of the architecture herein (e.g., with compilation in mind) provide several extensions in direct support of the control-dataflow internal representations generated by modern compilers. Certain embodiments herein are direct to a CSA dataflow compiler, e.g., which can accept C, C++, and Fortran programming languages, to target a CSA architecture.

Figure 2:
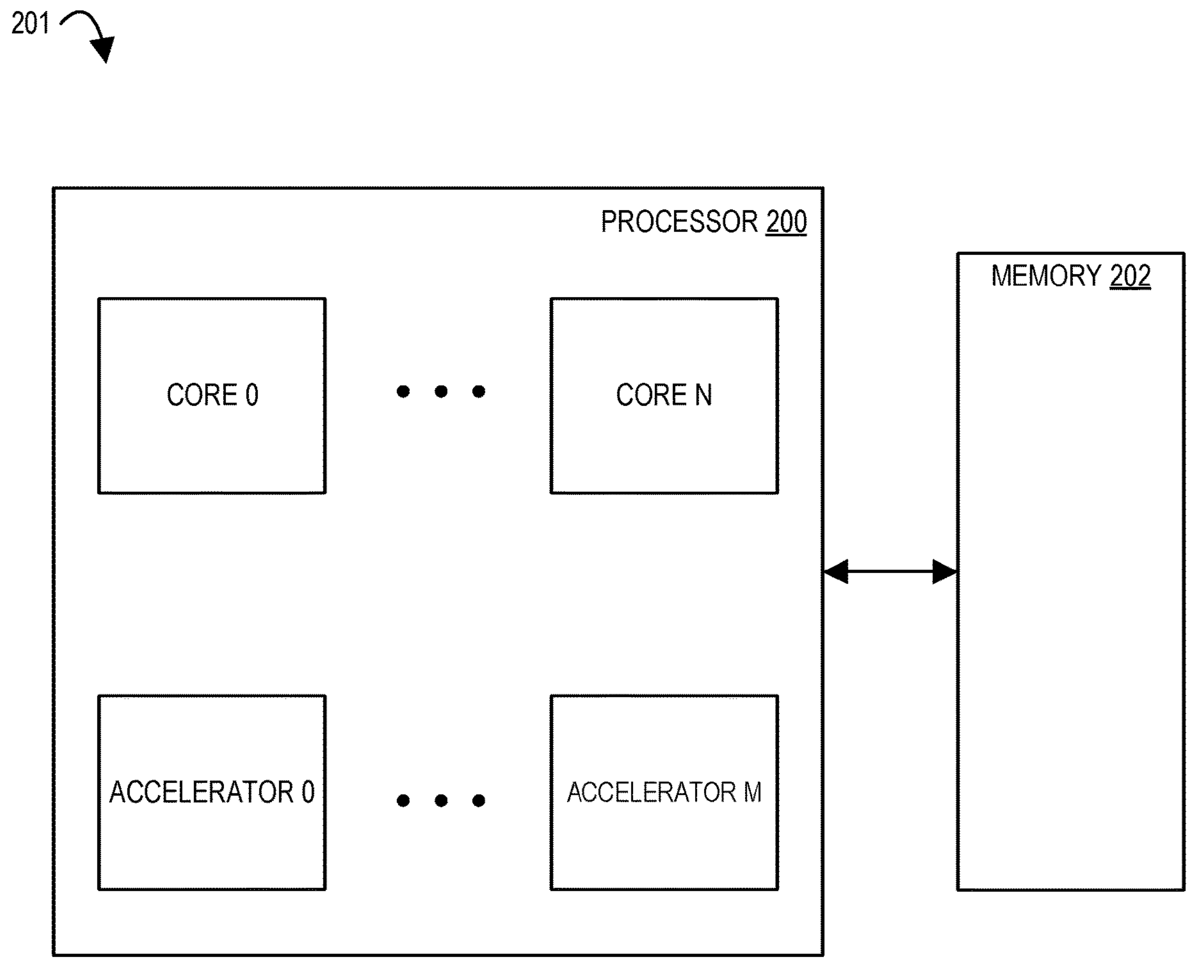
FIG. 2 illustrates a hardware processor coupled to a memory according to embodiments of the disclosure.

FIG. 2 illustrates a hardware processor 200 coupled to (e.g., connected to) a memory 202 according to embodiments of the disclosure. In one embodiment, hardware processor 200 and memory 202 are a computing system 201. In certain embodiments, one or more of accelerators is a CSA according to this disclosure. In certain embodiments, one or more of the cores in a processor are those cores disclosed herein. Hardware processor 200 (e.g., each core thereof) may include a hardware decoder (e.g., decode unit) and a hardware execution unit. Hardware processor 200 may include registers. Note that the figures herein may not depict all data communication couplings (e.g., connections). One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein. Depicted hardware processor 200 includes a plurality of cores (0 to N, where N may be 1 or more) and hardware accelerators (0 to M, where M may be 1 or more) according to embodiments of the disclosure. Hardware processor 200 (e.g., accelerator(s) and/or core(s) thereof) may be coupled to memory 202 (e.g., data storage device). Hardware decoder (e.g., of core) may receive an (e.g., single) instruction (e.g., macro-instruction) and decode the instruction, e.g., into micro-instructions and/or micro-operations. Hardware execution unit (e.g., of core) may execute the decoded instruction (e.g., macro-instruction) to perform an operation or operations.

Section 1 below discloses embodiments of CSA architecture. In particular, novel embodiments of integrating memory within the dataflow execution model are disclosed. Section 2 delves into the microarchitectural details of embodiments of a CSA. In one embodiment, the main goal of a CSA is to support compiler produced programs. Section 3 below examines embodiments of a CSA compilation tool chain. The advantages of embodiments of a CSA are compared to other architectures in the execution of compiled codes in Section 4. Finally the performance of embodiments of a CSA microarchitecture is discussed in Section 5, further CSA details are discussed in Section 6, and a summary is provided in Section 7.

1. CSA ARCHITECTURE

The goal of certain embodiments of a CSA is to rapidly and efficiently execute programs, e.g., programs produced by compilers. Certain embodiments of the CSA architecture provide programming abstractions that support the needs of compiler technologies and programming paradigms. Embodiments of the CSA execute dataflow graphs, e.g., a program manifestation that closely resembles the compiler's own internal representation (IR) of compiled programs. In this model, a program is represented as a dataflow graph comprised of nodes (e.g., vertices) drawn from a set of architecturally-defined dataflow operators (e.g., that encompass both computation and control operations) and edges which represent the transfer of data between dataflow operators. Execution may proceed by injecting dataflow tokens (e.g., that are or represent data values) into the dataflow graph. Tokens may flow between and be transformed at each node (e.g., vertex), for example, forming a complete computation. A sample dataflow graph and its derivation from high-level source code is shown in FIGS. 3A-3C, and FIG. 5 shows an example of the execution of a dataflow graph.

Embodiments of the CSA are configured for dataflow graph execution by providing exactly those dataflow-graph-execution supports required by compilers. In one embodiment, the CSA is an accelerator (e.g., an accelerator in FIG.

2) and it does not seek to provide some of the necessary but infrequently used mechanisms available on general purpose processing cores (e.g., a core in FIG. 2), such as system calls. Therefore, in this embodiment, the CSA can execute many codes, but not all codes. In exchange, the CSA gains significant performance and energy advantages. To enable the acceleration of code written in commonly used sequential languages, embodiments herein also introduce several novel architectural features to assist the compiler. One particular novelty is CSA's treatment of memory, a subject which has been ignored or poorly addressed previously. Embodiments of the CSA are also unique in the use of dataflow operators, e.g., as opposed to lookup tables (LUTs), as their fundamental architectural interface.

Turning to embodiments of the CSA, dataflow operators are discussed next.

1.1 Dataflow Operators

The key architectural interface of embodiments of the accelerator (e.g., CSA) is the dataflow operator, e.g., as a direct representation of a node in a dataflow graph. From an operational perspective, dataflow operators behave in a streaming or data-driven fashion. Dataflow operators may execute as soon as their incoming operands become available. CSA dataflow execution may depend (e.g., only) on highly localized status, for example, resulting in a highly scalable architecture with a distributed, asynchronous execution model. Dataflow operators may include arithmetic dataflow operators, for example, one or more of floating point addition and multiplication, integer addition, subtraction, and multiplication, various forms of comparison, logical operators, and shift. However, embodiments of the CSA may also include a rich set of control operators which assist in the management of dataflow tokens in the program graph. Examples of these include a "pick" operator, e.g., which multiplexes two or more logical input channels into a single output channel, and a "switch" operator, e.g., which operates as a channel demultiplexor (e.g., outputting a single channel from two or more logical input channels). These operators may enable a compiler to implement control paradigms such as conditional expressions. Certain embodiments of a CSA may include a limited dataflow operator set (e.g., to relatively small number of operations) to yield dense and energy efficient PE microarchitectures. Certain embodiments may include dataflow operators for complex operations that are common in HPC code. The CSA dataflow operator architecture is highly amenable to deployment-specific extensions. For example, more complex mathematical dataflow operators, e.g., trigonometry functions, may be included in certain embodiments to accelerate certain mathematics-intensive HPC workloads. Similarly, a neural-network tuned extension may include dataflow operators for vectorized, low precision arithmetic.

FIG. 3A illustrates a program source according to embodiments of the disclosure. Program source code includes a multiplication function (func). FIG. 3B illustrates a dataflow graph 300 for the program source of FIG. 3A according to embodiments of the disclosure. Dataflow graph 300 includes a pick node 304, switch node 306, and multiplication node 308. A buffer may optionally be included along one or more of the communication paths. Depicted dataflow graph 300 may perform an operation of selecting input X with pick node 304, multiplying X by Y (e.g., multiplication node 308), and then outputting the result from the left output of the switch node 306. FIG. 3C illustrates an accelerator (e.g., CSA) with a plurality of processing elements 301 configured to execute the dataflow graph of FIG. 3B according to embodiments of the disclosure. More particularly, the dataflow graph 300 is overlaid into the array of processing elements 301 (e.g., and the (e.g., interconnect) network(s) therebetween), for example, such that each node of the dataflow graph 300 is represented as a dataflow operator in the array of processing elements 301. For example, certain dataflow operations may be achieved with a processing element and/or certain dataflow operations may be achieved with a communications network (e.g., a network dataflow endpoint circuit thereof). For example, a Pick, PickSingleLeg, PickAny, Switch, and/or SwitchAny operation may be achieved with one or more components of a communications network (e.g., a network dataflow endpoint circuit thereof), e.g., in contrast to a processing element.

In one embodiment, one or more of the processing elements in the array of processing elements 301 is to access memory through memory interface 302. In one embodiment, pick node 304 of dataflow graph 300 thus corresponds (e.g., is represented by) to pick operator 304A, switch node 306 of dataflow graph 300 thus corresponds (e.g., is represented by) to switch operator 306A, and multiplier node 308 of dataflow graph 300 thus corresponds (e.g., is represented by) to multiplier operator 308A. Another processing element and/or a flow control path network may provide the control signals (e.g., control tokens) to the pick operator 304A and switch operator 306A to perform the operation in FIG. 3A. In one embodiment, array of processing elements 301 is configured to execute the dataflow graph 300 of FIG. 3B before execution begins. In one embodiment, compiler performs the conversion from FIG. 3A-3B. In one embodiment, the input of the dataflow graph nodes into the array of processing elements logically embeds the dataflow graph into the array of processing elements, e.g., as discussed further below, such that the input/output paths are configured to produce the desired result.

1.2 Latency Insensitive Channels

Communications arcs are the second major component of the dataflow graph. Certain embodiments of a CSA describes these arcs as latency insensitive channels, for example, in-order, back-pressured (e.g., not producing or sending output until there is a place to store the output), point-to-point communications channels. As with dataflow operators, latency insensitive channels are fundamentally asynchronous, giving the freedom to compose many types of networks to implement the channels of a particular graph. Latency insensitive channels may have arbitrarily long latencies and still faithfully implement the CSA architecture. However, in certain embodiments there is strong incentive in terms of performance and energy to make latencies as small as possible. Section 2.2 herein discloses a network microarchitecture in which dataflow graph channels are implemented in a pipelined fashion with no more than one cycle of latency. Embodiments of latency-insensitive channels provide a critical abstraction layer which may be leveraged with the CSA architecture to provide a number of runtime services to the applications programmer. For example, a CSA may leverage latency-insensitive channels in the implementation of the CSA configuration (the loading of a program onto the CSA array).

Figure 4:
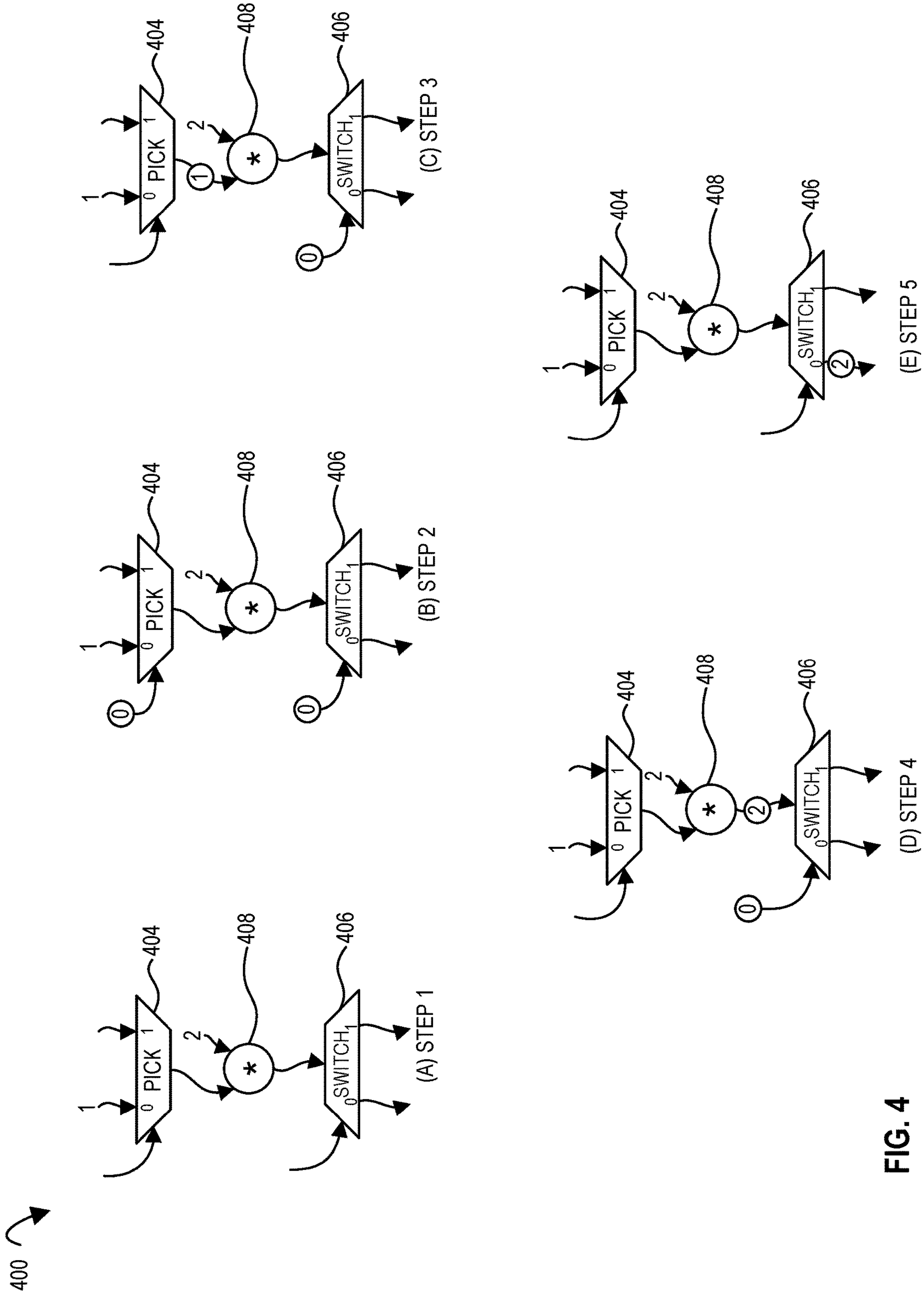
FIG. 4 illustrates an example execution of a dataflow graph according to embodiments of the disclosure.

FIG. 4 illustrates an example execution of a dataflow graph 400 according to embodiments of the disclosure. At step 1, input values (e.g., 1 for X in FIG. 3B and 2 for Y in FIG. 3B) may be loaded in dataflow graph 400 to perform a 1*2 multiplication operation. One or more of the data input values may be static (e.g., constant) in the operation (e.g., 1 for X and 2 for Y in reference to FIG. 3B) or updated during the operation. At step 2, a processing element (e.g., on a flow control path network) or other circuit outputs a zero to control input (e.g., multiplexer control signal) of pick node 404 (e.g., to source a one from port "0" to its output) and outputs a zero to control input (e.g., multiplexer control signal) of switch node 406 (e.g., to provide its input out of port "0" to a destination (e.g., a downstream processing element). At step 3, the data value of 1 is output from pick node 404 (e.g., and consumes its control signal "0" at the pick node 404) to multiplier node 408 to be multiplied with the data value of 2 at step 4. At step 4, the output of multiplier node 408 arrives at switch node 406, e.g., which causes switch node 406 to consume a control signal "0" to output the value of 2 from port "0" of switch node 406 at step 5. The operation is then complete. A CSA may thus be programmed accordingly such that a corresponding dataflow operator for each node performs the operations in FIG. 4. Although execution is serialized in this example, in principle all dataflow operations may execute in parallel. Steps are used in FIG. 4 to differentiate dataflow execution from any physical microarchitectural manifestation. In one embodiment a downstream processing element is to send a signal (or not send a ready signal) (for example, on a flow control path network) to the switch 406 to stall the output from the switch 406, e.g., until the downstream processing element is ready (e.g., has storage room) for the output.

1.3 Memory

Dataflow architectures generally focus on communication and data manipulation with less attention paid to state. However, enabling real software, especially programs written in legacy sequential languages, requires significant attention to interfacing with memory. Certain embodiments of a CSA use architectural memory operations as their primary interface to (e.g., large) stateful storage. From the perspective of the dataflow graph, memory operations are similar to other dataflow operations, except that they have the side effect of updating a shared store. In particular, memory operations of certain embodiments herein have the same semantics as every other dataflow operator, for example, they "execute" when their operands, e.g., an address, are available and, after some latency, a response is produced. Certain embodiments herein explicitly decouple the operand input and result output such that memory operators are naturally pipelined and have the potential to produce many simultaneous outstanding requests, e.g., making them exceptionally well suited to the latency and bandwidth characteristics of a memory subsystem. Embodiments of a CSA provide basic memory operations such as load, which takes an address channel and populates a response channel with the values corresponding to the addresses, and a store. Embodiments of a CSA may also provide more advanced operations such as in-memory atomics and consistency operators. These operations may have similar semantics to their von Neumann counterparts. Embodiments of a CSA may accelerate existing programs described using sequential languages such as C and Fortran. A consequence of supporting these language models is addressing program memory order, e.g., the serial ordering of memory operations typically prescribed by these languages.

FIG. 5 illustrates a program source (e.g., C code) 500 according to embodiments of the disclosure. According to the memory semantics of the C programming language, memory copy (memcpy) should be serialized. However, memcpy may be parallelized with an embodiment of the CSA if arrays A and B are known to be disjoint. FIG. 5 further illustrates the problem of program order. In general, compilers cannot prove that array A is different from array B, e.g., either for the same value of index or different values of index across loop bodies. This is known as pointer or memory aliasing. Since compilers are to generate statically correct code, they are usually forced to serialize memory accesses. Typically, compilers targeting sequential von Neumann architectures use instruction ordering as a natural means of enforcing program order. However, embodiments of the CSA have no notion of instruction or instruction-based program ordering as defined by a program counter. In certain embodiments, incoming dependency tokens, e.g., which contain no architecturally visible information, are like all other dataflow tokens and memory operations may not execute until they have received a dependency token. In certain embodiments, memory operations produce an outgoing dependency token once their operation is visible to all logically subsequent, dependent memory operations. In certain embodiments, dependency tokens are similar to other dataflow tokens in a dataflow graph. For example, since memory operations occur in conditional contexts, dependency tokens may also be manipulated using control operators described in Section 1.1, e.g., like any other tokens. Dependency tokens may have the effect of serializing memory accesses, e.g., providing the compiler a means of architecturally defining the order of memory accesses.

1.4 Runtime Services

A primary architectural considerations of embodiments of the CSA involve the actual execution of user-level programs, but it may also be desirable to provide several support mechanisms which underpin this execution. Chief among these are configuration (in which a dataflow graph is loaded into the CSA), extraction (in which the state of an executing graph is moved to memory), and exceptions (in which mathematical, soft, and other types of errors in the fabric are detected and handled, possibly by an external entity). Section 2.8 below discusses the properties of a latency-insensitive dataflow architecture of an embodiment of a CSA to yield efficient, largely pipelined implementations of these functions. Conceptually, configuration may load the state of a dataflow graph into the interconnect (and/or communications network (e.g., a network dataflow endpoint circuit thereof)) and processing elements (e.g., fabric), e.g., generally from memory. During this step, all structures in the CSA may be loaded with a new dataflow graph and any dataflow tokens live in that graph, for example, as a consequence of a context switch. The latency-insensitive semantics of a CSA may permit a distributed, asynchronous initialization of the fabric, e.g., as soon as PEs are configured, they may begin execution immediately. Unconfigured PEs may backpressure their channels until they are configured, e.g., preventing communications between configured and unconfigured elements. The CSA configuration may be partitioned into privileged and user-level state. Such a two-level partitioning may enable primary configuration of the fabric to occur without invoking the operating system. During one embodiment of extraction, a logical view of the dataflow graph is captured and committed into memory, e.g., including all live control and dataflow tokens and state in the graph.

Extraction may also play a role in providing reliability guarantees through the creation of fabric checkpoints. Exceptions in a CSA may generally be caused by the same events that cause exceptions in processors, such as illegal operator arguments or reliability, availability, and serviceability (RAS) events. In certain embodiments, exceptions are detected at the level of dataflow operators, for example, checking argument values or through modular arithmetic schemes. Upon detecting an exception, a dataflow operator (e.g., circuit) may halt and emit an exception message, e.g., which contains both an operation identifier and some details of the nature of the problem that has occurred. In one embodiment, the dataflow operator will remain halted until it has been reconfigured. The exception message may then be communicated to an associated processor (e.g., core) for service, e.g., which may include extracting the graph for software analysis.

1.5 Tile-Level Architecture

Figure 6:
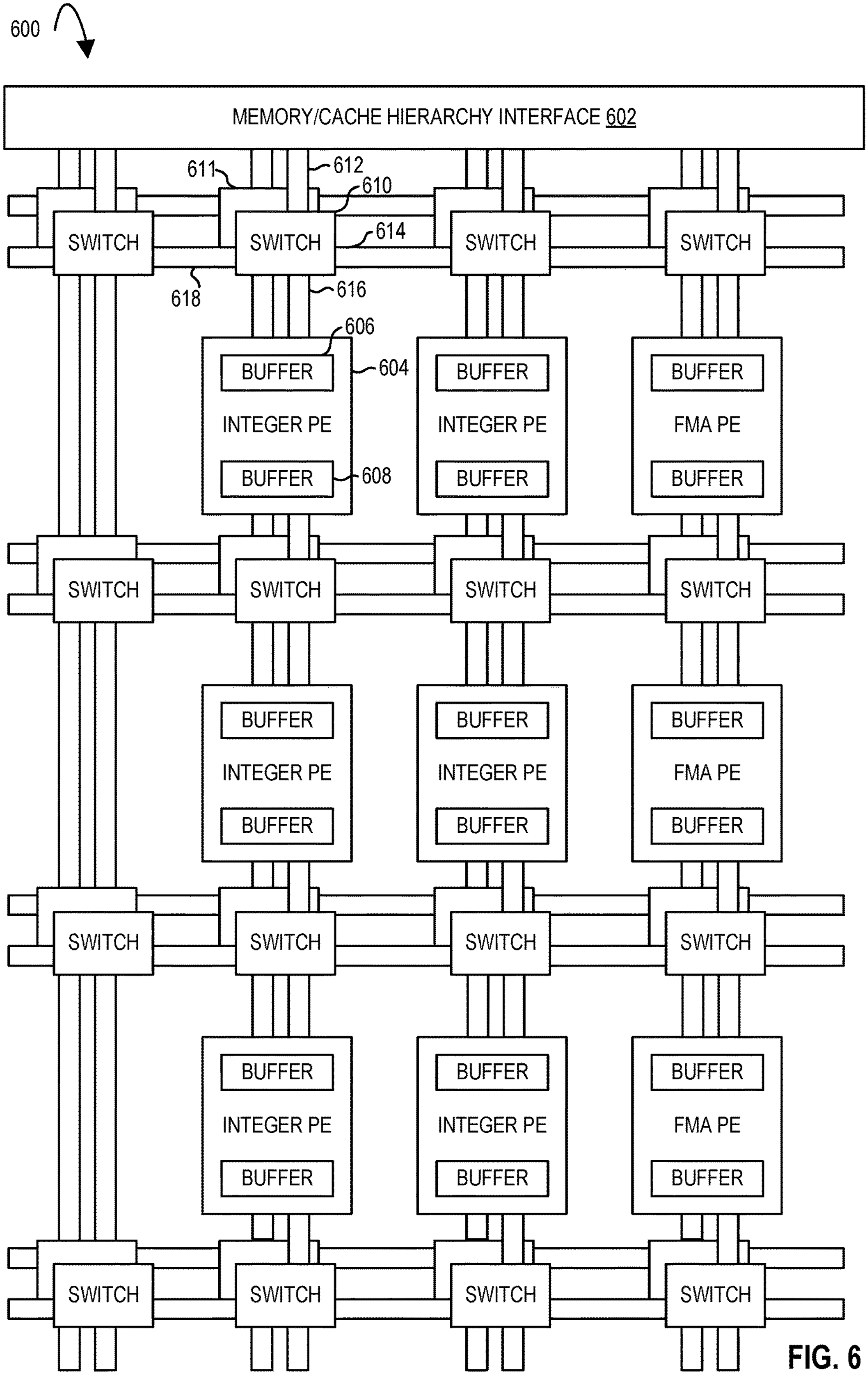
FIG. 6 illustrates an accelerator tile comprising an array of processing elements according to embodiments of the disclosure.
Figure 8:
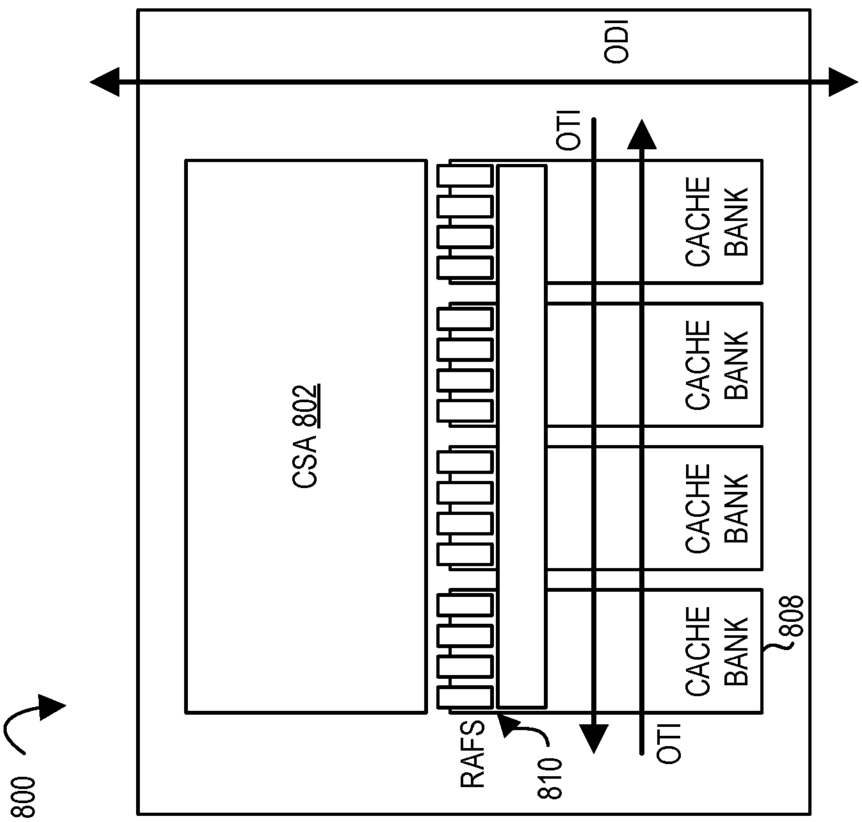
FIG. 8 illustrates a hardware processor tile comprising an accelerator according to embodiments of the disclosure.

Embodiments of the CSA computer architectures (e.g., targeting HPC and datacenter uses) are tiled. FIGS. 6 and 8 show tile-level deployments of a CSA. FIG. 8 shows a full-tile implementation of a CSA, e.g., which may be an accelerator of a processor with a core. A main advantage of this architecture is may be reduced design risk, e.g., such that the CSA and core are completely decoupled in manufacturing. In addition to allowing better component reuse, this may allow the design of components like the CSA Cache to consider only the CSA, e.g., rather than needing to incorporate the stricter latency requirements of the core. Finally, separate tiles may allow for the integration of CSA with small or large cores. One embodiment of the CSA captures most vector-parallel workloads such that most vector-style workloads run directly on the CSA, but in certain embodiments vector-style instructions in the core may be included, e.g., to support legacy binaries.

2. MICROARCHITECTURE

In one embodiment, the goal of the CSA microarchitecture is to provide a high quality implementation of each dataflow operator specified by the CSA architecture. Embodiments of the CSA microarchitecture provide that each processing element (and/or communications network (e.g., a network dataflow endpoint circuit thereof)) of the microarchitecture corresponds to approximately one node (e.g., entity) in the architectural dataflow graph. In one embodiment, a node in the dataflow graph is distributed in multiple network dataflow endpoint circuits. In certain embodiments, this results in microarchitectural elements that are not only compact, resulting in a dense computation array, but also energy efficient, for example, where processing elements (PEs) are both simple and largely unmultiplexed, e.g., executing a single dataflow operator for a configuration (e.g., programming) of the CSA. To further reduce energy and implementation area, a CSA may include a configurable, heterogeneous fabric style in which each PE thereof implements only a subset of dataflow operators (e.g., with a separate subset of dataflow operators implemented with network dataflow endpoint circuit(s)). Peripheral and support subsystems, such as the CSA cache, may be provisioned to support the distributed parallelism incumbent in the main CSA processing fabric itself. Implementation of CSA microarchitectures may utilize dataflow and latency-insensitive communications abstractions present in the architecture. In certain embodiments, there is (e.g., substantially) a one-to-one correspondence between nodes in the compiler generated graph and the dataflow operators (e.g., dataflow operator compute elements) in a CSA.

Below is a discussion of an example CSA, followed by a more detailed discussion of the microarchitecture. Certain embodiments herein provide a CSA that allows for easy compilation, e.g., in contrast to an existing FPGA compilers that handle a small subset of a programming language (e.g., C or C++) and require many hours to compile even small programs.

Certain embodiments of a CSA architecture admits of heterogeneous coarse-grained operations, like double precision floating point. Programs may be expressed in fewer coarse grained operations, e.g., such that the disclosed compiler runs faster than traditional spatial compilers. Certain embodiments include a fabric with new processing elements to support sequential concepts like program ordered memory accesses. Certain embodiments implement hardware to support coarse-grained dataflow-style communication channels. This communication model is abstract, and very close to the control-dataflow representation used by the compiler. Certain embodiments herein include a network implementation that supports single-cycle latency communications, e.g., utilizing (e.g., small) PEs which support single control-dataflow operations. In certain embodiments, not only does this improve energy efficiency and performance, it simplifies compilation because the compiler makes a one-to-one mapping between high-level dataflow constructs and the fabric. Certain embodiments herein thus simplify the task of compiling existing (e.g., C, C++, or Fortran) programs to a CSA (e.g., fabric).

Energy efficiency may be a first order concern in modern computer systems. Certain embodiments herein provide a new schema of energy-efficient spatial architectures. In certain embodiments, these architectures form a fabric with a unique composition of a heterogeneous mix of small, energy-efficient, data-flow oriented processing elements (PEs) (and/or a packet switched communications network (e.g., a network dataflow endpoint circuit thereof)) with a lightweight circuit switched communications network (e.g., interconnect), e.g., with hardened support for flow control. Due to the energy advantages of each, the combination of these components may form a spatial accelerator (e.g., as part of a computer) suitable for executing compiler-generated parallel programs in an extremely energy efficient manner. Since this fabric is heterogeneous, certain embodiments may be customized for different application domains by introducing new domain-specific PEs. For example, a fabric for high-performance computing might include some customization for double-precision, fused multiply-add, while a fabric targeting deep neural networks might include low-precision floating point operations.

An embodiment of a spatial architecture schema, e.g., as exemplified in FIG. 6, is the composition of light-weight processing elements (PE) connected by an inter-PE network. Generally, PEs may comprise dataflow operators, e.g., where once (e.g., all) input operands arrive at the dataflow operator, some operation (e.g., micro-instruction or set of micro-instructions) is executed, and the results are forwarded to downstream operators. Control, scheduling, and data storage may therefore be distributed amongst the PEs, e.g., removing the overhead of the centralized structures that dominate classical processors.

Programs may be converted to dataflow graphs that are mapped onto the architecture by configuring PEs and the network to express the control-dataflow graph of the program. Communication channels may be flow-controlled and fully back-pressured, e.g., such that PEs will stall if either source communication channels have no data or destination communication channels are full. In one embodiment, at runtime, data flow through the PEs and channels that have been configured to implement the operation (e.g., an accelerated algorithm). For example, data may be streamed in from memory, through the fabric, and then back out to memory.

Embodiments of such an architecture may achieve remarkable performance efficiency relative to traditional multicore processors: compute (e.g., in the form of PEs) may be simpler, more energy efficient, and more plentiful than in larger cores, and communications may be direct and mostly short-haul, e.g., as opposed to occurring over a wide, full-chip network as in typical multicore processors. Moreover, because embodiments of the architecture are extremely parallel, a number of powerful circuit and device level optimizations are possible without seriously impacting throughput, e.g., low leakage devices and low operating voltage. These lower-level optimizations may enable even greater performance advantages relative to traditional cores. The combination of efficiency at the architectural, circuit, and device levels yields of these embodiments are compelling. Embodiments of this architecture may enable larger active areas as transistor density continues to increase.

Embodiments herein offer a unique combination of dataflow support and circuit switching to enable the fabric to be smaller, more energy-efficient, and provide higher aggregate performance as compared to previous architectures. FPGAs are generally tuned towards fine-grained bit manipulation, whereas embodiments herein are tuned toward the double-precision floating point operations found in HPC applications. Certain embodiments herein may include a FPGA in addition to a CSA according to this disclosure.

Certain embodiments herein combine a light-weight network with energy efficient dataflow processing elements (and/or communications network (e.g., a network dataflow endpoint circuit thereof)) to form a high-throughput, low-latency, energy-efficient HPC fabric. This low-latency network may enable the building of processing elements (and/or communications network (e.g., a network dataflow endpoint circuit thereof)) with fewer functionalities, for example, only one or two instructions and perhaps one architecturally visible register, since it is efficient to gang multiple PEs together to form a complete program.

Relative to a processor core, CSA embodiments herein may provide for more computational density and energy efficiency. For example, when PEs are very small (e.g., compared to a core), the CSA may perform many more operations and have much more computational parallelism than a core, e.g., perhaps as many as 16 times the number of FMAs as a vector processing unit (VPU). To utilize all of these computational elements, the energy per operation is very low in certain embodiments.

The energy advantages our embodiments of this dataflow architecture are many. Parallelism is explicit in dataflow graphs and embodiments of the CSA architecture spend no or minimal energy to extract it, e.g., unlike out-of-order processors which must re-discover parallelism each time an instruction is executed. Since each PE is responsible for a single operation in one embodiment, the register files and ports counts may be small, e.g., often only one, and therefore use less energy than their counterparts in core. Certain CSAs include many PEs, each of which holds live program values, giving the aggregate effect of a huge register file in a traditional architecture, which dramatically reduces memory accesses. In embodiments where the memory is multi-ported and distributed, a CSA may sustain many more outstanding memory requests and utilize more bandwidth than a core. These advantages may combine to yield an energy level per watt that is only a small percentage over the cost of the bare arithmetic circuitry. For example, in the case of an integer multiply, a CSA may consume no more than 25% more energy than the underlying multiplication circuit. Relative to one embodiment of a core, an integer operation in that CSA fabric consumes less than 1/30th of the energy per integer operation.

From a programming perspective, the application-specific malleability of embodiments of the CSA architecture yields significant advantages over a vector processing unit (VPU). In traditional, inflexible architectures, the number of functional units, like floating divide or the various transcendental mathematical functions, must be chosen at design time based on some expected use case. In embodiments of the CSA architecture, such functions may be configured (e.g., by a user and not a manufacturer) into the fabric based on the requirement of each application. Application throughput may thereby be further increased. Simultaneously, the compute density of embodiments of the CSA improves by avoiding hardening such functions, and instead provision more instances of primitive functions like floating multiplication. These advantages may be significant in HPC workloads, some of which spend 75% of floating execution time in transcendental functions.

Certain embodiments of the CSA represents a significant advance as a dataflow-oriented spatial architectures, e.g., the PEs of this disclosure may be smaller, but also more energy-efficient. These improvements may directly result from the combination of dataflow-oriented PEs with a lightweight, circuit switched interconnect, for example, which has single-cycle latency, e.g., in contrast to a packet switched network (e.g., with, at a minimum, a 300% higher latency). Certain embodiments of PEs support 32-bit or 64-bit operation. Certain embodiments herein permit the introduction of new application-specific PEs, for example, for machine learning or security, and not merely a homogeneous combination. Certain embodiments herein combine lightweight dataflow-oriented processing elements with a lightweight, low-latency network to form an energy efficient computational fabric.

In order for certain spatial architectures to be successful, programmers are to configure them with relatively little effort, e.g., while obtaining significant power and performance superiority over sequential cores. Certain embodiments herein provide for a CSA (e.g., spatial fabric) that is easily programmed (e.g., by a compiler), power efficient, and highly parallel. Certain embodiments herein provide for a (e.g., interconnect) network that achieves these three goals. From a programmability perspective, certain embodiments of the network provide flow controlled channels, e.g., which correspond to the control-dataflow graph (CDFG) model of execution used in compilers. Certain network embodiments utilize dedicated, circuit switched links, such that program performance is easier to reason about, both by a human and a compiler, because performance is predictable. Certain network embodiments offer both high bandwidth and low latency. Certain network embodiments (e.g., static, circuit switching) provides a latency of 0 to 1 cycle (e.g., depending on the transmission distance.) Certain network embodiments provide for a high bandwidth by laying out several networks in parallel, e.g., and in low-level metals. Certain network embodiments communicate in low-level metals and over short distances, and thus are very power efficient.

Certain embodiments of networks include architectural support for flow control. For example, in spatial accelerators composed of small processing elements (PEs), communications latency and bandwidth may be critical to overall program performance. Certain embodiments herein provide for a light-weight, circuit switched network which facilitates communication between PEs in spatial processing arrays, such as the spatial array shown in FIG. 6, and the micro-architectural control features necessary to support this network. Certain embodiments of a network enable the construction of point-to-point, flow controlled communications channels which support the communications of the dataflow oriented processing elements (PEs). In addition to point-to-point communications, certain networks herein also support multicast communications. Communications channels may be formed by statically configuring the network to from virtual circuits between PEs. Circuit switching techniques herein may decrease communications latency and commensurately minimize network buffering, e.g., resulting in both high performance and high energy efficiency. In certain embodiments of a network, inter-PE latency may be as low as a zero cycles, meaning that the downstream PE may operate on data in the cycle after it is produced. To obtain even higher bandwidth, and to admit more programs, multiple networks may be laid out in parallel, e.g., as shown in FIG. 6.

Spatial architectures, such as the one shown in FIG. 6, may be the composition of lightweight processing elements connected by an inter-PE network (and/or communications network (e.g., a network dataflow endpoint circuit thereof)). Programs, viewed as dataflow graphs, may be mapped onto the architecture by configuring PEs and the network. Generally, PEs may be configured as dataflow operators, and once (e.g., all) input operands arrive at the PE, some operation may then occur, and the result are forwarded to the desired downstream PEs. PEs may communicate over dedicated virtual circuits which are formed by statically configuring a circuit switched communications network. These virtual circuits may be flow controlled and fully backpressured, e.g., such that PEs will stall if either the source has no data or the destination is full. At runtime, data may flow through the PEs implementing the mapped algorithm. For example, data may be streamed in from memory, through the fabric, and then back out to memory. Embodiments of this architecture may achieve remarkable performance efficiency relative to traditional multicore processors: for example, where compute, in the form of PEs, is simpler and more numerous than larger cores and communication are direct, e.g., as opposed to an extension of the memory system.

FIG. 6 illustrates an accelerator tile 600 comprising an array of processing elements (PEs) according to embodiments of the disclosure. The interconnect network is depicted as circuit switched, statically configured communications channels. For example, a set of channels coupled together by a switch (e.g., switch 610 in a first network and switch 611 in a second network). The first network and second network may be separate or coupled together. For example, switch 610 may couple one or more of the four data paths (612, 614, 616, 618) together, e.g., as configured to perform an operation according to a dataflow graph. In one embodiment, the number of data paths is any plurality. Processing element (e.g., processing element 604) may be as disclosed herein, for example, as in FIG. 9 or FIG. 32. Accelerator tile 600 includes a memory/cache hierarchy interface 602, e.g., to interface the accelerator tile 600 with a memory and/or cache. A data path (e.g., 618) may extend to another tile or terminate, e.g., at the edge of a tile. A processing element may include an input buffer (e.g., buffer 606) and an output buffer (e.g., buffer 608).

Figure 9:
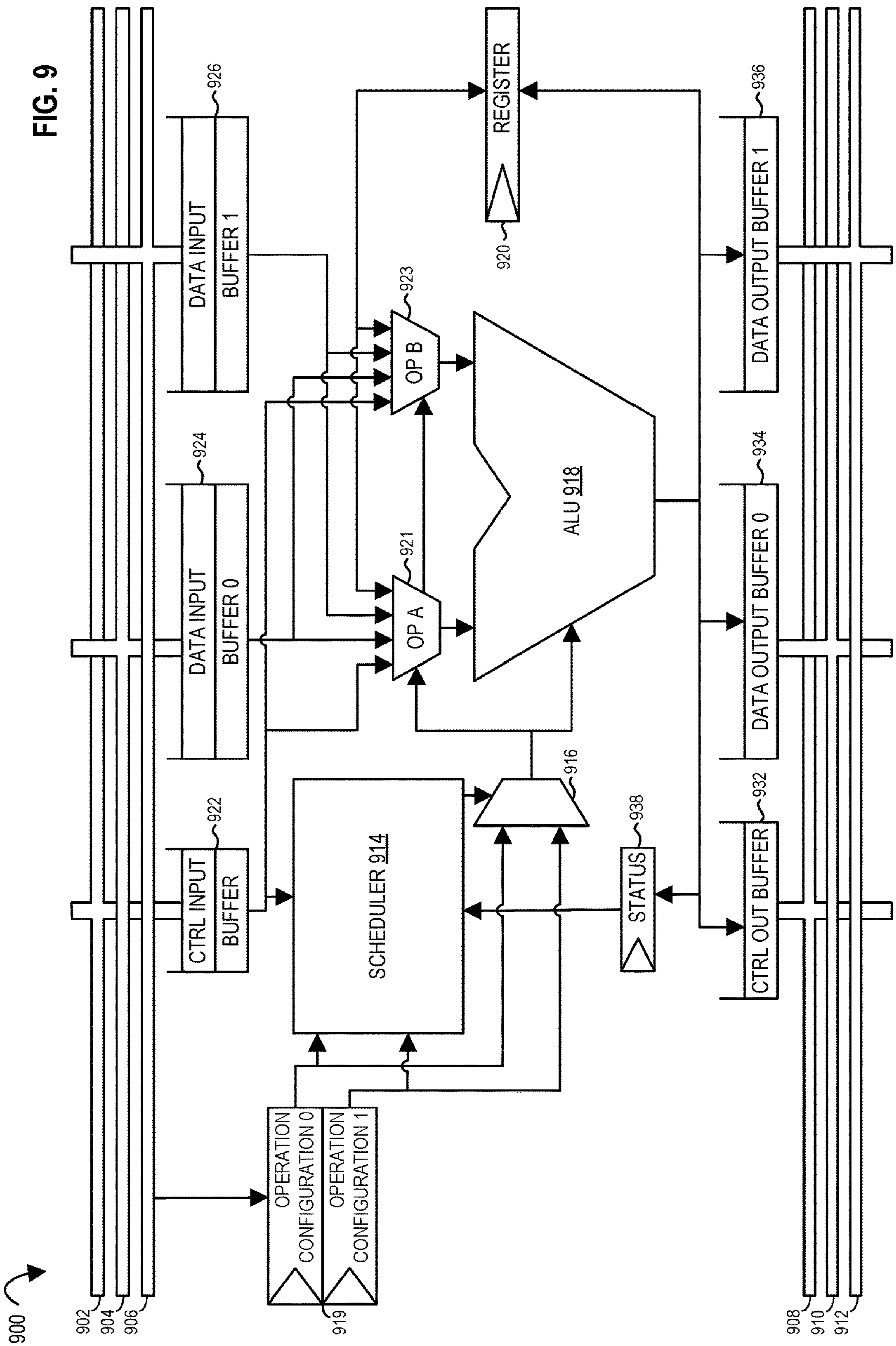
FIG. 9 illustrates a processing element according to embodiments of the disclosure.
Figure 10A:
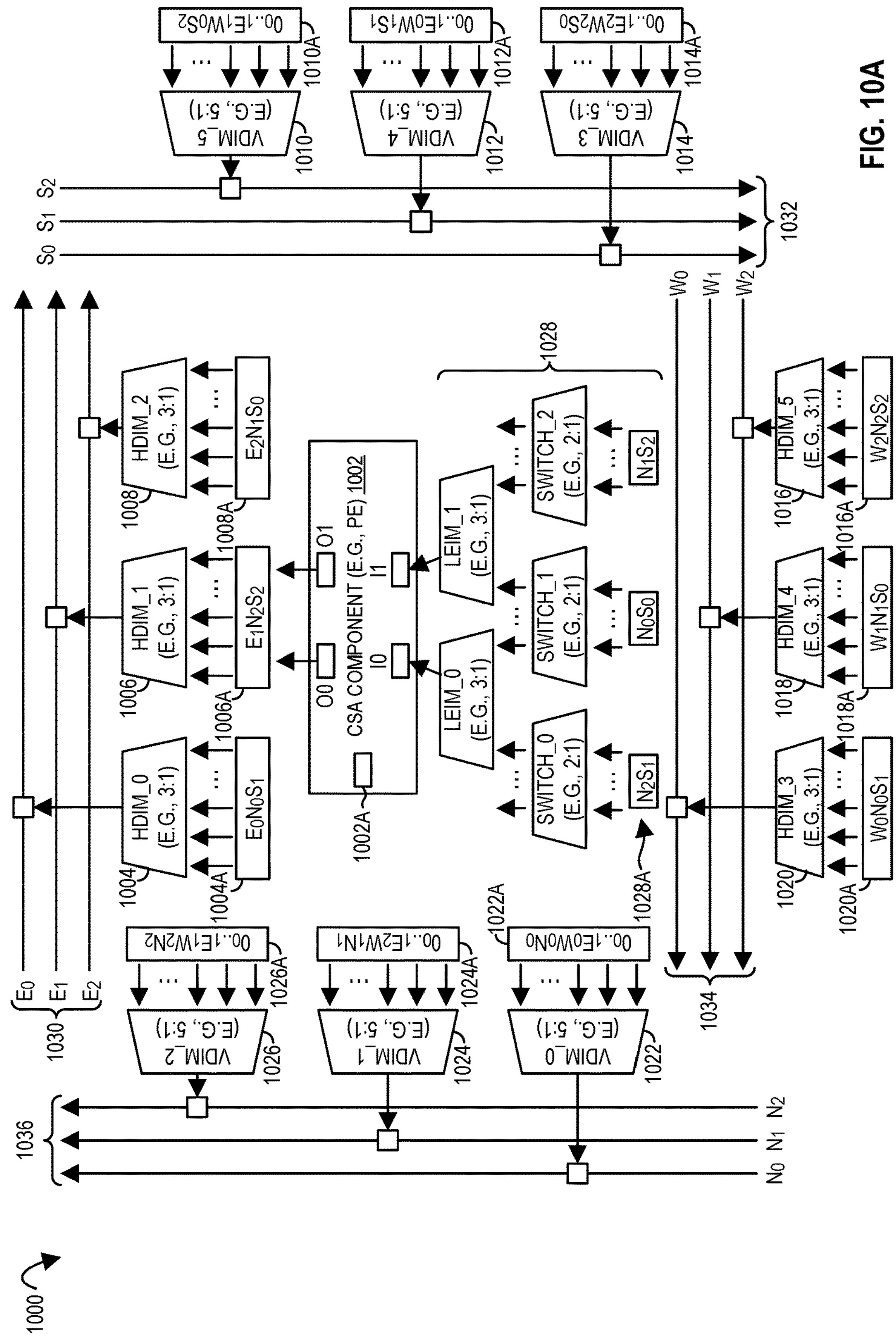
FIG. 10A illustrates a circuit switched network according to embodiments of the disclosure.
Figure 10B:
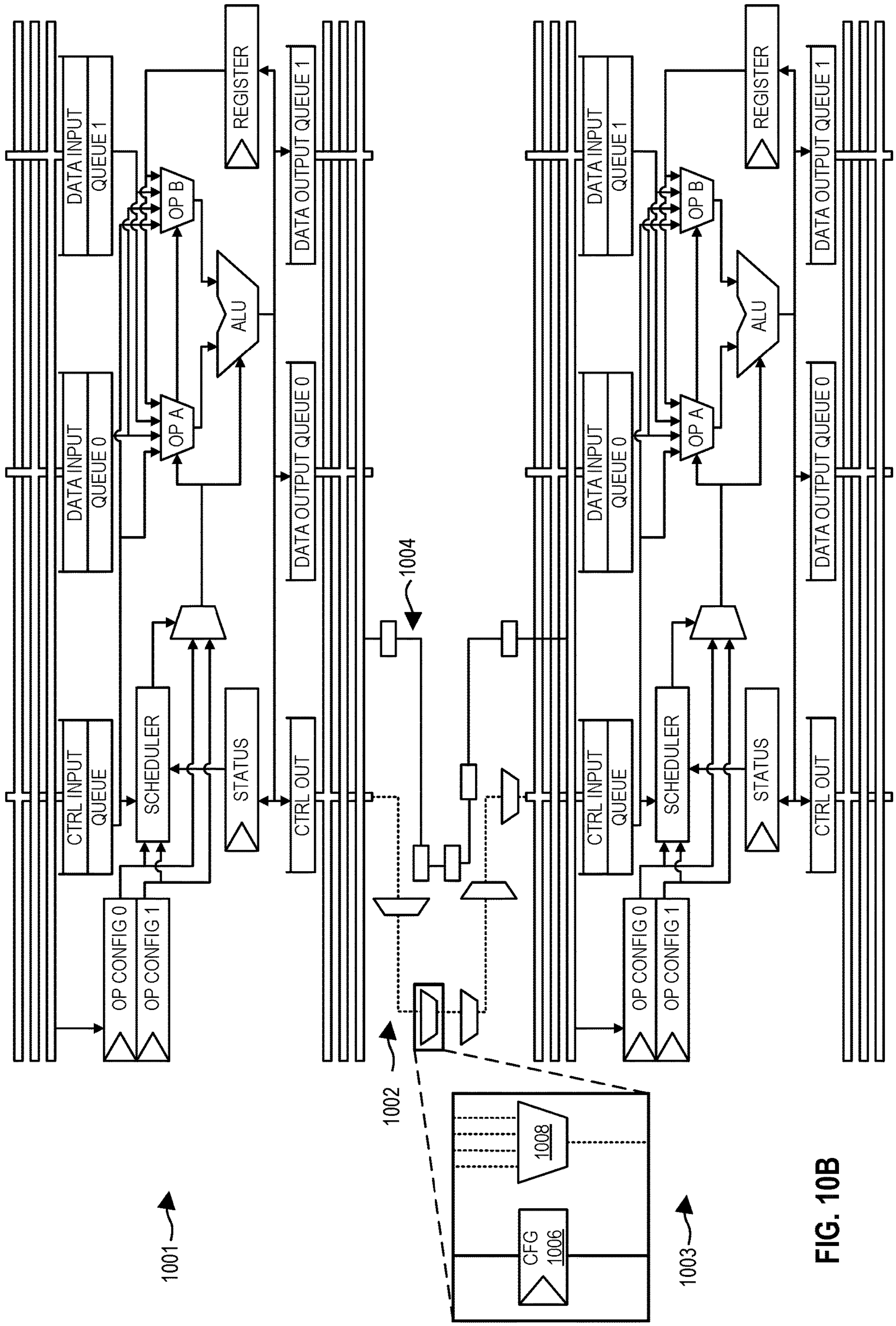
FIG. 10B illustrates a zoomed in view of a data path formed by setting a configuration value (e.g., bits) in a configuration storage of a circuit switched network between a first processing element and a second processing element according to embodiments of the disclosure.
Figure 10C:
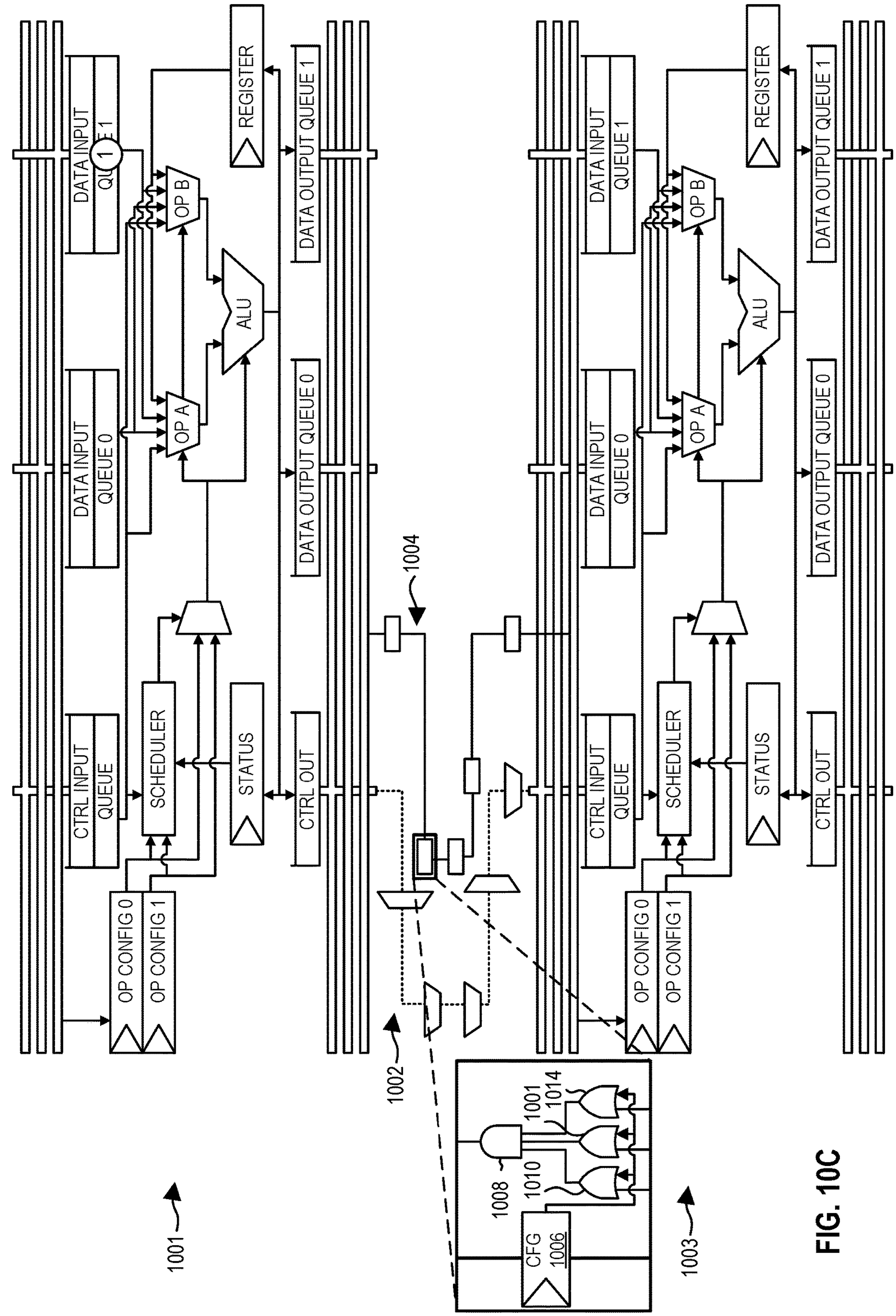
FIG. 10C illustrates a zoomed in view of a flow control (e.g., backpressure) path formed by setting a configuration value (e.g., bits) in a configuration storage (e.g., register) of a circuit switched network between a first processing element and a second processing element according to embodiments of the disclosure.

Operations may be executed based on the availability of their inputs and the status of the PE. A PE may obtain operands from input channels and write results to output channels, although internal register state may also be used. Certain embodiments herein include a configurable dataflow-friendly PE. FIG. 9 shows a detailed block diagram of one such PE. This PE consists of several I/O buffers, an ALU, a storage register, some instruction registers, and a scheduler. Each cycle, the scheduler may select an instruction for execution based on the availability of the input and output buffers and the status of the PE. The result of the operation may then be written to either an output buffer or to a (e.g., local to the PE) register. Data written to an output buffer may be transported to a downstream PE for further processing. This style of PE may be extremely energy efficient, for example, rather than reading data from a complex, multi-ported register file, a PE reads the data from a register. Similarly, instructions may be stored directly in a register, rather than in a virtualized instruction cache.

Instruction registers may be set during a special configuration step. During this step, auxiliary control wires and state, in addition to the inter-PE network, may be used to stream in configuration across the several PEs comprising the fabric. As result of parallelism, certain embodiments of such a network may provide for rapid reconfiguration, e.g., a tile sized fabric may be configured in less than about 10 microseconds.

FIG. 9 represents one example configuration of a processing element, e.g., in which all architectural elements are minimally sized. In other embodiments, each of the components of a processing element is independently scaled to produce new PEs. For example, to handle more complicated programs, a larger number of instructions that are executable by a PE may be introduced. A second dimension of configurability is in the function of the PE arithmetic logic unit (ALU). In FIG. 9, an PE is depicted which may support addition, subtraction, and various logic operations. Other kinds of PEs may be created by substituting different kinds of functional units into the PE. An integer multiplication PE, for example, might have no registers, a single instruction, and a single output buffer. Certain embodiments of a PE decompose a fused multiply add (FMA) into separate, but tightly coupled floating multiply and floating add units to improve support for multiply-add-heavy workloads. PEs are discussed further below.

Figure 7A:
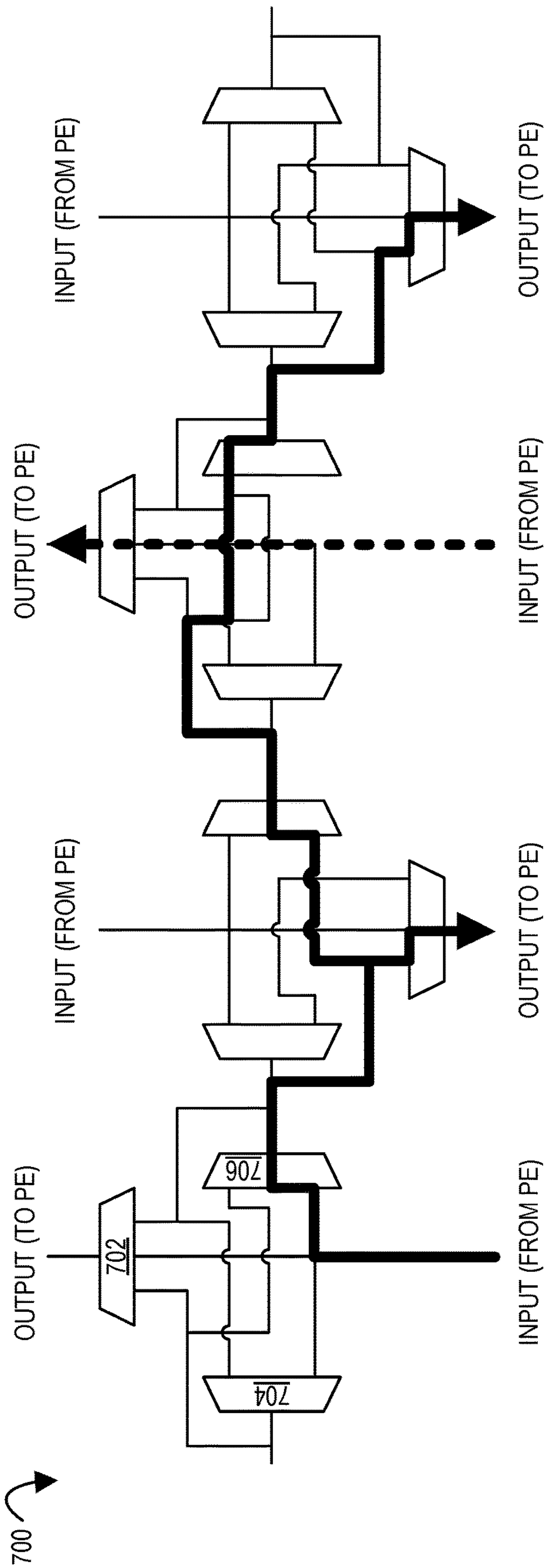
FIG. 7A illustrates a configurable data path network according to embodiments of the disclosure.
Figure 7B:
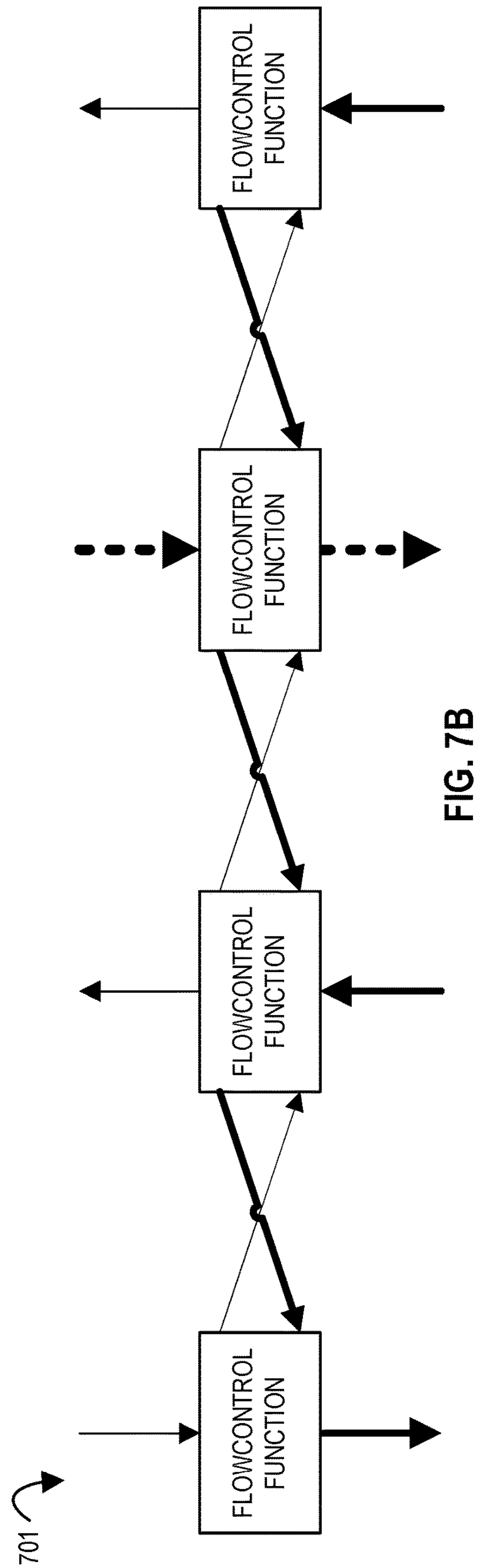
FIG. 7B illustrates a configurable flow control path network according to embodiments of the disclosure.

FIG. 7A illustrates a configurable data path network 700 (e.g., of network one or network two discussed in reference to FIG. 6) according to embodiments of the disclosure. Network 700 includes a plurality of multiplexers (e.g., multiplexers 702, 704, 706) that may be configured (e.g., via their respective control signals) to connect one or more data paths (e.g., from PEs) together. FIG. 7B illustrates a configurable flow control path network 701 (e.g., network one or network two discussed in reference to FIG. 6) according to embodiments of the disclosure. A network may be a light-weight PE-to-PE network. Certain embodiments of a network may be thought of as a set of composable primitives for the construction of distributed, point-to-point data channels. FIG. 7A shows a network that has two channels enabled, the bold black line and the dotted black line. The bold black line channel is multicast, e.g., a single input is sent to two outputs. Note that channels may cross at some points within a single network, even though dedicated circuit switched paths are formed between channel endpoints. Furthermore, this crossing may not introduce a structural hazard between the two channels, so that each operates independently and at full bandwidth.

Implementing distributed data channels may include two paths, illustrated in FIGS. 7A-7B. The forward, or data path, carries data from a producer to a consumer. Multiplexors may be configured to steer data and valid bits from the producer to the consumer, e.g., as in FIG. 7A. In the case of multicast, the data will be steered to multiple consumer endpoints. The second portion of this embodiment of a network is the flow control or backpressure path, which flows in reverse of the forward data path, e.g., as in FIG. 7B. Consumer endpoints may assert when they are ready to accept new data. These signals may then be steered back to the producer using configurable logical conjunctions, labelled as (e.g., backflow) flowcontrol function in FIG. 7B. In one embodiment, each flowcontrol function circuit may be a plurality of switches (e.g., muxes), for example, similar to FIG. 7A. The flow control path may handle returning control data from consumer to producer. Conjunctions may enable multicast, e.g., where each consumer is ready to receive data before the producer assumes that it has been received. In one embodiment, a PE is a PE that has a dataflow operator as its architectural interface. Additionally or alternatively, in one embodiment a PE may be any kind of PE (e.g., in the fabric), for example, but not limited to, a PE that has an instruction pointer, triggered instruction, or state machine based architectural interface.

The network may be statically configured, e.g., in addition to PEs being statically configured. During the configuration step, configuration bits may be set at each network component. These bits control, for example, the multiplexer selections and flow control functions. A network may comprise a plurality of networks, e.g., a data path network and a flow control path network. A network or plurality of networks may utilize paths of different widths (e.g., a first width, and a narrower or wider width). In one embodiment, a data path network has a wider (e.g., bit transport) width than the width of a flow control path network. In one embodiment, each of a first network and a second network includes their own data path network and flow control path network, e.g., data path network A and flow control path network A and wider data path network B and flow control path network B.

Certain embodiments of a network are bufferless, and data is to move between producer and consumer in a single cycle. Certain embodiments of a network are also boundless, that is, the network spans the entire fabric. In one embodiment, one PE is to communicate with any other PE in a single cycle. In one embodiment, to improve routing bandwidth, several networks may be laid out in parallel between rows of PEs.

Relative to FPGAs, certain embodiments of networks herein have three advantages: area, frequency, and program expression. Certain embodiments of networks herein operate at a coarse grain, e.g., which reduces the number configuration bits, and thereby the area of the network. Certain embodiments of networks also obtain area reduction by implementing flow control logic directly in circuitry (e.g., silicon). Certain embodiments of hardened network implementations also enjoys a frequency advantage over FPGA. Because of an area and frequency advantage, a power advantage may exist where a lower voltage is used at throughput parity. Finally, certain embodiments of networks provide better high-level semantics than FPGA wires, especially with respect to variable timing, and thus those certain embodiments are more easily targeted by compilers. Certain embodiments of networks herein may be thought of as a set of composable primitives for the construction of distributed, point-to-point data channels.

In certain embodiments, a multicast source may not assert its data valid unless it receives a ready signal from each sink. Therefore, an extra conjunction and control bit may be utilized in the multicast case.

Like certain PEs, the network may be statically configured. During this step, configuration bits are set at each network component. These bits control, for example, the multiplexer selection and flow control function. The forward path of our network requires some bits to swing its muxes. In the example shown in FIG. 7A, four bits per hop are required: the east and west muxes utilize one bit each, while the southbound multiplexer utilize two bits. In this embodiment, four bits may be utilized for the data path, but 7 bits may be utilized for the flow control function (e.g., in the flow control path network). Other embodiments may utilize more bits, for example, if a CSA further utilizes a north-south direction. The flow control function may utilize a control bit for each direction from which flow control can come. This may enables the setting of the sensitivity of the flow control function statically. The table 1 below summarizes the Boolean algebraic implementation of the flow control function for the network in FIG. 7B, with configuration bits capitalized. In this example, seven bits are utilized.

TABLE 1

| Flow Implementation | |
|---|---|
| readyToEast | (EAST_WEST_SENSITIVE + readyFromWest) * (EAST_SOUTH_SENSITIVE + readyFromSouth) |
| readyToWest | (WEST_EAST_SENSITIVE + readyFromEast) * (WEST_SOUTH_SENSITIVE + readyFromSouth) |
| readyToNorth | (NORTH_WEST_SENSITIVE + readyFromWest) * (NORTH_EAST_SENSITIVE + readyFromEast) * (NORTH_SOUTH_SENSITIVE + readyFromSouth) |

For the third flow control box from the left in FIG. 7B, EAST_WEST_SENSITIVE and NORTH_SOUTH_SENSITIVE are depicted as set to implement the flow control for the bold line and dotted line channels, respectively.

FIG. 8 illustrates a hardware processor tile 800 comprising an accelerator 802 according to embodiments of the disclosure. Accelerator 802 may be a CSA according to this disclosure. Tile 800 includes a plurality of cache banks (e.g., cache bank 808). Request address file (RAF) circuits 810 may be included, e.g., as discussed below in Section 2.2. ODI may refer to an On Die Interconnect, e.g., an interconnect stretching across an entire die connecting up all the tiles. OTI may refer to an On Tile Interconnect, for example, stretching across a tile, e.g., connecting cache banks on the tile together.

2.1 Processing Elements

In certain embodiments, a CSA includes an array of heterogeneous PEs, in which the fabric is composed of several types of PEs each of which implement only a subset of the dataflow operators. By way of example, FIG. 9 shows a provisional implementation of a PE capable of implementing a broad set of the integer and control operations. Other PEs, including those supporting floating point addition, floating point multiplication, buffering, and certain control operations may have a similar implementation style, e.g., with the appropriate (dataflow operator) circuitry substituted for the ALU. PEs (e.g., dataflow operators) of a CSA may be configured (e.g., programmed) before the beginning of execution to implement a particular dataflow operation from among the set that the PE supports. A configuration may include one or two control words which specify an opcode controlling the ALU, steer the various multiplexors within the PE, and actuate dataflow into and out of the PE channels. Dataflow operators may be implemented by microcoding these configurations bits. The depicted PE 900 in FIG. 9 is organized as a single-stage logical pipeline flowing from top to bottom. Data enters PE 900 from one of set of local networks, where it is registered in an input buffer for subsequent operation. Each PE may support a number of wide, data-oriented and narrow, control-oriented channels. The number of provisioned channels may vary based on PE functionality, but one embodiment of an integer-oriented PE has 2 wide and 1-2 narrow input and output channels. Although the PE is implemented as a single-cycle pipeline, other pipelining choices may be utilized. For example, multiplication PEs may have multiple pipeline stages.

PE execution may proceed in a dataflow style. Based on the configuration microcode, the scheduler may examine the status of the PE ingress and egress buffers, and, when all the inputs for the configured operation have arrived and the egress buffer of the operation is available, orchestrates the actual execution of the operation by a dataflow operator (e.g., on the ALU). The resulting value may be placed in the configured egress buffer. Transfers between the egress buffer of one PE and the ingress buffer of another PE may occur asynchronously as buffering becomes available. In certain embodiments, PEs are provisioned such that at least one dataflow operation completes per cycle. Section 2 discussed dataflow operator encompassing primitive operations, such as add, xor, or pick. Certain embodiments may provide advantages in energy, area, performance, and latency. In one embodiment, with an extension to a PE control path, more fused combinations may be enabled. In one embodiment, the width of the processing elements is 64 bits, e.g., for the heavy utilization of double-precision floating point computation in HPC and to support 64-bit memory addressing.

2.2 Communications Networks

Embodiments of the CSA microarchitecture provide a hierarchy of networks which together provide an implementation of the architectural abstraction of latency-insensitive channels across multiple communications scales. The lowest level of CSA communications hierarchy may be the local network. The local network may be statically circuit switched, e.g., using configuration registers to swing multiplexor(s) in the local network data-path to form fixed electrical paths between communicating PEs. In one embodiment, the configuration of the local network is set once per dataflow graph, e.g., at the same time as the PE configuration. In one embodiment, static, circuit switching optimizes for energy, e.g., where a large majority (perhaps greater than 95%) of CSA communications traffic will cross the local network. A program may include terms which are used in multiple expressions. To optimize for this case, embodiments herein provide for hardware support for multicast within the local network. Several local networks may be ganged together to form routing channels, e.g., which are interspersed (as a grid) between rows and columns of PEs. As an optimization, several local networks may be included to carry control tokens. In comparison to a FPGA interconnect, a CSA local network may be routed at the granularity of the data-path, and another difference may be a CSA's treatment of control. One embodiment of a CSA local network is explicitly flow controlled (e.g., back-pressured). For example, for each forward data-path and multiplexor set, a CSA is to provide a backward-flowing flow control path that is physically paired with the forward data-path. The combination of the two microarchitectural paths may provide a low-latency, low-energy, low-area, point-to-point implementation of the latency-insensitive channel abstraction. In one embodiment, a CSA's flow control lines are not visible to the user program, but they may be manipulated by the architecture in service of the user program. For example, the exception handling mechanisms described in Section 1.2 may be achieved by pulling flow control lines to a "not present" state upon the detection of an exceptional condition. This action may not only gracefully stalls those parts of the pipeline which are involved in the offending computation, but may also preserve the machine state leading up the exception, e.g., for diagnostic analysis. The second network layer, e.g., the mezzanine network, may be a shared, packet switched network. Mezzanine network may include a plurality of distributed network controllers, network dataflow endpoint circuits. The mezzanine network (e.g., the network schematically indicated by the dotted box in FIG. 73) may provide more general, long range communications, e.g., at the cost of latency, bandwidth, and energy. In some programs, most communications may occur on the local network, and thus mezzanine network provisioning will be considerably reduced in comparison, for example, each PE may connects to multiple local networks, but the CSA will provision only one mezzanine endpoint per logical neighborhood of PEs. Since the mezzanine is effectively a shared network, each mezzanine network may carry multiple logically independent channels, e.g., and be provisioned with multiple virtual channels. In one embodiment, the main function of the mezzanine network is to provide wide-range communications in-between PEs and between PEs and memory. In addition to this capability, the mezzanine may also include network dataflow endpoint circuit(s), for example, to perform certain dataflow operations. In addition to this capability, the mezzanine may also operate as a runtime support network, e.g., by which various services may access the complete fabric in a user-program-transparent manner. In this capacity, the mezzanine endpoint may function as a controller for its local neighborhood, for example, during CSA configuration. To form channels spanning a CSA tile, three subchannels and two local network channels (which carry traffic to and from a single channel in the mezzanine network) may be utilized. In one embodiment, one mezzanine channel is utilized, e.g., one mezzanine and two local=3 total network hops.

The composability of channels across network layers may be extended to higher level network layers at the inter-tile, inter-die, and fabric granularities.

FIG. 9 illustrates a processing element 900 according to embodiments of the disclosure. In one embodiment, operation configuration register 919 is loaded during configuration (e.g., mapping) and specifies the particular operation (or operations) this processing (e.g., compute) element is to perform. Register 920 activity may be controlled by that operation (an output of multiplexer 916, e.g., controlled by the scheduler 914). Scheduler 914 may schedule an operation or operations of processing element 900, for example, when input data and control input arrives. Control input buffer 922 is connected to local network 902 (e.g., and local network 902 may include a data path network as in FIG. 7A and a flow control path network as in FIG. 7B) and is loaded with a value when it arrives (e.g., the network has a data bit(s) and valid bit(s)). Control output buffer 932, data output buffer 934, and/or data output buffer 936 may receive an output of processing element 900, e.g., as controlled by the operation (an output of multiplexer 916). Status register 938 may be loaded whenever the ALU 918 executes (also controlled by output of multiplexer 916). Data in control input buffer 922 and control output buffer 932 may be a single bit. Multiplexer 921 (e.g., operand A) and multiplexer 923 (e.g., operand B) may source inputs.

For example, suppose the operation of this processing (e.g., compute) element is (or includes) what is called a pick in FIG. 3B. The processing element 900 then is to select data from either data input buffer 924 or data input buffer 926, e.g., to go to data output buffer 934 (e.g., default) or data output buffer 936. The control bit in 922 may thus indicate a 0 if selecting from data input buffer 924 or a 1 if selecting from data input buffer 926.

For example, suppose the operation of this processing (e.g., compute) element is (or includes) what is called a switch in FIG. 3B. The processing element 900 is to output data to data output buffer 934 or data output buffer 936, e.g., from data input buffer 924 (e.g., default) or data input buffer 926. The control bit in 922 may thus indicate a 0 if outputting to data output buffer 934 or a 1 if outputting to data output buffer 936.

Multiple networks (e.g., interconnects) may be connected to a processing element, e.g., (input) networks 902, 904, 906 and (output) networks 908, 910, 912. The connections may be switches, e.g., as discussed in reference to FIGS. 7A and 7B. In one embodiment, each network includes two sub-networks (or two channels on the network), e.g., one for the data path network in FIG. 7A and one for the flow control (e.g., backpressure) path network in FIG. 7B. As one example, local network 902 (e.g., set up as a control interconnect) is depicted as being switched (e.g., connected) to control input buffer 922. In this embodiment, a data path (e.g., network as in FIG. 7A) may carry the control input value (e.g., bit or bits) (e.g., a control token) and the flow control path (e.g., network) may carry the backpressure signal (e.g., backpressure or no-backpressure token) from control input buffer 922, e.g., to indicate to the upstream producer (e.g., PE) that a new control input value is not to be loaded into (e.g., sent to) control input buffer 922 until the backpressure signal indicates there is room in the control input buffer 922 for the new control input value (e.g., from a control output buffer of the upstream producer). In one embodiment, the new control input value may not enter control input buffer 922 until both (i) the upstream producer receives the "space available" backpressure signal from "control input" buffer 922 and (ii) the new control input value is sent from the upstream producer, e.g., and this may stall the processing element 900 until that happens (and space in the target, output buffer(s) is available).

Data input buffer 924 and data input buffer 926 may perform similarly, e.g., local network 904 (e.g., set up as a data (as opposed to control) interconnect) is depicted as being switched (e.g., connected) to data input buffer 924. In this embodiment, a data path (e.g., network as in FIG. 7A) may carry the data input value (e.g., bit or bits) (e.g., a dataflow token) and the flow control path (e.g., network) may carry the backpressure signal (e.g., backpressure or no-backpressure token) from data input buffer 924, e.g., to indicate to the upstream producer (e.g., PE) that a new data input value is not to be loaded into (e.g., sent to) data input buffer 924 until the backpressure signal indicates there is room in the data input buffer 924 for the new data input value (e.g., from a data output buffer of the upstream producer). In one embodiment, the new data input value may not enter data input buffer 924 until both (i) the upstream producer receives the "space available" backpressure signal from "data input" buffer 924 and (ii) the new data input value is sent from the upstream producer, e.g., and this may stall the processing element 900 until that happens (and space in the target, output buffer(s) is available). A control output value and/or data output value may be stalled in their respective output buffers (e.g., 932, 934, 936) until a backpressure signal indicates there is available space in the input buffer for the downstream processing element(s).

A processing element 900 may be stalled from execution until its operands (e.g., a control input value and its corresponding data input value or values) are received and/or until there is room in the output buffer(s) of the processing element 900 for the data that is to be produced by the execution of the operation on those operands.

Example Circuit Switched Network Configuration

In certain embodiments, the routing of data between components (e.g., PEs) is enabled by setting switches (e.g., multiplexers and/or demultiplexers) and/or logic gate circuits of a circuit switched network (e.g., a local network) to achieve a desired configuration, e.g., a configuration according to a dataflow graph.

FIG. 3.3B illustrates a circuit switched network 3.3B00 according to embodiments of the disclosure. Circuit switched network 3.3B00 is coupled to a CSA component (e.g., a processing element (PE)) 3.3B02, and may likewise couple to other CSA component(s) (e.g., PEs), for example, over one or more channels that are created from switches (e.g., multiplexers) 3.3B04-3.3B28. This may include horizontal (H) switches and/or vertical (V) switches. Depicted switches may be switches in FIG. 6. Switches may include one or more registers 3.3B04A-3.3B28A to store the control values (e.g., configuration bits) to control the selection of input(s) and/or output(s) of the switch to allow values to pass from an input(s) to an output(s). In one embodiment, the switches are selectively coupled to one or more of networks 3.3B30 (e.g., sending data to the right (east (E))), 3.3B32 (e.g., sending data downwardly (south (S))), 3.3B34 (e.g., sending data to the left (west (W))), and/or 3.3B36 (e.g., sending data upwardly (north (N))). Networks 3.3B30, 3.3B32, 3.3B34, and/or 3.3B36 may be coupled to another instance of the components (or a subset of the components) in FIG. 3.3B, for example, to create flow controlled communications channels (e.g., paths) which support communications between components (e.g., PEs) of a configurable spatial accelerator (e.g., a CSA as discussed herein). In one embodiment, a network (e.g., networks 3.3B30, 3.3B32, 3.3B34, and/or 3.3B36 or a separate network) receive a control value (e.g., configuration bits) from a source (e.g., a core) and cause that control value (e.g., configuration bits) to be stored in registers 3.3B04A-3.3B28A to cause the corresponding switches 3.3B04-3.3B28 to form the desired channels (e.g., according to a dataflow graph). Processing element 3.3B02 may also include control register(s) 3.3B02A, for example, as operation configuration register 919 in FIG. 9. Switches and other components may thus be set in certain embodiments to create data path or data paths between processing elements and/or backpressure paths for those data paths, e.g., as discussed herein. In one embodiment, the values (e.g., configuration bits) in these (control) registers 3.3B04A-3.3B28A are depicted with variables names that refer to the mux selection for the inputs, for example, with the values having a number which refers to the port number, and a letter which refers to the direction or PE output the data is coming from, e.g., where E1 in 3.3B06A refers to port number 1 coming from the east side of the network.

The network(s) may be statically configured, e.g., in addition to PEs being statically configured during configuration for a dataflow graph. During the configuration step, configuration bits may be set at each network component. These bits may control, for example, the multiplexer selections to control the flow of a dataflow token (e.g., on a data path network) and its corresponding backpressure token (e.g., on a flow control path network). A network may comprise a plurality of networks, e.g., a data path network and a flow control path network. A network or plurality of networks may utilize paths of different widths (e.g., a first width, and a narrower or wider second width). In one embodiment, a data path network has a wider (e.g., bit transport) width than the width of a flow control path network. In one embodiment, each of a first network and a second network includes their own data paths and flow control paths, e.g., data path A and flow control path A and wider data path B and flow control path B. For example, a data path and flow control path for a single output buffer of a producer PE that couples to a plurality of input buffers of consumer PEs. In one embodiment, to improve routing bandwidth, several networks are laid out in parallel between rows of PEs Like certain PEs, the network may be statically configured. During this step, configuration bits may be set at each network component. These bits control, for example, the data path (e.g., multiplexer created data path) and/or flow control path (e.g., multiplexer created flow control path). The forward (e.g., data) path may utilize control bits to swing its switches and/or logic gates.

FIG. 3.3C illustrates a zoomed in view of a data path 3.3C02 formed by setting a configuration value (e.g., bits) in a configuration storage (e.g., register) 3.3C06 of a circuit switched network between a first processing element 3.3C01 and a second processing element 3.3C03 according to embodiments of the disclosure. Flow control (e.g., backpressure) path 3.3C04 may be flow control (e.g., backpressure) path 3.3D04 in FIG. 3.3D. Depicted data path 3.3C02 is formed by setting configuration value (e.g., bits) in configuration storage (e.g., register) 3.3C06 to provide a control value to one or more switches (e.g., multiplexers). In certain embodiments, a data path includes inputs from various source PEs and/or switches. In certain embodiments, the configuration value is determined (e.g., by a compiler) and set at configuration time (e.g., before run time). In one embodiment, the configuration value selects the inputs (e.g., for a multiplexer) to source data from to the output. In one embodiment, a switch has multiple inputs and a single output that is selected by the configuration value, e.g., where a data path (e.g., for the data payload itself) and a valid path (e.g., for the valid value to indicate the data payload is valid to be transmitted). In certain embodiments, values from the non-selected path(s) are ignored.

In the zoomed in portion, multiplexer 3.3C08 is provided with a configuration value from configuration storage (e.g., register) 3.3C06 to cause the multiplexer 3.3C08 to source data from one of more inputs (e.g., with those inputs being coupled to respective PEs or other CSA components). In one embodiment, an (e.g., each) input to multiplexer 3.3C08 includes both (i) multiple bits of (e.g., payload) data as well as (ii) a (e.g., one bit) valid value, e.g., as discussed herein. In certain embodiments, the configuration value is stored into configuration storage locations (e.g., registers) to cause a transmitting PE or PEs to send data to receiving PE or PEs, e.g., according to a dataflow graph. Example configuration of a CSA is discussed further in Section 3.4 below.

FIG. 3.3D illustrates a zoomed in view of a flow control (e.g., backpressure) path 3.3D04 formed by setting a configuration value (e.g., bits) in a configuration storage (e.g., register) of a circuit switched network between a first processing element 3.3D01 and a second processing element 3.3D03 according to embodiments of the disclosure. Data path 3.3D02 may be data path 3.3C02 in FIG. 3.3C. Depicted flow control (e.g., backpressure) path 3.3D04 is formed by setting configuration value (e.g., bits) in configuration storage (e.g., register) 3.3D06 to provide a control value to one or more switches (e.g., multiplexers) and/or logic gate circuits. In certain embodiments, a flow control (e.g., backpressure) path includes (e.g., backpressure) inputs from various source PEs and/or other flow control functions. In certain embodiments, the configuration value is determined (e.g., by a compiler) and set at configuration time (e.g., before run time). In one embodiment, the configuration value selects the inputs and/or outputs of logic gate circuits to combine into a (e.g., single) flow control output. In one embodiment, a flow control (e.g., backpressure) path has multiple inputs, logic gates (e.g., AND gate, OR gate, NAND gate, NOR gate, etc.) and a single output that is selected by the configuration value, e.g., wherein a certain (e.g., logical zero or one) flow control (e.g., backpressure) value indicates a receiving PE (e.g., at least one of a plurality of receiving PEs) does not have storage and thus is not ready to receive (e.g., payload) data that is to be transmitted. In certain embodiments, values from the non-selected path(s) are ignored.

In the zoomed in portion, OR logic gate 3.3D10, OR logic gate 3.3D12, and OR logic gate 3.3D14 each include a first input coupled to configuration storage (e.g., register) 3.3D06 to receive a configuration value (for example, where setting a logical one on that input effectively ignores the particular backpressure signal and a logical zero on that input cause the monitoring of that particular backpressure signal), and a second input coupled to a respective, receiving PE to provide a backpressure value that indicates when that receiving PE is not ready to receive a new data value (e.g., when a queue of that receiving PE is full). In the depicted embodiment, the output from each OR logic gate 3.3D10, OR logic gate 3.3D12, and OR logic gate 3.3D14 is provided as a respective input to AND logic gate 3.3D08 such that AND logic gate 3.3D08 is to output a logical zero unless all of OR logic gate 3.3D10, OR logic gate 3.3D12, and OR logic gate 3.3D14 are outputting a logical one, and AND logic gate 3.3D08 will then output a logical one (e.g., to indicate that each of the monitored PEs are ready to receive a new data value). In one embodiment, an (e.g., each) input to OR logic gate 3.3D10, OR logic gate 3.3D12, and OR logic gate 3.3D14 is a single bit. In certain embodiments, the configuration value is stored into configuration storage locations (e.g., registers) to cause a transmitting PE or PEs to send flow control (e.g., backpressure) data to transmitting PE or PEs, e.g., according to a dataflow graph. In one multicast embodiment, a (e.g., single) flow control (e.g., backpressure) value indicates that at least one of a plurality of receiving PEs does not have storage and thus is not ready to receive (e.g., payload) data that is to be transmitted, e.g., by ANDing the outputs from OR logic gate 3.3D10, OR logic gate 3.3D12, and OR logic gate 3.3D14. Example configuration of a CSA is discussed below.

Example Processing Element with Control Lines

In certain embodiments, the core architectural interface of the CSA is the dataflow operator, e.g., as a direct representation of a node in a dataflow graph. From an operational perspective, dataflow operators may behave in a streaming or data-driven fashion. Dataflow operators execute as soon as their incoming operands become available and there is space available to store the output (resultant) operand or operands. In certain embodiments, CSA dataflow execution depends only on highly localized status, e.g., resulting in a highly scalable architecture with a distributed, asynchronous execution model.

In certain embodiments, a CSA fabric architecture takes the position that each processing element of the microarchitecture corresponds to approximately one entity in the architectural dataflow graph. In certain embodiments, this results in processing elements that are not only compact, resulting in a dense computation array, but also energy efficient. To further reduce energy and implementation area, certain embodiments use a flexible, heterogeneous fabric style in which each PE implements only a (proper) subset of dataflow operators. For example, with floating point operations and integer operations mapped to separate processing element types, but both types support dataflow control operations discussed herein. In one embodiment, a CSA includes a dozen types of PEs, although the precise mix and allocation may vary in other embodiments.

In one embodiment, processing elements are organized as pipelines and support the injection of one pipelined dataflow operator per cycle. Processing elements may have a single-cycle latency. However, other pipelining choices may be used for other (e.g., more complicated) operations. For example, floating point operations may use multiple pipeline stages.

As discussed herein, in certain embodiments CSA PEs are configured (for example, as discussed below) before the beginning of graph execution to implement a particular dataflow operation from among the set that they support. A configuration value (e.g., stored in the configuration register of a PE) may consist of one or two control words (e.g., 32 or 64 bits) which specify an opcode controlling the operation circuitry (e.g., ALU), steer the various multiplexors within the PE, and actuate dataflow into and out of the PE channels. Dataflow operators may thus be implemented by micro coding these configurations bits. Once configured, in certain embodiments the PE operation is fixed for the life of the graph, e.g., although microcode may provide some (e.g., limited) flexibility to support dynamically controller operations.

To handle some of the more complex dataflow operators like floating-point fused-multiply add (FMA) and a loop-control sequencer operator, multiple PEs may be used rather than to provision a more complex single PE. In these cases, additional function-specific communications paths may be added between the combinable PEs. In the case of an embodiment of a sequencer (e.g., to implement loop control), combinational paths are established between (e.g., adjacent) PEs to carry control information related to the loop. Such PE combinations may maintain fully pipelined behavior while preserving the utility of a basic PE embodiment, e.g., in the case that the combined behavior is not used for a particular program graph.

Processing elements may implement a common interface, e.g., including the local (e.g., circuit switched) network interfaces described herein. In addition to ports into the local network, a (e.g., every) processing element may implement a full complement of runtime services, e.g., including the micro-protocols associated with configuration, extraction, and exception. In certain embodiments, a common processing element perimeter enables the full parameterization of a particular hardware instance of a CSA with respect to processing element count, composition, and function, e.g., and the same properties make CSA processing element architecture highly amenable to deployment-specific extension. For example, CSA may include PEs tuned for the low-precision arithmetic machine learning applications.

Figure 11:
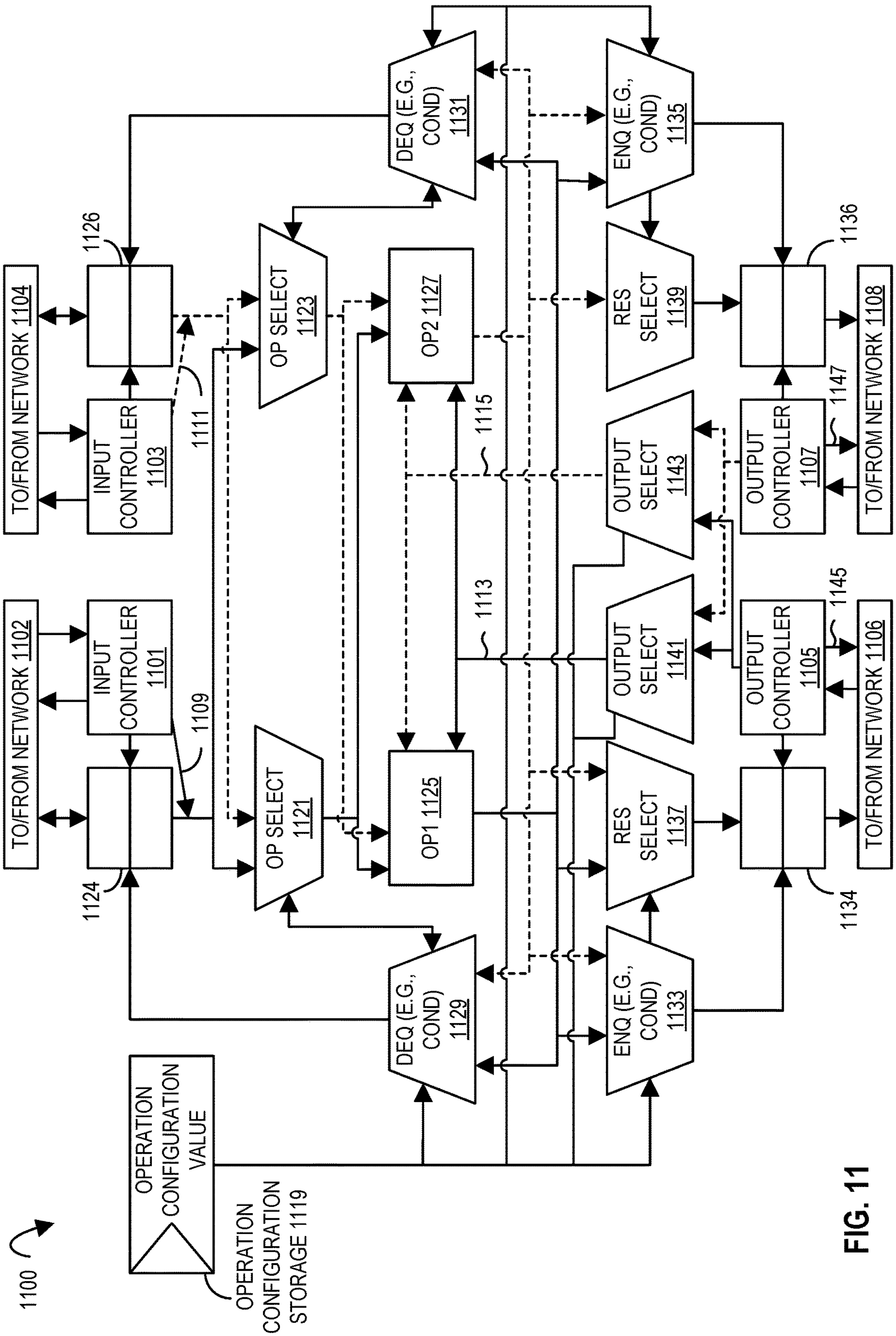
FIG. 11 illustrates data paths and control paths of a processing element according to embodiments of the disclosure.

In certain embodiments, a significant source of area and energy reduction is the customization of the dataflow operations supported by each type of processing element. In one embodiment, a proper subset (e.g., most) processing elements support only a few operations (e.g., one, two, three, or four operation types), for example, an implementation choice where a floating point PE only supports one of floating point multiply or floating point add, but not both. FIG. 11 depicts a processing element (PE) 1100 that supports (e.g., only) two operations, although the below discussion is equally applicable for a PE that supports a single operation or more than two operations. In one embodiment, processing element 1100 supports two operations, and the configuration value being set selects a single operation for performance, e.g., to perform one or multiple instances of a single operation type for that configuration.

FIG. 11 illustrates data paths and control paths of a processing element 1100 according to embodiments of the disclosure. A processing element may include one or more of the components discussed herein, e.g., as discussed in reference to FIG. 9. Processing element 1100 includes operation configuration storage 1119 (e.g., register) to store an operation configuration value that causes the PE to perform the selected operation when its requirements are met, e.g., when the incoming operands become available (e.g., from input storage 1124 and/or input storage 1126) and when there is space available to store the output (resultant) operand or operands (e.g., in output storage 1134 and/or output storage 1136). In certain embodiments, operation configuration value (e.g., corresponding to the mapping of a dataflow graph to that PE(s)) is loaded (e.g., stored) in operation configuration storage 1119 as described herein, e.g., in section 3.4 below.

Operation configuration value may be a (e.g., unique) value, for example, according to the format discussed in section 3.5 below, e.g., for the operations discussed in section 3.6 below. In certain embodiments, operation configuration value includes a plurality of bits that cause processing element 1100 to perform a desired (e.g., preselected) operation, for example, performing the desired (e.g., preselected) operation when the incoming operands become available (e.g., in input storage 1124 and/or input storage 1126) and when there is space available to store the output (resultant) operand or operands (e.g., in output storage 1134 and/or output storage 1136). The depicted processing element 1100 includes two sets of operation circuitry 1125 and 1127, for example, to each perform a different operation. In certain embodiments, a PE includes status (e.g., state) storage, for example, within operation circuitry or a status register. See, for example, the status register 938 in FIG. 9, the state stored in scheduler in FIGS. 3.6AGA-3.6AGF or the state stored in the scheduler in FIGS. 3.6AIA-3.6AIG.

Depicted processing element 1100 includes an operation configuration storage 1119 (e.g., register(s)) to store an operation configuration value. In one embodiment, all of or a proper subset of a (e.g., single) operation configuration value is sent from the operation configuration storage 1119 (e.g., register(s)) to the multiplexers (e.g., multiplexer 1121 and multiplexer 1123) and/or demultiplexers (e.g., demultiplexer 1141 and demultiplexer 1143) of the processing element 1100 to steer the data according to the configuration.

Processing element 1100 includes a first input storage 1124 (e.g., input queue or buffer) coupled to (e.g., circuit switched) network 1102 and a second input storage 1126 (e.g., input queue or buffer) coupled to (e.g., circuit switched) network 1104. Network 1102 and network 1104 may be the same network (e.g., different circuit switched paths of the same network). Although two input storages are depicted, a single input storage or more than two input storages (e.g., any integer or proper subset of integers) may be utilized (e.g., with their own respective input controllers). Operation configuration value may be sent via the same network that the input storage 1124 and/or input storage 1126 are coupled to.

Depicted processing element 1100 includes input controller 1101, input controller 1103, output controller 1105, and output controller 1107 (e.g., together forming a scheduler for processing element 1100). Embodiments of input controllers are discussed in reference to FIGS. 12-21. Embodiments of output controllers are discussed in reference to FIGS. 22-31. In certain embodiments, operation circuitry (e.g., operation circuitry 1125 or operation circuitry 1127 in FIG. 11) includes a coupling to a scheduler to perform certain actions, e.g., to activate certain logic circuitry in the operations circuitry based on control provided from the scheduler.

In FIG. 11, the operation configuration value (e.g., set according to the operation that is to be performed) or a subset of less than all of the operation configuration value causes the processing element 1100 to perform the programmed operation, for example, when the incoming operands become available (e.g., from input storage 1124 and/or input storage 1126) and when there is space available to store the output (resultant) operand or operands (e.g., in output storage 1134 and/or output storage 1136). In the depicted embodiment, the input controller 1101 and/or input controller 1103 are to cause a supplying of the input operand(s) and the output controller 1105 and/or output controller 1107 are to cause a storing of the resultant of the operation on the input operand(s). In one embodiment, a plurality of input controllers are combined into a single input controller. In one embodiment, a plurality of output controllers are combined into a single output controller.

In certain embodiments, the input data (e.g., dataflow token or tokens) is sent to input storage 1124 and/or input storage 1126 by networks 1102 or networks 1102. In one embodiment, input data is stalled until there is available storage (e.g., in the targeted storage input storage 1124 or input storage 1126) in the storage that is to be utilized for that input data. In the depicted embodiment, operation configuration value (or a portion thereof) is sent to the multiplexers (e.g., multiplexer 1121 and multiplexer 1123) and/or demultiplexers (e.g., demultiplexer 1141 and demultiplexer 1143) of the processing element 1100 as control value(s) to steer the data according to the configuration. In certain embodiments, input operand selection switches 1121 and 1123 (e.g., multiplexers) allow data (e.g., dataflow tokens) from input storage 1124 and input storage 1126 as inputs to either of operation circuitry 1125 or operation circuitry 1127. In certain embodiments, result (e.g., output operand) selection switches 1137 and 1139 (e.g., multiplexers) allow data from either of operation circuitry 1125 or operation circuitry 1127 into output storage 1134 and/or output storage 1136. Storage may be a queue (e.g., FIFO queue). In certain embodiments, an operation takes one input operand (e.g., from either of input storage 1124 and input storage 1126) and produce two resultants (e.g., stored in output storage 1134 and output storage 1136). In certain embodiments, an operation takes two or more input operands (for example, one from each input storage queue, e.g., one from each of input storage 1124 and input storage 1126) and produces a single (or plurality of) resultant (for example, stored in output storage, e.g., output storage 1134 and/or output storage 1136).

In certain embodiments, processing element 1100 is stalled from execution until there is input data (e.g., dataflow token or tokens) in input storage and there is storage space for the resultant data available in the output storage (e.g., as indicated by a backpressure value sent that indicates the output storage is not full). In the depicted embodiment, the input storage (queue) status value from path 1109 indicates (e.g., by asserting a "not empty" indication value or an "empty" indication value) when input storage 1124 contains (e.g., new) input data (e.g., dataflow token or tokens) and the input storage (queue) status value from path 1111 indicates (e.g., by asserting a "not empty" indication value or an "empty" indication value) when input storage 1126 contains (e.g., new) input data (e.g., dataflow token or tokens). In one embodiment, the input storage (queue) status value from path 1109 for input storage 1124 and the input storage (queue) status value from path 1111 for input storage 1126 is steered to the operation circuitry 1125 and/or operation circuitry 1127 (e.g., along with the input data from the input storage(s) that is to be operated on) by multiplexer 1121 and multiplexer 1123.

In the depicted embodiment, the output storage (queue) status value from path 1113 indicates (e.g., by asserting a "not full" indication value or a "full" indication value) when output storage 1134 has available storage for (e.g., new) output data (e.g., as indicated by a backpressure token or tokens) and the output storage (queue) status value from path 1115 indicates (e.g., by asserting a "not full" indication value or a "full" indication value) when output storage 1136 has available storage for (e.g., new) output data (e.g., as indicated by a backpressure token or tokens). In the depicted embodiment, operation configuration value (or a portion thereof) is sent to both multiplexer 1141 and multiplexer 1143 to source the output storage (queue) status value(s) from the output controllers 1105 and/or 1107. In certain embodiments, operation configuration value includes a bit or bits to cause a first output storage status value to be asserted, where the first output storage status value indicates the output storage (queue) is not full or a second, different output storage status value to be asserted, where the second output storage status value indicates the output storage (queue) is full. The first output storage status value (e.g., "not full") or second output storage status value (e.g., "full") may be output from output controller 1105 and/or output controller 1107, e.g., as discussed below. In one embodiment, a first output storage status value (e.g., "not full") is sent to the operation circuitry 1125 and/or operation circuitry 1127 to cause the operation circuitry 1125 and/or operation circuitry 1127, respectively, to perform the programmed operation when an input value is available in input storage (queue) and a second output storage status value (e.g., "full") is sent to the operation circuitry 1125 and/or operation circuitry 1127 to cause the operation circuitry 1125 and/or operation circuitry 1127, respectively, to not perform the programmed operation even when an input value is available in input storage (queue).

In the depicted embodiment, dequeue (e.g., conditional dequeue) multiplexers 1129 and 1131 are included to cause a dequeue (e.g., removal) of a value (e.g., token) from a respective input storage (queue), e.g., based on operation completion by operation circuitry 1125 and/or operation circuitry 1127. The operation configuration value includes a bit or bits to cause the dequeue (e.g., conditional dequeue) multiplexers 1129 and 1131 to dequeue (e.g., remove) a value (e.g., token) from a respective input storage (queue). In the depicted embodiment, enqueue (e.g., conditional enqueue) multiplexers 1133 and 1135 are included to cause an enqueue (e.g., insertion) of a value (e.g., token) into a respective output storage (queue), e.g., based on operation completion by operation circuitry 1125 and/or operation circuitry 1127. The operation configuration value includes a bit or bits to cause the enqueue (e.g., conditional enqueue) multiplexers 1133 and 1135 to enqueue (e.g., insert) a value (e.g., token) into a respective output storage (queue).

Certain operations herein allow the manipulation of the control values sent to these queues, e.g., based on local values computed and/or stored in the PE.

In one embodiment, the dequeue multiplexers 1129 and 1131 are conditional dequeue multiplexers 1129 and 1131 that, when a programmed operation is performed, the consumption (e.g., dequeuing) of the input value from the input storage (queue) is conditionally performed. In one embodiment, the enqueue multiplexers 1133 and 1135 are conditional enqueue multiplexers 1133 and 1135 that, when a programmed operation is performed, the storing (e.g., enqueuing) of the output value for the programmed operation into the output storage (queue) is conditionally performed.

For example, as discussed herein, certain operations may make dequeuing (e.g., consumption) decisions for an input storage (queue) conditionally (e.g., based on token values) and/or enqueuing (e.g., output) decisions for an output storage (queue) conditionally (e.g., based on token values). An example of a conditional enqueue operation is a PredMerge operation that conditionally writes its outputs, so conditional enqueue multiplexer(s) will be swung, e.g., to store or not store the predmerge result into the appropriate output queue. An example of a conditional dequeue operation is a PredProp operation that conditionally reads its inputs, so conditional dequeue multiplexer(s) will be swung, e.g., to store or not store the predprop result into the appropriate input queue.

In certain embodiments, control input value (e.g., bit or bits) (e.g., a control token) is input into a respective, input storage (e.g., queue), for example, into a control input buffer as discussed herein (e.g., control input buffer 922 in FIG. 9). In one embodiment, control input value is used to make dequeuing (e.g., consumption) decisions for an input storage (queue) conditionally based on the control input value and/or enqueuing (e.g., output) decisions for an output storage (queue) conditionally based on the control input value. In certain embodiments, control output value (e.g., bit or bits) (e.g., a control token) is output into a respective, output storage (e.g., queue), for example, into a control output buffer as discussed herein (e.g., control output buffer 932 in FIG. 9).

Input Controllers

Figure 12:
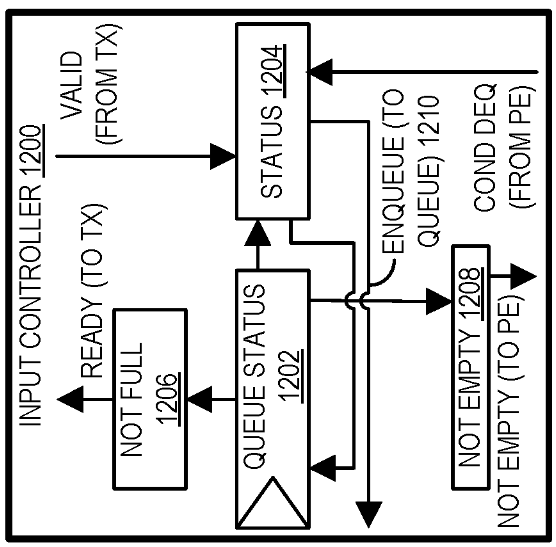
FIG. 12 illustrates input controller circuitry of input controller and/or input controller of processing element in FIG. 11 according to embodiments of the disclosure.

FIG. 12 illustrates input controller circuitry 1200 of input controller 1101 and/or input controller 1103 of processing element 1100 in FIG. 11 according to embodiments of the disclosure. In one embodiment, each input queue (e.g., buffer) includes its own instance of input controller circuitry 1200, for example, 2, 3, 4, 5, 6, 7, 8, or more (e.g., any integer) of instances of input controller circuitry 1200. Depicted input controller circuitry 1200 includes a queue status register 1202 to store a value representing the current status of that queue (e.g., the queue status register 1202 storing any combination of a head value (e.g., pointer) that represents the head (beginning) of the data stored in the queue, a tail value (e.g., pointer) that represents the tail (ending) of the data stored in the queue, and a count value that represents the number of (e.g., valid) values stored in the queue). For example, a count value may be an integer (e.g., two) where the queue is storing the number of values indicated by the integer (e.g., storing two values in the queue). The capacity of data (e.g., storage slots for data, e.g., for data elements) in a queue may be preselected (e.g., during programming), for example, depending on the total bit capacity of the queue and the number of bits in each element. Queue status register 1202 may be updated with the initial values, e.g., during configuration time.

Depicted input controller circuitry 1200 includes a Status determiner 1204, a Not Full determiner 1206, and a Not Empty determiner 1208. A determiner may be implemented in software or hardware. A hardware determiner may be a circuit implementation, for example, a logic circuit programmed to produce an output based on the inputs into the state machine(s) discussed below. Depicted (e.g., new) Status determiner 1204 includes a port coupled to queue status register 1202 to read and/or write to input queue status register 1202.

Depicted Status determiner 1204 includes a first input to receive a Valid value (e.g., a value indicating valid) from a transmitting component (e.g., an upstream PE) that indicates if (e.g., when) there is data (valid data) to be sent to the PE that includes input controller circuitry 1200. The Valid value may be referred to as a dataflow token. Depicted Status determiner 1204 includes a second input to receive a value or values from queue status register 1202 that represents that current status of the input queue that input controller circuitry 1200 is controlling. Optionally, Status determiner 1204 includes a third input to receive a value (from within the PE that includes input controller circuitry 1200) that indicates if (when) there is a conditional dequeue, e.g., from operation circuitry 1125 and/or operation circuitry 1127 in FIG. 11.

As discussed further below, the depicted Status determiner 1204 includes a first output to send a value on path 1210 that will cause input data (transmitted to the input queue that input controller circuitry 1200 is controlling) to be enqueued into the input queue or not enqueued into the input queue. Depicted Status determiner 1204 includes a second output to send an updated value to be stored in queue status register 1202, e.g., where the updated value represents the updated status (e.g., head value, tail value, count value, or any combination thereof) of the input queue that input controller circuitry 1200 is controlling.

Input controller circuitry 1200 includes a Not Full determiner 1206 that determines a Not Full (e.g., Ready) value and outputs the Not Full value to a transmitting component (e.g., an upstream PE) to indicate if (e.g., when) there is storage space available for input data in the input queue being controlled by input controller circuitry 1200. The Not Full (e.g., Ready) value may be referred to as a backpressure token, e.g., a backpressure token from a receiving PE sent to a transmitting PE.

Input controller circuitry 1200 includes a Not Empty determiner 1208 that determines an input storage (queue) status value and outputs (e.g., on path 1109 or path 1111 in FIG. 11) the input storage (queue) status value that indicates (e.g., by asserting a "not empty" indication value or an "empty" indication value) when the input queue being controlled contains (e.g., new) input data (e.g., dataflow token or tokens). In certain embodiments, the input storage (queue) status value (e.g., being a value that indicates the input queue is not empty) is one of the two control values (with the other being that storage for the resultant is not full) that is to stall a PE (e.g., operation circuitry 1125 and/or operation circuitry 1127 in FIG. 11) until both of the control values indicate the PE may proceed to perform its programmed operation (e.g., with a Not Empty value for the input queue(s) that provide the inputs to the PE and a Not Full value for the output queue(s) that are to store the resultant(s) for the PE operation). An example of determining the Not Full value for an output queue is discussed below in reference to FIG. 22. In certain embodiments, input controller circuitry includes any one or more of the inputs and any one or more of the outputs discussed herein.

For example, assume that the operation that is to be performed is to source data from both input storage 1124 and input storage 1126 in FIG. 11. Two instances of input controller circuitry 1200 may be included to cause a respective input value to be enqueued into input storage 1124 and input storage 1126 in FIG. 11. In this example, each input controller circuitry instance may send a Not Empty value within the PE containing input storage 1124 and input storage 1126 (e.g., to operation circuitry) to cause the PE to operate on the input values (e.g., when the storage for the resultant is also not full).

Figure 13:
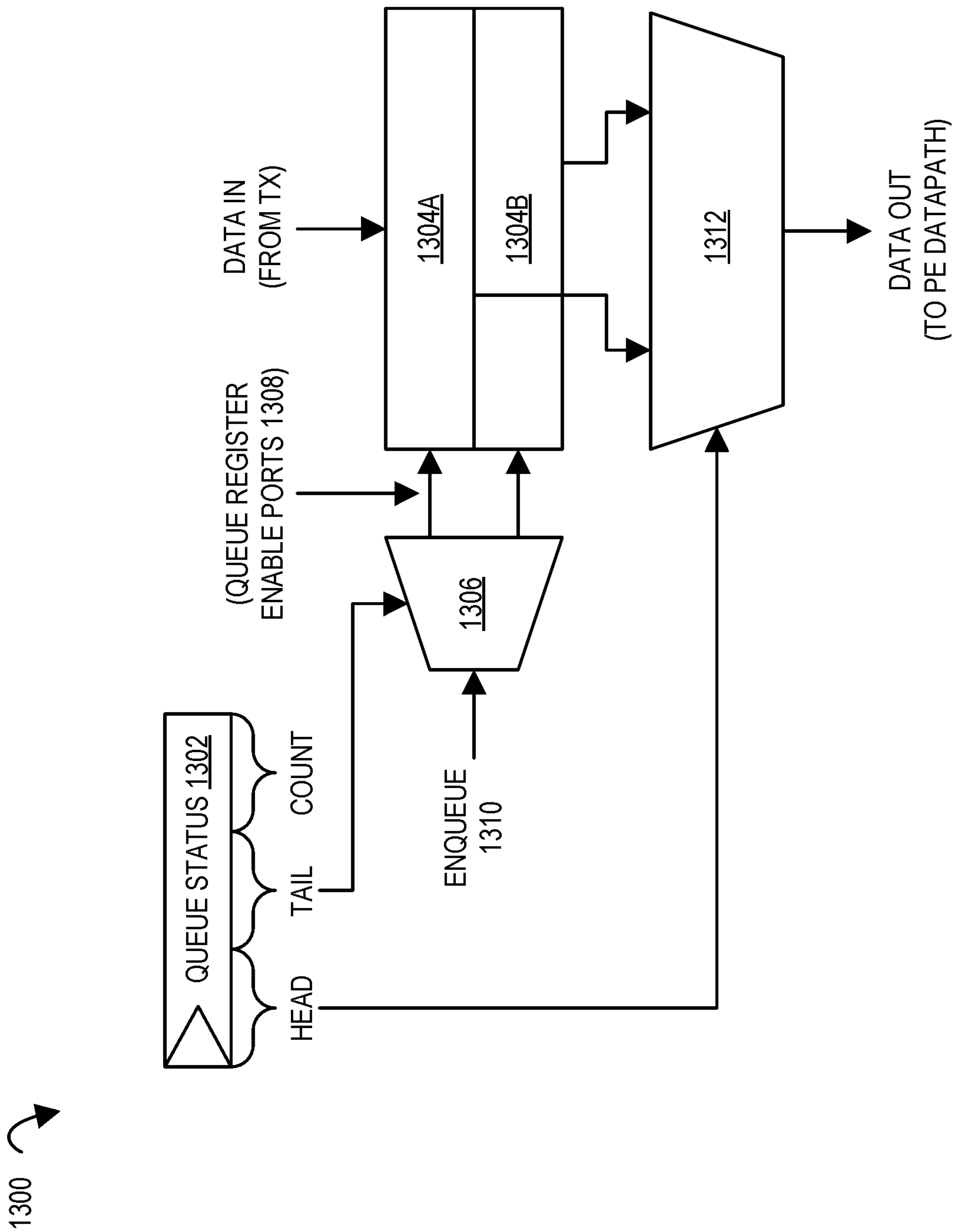
FIG. 13 illustrates enqueue circuitry of input controller and/or input controller in FIG. 12 according to embodiments of the disclosure.

FIG. 13 illustrates enqueue circuitry 1300 of input controller 1101 and/or input controller 1103 in FIG. 12 according to embodiments of the disclosure. Depicted enqueue circuitry 1300 includes a queue status register 1302 to store a value representing the current status of the input queue 1304. Input queue 1304 may be any input queue, e.g., input storage 1124 or input storage 1126 in FIG. 11. Enqueue circuitry 1300 includes a multiplexer 1306 coupled to queue register enable ports 1308. Enqueue input 1310 is to receive a value indicating to enqueue (e.g., store) an input value into input queue 1304 or not. In one embodiment, enqueue input 1310 is coupled to path 1210 of an input controller that causes input data (e.g., transmitted to the input queue 1304 that input controller circuitry 1200 is controlling) to be enqueued into. In the depicted embodiment, the tail value from queue status register 1302 is used as the control value to control whether the input data is stored in the first slot 1304A or the second slot 1304B of input queue 1304. In one embodiment, input queue 1304 includes three or more slots, e.g., with that same number of queue register enable ports as the number of slots. Enqueue circuitry 1300 includes a multiplexer 1312 coupled to input queue 1304 that causes data from a particular location (e.g., slot) of the input queue 1304 to be output into a processing element. In the depicted embodiment, the head value from queue status register 1302 is used as the control value to control whether the output data is sourced from the first slot 1304A or the second slot 1304B of input queue 1304. In one embodiment, input queue 1304 includes three or more slots, e.g., with that same number of input ports of multiplexer 1312 as the number of slots. A Data In value may be the input data (e.g., payload) for an input storage, for example, in contrast to a Valid value which may (e.g., only) indicate (e.g., by a single bit) that input data is being sent or ready to be sent but does not include the input data itself. Data Out value may be sent to multiplexer 1121 and/or multiplexer 1123 in FIG. 11.

Queue status register 1302 may store any combination of a head value (e.g., pointer) that represents the head (beginning) of the data stored in the queue, a tail value (e.g., pointer) that represents the tail (ending) of the data stored in the queue, and a count value that represents the number of (e.g., valid) values stored in the queue). For example, a count value may be an integer (e.g., two) where the queue is storing the number of values indicated by the integer (e.g., storing two values in the queue). The capacity of data (e.g., storage slots for data, e.g., for data elements) in a queue may be preselected (e.g., during programming), for example, depending on the total bit capacity of the queue and the number of bits in each element. Queue status register 1302 may be updated with the initial values, e.g., during configuration time. Queue status register 1302 may be updated as discussed in reference to FIG. 12.

Figures 14, 15, 16:
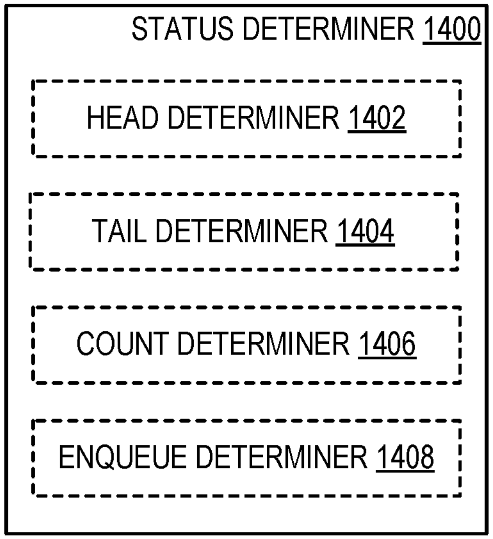
FIG. 14 illustrates a status determiner of input controller and/or input controller in FIG. 11 according to embodiments of the disclosure.
FIG. 15 illustrates a head determiner state machine according to embodiments of the disclosure.
FIG. 16 illustrates a tail determiner state machine according to embodiments of the disclosure.

FIG. 14 illustrates a status determiner 1400 of input controller 1101 and/or input controller 1103 in FIG. 11 according to embodiments of the disclosure. Status determiner 1400 may be used as status determiner 1204 in FIG. 12. Depicted status determiner 1400 includes a head determiner 1402, a tail determiner 1404, a count determiner 1406, and an enqueue determiner 1408. A status determiner may include one or more (e.g., any combination) of a head determiner 1402, a tail determiner 1404, a count determiner 1406, or an enqueue determiner 1408. In certain embodiments, head determiner 1402 provides a head value that that represents the current head (e.g., starting) position of input data stored in an input queue, tail determiner 1404 provides a tail value (e.g., pointer) that represents the current tail (e.g., ending) position of the input data stored in that input queue, count determiner 1406 provides a count value that represents the number of (e.g., valid) values stored in the input queue, and enqueue determiner provides an enqueue value that indicates whether to enqueue (e.g., store) input data (e.g., an input value) into the input queue or not.

FIG. 15 illustrates a head determiner state machine 1500 according to embodiments of the disclosure. In certain embodiments, head determiner 1402 in FIG. 14 operates according to state machine 1500. In one embodiment, head determiner 1402 in FIG. 14 includes logic circuitry that is programmed to perform according to state machine 1500. State machine 1500 includes inputs for an input queue of the input queue's: current head value (e.g., from queue status register 1202 in FIG. 12 or queue status register 1302 in FIG. 13), capacity (e.g., a fixed number), conditional dequeue value (e.g., output from conditional dequeue multiplexers 1129 and 1131 in FIG. 11), and not empty value (e.g., from Not Empty determiner 1208 in FIG. 12). State machine 1500 outputs an updated head value based on those inputs. The && symbol indicates a logical AND operation. The <=symbol indicates assignment of a new value, e.g., head <=0 assigns the value of zero as the updated head value. In FIG. 13, an (e.g., updated) head value is used as a control input to multiplexer 1312 to select a head value from the input queue 1304.

FIG. 16 illustrates a tail determiner state machine 1600 according to embodiments of the disclosure. In certain embodiments, tail determiner 1404 in FIG. 14 operates according to state machine 1600. In one embodiment, tail determiner 1404 in FIG. 14 includes logic circuitry that is programmed to perform according to state machine 1600. State machine 1600 includes inputs for an input queue of the input queue's: current tail value (e.g., from queue status register 1202 in FIG. 12 or queue status register 1302 in FIG. 13), capacity (e.g., a fixed number), ready value (e.g., output from Not Full determiner 1206 in FIG. 12), and valid value (for example, from a transmitting component (e.g., an upstream PE) as discussed in reference to FIG. 12 or FIG. 21). State machine 1600 outputs an updated tail value based on those inputs. The && symbol indicates a logical AND operation. The <= symbol indicates assignment of a new value, e.g., tail <=tail+1 assigns the value of the previous tail value plus one as the updated tail value. In FIG. 13, an (e.g., updated) tail value is used as a control input to multiplexer 1306 to help select a tail slot of the input queue 1304 to store new input data into.

FIG. 17 illustrates a count determiner state machine 1700 according to embodiments of the disclosure. In certain embodiments, count determiner 1406 in FIG. 14 operates according to state machine 1700. In one embodiment, count determiner 1406 in FIG. 14 includes logic circuitry that is programmed to perform according to state machine 1700. State machine 1700 includes inputs for an input queue of the input queue's: current count value (e.g., from queue status register 1202 in FIG. 12 or queue status register 1302 in FIG. 13), ready value (e.g., output from Not Full determiner 1206 in FIG. 12), valid value (for example, from a transmitting component (e.g., an upstream PE) as discussed in reference to FIG. 12 or FIG. 21), conditional dequeue value (e.g., output from conditional dequeue multiplexers 1129 and 1131 in FIG. 11), and not empty value (e.g., from Not Empty determiner 1208 in FIG. 12). State machine 1700 outputs an updated count value based on those inputs. The && symbol indicates a logical AND operation. The + symbol indicates an addition operation. The – symbol indicates a subtraction operation. The <= symbol indicates assignment of a new value, e.g., to the count field of queue status register 1202 in FIG. 12 or queue status register 1302 in FIG. 13. Note that the asterisk symbol indicates the conversion of a Boolean value of true to an integer 1 and a Boolean value of false to an integer 0.

FIG. 18 illustrates an enqueue determiner state machine 1800 according to embodiments of the disclosure. In certain embodiments, enqueue determiner 1408 in FIG. 14 operates according to state machine 1800. In one embodiment, enqueue determiner 1408 in FIG. 14 includes logic circuitry that is programmed to perform according to state machine 1800. State machine 1800 includes inputs for an input queue of the input queue's: ready value (e.g., output from Not Full determiner 1206 in FIG. 12), and valid value (for example, from a transmitting component (e.g., an upstream PE) as discussed in reference to FIG. 12 or FIG. 21). State machine 1800 outputs an updated enqueue value based on those inputs. The && symbol indicates a logical AND operation. The = symbol indicates assignment of a new value. In FIG. 13, an (e.g., updated) enqueue value is used as an input on path 1310 to multiplexer 1306 to cause the tail slot of the input queue 1304 to store new input data therein.

FIG. 19 illustrates a Not Full determiner state machine 1900 according to embodiments of the disclosure. In certain embodiments, Not Full determiner 1206 in FIG. 12 operates according to state machine 1900. In one embodiment, Not Full determiner 1206 in FIG. 12 includes logic circuitry that is programmed to perform according to state machine 1900. State machine 1900 includes inputs for an input queue of the input queue's count value (e.g., from queue status register 1202 in FIG. 12 or queue status register 1302 in FIG. 13) and capacity (e.g., a fixed number indicating the total capacity of the input queue). The < symbol indicates a less than operation, such that a ready value (e.g., a Boolean one) indicating the input queue is not full is asserted as long as the current count of the input queue is less than the input queue's capacity. In FIG. 12, an (e.g., updated) Ready (e.g., Not Full) value is sent to a transmitting component (e.g., an upstream PE) to indicate if (e.g., when) there is storage space available for additional input data in the input queue.

FIG. 20 illustrates a Not Empty determiner state machine 2000 according to embodiments of the disclosure. In certain embodiments, Not Empty determiner 1208 in FIG. 12 operates according to state machine 2000. In one embodiment, Not Empty determiner 1208 in FIG. 12 includes logic circuitry that is programmed to perform according to state machine 2000. State machine 2000 includes an input for an input queue of the input queue's count value (e.g., from queue status register 1202 in FIG. 12 or queue status register 1302 in FIG. 13). The < symbol indicates a less than operation, such that a Not Empty value (e.g., a Boolean one) indicating the input queue is not empty is asserted as long as the current count of the input queue is greater than zero (or whatever number indicates an empty input queue). In FIG. 12, an (e.g., updated) Not Empty value is to cause the PE (e.g., the PE that includes the input queue) to operate on the input value(s), for example, when the storage for the resultant of that operation is also not full.

FIG. 21 illustrates a valid determiner state machine 2100 according to embodiments of the disclosure. In certain embodiments, Not Empty determiner 2208 in FIG. 22 operates according to state machine 2100. In one embodiment, Not Empty determiner 2208 in FIG. 22 includes logic circuitry that is programmed to perform according to state machine 2100. State machine 2200 includes an input for an output queue of the output queue's count value (e.g., from queue status register 2202 in FIG. 22 or queue status register 2302 in FIG. 23). The < symbol indicates a less than operation, such that a Not Empty value (e.g., a Boolean one) indicating the output queue is not empty is asserted as long as the current count of the output queue is greater than zero (or whatever number indicates an empty output queue). In FIG. 12, an (e.g., updated) valid value is sent from a transmitting (e.g., upstream) PE to the receiving PE (e.g., the receiving PE that includes the input queue being controlled by input controller 1200 in FIG. 12), e.g., and that valid value is used as the valid value in state machines 1600, 1700, and/or 1800.

Output Controllers

Figure 22:
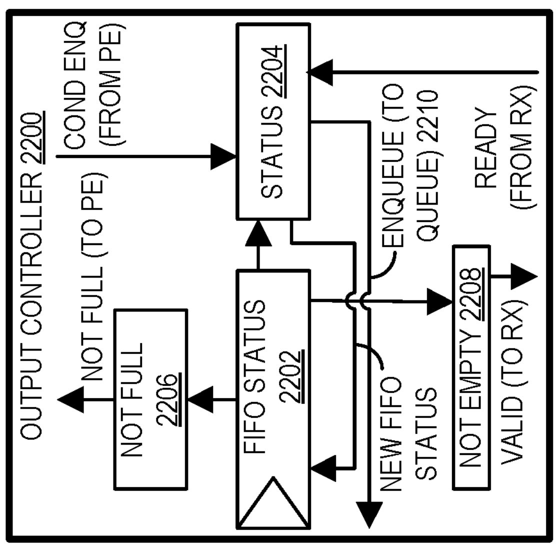
FIG. 22 illustrates output controller circuitry of output controller and/or output controller of processing element in FIG. 11 according to embodiments of the disclosure.

FIG. 22 illustrates output controller circuitry 2200 of output controller 1105 and/or output controller 1107 of processing element 1100 in FIG. 11 according to embodiments of the disclosure. In one embodiment, each output queue (e.g., buffer) includes its own instance of output controller circuitry 2200, for example, 2, 3, 4, 5, 6, 7, 8, or more (e.g., any integer) of instances of output controller circuitry 2200. Depicted output controller circuitry 2200 includes a queue status register 2202 to store a value representing the current status of that queue (e.g., the queue status register 2202 storing any combination of a head value (e.g., pointer) that represents the head (beginning) of the data stored in the queue, a tail value (e.g., pointer) that represents the tail (ending) of the data stored in the queue, and a count value that represents the number of (e.g., valid) values stored in the queue). For example, a count value may be an integer (e.g., two) where the queue is storing the number of values indicated by the integer (e.g., storing two values in the queue). The capacity of data (e.g., storage slots for data, e.g., for data elements) in a queue may be preselected (e.g., during programming), for example, depending on the total bit capacity of the queue and the number of bits in each element. Queue status register 2202 may be updated with the initial values, e.g., during configuration time. Count value may be set at zero during initialization.

Depicted output controller circuitry 2200 includes a Status determiner 2204, a Not Full determiner 2206, and a Not Empty determiner 2208. A determiner may be implemented in software or hardware. A hardware determiner may be a circuit implementation, for example, a logic circuit programmed to produce an output based on the inputs into the state machine(s) discussed below. Depicted (e.g., new) Status determiner 2204 includes a port coupled to queue status register 2202 to read and/or write to output queue status register 2202.

Depicted Status determiner 2204 includes a first input to receive a Ready value from a receiving component (e.g., a downstream PE) that indicates if (e.g., when) there is space (e.g., in an input queue thereof) for new data to be sent to the PE. In certain embodiments, the Ready value from the receiving component is sent by an input controller that includes input controller circuitry 1200 in FIG. 12. The Ready value may be referred to as a backpressure token, e.g., a backpressure token from a receiving PE sent to a transmitting PE. Depicted Status determiner 2204 includes a second input to receive a value or values from queue status register 2202 that represents that current status of the output queue that output controller circuitry 2200 is controlling. Optionally, Status determiner 2204 includes a third input to receive a value (from within the PE that includes output controller circuitry 1200) that indicates if (when) there is a conditional enqueue, e.g., from operation circuitry 1125 and/or operation circuitry 1127 in FIG. 11.

As discussed further below, the depicted Status determiner 2204 includes a first output to send a value on path 2210 that will cause output data (sent to the output queue that output controller circuitry 2200 is controlling) to be enqueued into the output queue or not enqueued into the output queue. Depicted Status determiner 2204 includes a second output to send an updated value to be stored in queue status register 2202, e.g., where the updated value represents the updated status (e.g., head value, tail value, count value, or any combination thereof) of the output queue that output controller circuitry 2200 is controlling.

Output controller circuitry 2200 includes a Not Full determiner 2206 that determines a Not Full (e.g., Ready) value and outputs the Not Full value, e.g., within the PE that includes output controller circuitry 2200, to indicate if (e.g., when) there is storage space available for output data in the output queue being controlled by output controller circuitry 2200. In one embodiment, for an output queue of a PE, a Not Full value that indicates there is no storage space available in that output queue is to cause a stall of execution of the PE (e.g., stall execution that is to cause a resultant to be stored into the storage space) until storage space is available (e.g., and when there is available data in the input queue(s) being sourced from in that PE).

Output controller circuitry 2200 includes a Not Empty determiner 2208 that determines an output storage (queue) status value and outputs (e.g., on path 1145 or path 1147 in FIG. 11) an output storage (queue) status value that indicates (e.g., by asserting a "not empty" indication value or an "empty" indication value) when the output queue being controlled contains (e.g., new) output data (e.g., dataflow token or tokens), for example, so that output data may be sent to the receiving PE. In certain embodiments, the output storage (queue) status value (e.g., being a value that indicates the output queue of the sending PE is not empty) is one of the two control values (with the other being that input storage of the receiving PE coupled to the output storage is not full) that is to stall transmittal of that data from the sending PE to the receiving PE until both of the control values indicate the components (e.g., PEs) may proceed to transmit that (e.g., payload) data (e.g., with a Ready value for the input queue(s) that is to receive data from the transmitting PE and a Valid value for the output queue(s) in the receiving PE that is to store the data). An example of determining the Ready value for an input queue is discussed above in reference to FIG. 12. In certain embodiments, output controller circuitry includes any one or more of the inputs and any one or more of the outputs discussed herein.

For example, assume that the operation that is to be performed is to send (e.g., sink) data into both output storage 1134 and output storage 1136 in FIG. 11. Two instances of output controller circuitry 2200 may be included to cause a respective output value(s) to be enqueued into output storage 1134 and output storage 1136 in FIG. 11. In this example, each output controller circuitry instance may send a Not Full value within the PE containing output storage 1134 and output storage 1136 (e.g., to operation circuitry) to cause the PE to operate on its input values (e.g., when the input storage to source the operation input(s) is also not empty).

Figure 23:
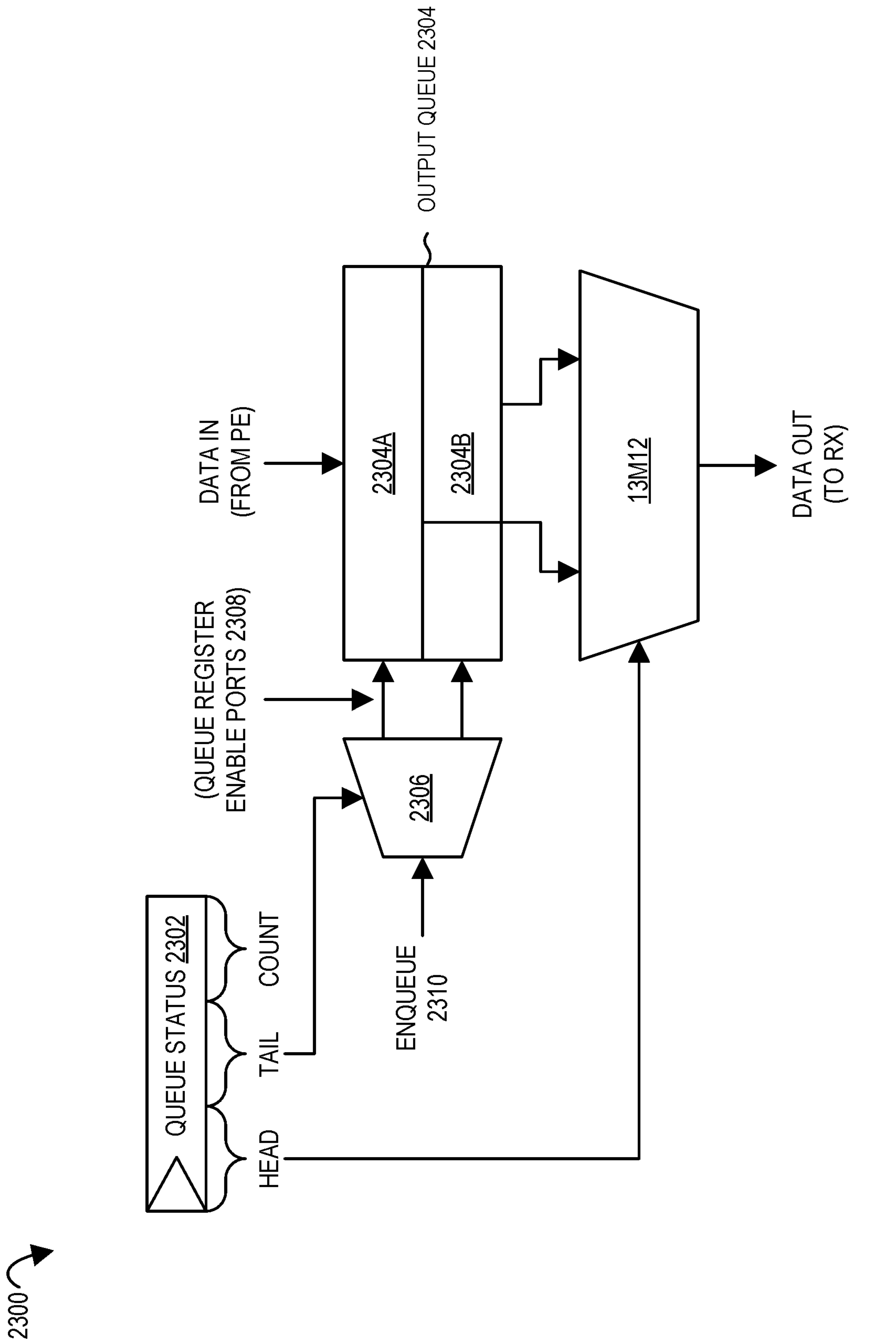
FIG. 23 illustrates enqueue circuitry of output controller and/or output controller in FIG. 12 according to embodiments of the disclosure.

FIG. 23 illustrates enqueue circuitry 2300 of output controller 1105 and/or output controller 1107 in FIG. 12 according to embodiments of the disclosure. Depicted enqueue circuitry 2300 includes a queue status register 2302 to store a value representing the current status of the output queue 2304. Output queue 2304 may be any output queue, e.g., output storage 1134 or output storage 1136 in FIG. 11. Enqueue circuitry 2300 includes a multiplexer 2306 coupled to queue register enable ports 2308. Enqueue input 2310 is to receive a value indicating to enqueue (e.g., store) an output value into output queue 2304 or not. In one embodiment, enqueue input 2310 is coupled to path 2210 of an output controller that causes output data (e.g., transmitted to the output queue 2304 that output controller circuitry 2300 is controlling) to be enqueued into. In the depicted embodiment, the tail value from queue status register 2302 is used as the control value to control whether the output data is stored in the first slot 2304A or the second slot 2304B of output queue 2304. In one embodiment, output queue 2304 includes three or more slots, e.g., with that same number of queue register enable ports as the number of slots. Enqueue circuitry 2300 includes a multiplexer 2312 coupled to output queue 2304 that causes data from a particular location (e.g., slot) of the output queue 2304 to be output to a network (e.g., to a downstream processing element). In the depicted embodiment, the head value from queue status register 2302 is used as the control value to control whether the output data is sourced from the first slot 2304A or the second slot 2304B of output queue 2304. In one embodiment, output queue 2304 includes three or more slots, e.g., with that same number of output ports of multiplexer 2312 as the number of slots. A Data In value may be the output data (e.g., payload) for an output storage, for example, in contrast to a Valid value which may (e.g., only) indicate (e.g., by a single bit) that output data is being sent or ready to be sent but does not include the output data itself. Data Out value may be sent to multiplexer 1121 and/or multiplexer 1123 in FIG. 11.

Queue status register 2302 may store any combination of a head value (e.g., pointer) that represents the head (beginning) of the data stored in the queue, a tail value (e.g., pointer) that represents the tail (ending) of the data stored in the queue, and a count value that represents the number of (e.g., valid) values stored in the queue). For example, a count value may be an integer (e.g., two) where the queue is storing the number of values indicated by the integer (e.g., storing two values in the queue). The capacity of data (e.g., storage slots for data, e.g., for data elements) in a queue may be preselected (e.g., during programming), for example, depending on the total bit capacity of the queue and the number of bits in each element. Queue status register 2302 may be updated with the initial values, e.g., during configuration time. Queue status register 2302 may be updated as discussed in reference to FIG. 22.

Figures 24, 25, 26:
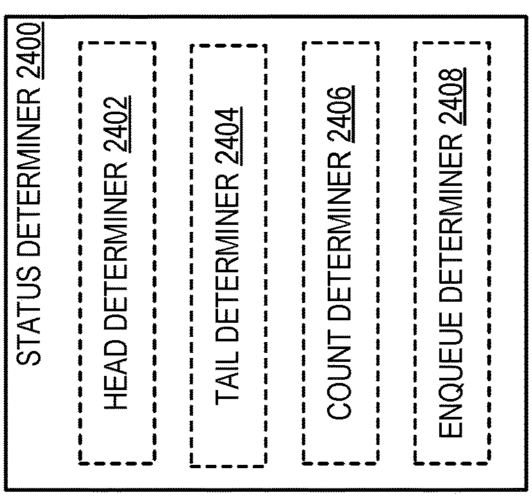
FIG. 24 illustrates a status determiner of output controller and/or output controller in FIG. 11 according to embodiments of the disclosure.
FIG. 25 illustrates a head determiner state machine according to embodiments of the disclosure.
FIG. 26 illustrates a tail determiner state machine according to embodiments of the disclosure.

FIG. 24 illustrates a status determiner 2400 of output controller 1105 and/or output controller 1107 in FIG. 11 according to embodiments of the disclosure. Status determiner 2400 may be used as status determiner 2204 in FIG. 22. Depicted status determiner 2400 includes a head determiner 2402, a tail determiner 2404, a count determiner 2406, and an enqueue determiner 2408. A status determiner may include one or more (e.g., any combination) of a head determiner 2402, a tail determiner 2404, a count determiner 2406, or an enqueue determiner 2408. In certain embodiments, head determiner 2402 provides a head value that that represents the current head (e.g., starting) position of output data stored in an output queue, tail determiner 2404 provides a tail value (e.g., pointer) that represents the current tail (e.g., ending) position of the output data stored in that output queue, count determiner 2406 provides a count value that represents the number of (e.g., valid) values stored in the output queue, and enqueue determiner provides an enqueue value that indicates whether to enqueue (e.g., store) output data (e.g., an output value) into the output queue or not.

FIG. 25 illustrates a head determiner state machine 2500 according to embodiments of the disclosure. In certain embodiments, head determiner 2402 in FIG. 24 operates according to state machine 2500. In one embodiment, head determiner 2402 in FIG. 24 includes logic circuitry that is programmed to perform according to state machine 2500. State machine 2500 includes inputs for an output queue of: a current head value (e.g., from queue status register 2202 in FIG. 22 or queue status register 2302 in FIG. 23), capacity (e.g., a fixed number), ready value (e.g., output from a Not Full determiner 1206 in FIG. 12 from a receiving component (e.g., a downstream PE) for its input queue), and valid value (for example, from a Not Empty determiner of the PE as discussed in reference to FIG. 22 or FIG. 30). State machine 2500 outputs an updated head value based on those inputs. The && symbol indicates a logical AND operation. The <= symbol indicates assignment of a new value, e.g., head <=0 assigns the value of zero as the updated head value. In FIG. 23, an (e.g., updated) head value is used as a control input to multiplexer 2312 to select a head value from the output queue 2304.

FIG. 26 illustrates a tail determiner state machine 2600 according to embodiments of the disclosure. In certain embodiments, tail determiner 2404 in FIG. 24 operates according to state machine 2600. In one embodiment, tail determiner 2404 in FIG. 24 includes logic circuitry that is programmed to perform according to state machine 2600. State machine 2600 includes inputs for an output queue of: a current tail value (e.g., from queue status register 2202 in FIG. 22 or queue status register 2302 in FIG. 23), capacity (e.g., a fixed number), a Not Full value (e.g., from a Not Full determiner of the PE as discussed in reference to FIG. 22 or FIG. 29), and a Conditional Enqueue value (e.g., output from conditional enqueue multiplexers 1133 and 1135 in FIG. 11). State machine 2600 outputs an updated tail value based on those inputs. The && symbol indicates a logical AND operation. The <= symbol indicates assignment of a new value, e.g., tail <=tail+1 assigns the value of the previous tail value plus one as the updated tail value. In FIG. 23, an (e.g., updated) tail value is used as a control input to multiplexer 2306 to help select a tail slot of the output queue 2304 to store new output data into.

FIG. 27 illustrates a count determiner state machine 2700 according to embodiments of the disclosure. In certain embodiments, count determiner 2406 in FIG. 24 operates according to state machine 2700. In one embodiment, count determiner 2406 in FIG. 24 includes logic circuitry that is programmed to perform according to state machine 2700. State machine 2700 includes inputs for an output queue of: current count value (e.g., from queue status register 2202 in FIG. 22 or queue status register 2302 in FIG. 23), ready value (e.g., output from a Not Full determiner 1206 in FIG. 12 from a receiving component (e.g., a downstream PE) for its input queue), valid value (for example, from a Not Empty determiner of the PE as discussed in reference to FIG. 22 or FIG. 30), Conditional Enqueue value (e.g., output from conditional enqueue multiplexers 1133 and 1135 in FIG. 11), and Not Full value (e.g., from a Not Full determiner of the PE as discussed in reference to FIG. 22 or FIG. 29). State machine 2700 outputs an updated count value based on those inputs. The && symbol indicates a logical AND operation. The + symbol indicates an addition operation. The − symbol indicates a subtraction operation. The <= symbol indicates assignment of a new value, e.g., to the count field of queue status register 2202 in FIG. 22 or queue status register 2302 in FIG. 23. Note that the asterisk symbol indicates the conversion of a Boolean value of true to an integer 1 and a Boolean value of false to an integer 0.

FIG. 28 illustrates an enqueue determiner state machine 2800 according to embodiments of the disclosure. In certain embodiments, enqueue determiner 2408 in FIG. 24 operates according to state machine 2800. In one embodiment, enqueue determiner 2408 in FIG. 24 includes logic circuitry that is programmed to perform according to state machine 2800. State machine 2800 includes inputs for an output queue of: ready value (e.g., output from a Not Full determiner 1206 in FIG. 12 from a receiving component (e.g., a downstream PE) for its input queue), and valid value (for example, from a Not Empty determiner of the PE as discussed in reference to FIG. 22 or FIG. 30). State machine 2800 outputs an updated enqueue value based on those inputs. The && symbol indicates a logical AND operation. The =symbol indicates assignment of a new value. In FIG. 23, an (e.g., updated) enqueue value is used as an input on path 2310 to multiplexer 2306 to cause the tail slot of the output queue 2304 to store new output data therein.

FIG. 29 illustrates a Not Full determiner state machine 2900 according to embodiments of the disclosure. In certain embodiments, Not Full determiner 2206 in FIG. 12 operates according to state machine 2900. In one embodiment, Not Full determiner 2206 in FIG. 22 includes logic circuitry that is programmed to perform according to state machine 2900. State machine 2900 includes inputs for an output queue of the output queue's count value (e.g., from queue status register 2202 in FIG. 22 or queue status register 2302 in FIG. 23) and capacity (e.g., a fixed number indicating the total capacity of the output queue). The < symbol indicates a less than operation, such that a ready value (e.g., a Boolean one) indicating the output queue is not full is asserted as long as the current count of the output queue is less than the output queue's capacity. In FIG. 22, a (e.g., updated) Not Full value is produced and used within the PE to indicate if (e.g., when) there is storage space available for additional output data in the output queue.

FIG. 30 illustrates a Not Empty determiner state machine 3000 according to embodiments of the disclosure. In certain embodiments, Not Empty determiner 1208 in FIG. 12 operates according to state machine 3000. In one embodiment, Not Empty determiner 1208 in FIG. 12 includes logic circuitry that is programmed to perform according to state machine 3000. State machine 3000 includes an input for an input queue of the input queue's count value (e.g., from queue status register 1202 in FIG. 12 or queue status register 1302 in FIG. 13). The < symbol indicates a less than operation, such that a Not Empty value (e.g., a Boolean one) indicating the input queue is not empty is asserted as long as the current count of the input queue is greater than zero (or whatever number indicates an empty input queue). In FIG. 12, an (e.g., updated) Not Empty value is to cause the PE (e.g., the PE that includes the input queue) to operate on the input value(s), for example, when the storage for the resultant of that operation is also not full.

FIG. 31 illustrates a valid determiner state machine 3100 according to embodiments of the disclosure. In certain embodiments, Not Empty determiner 2208 in FIG. 22 operates according to state machine 3100. In one embodiment, Not Empty determiner 2208 in FIG. 22 includes logic circuitry that is programmed to perform according to state machine 3100. State machine 2200 includes an input for an output queue of the output queue's count value (e.g., from queue status register 2202 in FIG. 22 or queue status register 2302 in FIG. 23). The < symbol indicates a less than operation, such that a Not Empty value (e.g., a Boolean one) indicating the output queue is not empty is asserted as long as the current count of the output queue is greater than zero (or whatever number indicates an empty output queue). In FIG. 22, an (e.g., updated) valid value is sent from a transmitting (e.g., upstream) PE to the receiving PE (e.g., sent by the transmitting PE that includes the output queue being controlled by output controller 2200 in FIG. 22), e.g., and that valid value is used as the valid value in state machines 2500, 2700, and/or 2800.

In certain embodiments, a first LIC channel may be formed between an output of a first PE to an input of a second PE, and a second LIC channel may be formed between an output of the second PE and an input of a third PE. As an example, a ready value may be sent on a first path of a LIC channel by a receiving PE to a transmitting PE and a valid value may be sent on a second path of the LIC channel by the transmitting PE to the receiving PE. As an example, see FIGS. 12 and 22. Additionally, a LIC channel in certain embodiments may include a third path for transmittal of the (e.g., payload) data, e.g., transmitted after the ready value and valid value are asserted.

Embodiments herein allow for the mapping of certain dataflow operators onto the circuit switched network, for example, to perform data steering operations, such as "pick" or "merge", in which values from several locations are steered into a single location (e.g., PE). In certain embodiments, by adding a small amount of state and control within the processing elements of a CSA, these operations are implemented as an extension of the PE-to-PE communication network, thereby removing these operations from the (e.g., general purpose) processing elements, e.g., for an area of the CSA savings as well as improvements in performance and energy efficiency. In one embodiment, the key limitation to spatial acceleration is the size of the program that may be configured on the accelerator at any point in time, and thus moving some operation(s) to the circuit switched network from the PE improves the number of operations that can be resident in the spatial array.

In certain embodiments of a CSA, the large number of paths fanning in to a receiver PE offer an opportunity to implement a selection operator using the circuit switched network microarchitecture. In one embodiment, a control (e.g., conditional) value (e.g., token) at a receiver PE steers flow control in addition to steering the data path, e.g., maintaining a PE-to-PE communications protocol without hardware changes at the transmitter or within PE-to-PE network. In one embodiment, a switch decoder (e.g., as in FIG. 34) is the only change to the hardware at the receiver PE. In one embodiment, state storage is used to achieve the desired operations, e.g., as discussed below.

Configurable Operand Size Architecture

In certain embodiments, a processing element includes fixed operand size operation circuitry, for example, having a fixed bit width of 8-bits, 16-bits, 32-bits, 64-bits, or any other predetermined number. In one embodiment, fixed operand size operation circuitry includes an arithmetic and logic unit (ALU) that uses pipelining and multiple concurrent (e.g., parallel) functional units (e.g., circuits) to attain high computational throughput. One example of such an ALU is a bit-parallel ALU, e.g., where each bit of an operand is input (e.g., clocked) into the ALU concurrently.

However, it may be desirable for a processing element to have configurable operand size operation circuitry. In one embodiment, configurable operand size operation circuitry includes a bit-serial ALU, e.g., including one or more bit-serial adders, bit-serial multipliers, and/or other logic operations to obtain a very high data processing rate (e.g., data bits per clock cycle) and lower power consumption compared with bit-parallel ALUs. Thus, certain embodiments herein allow a processing element to be configured for an (e.g., input and/or output) (e.g., any) operand size specifically chosen for a specific application. In one embodiment, an operand size configurable ALU is suited for diverse applications in usages that need different variable operand sizes, e.g., wireless and sensor processing. Certain embodiments herein are directed to a processing element having configurable operand size operation circuitry that both saves power by using the most compact and smallest design compared with parallel designs (e.g., parallel adders and multipliers that use extra logics, including but not limited to pipeline stages) to achieve the desired speed and latency, and also allows for much greater throughput (e.g., by implementing more bit-serial ALUs in the same sized area as a single bit-parallel ALU). Certain embodiments herein do not exploit pipeline and other techniques to reduce the clock frequency and processing throughput by using parallel processing of multiple data bits concurrently, do not simply grow the amount of data processed concurrently by using vector operations, and/or do not provide a fixed (or limited) operand size options, e.g., are not limited to only operating on operands of a pre-determined, fixed size (e.g., 8, 16, 32, or 64 bits). In certain embodiments, configurable operand size operation circuitry is able to operate (e.g., in series) on a first, multiple bit width of operands and a second, multiple bit width of operands that is one bit wider (or narrower) than the first, multiple bit width.

Certain embodiments of a processing element having configurable operand size operation circuitry occupy a smaller area compared to fixed (e.g., fixed to one or a proper subset of bit widths) operand size operation circuitry (e.g., parallel pipelined adders and multipliers). In one embodiment, the same area of a (e.g., 32-bit) parallel pipelined adder accommodates a plurality (e.g., more than 64) single bit-serial adders that can support any number of bits additions. Certain embodiments of a processing element having configurable operand size operation circuitry sequentially processes the data in series so the wires are much shorter and the fan-out is much lower than bit-parallel designs. Certain embodiments of a processing element having configurable operand size operation circuitry allow for operations on small or irregular data types (e.g., 7-bit addition in a turbo decoder, which is a key component of certain cellular (e.g., 4G) pipelines) that do not waste power in comparison to fixed (e.g., fixed to one or a proper subset of bit widths) operand size operation circuitry. Certain embodiments of a processing element having configurable operand size operation circuitry use single bit memory storage (e.g., flip-flop circuit) in contrast to the numerous amounts of pipeline flip-flops used for certain bit-parallel ALUs. Certain embodiments herein are directed to a processing element that processes configurable sized operands in series to handle varied applications' requests while reducing power and improving performance over circuitry that processes fixed size(s) of operands in parallel.

Certain embodiments herein are directed to a processing element that processes configurable sized operands to implement arithmetic and/or logic operations on binary numbers in a computing system in a bit-serial instead of a bit-parallel fashion. Certain embodiments herein support a configurable operand size and/or user defined fixed-point data format and operations. Certain embodiments herein achieve a high data processing rate per cycle by implementing more bit-serial ALU units in the same area of a pipelined bit-parallel ALU, and thus eliminate the extra logic circuitry and pipeline registers present in the bit-parallel ALU. The operand size configurability of certain embodiments herein further reduces the power consumption and increases performance compared with other designs. Examples of bit-serial configurable operand size operation circuitry are discussed in reference to FIGS. 32 to 42 below.

Figure 32:
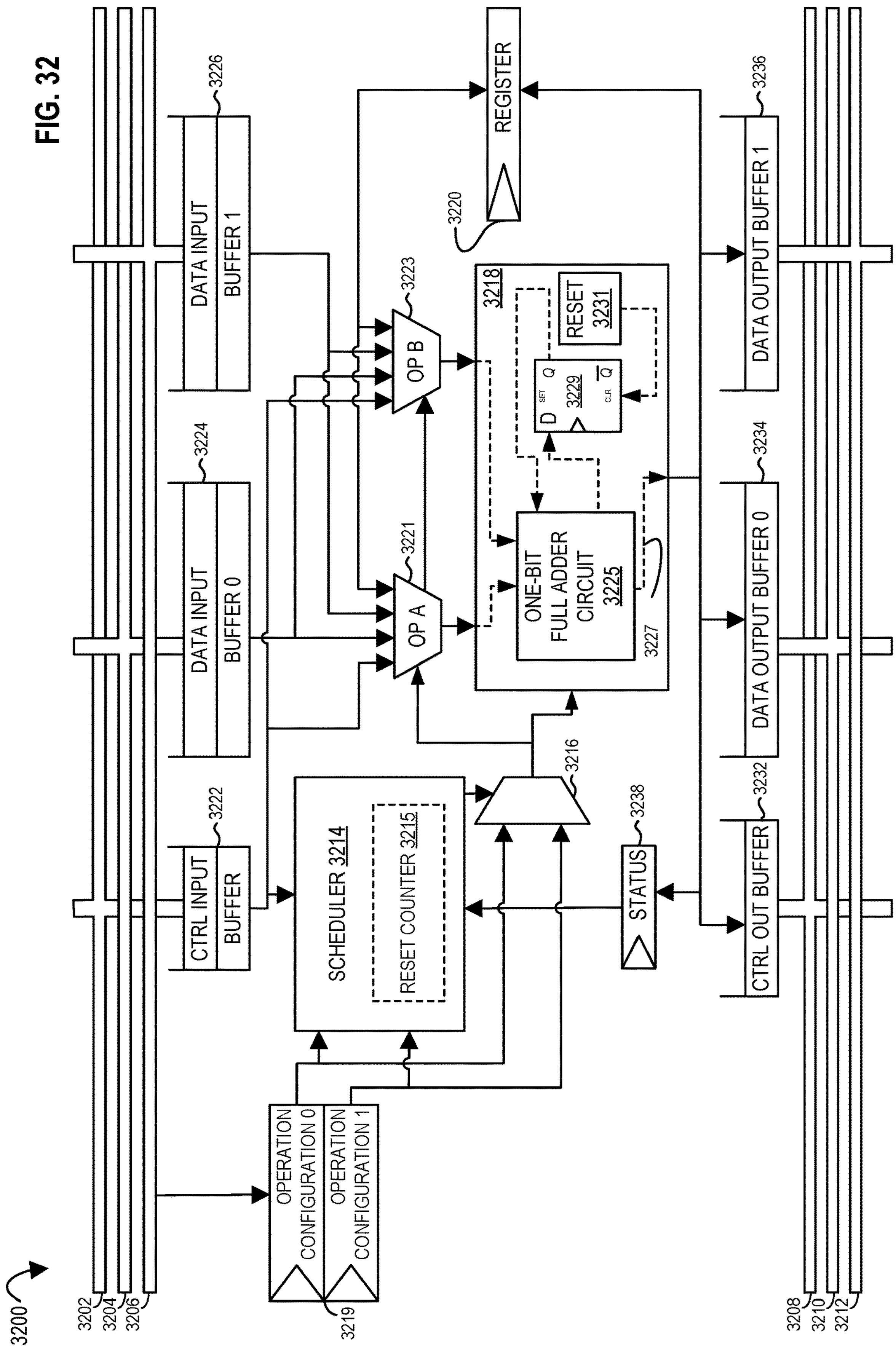
FIG. 32 illustrates a processing element having a configurable operand size operation circuit according to embodiments of the disclosure.

FIG. 32 illustrates a processing element 3200 having a configurable operand size operation circuit 3218 according to embodiments of the disclosure. In one embodiment, operation configuration register 3219 is loaded during configuration (e.g., mapping) and specifies the particular operation (or operations) this processing (e.g., compute) element is to perform and the bit width of the operand size (e.g., for that particular operation). Register 3220 activity may be controlled by that operation (an output of multiplexer 3216, e.g., controlled by the scheduler 3214). Scheduler 3214 may schedule an operation or operations of processing element 3200, for example, when input data and control input arrives. Control input buffer 3222 is connected to local network 3202 (e.g., and local network 3202 may include a data path network as in FIG. 7A and a flow control path network as in FIG. 7B) and is loaded with a value when it arrives (e.g., the network has a data bit(s) and valid bit(s)). Control output buffer 3232, data output buffer 3234, and/or data output buffer 3236 may receive an output of processing element 3200, e.g., as controlled by the operation (an output of multiplexer 3216). Status register 3238 may be loaded whenever the configurable operand size operation circuit (e.g., bit-serial ALU) 3218 executes (also controlled by output of multiplexer 3216). Data in control input buffer 3222 and control output buffer 3232 may be a single bit. Multiplexer 3221 (e.g., operand A) and multiplexer 3223 (e.g., operand B) may source inputs. Processing element 3200 may include operation circuitry for bit-parallel operations (e.g., a bit-parallel ALU) in addition to one or more instances of configurable operand size operation circuit 3218.

In one embodiment, the configuration value field that indicates the bit width of the operand size (e.g., for that particular operation) operation configuration register 3219 causes a particular value to be loaded into reset counter 3215, for example, a seven for seven bit wide input operands (e.g., for data up to 128 bits or a twelve for twelve bit wide input operands (e.g., for data up to 4096 bits). The reset counter 3215 may decrement with each cycle of operation that completes on a set of corresponding bits from each input operand (e.g., operand A and operand B) and then cause a reset of the configurable operand size operation circuit 3218 when the set of bit-serial operations is completed on the entire width of the input operands.

For example, configurable operand size operation circuit 3218 may be a bit-serial ALU (e.g., adder thereof) which includes a one-bit full adder circuit 3225 (e.g., that adds binary numbers and accounts for values carried in by adding those three one-bit numbers) and a latch 3229 (e.g., D flip-flop with reset) to serve as a memory unit. In one embodiment, a single processing element includes a plurality of bit-serial adders (e.g., a plurality of instances of circuit 3218), e.g., where such a PE can be used for either bit-serial or bit-parallel computation according to the configuration. In one embodiment, two serial bits input streams (e.g., one from multiplexer 3221 and one from multiplexer 3223) are fed into respective inputs of the one-bit full adder circuit 3225, and the serial output (e.g., a binary zero or one) is stored into the output (e.g., one of data output buffers 3234 or 3236) and any carry-out (e.g., if two or three ones are added, there is a carry out of zero) is stored in latch 3229 (e.g., input into the D input and output from the Q output in the next cycle into the carry input of full adder circuit 3225), with this repeated until the entire width of the input operands are processed. On completion of the bit-serial operation, the latch 3229 is reset to zero, e.g., when a new addition is started. In one embodiment, reset counter 3215 causes a value to be asserted to reset input 3231 of configurable operand size operation circuit 3218 to reset the circuit for a next operation, e.g., by causing a clear of any value (e.g., a one) stored in latch 3229. In one embodiment, full adder 3225 is formed from 28 transistors and latch 3229 is formed from 12 transistors, e.g., such that the proposed bit-serial adder uses only 40 transistors. The reset input of the latch 3229 can be used as a start input for the addition of two, new serial binary numbers. In certain embodiments, an output controller (e.g., output controller 2200 in FIG. 22) of the PE is not to assert a "Not Empty" value (e.g., is not to assert a "Valid" indication for the output buffer) for an output buffer until the bit-serial operation that is storing data in that output buffer is complete, e.g., as indicated by the reset counter 3215.

Configurable operand size operation circuit 3218 (e.g., bit-serial adder) can be used to compute the addition of any bit width (e.g., length) of two binary numbers. In one embodiment, the bit length is reconfigured by using reset counter 3215, e.g., a binary counter that counts down or up from a predetermined value. In one embodiment, a pre-loaded six-bit binary counter can set the operand size (e.g., bit width) from 1 to 64. In one embodiment, the output of the reset counter 3215 is connected to the reset of the bit-serial adder to set the bit width of the adder. In certain embodiments, larger bit widths than 64 can be handled simply by increasing the width of the counter 3215.

Configurable operand size operation circuit 3218 (e.g., bit-serial adder) can be used for compute intensive applications where large numbers of additions are required concurrently, for example, by a plurality of configurable operand size operation circuits, with each element of respective input vectors being operated on by a respective instance of a configurable operand size operation circuit of the plurality of configurable operand size operation circuits. In certain of these embodiments, a single reset counter is shared by the plurality of configurable operand size operation circuits.

Input from buffer 3222 may be used as a control. For example, suppose the operation of this processing (e.g., compute) element is (or includes) what is called a pick in FIG. 3B. The processing element 3200 then is to select data from either data input buffer 3224 or data input buffer 3226, e.g., to go to data output buffer 3234 (e.g., default) or data output buffer 3236. The control bit in 3222 may thus indicate a 0 if selecting from data input buffer 3224 or a 1 if selecting from data input buffer 3226. As another example, suppose the operation of this processing (e.g., compute) element is (or includes) what is called a switch in FIG. 3B. The processing element 3200 is to output data to data output buffer 3234 or data output buffer 3236, e.g., from data input buffer 3224 (e.g., default) or data input buffer 3226. The control bit in 3222 may thus indicate a 0 if outputting to data output buffer 3234 or a 1 if outputting to data output buffer 3236.

Multiple networks (e.g., interconnects) may be connected to a processing element, e.g., (input) networks 3202, 3204, 3206 and (output) networks 3208, 3210, 3212. The connections may be switches, e.g., as discussed in reference to FIGS. 7A and 7B. In one embodiment, each network includes two sub-networks (or two channels on the network), e.g., one for the data path network in FIG. 7A and one for the flow control (e.g., backpressure) path network in FIG. 7B. As one example, local network 3202 (e.g., set up as a control interconnect) is depicted as being switched (e.g., connected) to control input buffer 3222. In this embodiment, a data path (e.g., network as in FIG. 7A) may carry the control input value (e.g., bit or bits) (e.g., a control token) and the flow control path (e.g., network) may carry the backpressure signal (e.g., backpressure or no-backpressure token) from control input buffer 3222, e.g., to indicate to the upstream producer (e.g., PE) that a new control input value is not to be loaded into (e.g., sent to) control input buffer 3222 until the backpressure signal indicates there is room in the control input buffer 3222 for the new control input value (e.g., from a control output buffer of the upstream producer). In one embodiment, the new control input value may not enter control input buffer 3222 until both (i) the upstream producer receives the "space available" backpressure signal from "control input" buffer 3222 and (ii) the new control input value is sent from the upstream producer, e.g., and this may stall the processing element 3200 until that happens (and space in the target, output buffer(s) is available).

Data input buffer 3224 and data input buffer 3226 may perform similarly, e.g., local network 3204 (e.g., set up as a data (as opposed to control) interconnect) is depicted as being switched (e.g., connected) to data input buffer 3224. In this embodiment, a data path (e.g., network as in FIG. 7A) may carry the data input value (e.g., bit or bits) (e.g., a dataflow token) and the flow control path (e.g., network) may carry the backpressure signal (e.g., backpressure or no-backpressure token) from data input buffer 3224, e.g., to indicate to the upstream producer (e.g., PE) that a new data input value is not to be loaded into (e.g., sent to) data input buffer 3224 until the backpressure signal indicates there is room in the data input buffer 3224 for the new data input value (e.g., from a data output buffer of the upstream producer). In one embodiment, the new data input value may not enter data input buffer 3224 until both (i) the upstream producer receives the "space available" backpressure signal from "data input" buffer 3224 and (ii) the new data input value is sent from the upstream producer, e.g., and this may stall the processing element 3200 until that happens (and space in the target, output buffer(s) is available). A control output value and/or data output value may be stalled in their respective output buffers (e.g., 3232, 3234, 3236) until a backpressure signal indicates there is available space in the input buffer for the downstream processing element(s).

A processing element 3200 may be stalled from execution until its operands (e.g., a control input value and its corresponding data input value or values) are received and/or until there is room in the output buffer(s) of the processing element 3200 for the data that is to be produced by the execution of the operation on those operands. Next, discussion of FIG. 33 includes forming a configurable operand size multiplication circuit (e.g., bit-serial). In certain embodiments, a plurality of bit-serial, configurable operand size multiplication circuits consume the same area as a single bit-parallel multiplier.

Figure 33:
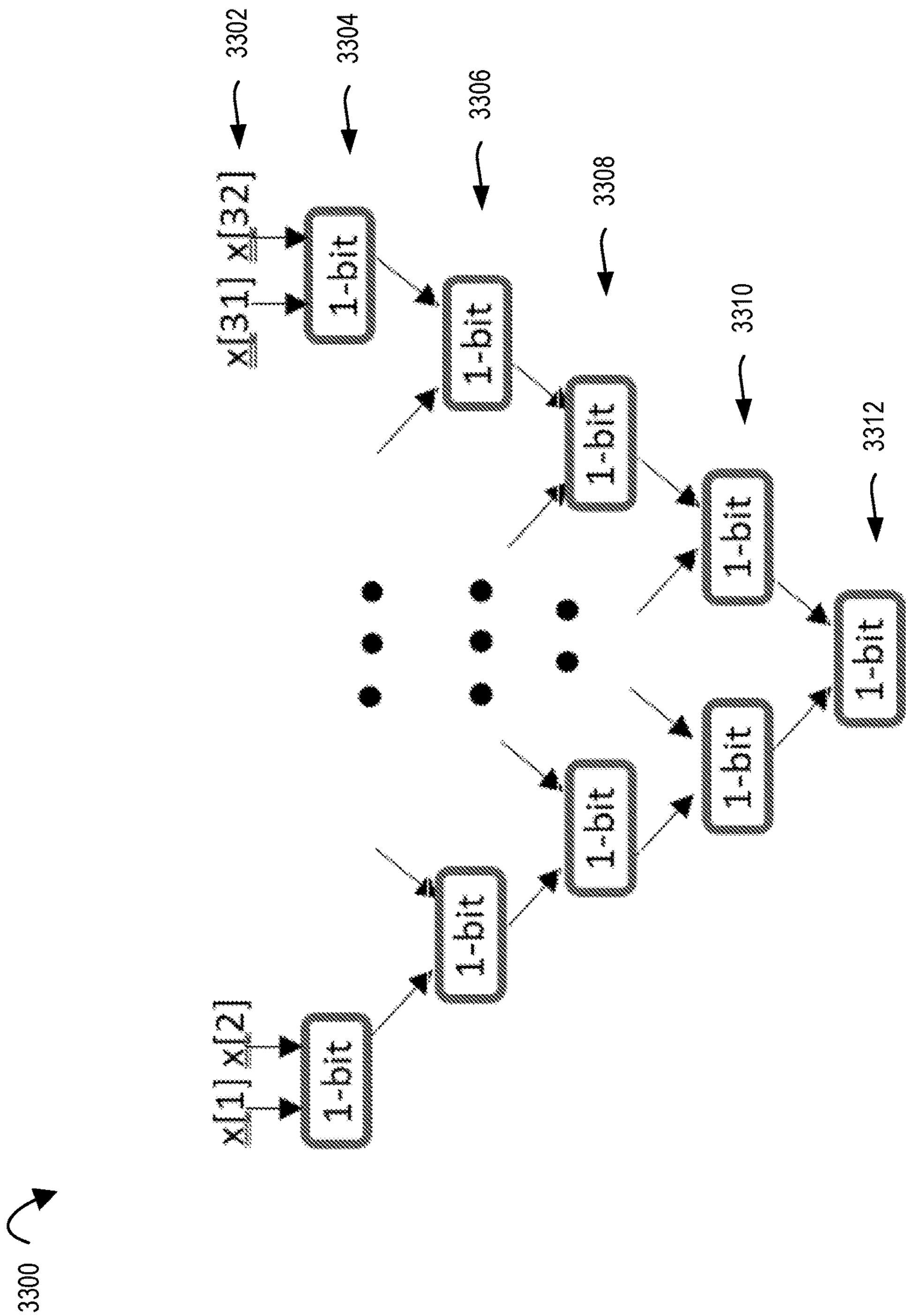
FIG. 33 illustrates a configurable operand size multiplication circuit formed from a plurality of configurable operand size operation circuits according to embodiments of the disclosure.

FIG. 33 illustrates a configurable operand size multiplication circuit 3300 formed from a plurality of configurable operand size operation circuits 3302, 3304, 3306, 3308, 3310, and 3312 according to embodiments of the disclosure. In certain embodiments, each row of configurable operand size operation circuits 3302, 3304, 3306, 3308, and 3310 is formed from one or more instances of configurable operand size operation circuit 3218 from FIG. 32, e.g., along with the control logic.

Figure 34:
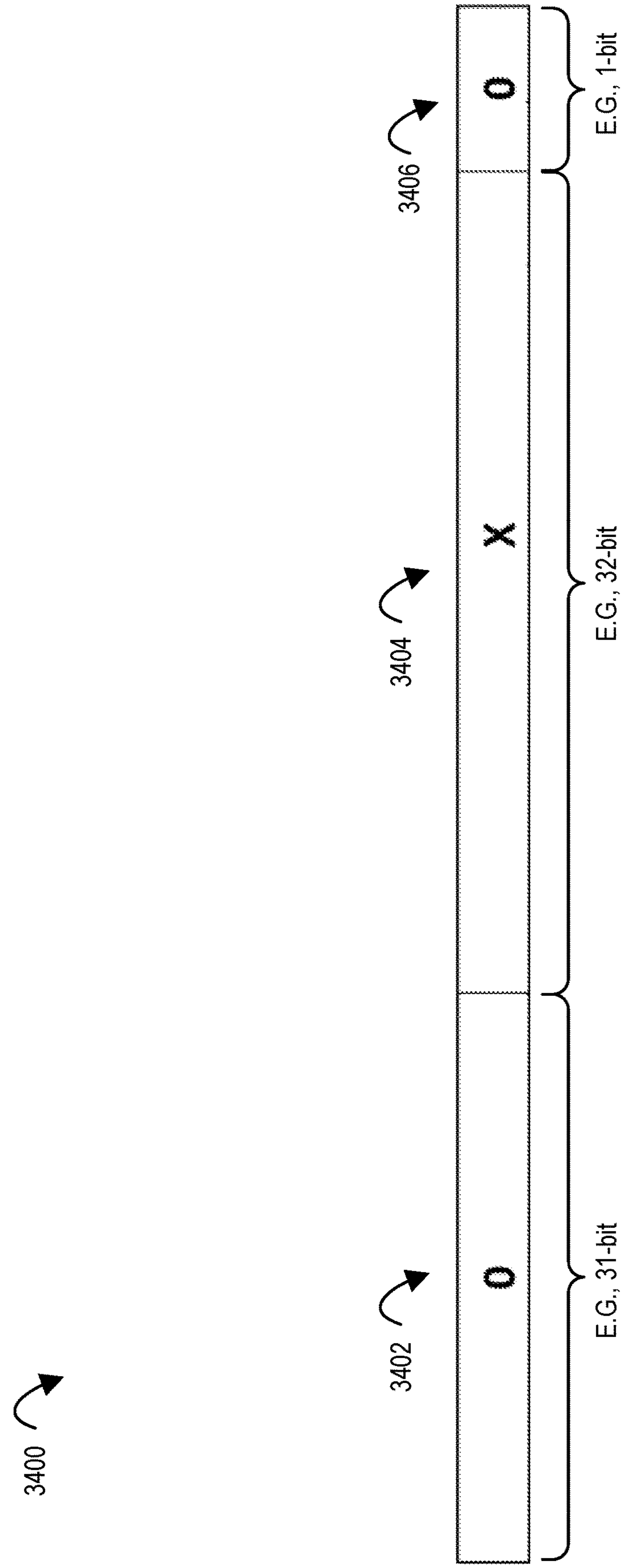
FIG. 34 illustrates a shift register of a configurable operand size multiplication circuit according to embodiments of the disclosure.

A bit-serial multiplier (e.g., formed from one or more PEs that include a configurable operand size operation circuit) may be used in high data rate applications and long word length multiplications such as in public key cryptography (e.g., integer multiplications of 1024 bits), e.g., instead of using a bit-parallel multiplier that uses many special circuit designs for low power, high performance, or low area. For example, when implementing the (e.g., 32-bit) multiplication of two (e.g., 32-bit) binary numbers: M=X*Y, the multiplication becomes adding the X a Y number of times. In one embodiment, x[i] is extended to 64 bits because the result of multiplication is 64-bits. In one embodiment, x[i] are all zeros when y[i]=0 and x[i] is a copy of the X and appended with zero at the head and tail based on the location of the i when y[i]=1. E.g., when y[2]=1, the x[2] is as shown in FIG. 34. FIG. 33 shows an example design of bit-serial multiplier where there are a total of 31 bit-serial adders (e.g., with a total number of transistors 40*31=1240). In one embodiment, a plurality of (e.g., 31) bit-serial adders share a same, single configuration counter, so the number of transistors 1240+198=1438 in this example.

FIG. 34 illustrates a shift register 3400 of a configurable operand size multiplication circuit according to embodiments of the disclosure. In one embodiment, x is appended with a zero at the head 3402 and tail 3406 of X 3404 to form the x[2] when Y[2]=1.

Embodiments herein may also be radix-2 and radix-4 bit-serial adder and multipliers. In one embodiment, a radix-2 bit-serial adder uses two full adder circuits and one memory bit (e.g., latch), thus the overhead of memory bit storage is reduced by half over using two memory bits of storage. In one embodiment, a radix-4 bit-serial adder uses four full adder circuits and one memory bit (e.g., latch). In one embodiment, the configurability of the radix-2 bit-serial adder is even numbers while radix-4 bit-serial adder can be configured as 4's multiples.

As certain configurable operand size multiplication circuit may operate on any bit width of operands (e.g., in increments of one bit and not just 8-bit increments), storage to load and/or store the operands may be used. In one embodiment, storage is a row and column accessible register file design for a bit-serial ALU, e.g., with a single bit being accessible at one time or vectorized to be accessible as a single bit row or column.

Since data values (e.g., data word or words) may not always be aligned to the native width of the bit-serial architecture (e.g., a bit-parallel architecture may have 32-bit SIMD, but an application may only have 14 data words), certain embodiments herein of register files accepts dynamic configuration to determine how many bit-parallel values (e.g., words must) be received before emitting a bit-serial value (e.g., word), for example, and also an argument reflecting the length of the bit-serial word to be emitted.

As other components in a computing system may be bit-parallel, e.g., the memory subsystem, certain embodiments of configurable operand size multiplication circuits (e.g., bit-serial ALU) coexists with bit-parallel ALUs and bit-parallel memory subsystems. In one embodiment, bitwise, row and column accessible register file facilitates the co-working of bit-serial and bit-parallel ALUs. Furthermore, some applications (for example, bit-matrix multiplications, e.g., in cryptography) can also benefit from a row and column accessible register file design. In one embodiment, bitwise, row and column accessible register file allows the conversion of conventional bit-parallel values (e.g., words), for example from memory, into a bit-serial representation for processing by a bit-serial ALU. In one embodiment, to supply sufficient bit-parallel values (e.g., words) to be gathered before a bit-serial values (e.g., word can be emitted, the circuitry includes double buffering, e.g., either natively or through the combination of two storage units.

Figure 35:
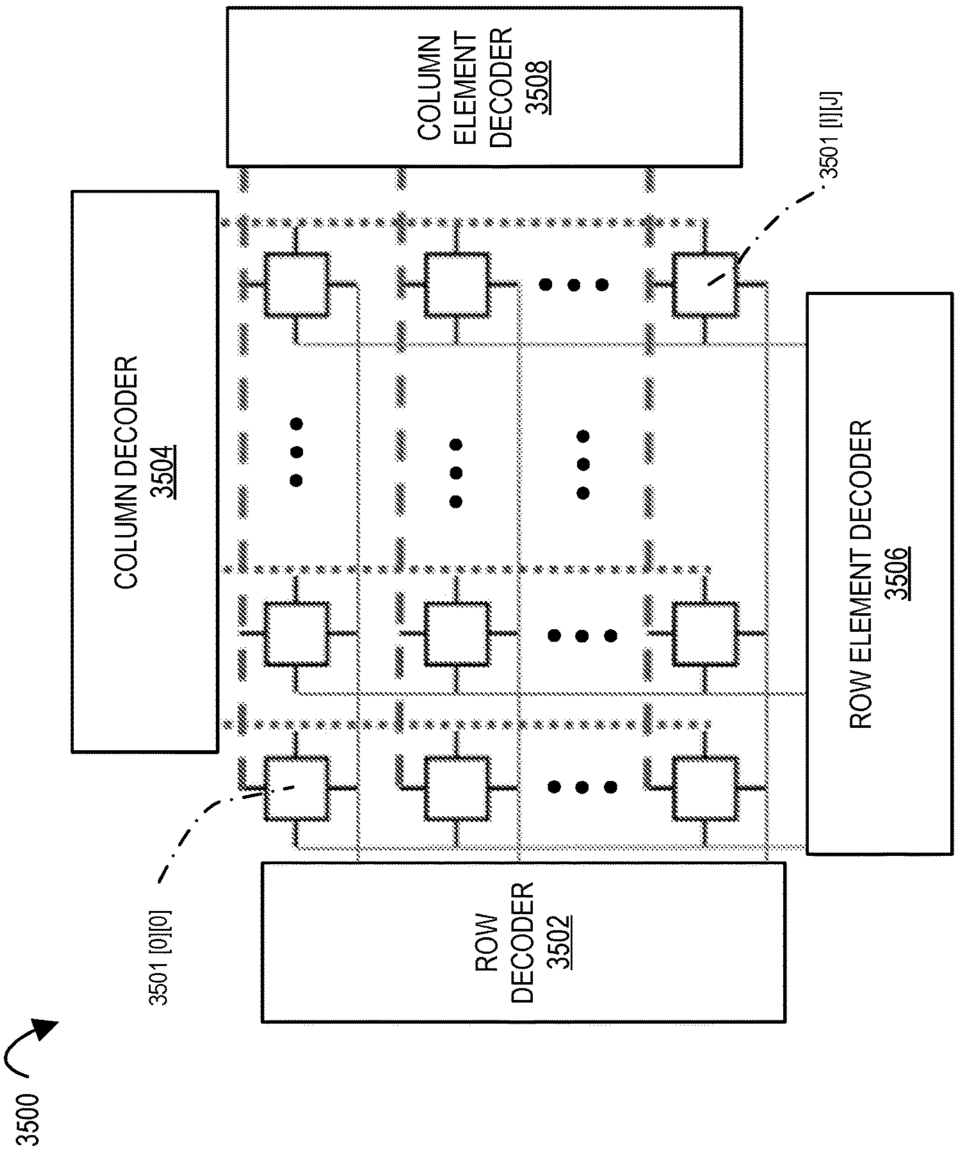
FIG. 35 illustrates a bitwise, row and column accessible register file according to embodiments of the disclosure.

FIG. 35 illustrates a bitwise, row and column accessible register file 3500 according to embodiments of the disclosure, e.g., with each bit indexed from (upper leftmost as depicted) storage 3501 [0][0] to (lower rightmost as depicted) storage 3501[i][J]) for storing data (e.g., as rows [I+1] and column [J+1]).

Bitwise, row and column accessible register file 3500 includes a row decoder 3502 to allow access to an entire row of bits and a column decoder 3504 to allow access to an entire column of bits, for example, access by a bit-parallel ALU.

Bitwise, row and column accessible register file 3500 includes a row element decoder 3506 to allow access to single bit (e.g., or single element from a plurality of elements) in a row of bits and a column element decoder 3508 to allow access to single bit (e.g., or single element from a plurality of elements) in a column of bits, for example, access by a bit-serial ALU. For example, if a bit-serial ALU is to access values at a first granularity (e.g., 7 bits wide), row element decoder 3506 can allow access at the first granularity (e.g., 7 bits wide) in a row of bits and a column element decoder 3508 can allow access at the first granularity (e.g., 7 bits wide) in a column of bits. In one embodiment, to support (e.g., 32 bit elements for a plurality of elements in a single vector) serial operation, the row width of the register file is a multiples of the element width (e.g., 32 bits) and to support configurable operand size (e.g., from 1 to 64 bits, or any other value), the column width is set to the maximum supported operand size. In one embodiment, multiple rows are combined to support wider operand size, and the column width can be set to a limited value considering tradeoffs among area, costs, power, and performance. In certain embodiments, a register file has other bit-parallel operating modes as discussed herein (e.g., all modes of storage PE).

Figure 36:
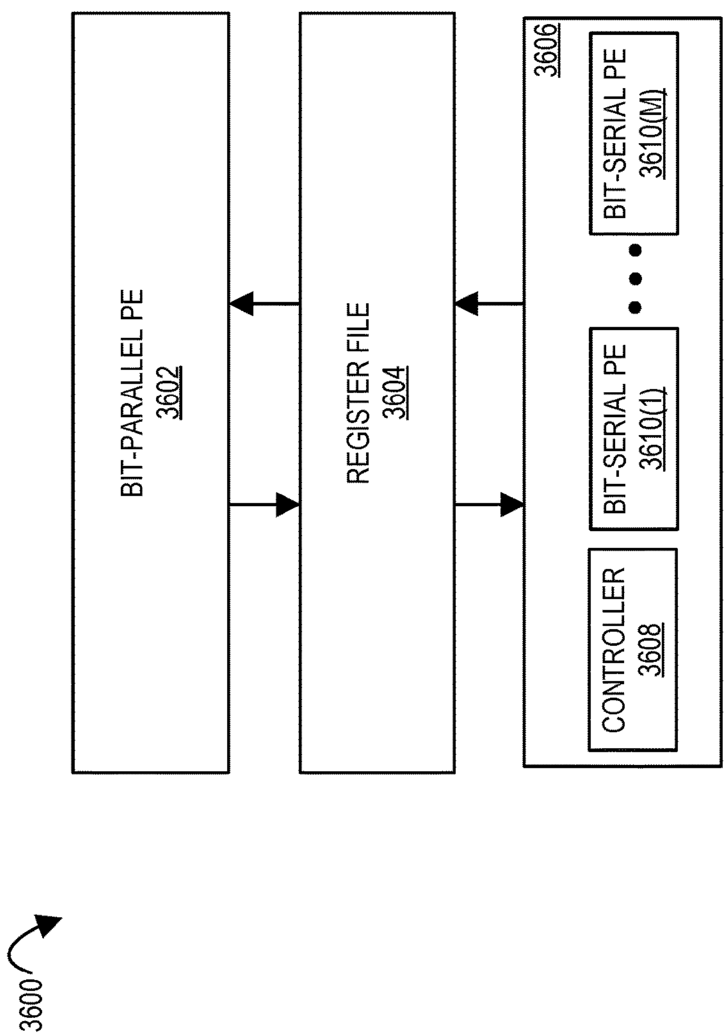
FIG. 36 illustrates a circuit comprising a bitwise, row and column accessible register file coupled to processing elements having configurable operand size operation circuits and a processing element having fixed operand size operation circuits according to embodiments of the disclosure.

FIG. 36 illustrates a circuit (e.g., configurable spatial array) comprising a bitwise, row and column accessible register file 3604 coupled to processing elements 3610(1) to 3610(M), where M can be any integer, having configurable operand size operation circuits and a processing element 3602 (e.g., bit-parallel PE) having fixed operand size operation circuits according to embodiments of the disclosure. In one embodiment, bitwise, row and column accessible register file 3604 is an instance of bitwise, row and column accessible register file 3500 from FIG. 35. In one embodiment, bit-serial circuitry 3606 includes a single controller 3608 (e.g., implementing a single reset counter as discussed herein) shared by plurality of bit-serial processing elements 3610(1) to 3610(M). In certain embodiments, bitwise, row and column accessible register file 3604 allows both bit-serial PEs and bit-parallel PE to operate on the same data (e.g., pass the data back and/or forth). In one embodiment, each bit-serial PE is to operate on respective elements from a plurality of input vectors (e.g., elements having the same index value).

Figure 37:
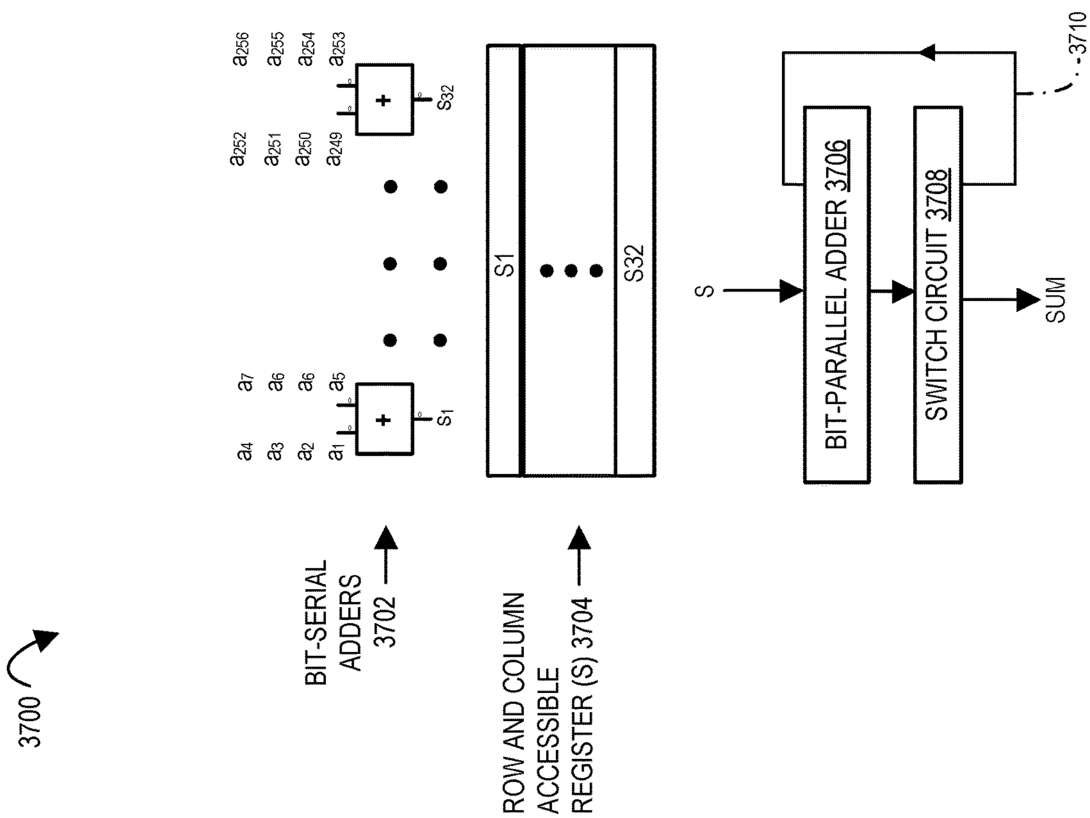
FIG. 37 illustrates a value summation operation with a circuit comprising a bitwise accessible register file coupled to processing elements having configurable operand size operation circuits and a processing element having fixed operand size operation circuits according to embodiments of the disclosure.

FIG. 37 illustrates a value summation operation with a circuit 3700 comprising a bitwise accessible register file 3704 coupled to (e.g., bit-serial) processing elements 3702 having configurable operand size operation circuits and a (e.g., bit-parallel) processing element 3706 having fixed operand size operation circuits according to embodiments of the disclosure. In one embodiment, the value summation operation adds 256 numbers (e.g., values) together by a collaboration of bit-serial PEs 3702 and bit-parallel PE 3706. The bit-serial and bit-parallel PEs can collaborate to finish some computations through the row and column accessible registers. For example, bit-parallel adder 3706 may add a plurality of vector elements in parallel, e.g., 32 elements. As one example, bit-serial adders 3702 may be used to add respective values together (e.g., a1 to a7 to form a result that is stored in element s1 of vector S1 in register 3704) to form a single vector that is then stored into a (e.g., row) of register 3704. That may be repeated for different input values to form a plurality of vectors (e.g., S1 to S32). Then bit parallel adder 3706 may be used to add vector S1 to S2 to produce an intermediate resultant stored into switch circuit 3708 (e.g., latch), and that intermediate resultant added to S3 (e.g., with carryout provided on line 3710), and so forth until the final resultant is completed.

Bit matrix multiplications may also be performed using a row and column accessible register file. One example of using a bitwise, row and column accessible register file is to implement a bit matrix multiplication, e.g., used in bioinformatics, software defined radio, imaging, data mining, and/or cryptography. In certain embodiments, the row and column accessible register provides the opportunity to read/write both the row and column of a matrix concurrently. In one embodiment, the multiplication is implemented by an AND logic operation of two bits, while the summation of the results of multiplications is an exclusive OR (XOR) logic operation, for example, outputting a true (e.g., one) when the number of true inputs (e.g., one) is odd, e.g., where input one being true and input two being true causes an output of zero. An example of circuitry implementing this is in FIG. 38.

Figure 38:
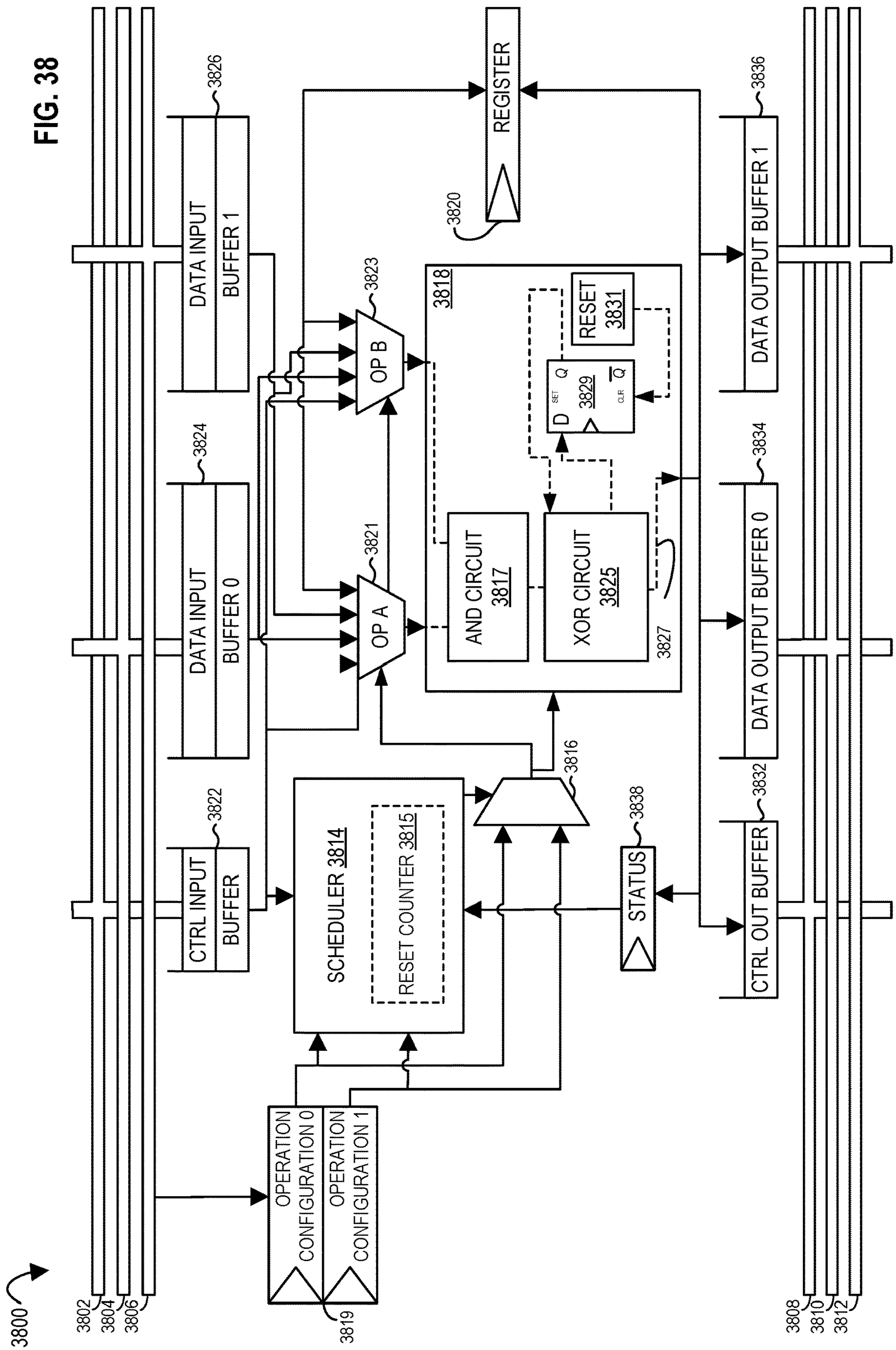
FIG. 38 illustrates a processing element having a configurable operand size operation circuit according to embodiments of the disclosure.

FIG. 38 illustrates a processing element 3800 having a configurable operand size operation circuit 3818 according to embodiments of the disclosure. FIG. 38 shows the diagram of circuit implementing bitwise multiplication and summation. This is the bitwise equivalent of a fused multiply add. In one embodiment, the input "a" is from a row of the multiplier matrix and the input "b" is from one column of the multiplicand matrix. For a bit matrix multiplication of n×n, there are $n^2$ such operations. Similar to the discussion of serial bit adder and multiplier, a vector (e.g., bit-parallel) ALU can support parallel (e.g., 32-bit) stream multiplication concurrently.

In one embodiment, operation configuration register 3819 is loaded during configuration (e.g., mapping) and specifies the particular operation (or operations) this processing (e.g., compute) element is to perform and the bit width of the operand size (e.g., for that particular operation). Register 3820 activity may be controlled by that operation (an output of multiplexer 3816, e.g., controlled by the scheduler 3814). Scheduler 3814 may schedule an operation or operations of processing element 3800, for example, when input data and control input arrives. Control input buffer 3822 is connected to local network 3802 (e.g., and local network 3802 may include a data path network as in FIG. 7A and a flow control path network as in FIG. 7B) and is loaded with a value when it arrives (e.g., the network has a data bit(s) and valid bit(s)). Control output buffer 3832, data output buffer 3834, and/or data output buffer 3836 may receive an output of processing element 3800, e.g., as controlled by the operation (an output of multiplexer 3816). Status register 3838 may be loaded whenever the configurable operand size operation circuit (e.g., bit-serial ALU) 3818 executes (also controlled by output of multiplexer 3816). Data in control input buffer 3822 and control output buffer 3832 may be a single bit. Multiplexer 3821 (e.g., operand A) and multiplexer 3823 (e.g., operand B) may source inputs.

In one embodiment, the configuration value field that indicates the bit width of the operand size (e.g., for that particular operation) operation configuration register 3819 causes a particular value to be loaded into reset counter 3815, for example, a seven for seven bit wide input operands. The reset counter 3815 may decrement with each cycle of operation that completes on a set of corresponding bits from each input operand (e.g., operand A and operand B) and then cause a reset of the configurable operand size operation circuit 3818 when the set of bit-serial operations is completed on the entire width of the input operands.

For example, configurable operand size operation circuit 3818 may be a bit-serial bit matrix multiplier which includes an AND logic gate circuit 3817 (e.g., that outputs a true (e.g., one) only when all of the inputs are true (e.g., one)), and an exclusive OR (XOR) logic gate circuit 3825, for example, outputting a true (e.g., one) when the number of true inputs (e.g., one) is odd, e.g., where input one being true and input two being true causes an output of zero. In one embodiment, multiplication is implemented by AND logic gate circuit 3817 of two bits, while the summation of the results of multiplications is the exclusive OR (XOR) logic gate circuit 3825, for example, outputting a true (e.g., one) when the number of true inputs (e.g., one) is odd, e.g., where input one being true and input two being true causes an output of zero. Latch 3829 (e.g., D flip-flop with reset) may be included to serve as a memory unit. In one embodiment, two bit-serial input streams (e.g., one from multiplexer 3821 and one from multiplexer 3823) are fed into respective inputs of the AND logic gate circuit 3817, and that output is fed into one input of XOR logic gate circuit 3825, and the serial output (e.g., a binary zero or one) is stored into the output (e.g., one of data output buffers 3834 or 3836) and any carry-out (e.g., if two or three ones are added, there is a carry out of zero) is stored in latch 3829 (e.g., input into the D input and output from the Q output in the next cycle into the second input of XOR logic gate circuit 3825), with this repeated until the entire width of the input operands are processed. On completion of the bit-serial operation, the latch 3829 is reset to zero, e.g., when a new operation is started and a final summation value is output to an output buffer (e.g. one of 3832, 3834, or 3836). In one embodiment, reset counter 3815 causes a value to be asserted to reset input 3831 of configurable operand size operation circuit 3818 to reset the circuit for a next operation, e.g., by causing a clear of any value (e.g., a one) stored in latch 3829. The reset input of the latch 3829 can be used as a start input for the addition of two, new serial binary numbers. In certain embodiments, an output controller (e.g., output controller 2200 in FIG. 22) of the PE is not to assert a "Not Empty" value (e.g., is not to assert a "Valid" indication for the output buffer) for an output buffer until the bit-serial operation that is storing data in that output buffer is complete, e.g., as indicated by the reset counter 3815.

Configurable operand size operation circuit 3818 can be used on any bit width (e.g., length) of two binary numbers. In one embodiment, the bit length is reconfigured by using reset counter 3815, e.g., a binary counter that counts down or up from a predetermined value. In one embodiment, a preloaded six-bit binary counter can set the operand size (e.g., bit width) from 1 to 64. In one embodiment, the output of the reset counter 3815 is connected to the reset of the bit-serial adder to set the bit width. In certain embodiments, larger bit widths than 64 can be handled simply by increasing the width of the counter 3815.

Configurable operand size operation circuit 3818 can be used for compute intensive applications where large numbers of bit matrix multiplication are required concurrently, for example, by a plurality of configurable operand size operation circuits, with each element of respective input vectors being operated on by a respective instance of a configurable operand size operation circuit of the plurality of configurable operand size operation circuits. In certain of these embodiments, a single reset counter is shared by the plurality of configurable operand size operation circuits. In certain of these embodiments, a single PE includes a single reset counter controlling a plurality of configurable operand size operation circuits within that single PE.

Input from buffer 3822 may be used as a control. For example, suppose the operation of this processing (e.g., compute) element is (or includes) what is called a pick in FIG. 3B. The processing element 3800 then is to select data from either data input buffer 3824 or data input buffer 3826, e.g., to go to data output buffer 3834 (e.g., default) or data output buffer 3836. The control bit in 3822 may thus indicate a 0 if selecting from data input buffer 3824 or a 1 if selecting from data input buffer 3826. As another example, suppose the operation of this processing (e.g., compute) element is (or includes) what is called a switch in FIG. 3B. The processing element 3800 is to output data to data output buffer 3834 or data output buffer 3836, e.g., from data input buffer 3824 (e.g., default) or data input buffer 3826. The control bit in 3822 may thus indicate a 0 if outputting to data output buffer 3834 or a 1 if outputting to data output buffer 3836.

Multiple networks (e.g., interconnects) may be connected to a processing element, e.g., (input) networks 3802, 3804, 3806 and (output) networks 3808, 3810, 3812. The connections may be switches, e.g., as discussed in reference to FIGS. 7A and 7B. In one embodiment, each network includes two sub-networks (or two channels on the network), e.g., one for the data path network in FIG. 7A and one for the flow control (e.g., backpressure) path network in FIG. 7B. As one example, local network 3802 (e.g., set up as a control interconnect) is depicted as being switched (e.g., connected) to control input buffer 3822. In this embodiment, a data path (e.g., network as in FIG. 7A) may carry the control input value (e.g., bit or bits) (e.g., a control token) and the flow control path (e.g., network) may carry the backpressure signal (e.g., backpressure or no-backpressure token) from control input buffer 3822, e.g., to indicate to the upstream producer (e.g., PE) that a new control input value is not to be loaded into (e.g., sent to) control input buffer 3822 until the backpressure signal indicates there is room in the control input buffer 3822 for the new control input value (e.g., from a control output buffer of the upstream producer). In one embodiment, the new control input value may not enter control input buffer 3822 until both (i) the upstream producer receives the "space available" backpressure signal from "control input" buffer 3822 and (ii) the new control input value is sent from the upstream producer, e.g., and this may stall the processing element 3800 until that happens (and space in the target, output buffer(s) is available).

Data input buffer 3824 and data input buffer 3826 may perform similarly, e.g., local network 3804 (e.g., set up as a data (as opposed to control) interconnect) is depicted as being switched (e.g., connected) to data input buffer 3824. In this embodiment, a data path (e.g., network as in FIG. 7A) may carry the data input value (e.g., bit or bits) (e.g., a dataflow token) and the flow control path (e.g., network) may carry the backpressure signal (e.g., backpressure or no-backpressure token) from data input buffer 3824, e.g., to indicate to the upstream producer (e.g., PE) that a new data input value is not to be loaded into (e.g., sent to) data input buffer 3824 until the backpressure signal indicates there is room in the data input buffer 3824 for the new data input value (e.g., from a data output buffer of the upstream producer). In one embodiment, the new data input value may not enter data input buffer 3824 until both (i) the upstream producer receives the "space available" backpressure signal from "data input" buffer 3824 and (ii) the new data input value is sent from the upstream producer, e.g., and this may stall the processing element 3800 until that happens (and space in the target, output buffer(s) is available). A control output value and/or data output value may be stalled in their respective output buffers (e.g., 3832, 3834, 3836) until a backpressure signal indicates there is available space in the input buffer for the downstream processing element(s).

A processing element 3800 may be stalled from execution until its operands (e.g., a control input value and its corresponding data input value or values) are received and/or until there is room in the output buffer(s) of the processing element 3800 for the data that is to be produced by the execution of the operation on those operands.

In certain embodiments, support for logical operations (e.g., OR, NOR, XOR, AND, NAND, etc.) is implemented with the existing controls for addition by providing a different opcode to the bit-serial ALU.

In certain embodiments, support for shift operations is provided. In certain embodiments, bit-serial shift operations differ from bit-serial arithmetic in that some bits must either be added to or removed from the bit serial word based on a shift argument. In certain embodiments herein, this functionality in achieved by incorporating a state machine in an ALU to appropriately modify the bits of the bit serial operation. For example, a logical left shift of size k will introduce k number or zeros at the beginning of the bit serial words (e.g., k wide 0 s will be produced), and the last k bits of the serial words will be removed. Where shifting adds undesired latency, more storage may be provided in the ALU or multiple ALUs may be chained together.

In certain embodiments, support for data flow operations is provided. Bit-serial data flow operations, e.g., the pick and switch discussed herein, differ from bit-parallel flow operations in that the control bit of the bit-parallel operations is to generate a sequence of control bits of the same length of the operand size. In one embodiment, the bit-serial data flow operations are vector operations and the control bit sequence controls all the (e.g., 32 bit) streams.

It may be desired to move data of varied operand sizes. As an extension to a bit-parallel architecture, certain embodiments herein allow for bit-serial data movement between memory and PEs to coexist. In one embodiment, the operand size is user defined (e.g., which can be from several to hundreds of bits). Additionally, a vector processing ALU (e.g., a single instruction, multiple data (SIMD) ALU may need a number of elements from memory for each of its elements (e.g., lanes). Thus, in one embodiment, the total data size for SIMD-32 bit-serial operation for an operand size of 1024 bits is: 1024-bits×32=about 4 kBytes, which may represents a high cache bandwidth pressure or a longer latency to start the bit-serial operation. To mitigate the impact of this data reading/writing, and recognizing that the data is not all used concurrently as in the bit-parallel operation, certain embodiments herein do not bring all the data in to start the bit-serial operation. Instead, data can be brought into the register file sequentially. For example, data can be moved at the granularity at the byte (eight bits) level, e.g., for an operand size of 7 bits, one load of 8 bits is used, and leaving one bit of the memory unused. For larger operand size, e.g. 31-bit data, four loads of 8 bits are used. Thus, a RAF circuit may combine multiple segments (e.g., 8 bits, etc.) of data from the memory and bring that combined data to PE(s).

Figure 39:
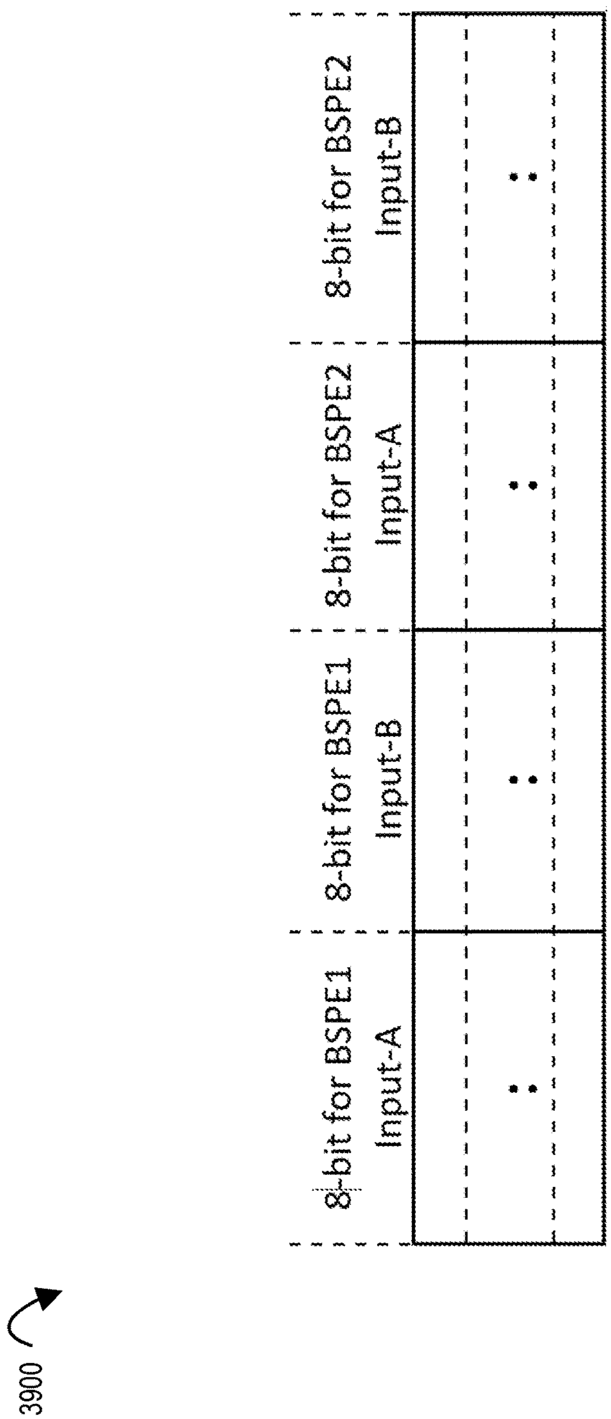
FIG. 39 illustrates a register file for use by a RAF circuit for processing elements having configurable operand size operation circuits according to embodiments of the disclosure.

FIG. 39 illustrates a register file 3900 for use by a RAF circuit for processing elements having configurable operand size operation circuits according to embodiments of the disclosure. For example, a first input (e.g., a first input buffer of) a first bit-serial PE may be coupled to first segment of register file 3900, a second input (e.g., a second input buffer of) the first bit-serial PE may be coupled to a second segment of register file, a first input (e.g., a first input buffer of) a second bit-serial PE may be coupled to third segment of register file 3900, and a second input (e.g., a second input buffer of) the second bit-serial PE may be coupled to a fourth segment of register file 3900. Eight bits is an example segment width and it should be understood that any plurality of bits is possible. In one embodiment, each row of register file 3900 is a single row of a vector register.

Figure 40:
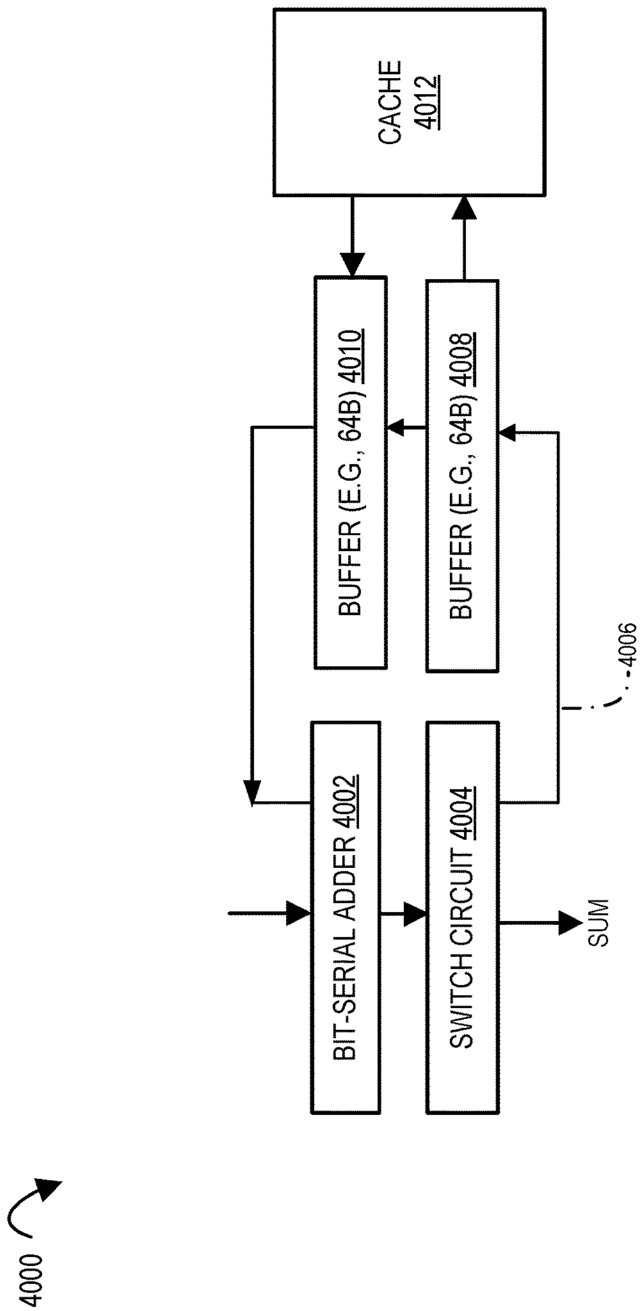
FIG. 40 illustrates a reduction operation with a circuit comprising a processing element having a configurable operand size operation circuit according to embodiments of the disclosure.

In certain embodiments, support for reduction operations is provided. FIG. 40 shows an example design of bit-serial addition reduction operation.

FIG. 40 illustrates a reduction operation with a circuit 4000 comprising a processing element having a configurable operand size operation circuit (e.g., bit-serial adder circuit 4002) according to embodiments of the disclosure. In one embodiment, bit-serial adder circuit 4002 is according to the disclosure herein. As one example, bit-serial adder circuit 4002 receives a first bit on a first input and a second value on a second input (e.g., from buffer 4010). Output of switch circuit 4004 (e.g., latch).

In certain embodiments, the reduction operation has a feedback loop 4006 to continuously process the data. For example, the temporary result may need to be stored to a temporary buffer, whose capacity may be too large to fit into a register file, e.g., when the operand size is 1024-bit in length, the temporary buffer is 1024×32=4 kByte in certain embodiments. One option is to temporarily store the data into a cache 4012 (e.g., or scratchpad). Because the temporary results obtained are needed in serial temporarily moving the data to cache/scratchpad may not impact the performance if scheduled properly. In FIG. 40, the temporary buffer consists of two (e.g., 32 elements that are each 8 bits wide, so 64 bytes in total) buffers 4008 and 4010. In one embodiment, the upper (e.g., 32 byte) buffer 4010 holds the (e.g., 8) least significant bits of the data and receives other bits stored in the cache 4012, and/or the lower (e.g., 32 byte) buffer 4008 receives the temporary data from the switch circuit 4004 (e.g., latch) and sends the data to cache 4012. In one embodiment, the least significant bits (e.g., eight) are sent to the upper buffer directly and not sent to the cache 4012.

In certain embodiments, support for data alignment for operand size X is provided. To accommodate varied-size operands and conventional fix-sized bit-parallel operators, the register files and buffers are shared by both bit-serial and bit-parallel operators in certain embodiments. In one embodiment, the store of the operand size of X bits of data is aligned at the least significant bit (LSB). Another option is to align the data from the most significant bit (MSB). However, using the LSB to align the data may make the reading of the register files from the column easier, because the column address will start from the boundary of (e.g., 8) the bits and does not need a computation to find out where to start from.

Table 2 below illustrates how two different size operands can share a single register.

TABLE 2

| Data Alignment format | | |
|---|---|---|
| First Half (e.g., 8 bits) | | Second Half (e.g., 8 bits) |
| U | X | Y[1:8], Y[9:16], Y[17:24] |

In one embodiment, all the data is LSB aligned and, to efficiently use the register capacity, reduce the latency, and decrease the cache bandwidth pressure, only a proper subset of (e.g., eight bits) are brought to the register at a time. For example, for the data X, which is less not an increment of eight (e.g., is than 8-bits in width), it is brought into the register from memory once and right aligned and stored in the register. While the data Y, whose length is greater than X (e.g., 25-bits) is brought into the register byte by byte in certain embodiments. For example, the first segment of (e.g., eight) bits, Y (e.g., [1:8]) may be brought to the register and LSB aligned. After the first segment of (e.g., 8) bits have been consumed, then the next (e.g., 8) segment of bits Y (e.g., [9:16]) maybe moved into the register followed by the remaining segment of bits Y (e.g., [17:24]).

In certain embodiments, support for bit-serial implementation of matrix multiplication is provided. To illustrate how a bit-serial ALU can be used to implement compute intensive applications, an example of matrix multiplication, $C_{8\times8}=A_{8\times8}\times B_{8\times8}$ is shown in reference to FIG. 41. Only the upper 4 rows of the matrix $C_{8\times8}$ is shown, however the lower 4 rows of $C_{8\times8}$ can be implemented in the same way or use the same graph after the upper 4 rows have been finished. Eight elements (e.g., 8×8) are an example and any plurality may be selected.

Figure 41:
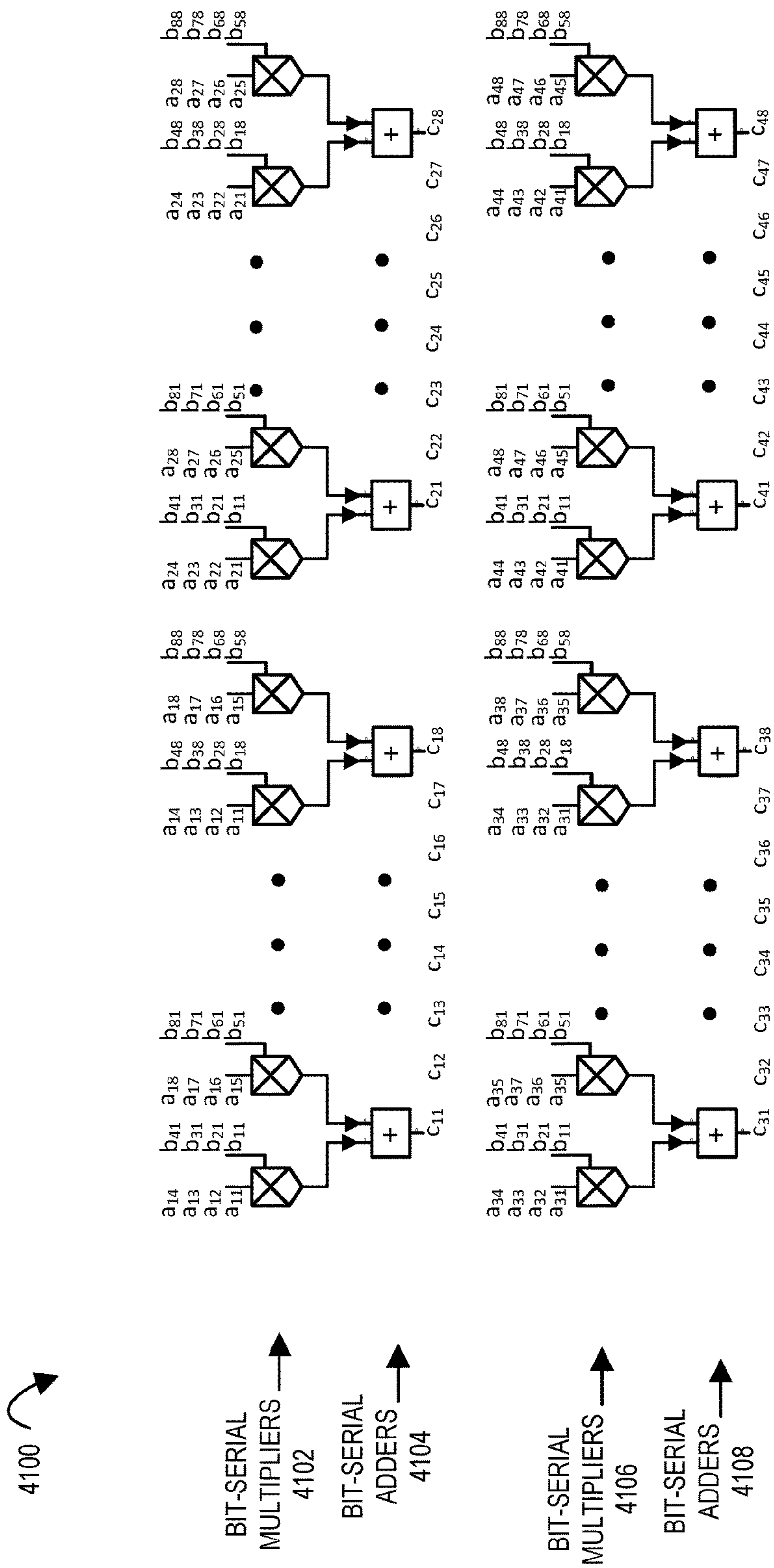
FIG. 41 illustrates a matrix multiplication operation with a circuit comprising a plurality of processing elements having configurable operand size operation circuits according to embodiments of the disclosure.

FIG. 41 illustrates a matrix multiplication operation with a circuit 4100 comprising a plurality of processing elements having configurable operand size operation circuits (e.g., bit-serial multipliers 4102 and 4105 and bit-serial adders 4104 and 4108) according to embodiments of the disclosure. In this implementation, one set of multipliers 4102, 4106 and one set of accumulated adders 4104, 4108 are used to implement the computation of upper four rows of 4×8=32 elements of the matrix $C_{8\times8}$. The computation of each element is done sequentially, e.g., c11=a11×b11+a15×b51+a12×b21+a16×b61+a13×b31+a17×b71+a14×b41+a18×b81, but different elements of matrix $C_{8\times8}$ are computed concurrently in certain embodiments.

Figure 42:
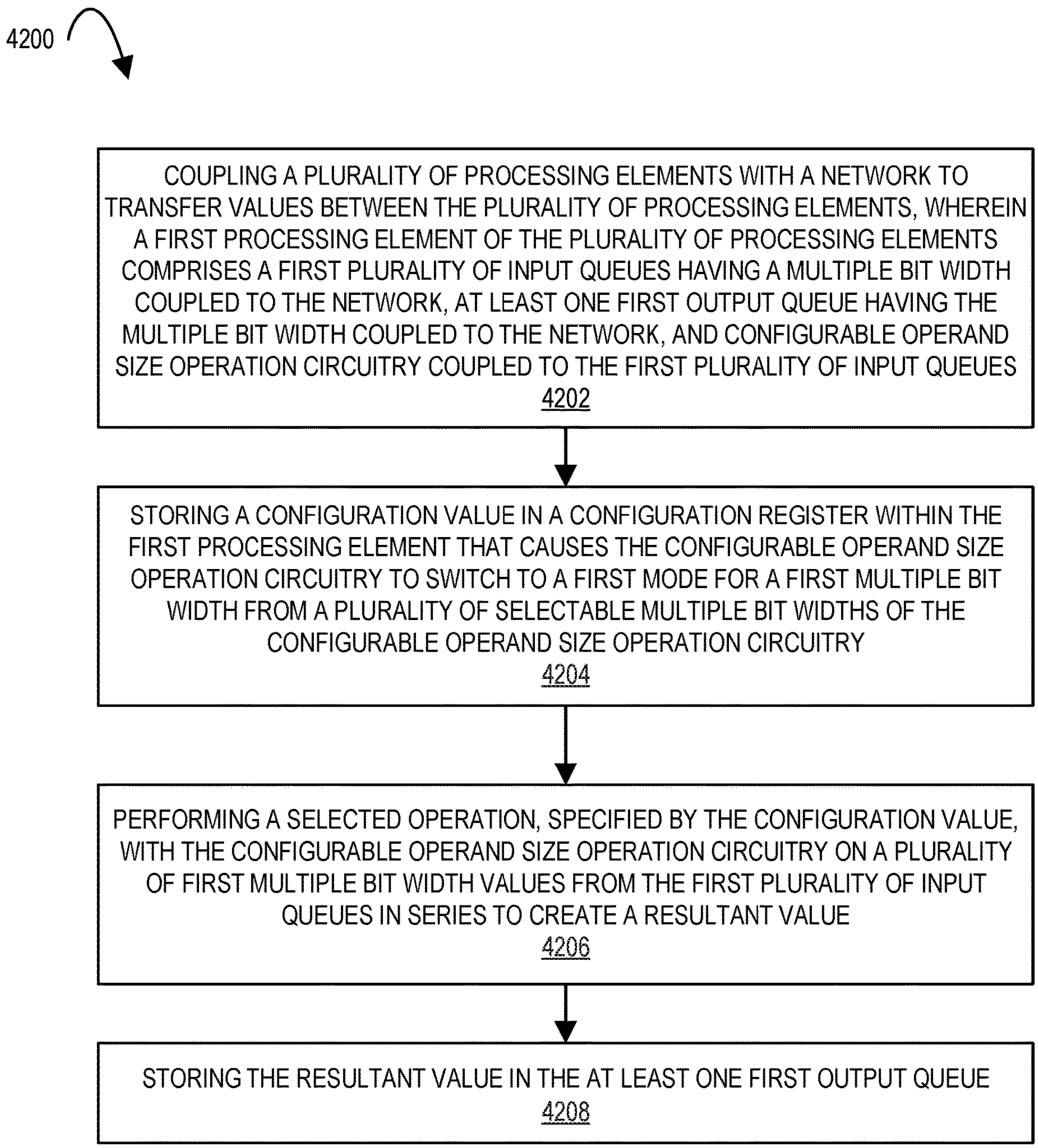
FIG. 42 illustrates a flow diagram according to embodiments of the disclosure.

FIG. 42 illustrates a flow diagram 4200 according to embodiments of the disclosure. Flow diagram 4200 includes coupling a plurality of processing elements with a network to transfer values between the plurality of processing elements, wherein a first processing element of the plurality of processing elements comprises a first plurality of input queues having a multiple bit width coupled to the network, at least one first output queue having the multiple bit width coupled to the network, and configurable operand size operation circuitry coupled to the first plurality of input queues 4202, storing a configuration value in a configuration register within the first processing element that causes the configurable operand size operation circuitry to switch to a first mode for a first multiple bit width from a plurality of selectable multiple bit widths of the configurable operand size operation circuitry 4204, performing a selected operation, specified by the configuration value, with the configurable operand size operation circuitry on a plurality of first multiple bit width values from the first plurality of input queues in series to create a resultant value 4206, and storing the resultant value in the at least one first output queue 4208.

In certain embodiments, an apparatus (e.g., hardware accelerator) comprises a plurality of processing elements; a network between the plurality of processing elements to transfer values between the plurality of processing elements; and a first (e.g., single) processing element of the plurality of processing elements comprising: a first plurality of input queues having a multiple bit width coupled to the network, at least one first output queue having the multiple bit width coupled to the network, configurable operand size operation circuitry coupled to the first plurality of input queues, and a configuration register within the first processing element to store a configuration value that causes the configurable operand size operation circuitry to switch to a first mode for a first multiple bit width from a plurality of selectable multiple bit widths of the configurable operand size operation circuitry, perform a selected operation on a plurality of first multiple bit width values from the first plurality of input queues in series to create a resultant value, and store the resultant value in the at least one first output queue. In one embodiment, the configurable operand size operation circuitry comprises a bit-serial adder circuit controlled by a counter that is set by the configuration value from the configuration register. In one embodiment, the configurable operand size operation circuitry comprises a bit-serial multiplier circuit controlled by a counter that is set by the configuration value from the configuration register. In one embodiment, the at least one first output queue is coupled via the network to a second processing element of the plurality of processing elements comprising: a third plurality of input queues having the multiple bit width coupled to the network, at least one fourth output queue having the multiple bit width coupled to the network, fixed operand size operation circuitry coupled to the first plurality of input queues, and a configuration register within the second processing element to store a second configuration value that causes the fixed operand size operation circuitry to perform a selected operation on the resultant value from the first processing element to create a second resultant value, and store the resultant value in the at least one fourth output queue. In one embodiment, the first processing element comprises an input controller and an output controller, and, when the first plurality of input queues stores the plurality of first multiple bit width values, the input controller is to send a not empty value to the configurable operand size operation circuitry of the first processing element and when the at least one first output queue is not full, the output controller is to send a not full value to the configurable operand size operation circuitry of the first processing element, and the configurable operand size operation circuitry of the first processing element of the first processing element is to begin the selected operation on the plurality of first multiple bit width values stored in the first plurality of input queues after both the not empty value and the not full value are received. In one embodiment, the first processing element comprises an output controller, and, when the at least one first output queue is not full, the output controller is to send a not full value to the configurable operand size operation circuitry of the first processing element to cause the first processing element to begin the selected operation on the plurality of first multiple bit width values. In one embodiment, the first processing element comprises an input controller, and, when the first plurality of input queues stores the plurality of first multiple bit width values, the input controller is to send a not empty value to the configurable operand size operation circuitry of the first processing element to begin the selected operation on the plurality of first multiple bit width values. In one embodiment, a bitwise, row and column accessible register file is coupled to the first processing element to store the resultant value from the at least one first output queue of the first processing element.

In another embodiment, a method includes coupling a plurality of processing elements with a network to transfer values between the plurality of processing elements, wherein a first processing element of the plurality of processing elements comprises a first plurality of input queues having a multiple bit width coupled to the network, at least one first output queue having the multiple bit width coupled to the network, and configurable operand size operation circuitry coupled to the first plurality of input queues; storing a configuration value in a configuration register within the first processing element that causes the configurable operand size operation circuitry to switch to a first mode for a first multiple bit width from a plurality of selectable multiple bit widths of the configurable operand size operation circuitry; performing a selected operation, specified by the configuration value, with the configurable operand size operation circuitry on a plurality of first multiple bit width values from the first plurality of input queues in series to create a resultant value; and storing the resultant value in the at least one first output queue. In one embodiment, the performing the selected operation comprises controlling a bit-serial adder circuit of the configurable operand size operation circuitry by a counter that is set by the configuration value from the configuration register. In one embodiment, the performing the selected operation comprises controlling a bit-serial multiplier circuit of the configurable operand size operation circuitry by a counter that is set by the configuration value from the configuration register. In one embodiment, the method includes coupling the at least one first output queue via the network to a second processing element of the plurality of processing elements comprising a third plurality of input queues having the multiple bit width coupled to the network, at least one fourth output queue having the multiple bit width coupled to the network, and fixed operand size operation circuitry coupled to the first plurality of input queues; storing a second configuration value in a configuration register within the second processing element that causes the fixed operand size operation circuitry to perform a selected operation on the resultant value from the first processing element to create a second resultant value; and storing the resultant value in the at least one fourth output queue. In one embodiment, the first processing element comprises an input controller and an output controller, and, when the first plurality of input queues stores the plurality of first multiple bit width values, the input controller sends a not empty value to the configurable operand size operation circuitry of the first processing element and when the at least one first output queue is not full, the output controller sends a not full value to the configurable operand size operation circuitry of the first processing element, and the configurable operand size operation circuitry of the first processing element of the first processing element begins performing the selected operation on the plurality of first multiple bit width values stored in the first plurality of input queues after both the not empty value and the not full value are received. In one embodiment, the first processing element comprises an output controller, and, when the at least one first output queue is not full, the output controller sends a not full value to the configurable operand size operation circuitry of the first processing element to cause the first processing element to begin performing the selected operation on the plurality of first multiple bit width values. In one embodiment, the first processing element comprises an input controller, and, when the first plurality of input queues stores the plurality of first multiple bit width values, the input controller sends a not empty value to the configurable operand size operation circuitry of the first processing element to begin performing the selected operation on the plurality of first multiple bit width values. In one embodiment, the method includes storing the resultant value from the at least one first output queue of the first processing element into a bitwise, row and column accessible register file via the network.

In yet another embodiment, a hardware processor comprises a core with a decoder to decode an instruction into a decoded instruction and an execution unit to execute the decoded instruction to perform a first operation; a plurality of processing elements; a network between the plurality of processing elements to transfer values between the plurality of processing elements; and a first processing element of the plurality of processing elements comprising: a first plurality of input queues having a multiple bit width coupled to the network, at least one first output queue having the multiple bit width coupled to the network, configurable operand size operation circuitry coupled to the first plurality of input queues, and a configuration register within the first processing element to store a configuration value that causes the configurable operand size operation circuitry to switch to a first mode for a first multiple bit width from a plurality of selectable multiple bit widths of the configurable operand size operation circuitry, perform a second, selected operation on a plurality of first multiple bit width values from the first plurality of input queues in series to create a resultant value, and store the resultant value in the at least one first output queue. In one embodiment, the configurable operand size operation circuitry comprises a bit-serial adder circuit controlled by a counter that is set by the configuration value from the configuration register. In one embodiment, the configurable operand size operation circuitry comprises a bit-serial multiplier circuit controlled by a counter that is set by the configuration value from the configuration register. In one embodiment, the at least one first output queue is coupled via the network to a second processing element of the plurality of processing elements comprising: a third plurality of input queues having the multiple bit width coupled to the network, at least one fourth output queue having the multiple bit width coupled to the network, fixed operand size operation circuitry coupled to the first plurality of input queues, and a configuration register within the second processing element to store a second configuration value that causes the fixed operand size operation circuitry to perform a third, selected operation on the resultant value from the first processing element to create a second resultant value, and store the resultant value in the at least one fourth output queue. In one embodiment, the first processing element comprises an input controller and an output controller, and, when the first plurality of input queues stores the plurality of first multiple bit width values, the input controller is to send a not empty value to the configurable operand size operation circuitry of the first processing element and when the at least one first output queue is not full, the output controller is to send a not full value to the configurable operand size operation circuitry of the first processing element, and the configurable operand size operation circuitry of the first processing element of the first processing element is to begin the second, selected operation on the plurality of first multiple bit width values stored in the first plurality of input queues after both the not empty value and the not full value are received. In one embodiment, the first processing element comprises an output controller, and, when the at least one first output queue is not full, the output controller is to send a not full value to the configurable operand size operation circuitry of the first processing element to cause the first processing element to begin the second, selected operation on the plurality of first multiple bit width values. In one embodiment, the first processing element comprises an input controller, and, when the first plurality of input queues stores the plurality of first multiple bit width values, the input controller is to send a not empty value to the configurable operand size operation circuitry of the first processing element to begin the second, selected operation on the plurality of first multiple bit width values. In one embodiment, a bitwise, row and column accessible register file is coupled to the first processing element to store the resultant value from the at least one first output queue of the first processing element.

2.3 Memory Interface

Figure 43:
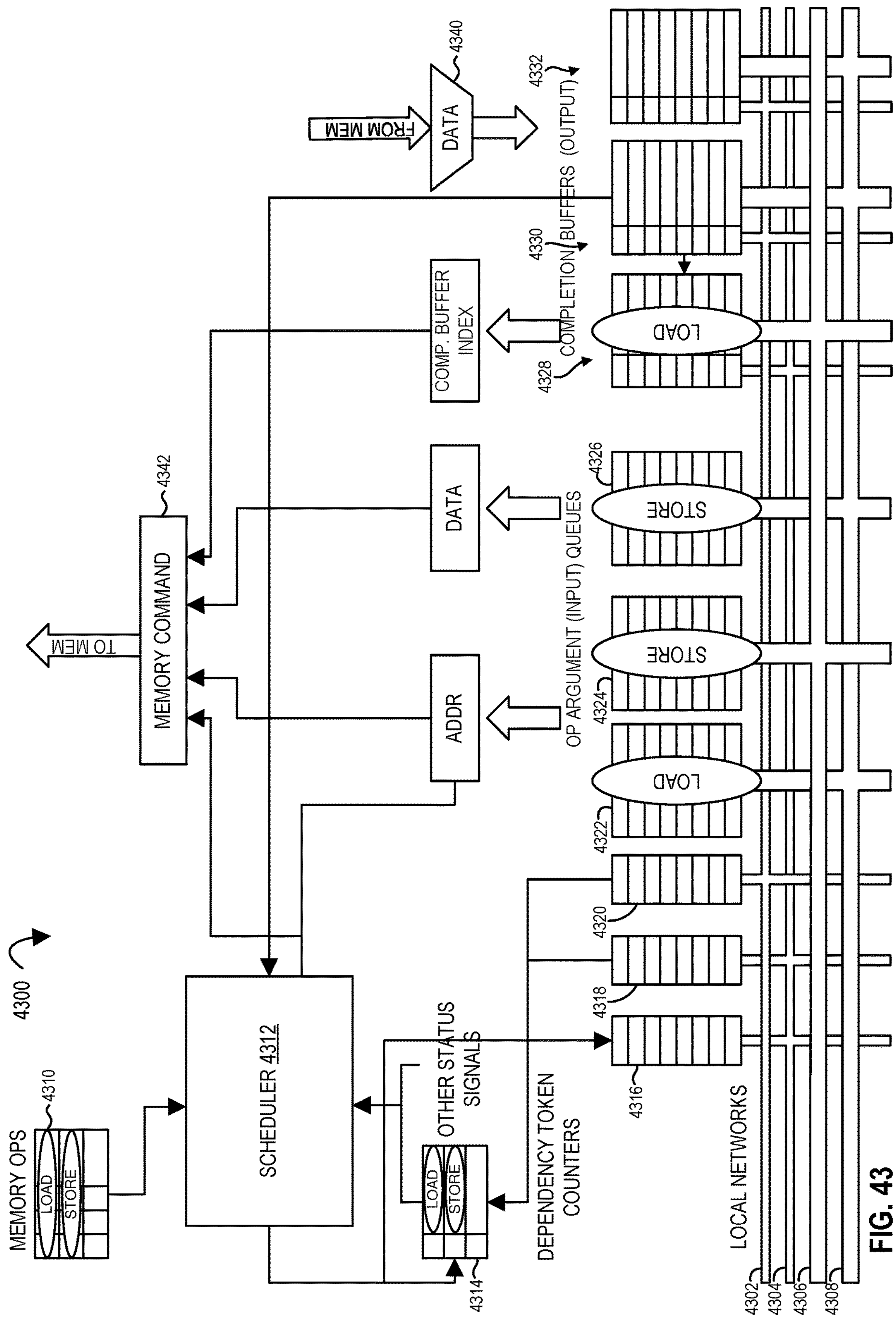
FIG. 43 illustrates a request address file (RAF) circuit according to embodiments of the disclosure.

The request address file (RAF) circuit, a simplified version of which is shown in FIG. 43, may be responsible for executing memory operations and serves as an intermediary between the CSA fabric and the memory hierarchy. As such, the main microarchitectural task of the RAF may be to rationalize the out-of-order memory subsystem with the in-order semantics of CSA fabric. In this capacity, the RAF circuit may be provisioned with completion buffers, e.g., queue-like structures that re-order memory responses and return them to the fabric in the request order. The second major functionality of the RAF circuit may be to provide support in the form of address translation and a page walker. Incoming virtual addresses may be translated to physical addresses using a channel-associative translation lookaside buffer (TLB). To provide ample memory bandwidth, each CSA tile may include multiple RAF circuits. Like the various PEs of the fabric, the RAF circuits may operate in a dataflow-style by checking for the availability of input arguments and output buffering, if required, before selecting a memory operation to execute. Unlike some PEs, however, the RAF circuit is multiplexed among several co-located memory operations. A multiplexed RAF circuit may be used to minimize the area overhead of its various subcomponents, e.g., to share the Accelerator Cache Interconnect (ACI) network (described in more detail in Section 2.4), shared virtual memory (SVM) support hardware, mezzanine network interface, and other hardware management facilities. However, there are some program characteristics that may also motivate this choice. In one embodiment, a (e.g., valid) dataflow graph is to poll memory in a shared virtual memory system. Memory-latency-bound programs, like graph traversals, may utilize many separate memory operations to saturate memory bandwidth due to memory-dependent control flow. Although each RAF may be multiplexed, a CSA may include multiple (e.g., between 8 and 32) RAFs at a tile granularity to ensure adequate cache bandwidth. RAFs may communicate with the rest of the fabric via both the local network and the mezzanine network. Where RAFs are multiplexed, each RAF may be provisioned with several ports into the local network. These ports may serve as a minimum-latency, highly-deterministic path to memory for use by latency-sensitive or high-bandwidth memory operations. In addition, a RAF may be provisioned with a mezzanine network endpoint, e.g., which provides memory access to runtime services and distant user-level memory accessors.

FIG. 43 illustrates a request address file (RAF) circuit 4300 according to embodiments of the disclosure. In one embodiment, at configuration time, the memory load and store operations that were in a dataflow graph are specified in registers 4310. The arcs to those memory operations in the dataflow graphs may then be connected to the input queues 4322, 4324, and 4326. The arcs from those memory operations are thus to leave completion buffers 4328, 4330, or 4332. Dependency tokens (which may be single bits) arrive into queues 4318 and 4320. Dependency tokens are to leave from queue 4316. Dependency token counter 4314 may be a compact representation of a queue and track a number of dependency tokens used for any given input queue. If the dependency token counters 4314 saturate, no additional dependency tokens may be generated for new memory operations. Accordingly, a memory ordering circuit (e.g., a RAF in FIG. 44) may stall scheduling new memory operations until the dependency token counters 4314 becomes unsaturated.

As an example for a load, an address arrives into queue 4322 which the scheduler 4312 matches up with a load in 4310. A completion buffer slot for this load is assigned in the order the address arrived. Assuming this particular load in the graph has no dependencies specified, the address and completion buffer slot are sent off to the memory system by the scheduler (e.g., via memory command 4342). When the result returns to multiplexer 4340 (shown schematically), it is stored into the completion buffer slot it specifies (e.g., as it carried the target slot all along though the memory system). The completion buffer sends results back into local network (e.g., local network 4302, 4304, 4306, or 4308) in the order the addresses arrived.

Stores may be similar except both address and data have to arrive before any operation is sent off to the memory system.

2.4 Cache

Figure 44:
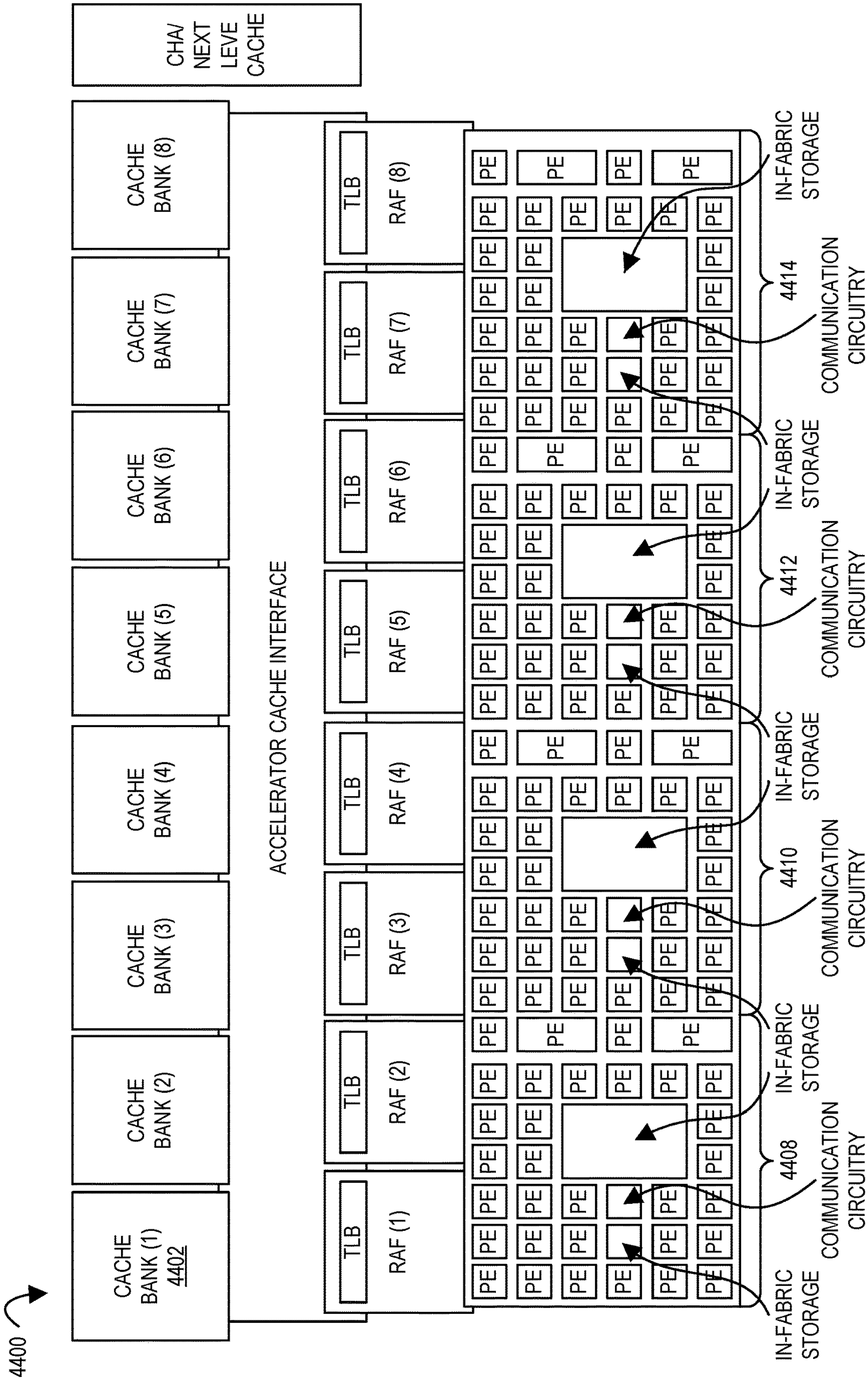
FIG. 44 illustrates a plurality of request address file (RAF) circuits coupled between a plurality of accelerator tiles and a plurality of cache banks according to embodiments of the disclosure.

Dataflow graphs may be capable of generating a profusion of (e.g., word granularity) requests in parallel. Thus, certain embodiments of the CSA provide a cache subsystem with sufficient bandwidth to service the CSA. A heavily banked cache microarchitecture, e.g., as shown in FIG. 44 may be utilized. FIG. 44 illustrates a circuit 4400 with a plurality of request address file (RAF) circuits (e.g., RAF circuit (1)) coupled between a plurality of accelerator tiles (4408, 4410, 4412, 4414) and a plurality of cache banks (e.g., cache bank 4402) according to embodiments of the disclosure. In one embodiment, the number of RAFs and cache banks may be in a ratio of either 1:1 or 1:2. Cache banks may contain full cache lines (e.g., as opposed to sharding by word), with each line having exactly one home in the cache. Cache lines may be mapped to cache banks via a pseudo-random function. The CSA may adopt the shared virtual memory (SVM) model to integrate with other tiled architectures. Certain embodiments include an Accelerator Cache Interconnect (ACI) network connecting the RAFs to the cache banks. This network may carry addresses and data between the RAFs and the cache. The topology of the ACI may be a cascaded crossbar, e.g., as a compromise between latency and implementation complexity.

In certain embodiments, accelerator-cache network is further coupled to cache home agent and/or next level cache. In certain embodiments, accelerator-cache network (e.g., interconnect) is separate from any (for example, circuit switched or packet switched) network of an accelerator (e.g., accelerator tile), e.g., RAF is the interface between the processing elements and the cache home agent and/or next level cache. In one embodiment, a cache home agent is to connect to a memory (e.g., separate from the cache banks) to access data from that memory (e.g., memory 202 in FIG. 2), e.g., to move data between the cache banks and the (e.g., system) memory. In one embodiment, a next level cache is a (e.g., single) higher level cache, for example, such that the next level cache (e.g., higher level cache) is checked for data that was not found (e.g., a miss) in a lower level cache (e.g., cache banks). In one embodiment, this data is payload data. In another embodiment, this data is a physical address to virtual address mapping. In one embodiment, a CHA is to perform a search of (e.g., system) memory for a miss (e.g., a miss in the higher level cache) and not perform a search for a hit (e.g., the data being requested is in the cache being searched).

2.5 Network Resources, e.g., Circuitry, to Perform (e.g., Dataflow) Operations

In certain embodiments, processing elements (PEs) communicate using dedicated virtual circuits which are formed by statically configuring a (e.g., circuit switched) communications network. These virtual circuits may be flow controlled and fully back-pressured, e.g., such that a PE will stall if either the source has no data or its destination is full. At runtime, data may flow through the PEs implementing the mapped dataflow graph (e.g., mapped algorithm). For example, data may be streamed in from memory, through the (e.g., fabric area of a) spatial array of processing elements, and then back out to memory.

Such an architecture may achieve remarkable performance efficiency relative to traditional multicore processors: compute, e.g., in the form of PEs, may be simpler and more numerous than cores and communications may be direct, e.g., as opposed to an extension of the memory system. However, the (e.g., fabric area of) spatial array of processing elements may be tuned for the implementation of compiler-generated expression trees, which may feature little multiplexing or demultiplexing. Certain embodiments herein extend (for example, via network resources, such as, but not limited to, network dataflow endpoint circuits) the architecture to support (e.g., high-radix) multiplexing and/or demultiplexing, for example, especially in the context of function calls.

Spatial arrays, such as the spatial array of processing elements 101 in FIG. 1, may use (e.g., packet switched) networks for communications. Certain embodiments herein provide circuitry to overlay high-radix dataflow operations on these networks for communications. For example, certain embodiments herein utilize the existing network for communications (e.g., interconnect network 104 described in reference to FIG. 1) to provide data routing capabilities between processing elements and other components of the spatial array, but also augment the network (e.g., network endpoints) to support the performance and/or control of some (e.g., less than all) of dataflow operations (e.g., without utilizing the processing elements to perform those dataflow operations). In one embodiment, (e.g., high radix) dataflow operations are supported with special hardware structures (e.g. network dataflow endpoint circuits) within a spatial array, for example, without consuming processing resources or degrading performance (e.g., of the processing elements).

In one embodiment, a circuit switched network between two points (e.g., between a producer and consumer of data) includes a dedicated communication line between those two points, for example, with (e.g., physical) switches between the two points set to create a (e.g., exclusive) physical circuit between the two points. In one embodiment, a circuit switched network between two points is set up at the beginning of use of the connection between the two points and maintained throughout the use of the connection. In another embodiment, a packet switched network includes a shared communication line (e.g., channel) between two (e.g., or more) points, for example, where packets from different connections share that communication line (for example, routed according to data of each packet, e.g., in the header of a packet including a header and a payload). An example of a packet switched network is discussed below, e.g., in reference to a mezzanine network.

Figure 45:
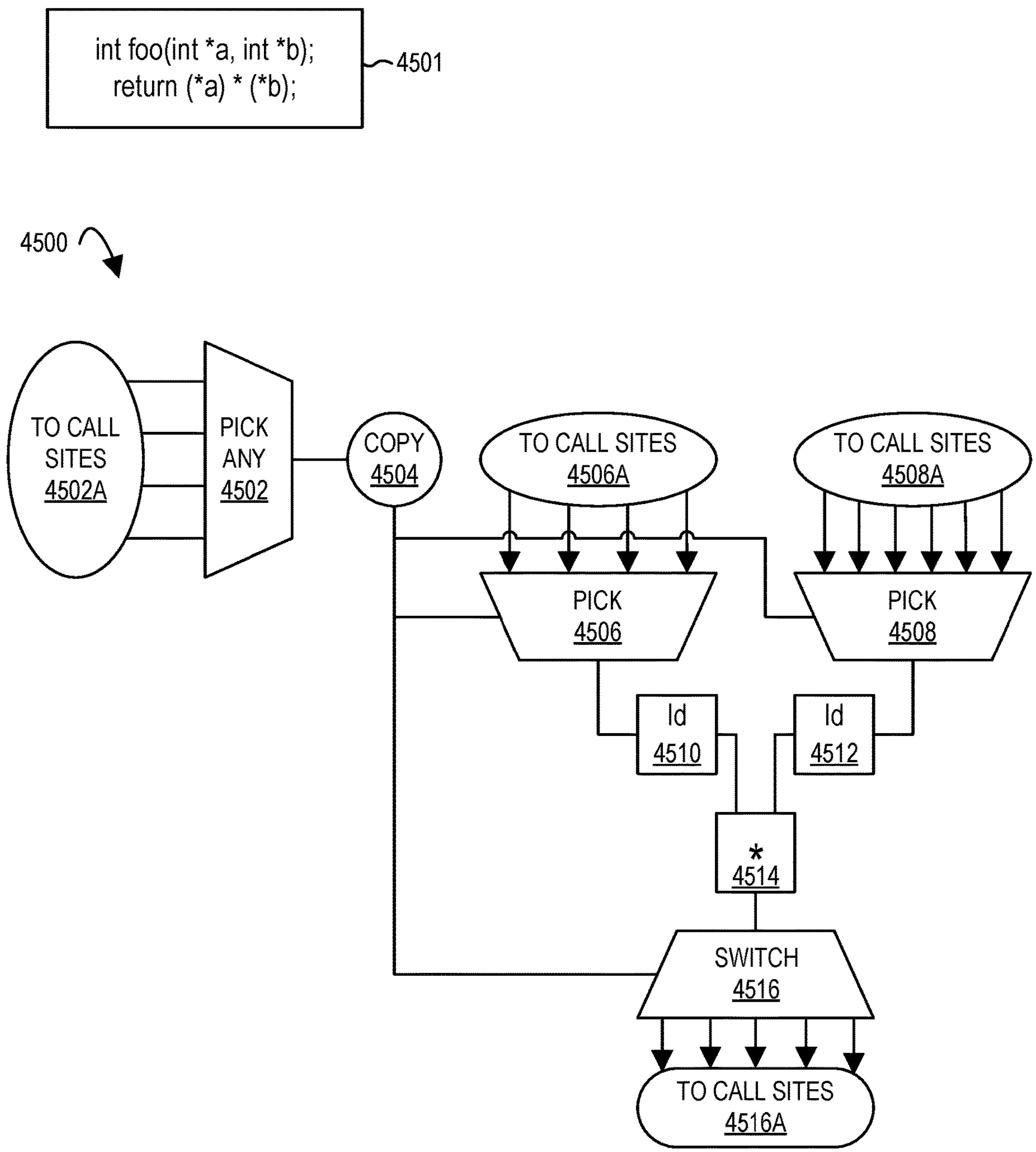
FIG. 45 illustrates a data flow graph of a pseudocode function call according to embodiments of the disclosure.

FIG. 45 illustrates a data flow graph 4500 of a pseudocode function call 4501 according to embodiments of the disclosure. Function call 4501 is to load two input data operands (e.g., indicated by pointers *a and *b, respectively), and multiply them together, and return the resultant data. This or other functions may be performed multiple times (e.g., in a dataflow graph). The dataflow graph in FIG. 45 illustrates a PickAny dataflow operator 4502 to perform the operation of selecting a control data (e.g., an index) (for example, from call sites 4502A) and copying with copy dataflow operator 4504 that control data (e.g., index) to each of the first Pick dataflow operator 4506, second Pick dataflow operator 4506, and Switch dataflow operator 4516. In one embodiment, an index (e.g., from the PickAny thus inputs and outputs data to the same index position, e.g., of [0, 1 . . . M], where M is an integer. First Pick dataflow operator 4506 may then pull one input data element of a plurality of input data elements 4506A according to the control data, and use the one input data element as (*a) to then load the input data value stored at *a with load dataflow operator 4510. Second Pick dataflow operator 4508 may then pull one input data element of a plurality of input data elements 4508A according to the control data, and use the one input data element as (*b) to then load the input data value stored at *b with load dataflow operator 4512. Those two input data values may then be multiplied by multiplication dataflow operator 4514 (e.g., as a part of a processing element). The resultant data of the multiplication may then be routed (e.g., to a downstream processing element or other component) by Switch dataflow operator 4516, e.g., to call sites 4516A, for example, according to the control data (e.g., index) to Switch dataflow operator 4516.

FIG. 45 is an example of a function call where the number of dataflow operators used to manage the steering of data (e.g., tokens) may be significant, for example, to steer the data to and/or from call sites. In one example, one or more of PickAny dataflow operator 4502, first Pick dataflow operator 4506, second Pick dataflow operator 4506, and Switch dataflow operator 4516 may be utilized to route (e.g., steer) data, for example, when there are multiple (e.g., many) call sites. In an embodiment where a (e.g., main) goal of introducing a multiplexed and/or demultiplexed function call is to reduce the implementation area of a particular dataflow graph, certain embodiments herein (e.g., of microarchitecture) reduce the area overhead of such multiplexed and/or demultiplexed (e.g., portions) of dataflow graphs.

Figure 46:
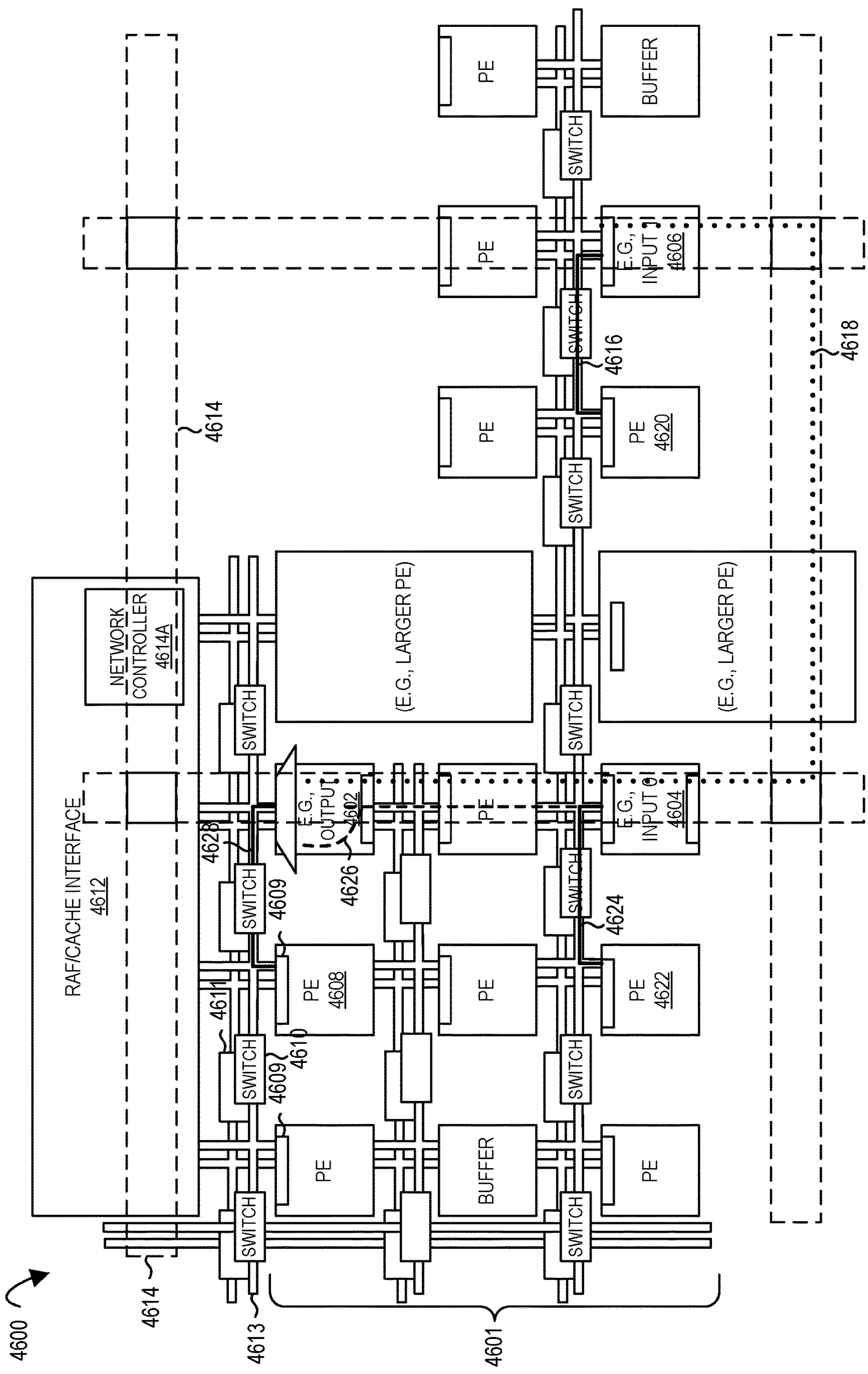
FIG. 46 illustrates a spatial array of processing elements with a plurality of network dataflow endpoint circuits according to embodiments of the disclosure.

FIG. 46 illustrates a spatial array 4601 of processing elements (PEs) with a plurality of network dataflow endpoint circuits (4602, 4604, 4606) according to embodiments of the disclosure. Spatial array 4601 of processing elements may include a communications (e.g., interconnect) network in between components, for example, as discussed herein. In one embodiment, communications network is one or more (e.g., channels of a) packet switched communications network. In one embodiment, communications network is one or more circuit switched, statically configured communications channels. For example, a set of channels coupled together by a switch (e.g., switch 4610 in a first network and switch 4611 in a second network). The first network and second network may be separate or coupled together. For example, switch 4610 may couple one or more of a plurality (e.g., four) data paths therein together, e.g., as configured to perform an operation according to a dataflow graph. In one embodiment, the number of data paths is any plurality. Processing element (e.g., processing element 4608) may be as disclosed herein, for example, as in FIG. 9. Accelerator tile 4600 includes a memory/cache hierarchy interface 4612, e.g., to interface the accelerator tile 4600 with a memory and/or cache. A data path may extend to another tile or terminate, e.g., at the edge of a tile. A processing element may include an input buffer (e.g., buffer 4609) and an output buffer.

Operations may be executed based on the availability of their inputs and the status of the PE. A PE may obtain operands from input channels and write results to output channels, although internal register state may also be used. Certain embodiments herein include a configurable dataflow-friendly PE. FIG. 9 shows a detailed block diagram of one such PE. This PE consists of several I/O buffers, an ALU, a storage register, some instruction registers, and a scheduler. Each cycle, the scheduler may select an instruction for execution based on the availability of the input and output buffers and the status of the PE. The result of the operation may then be written to either an output buffer or to a (e.g., local to the PE) register. Data written to an output buffer may be transported to a downstream PE for further processing. This style of PE may be extremely energy efficient, for example, rather than reading data from a complex, multi-ported register file, a PE reads the data from a register. Similarly, instructions may be stored directly in a register, rather than in a virtualized instruction cache.

Instruction registers may be set during a special configuration step. During this step, auxiliary control wires and state, in addition to the inter-PE network, may be used to stream in configuration across the several PEs comprising the fabric. As result of parallelism, certain embodiments of such a network may provide for rapid reconfiguration, e.g., a tile sized fabric may be configured in less than about 10 microseconds.

Further, depicted accelerator tile 4600 includes packet switched communications network 4614, for example, as part of a mezzanine network, e.g., as described below. Certain embodiments herein allow for (e.g., a distributed) dataflow operations (e.g., operations that only route data) to be performed on (e.g., within) the communications network (e.g., and not in the processing element(s)). As an example, a distributed Pick dataflow operation of a dataflow graph is depicted in FIG. 46. Particularly, distributed pick is implemented using three separate configurations on three separate network (e.g., global) endpoints (e.g., network dataflow endpoint circuits (4602, 4604, 4606)). Dataflow operations may be distributed, e.g., with several endpoints to be configured in a coordinated manner. For example, a compilation tool may understand the need for coordination. Endpoints (e.g., network dataflow endpoint circuits) may be shared among several distributed operations, for example, a dataflow operation (e.g., pick) endpoint may be collated with several sends related to the dataflow operation (e.g., pick). A distributed dataflow operation (e.g., pick) may generate the same result the same as a non-distributed dataflow operation (e.g., pick). In certain embodiment, a difference between distributed and non-distributed dataflow operations is that in the distributed dataflow operations have their data (e.g., data to be routed, but which may not include control data) over a packet switched communications network, e.g., with associated flow control and distributed coordination. Although different sized processing elements (PE) are shown, in one embodiment, each processing element is of the same size (e.g., silicon area). In one embodiment, a buffer element to buffer data may also be included, e.g., separate from a processing element.

As one example, a pick dataflow operation may have a plurality of inputs and steer (e.g., route) one of them as an output, e.g., as in FIG. 45. Instead of utilizing a processing element to perform the pick dataflow operation, it may be achieved with one or more of network communication resources (e.g., network dataflow endpoint circuits). Additionally or alternatively, the network dataflow endpoint circuits may route data between processing elements, e.g., for the processing elements to perform processing operations on the data. Embodiments herein may thus utilize to the communications network to perform (e.g., steering) dataflow operations. Additionally or alternatively, the network dataflow endpoint circuits may perform as a mezzanine network discussed below.

In the depicted embodiment, packet switched communications network 4614 may handle certain (e.g., configuration) communications, for example, to program the processing elements and/or circuit switched network (e.g., network 4613, which may include switches). In one embodiment, a circuit switched network is configured (e.g., programmed) to perform one or more operations (e.g., dataflow operations of a dataflow graph).

Packet switched communications network 4614 includes a plurality of endpoints (e.g., network dataflow endpoint circuits (4602, 4604, 4606). In one embodiment, each endpoint includes an address or other indicator value to allow data to be routed to and/or from that endpoint, e.g., according to (e.g., a header of) a data packet.

Additionally or alternatively to performing one or more of the above, packet switched communications network 4614 may perform dataflow operations. Network dataflow endpoint circuits (4602, 4604, 4606) may be configured (e.g., programmed) to perform a (e.g., distributed pick) operation of a dataflow graph. Programming of components (e.g., a circuit) are described herein. An embodiment of configuring a network dataflow endpoint circuit (e.g., an operation configuration register thereof) is discussed in reference to FIG. 47.

As an example of a distributed pick dataflow operation, network dataflow endpoint circuits (4602, 4604, 4606) in FIG. 46 may be configured (e.g., programmed) to perform a distributed pick operation of a dataflow graph. An embodiment of configuring a network dataflow endpoint circuit (e.g., an operation configuration register thereof) is discussed in reference to FIG. 47. Additionally or alternatively to configuring remote endpoint circuits, local endpoint circuits may also be configured according to this disclosure.

Network dataflow endpoint circuit 4602 may be configured to receive input data from a plurality of sources (e.g., network dataflow endpoint circuit 4604 and network dataflow endpoint circuit 4606), and to output resultant data, e.g., as in FIG. 45), for example, according to control data. Network dataflow endpoint circuit 4604 may be configured to provide (e.g., send) input data to network dataflow endpoint circuit 4602, e.g., on receipt of the input data from processing element 4622. This may be referred to as Input 0 in FIG. 46. In one embodiment, circuit switched network is configured (e.g., programmed) to provide a dedicated communication line between processing element 4622 and network dataflow endpoint circuit 4604 along path 4624. Network dataflow endpoint circuit 4606 may be configured to provide (e.g., send) input data to network dataflow endpoint circuit 4602, e.g., on receipt of the input data from processing element 4620. This may be referred to as Input 1 in FIG.

46. In one embodiment, circuit switched network is configured (e.g., programmed) to provide a dedicated communication line between processing element 4620 and network dataflow endpoint circuit 4606 along path 4616.

When network dataflow endpoint circuit 4604 is to transmit input data to network dataflow endpoint circuit 4602 (e.g., when network dataflow endpoint circuit 4602 has available storage room for the data and/or network dataflow endpoint circuit 4604 has its input data), network dataflow endpoint circuit 4604 may generate a packet (e.g., including the input data and a header to steer that data to network dataflow endpoint circuit 4602 on the packet switched communications network 4614 (e.g., as a stop on that (e.g., ring) network 4614). This is illustrated schematically with dashed line 4626 in FIG. 46. Although the example shown in FIG. 46 utilizes two sources (e.g., two inputs) a single or any plurality (e.g., greater than two) of sources (e.g., inputs) may be utilized.

When network dataflow endpoint circuit 4606 is to transmit input data to network dataflow endpoint circuit 4602 (e.g., when network dataflow endpoint circuit 4602 has available storage room for the data and/or network dataflow endpoint circuit 4606 has its input data), network dataflow endpoint circuit 4604 may generate a packet (e.g., including the input data and a header to steer that data to network dataflow endpoint circuit 4602 on the packet switched communications network 4614 (e.g., as a stop on that (e.g., ring) network 4614). This is illustrated schematically with dashed line 4618 in FIG. 46. Though a mesh network is shown, other network topologies may be used.

Network dataflow endpoint circuit 4602 (e.g., on receipt of the Input 0 from network dataflow endpoint circuit 4604, Input 1 from network dataflow endpoint circuit 4606, and/or control data) may then perform the programmed dataflow operation (e.g., a Pick operation in this example). The network dataflow endpoint circuit 4602 may then output the according resultant data from the operation, e.g., to processing element 4608 in FIG. 46. In one embodiment, circuit switched network is configured (e.g., programmed) to provide a dedicated communication line between processing element 4608 (e.g., a buffer thereof) and network dataflow endpoint circuit 4602 along path 4628. A further example of a distributed Pick operation is discussed below in reference to FIG. 59-61.

In one embodiment, the control data to perform an operation (e.g., pick operation) comes from other components of the spatial array, e.g., a processing element or through network. An example of this is discussed below in reference to FIG. 47. Note that Pick operator is shown schematically in endpoint 4602, and may not be a multiplexer circuit, for example, see the discussion below of network dataflow endpoint circuit 4700 in FIG. 47.

In certain embodiments, a dataflow graph may have certain operations performed by a processing element and certain operations performed by a communication network (e.g., network dataflow endpoint circuit or circuits).

Figure 47:
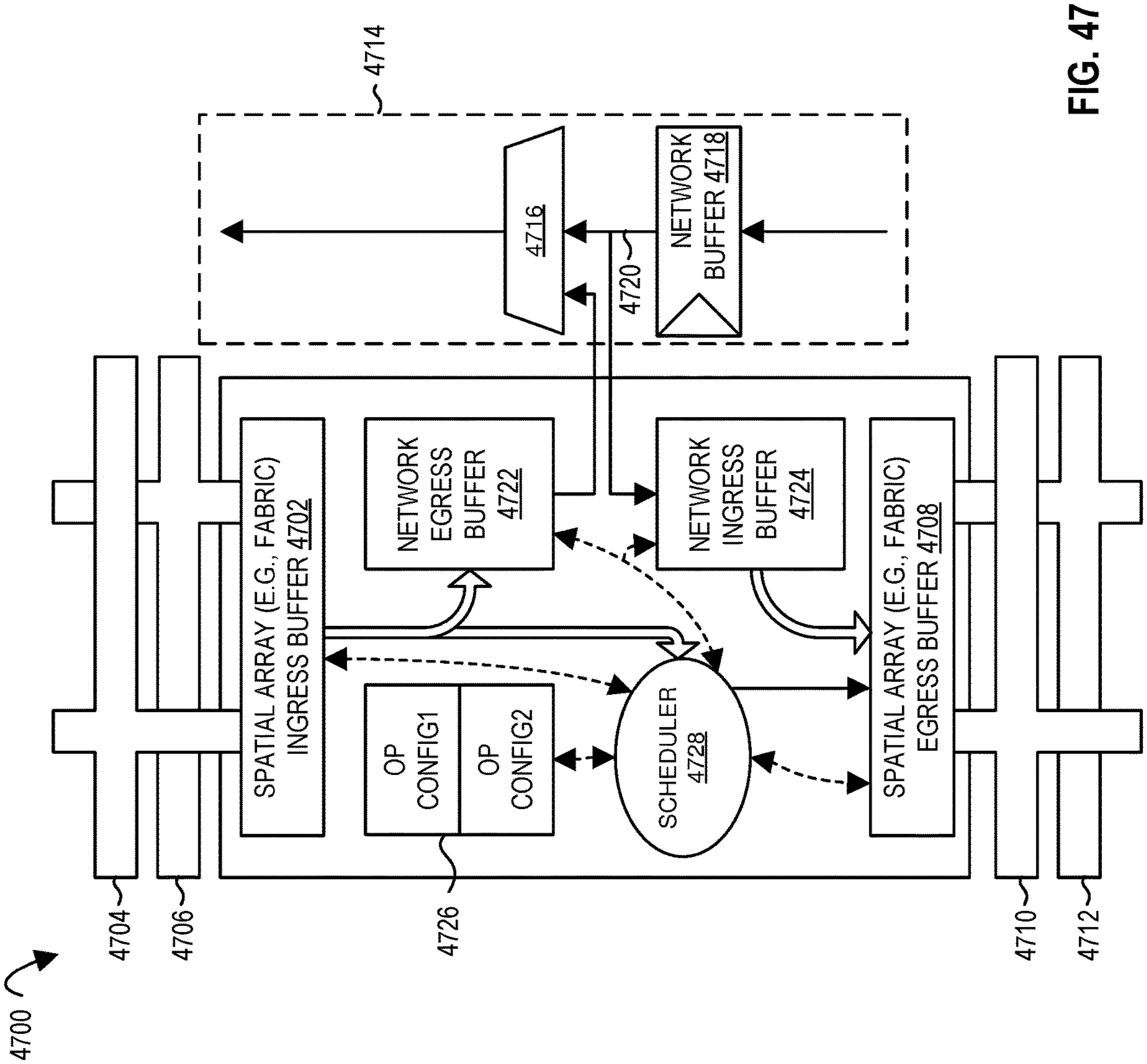
FIG. 47 illustrates a network dataflow endpoint circuit according to embodiments of the disclosure.

FIG. 47 illustrates a network dataflow endpoint circuit 4700 according to embodiments of the disclosure. Although multiple components are illustrated in network dataflow endpoint circuit 4700, one or more instances of each component may be utilized in a single network dataflow endpoint circuit. An embodiment of a network dataflow endpoint circuit may include any (e.g., not all) of the components in FIG. 47.

FIG. 47 depicts the microarchitecture of a (e.g., mezzanine) network interface showing embodiments of main data (solid line) and control data (dotted) paths. This microarchitecture provides a configuration storage and scheduler to enable (e.g., high-radix) dataflow operators. Certain embodiments herein include data paths to the scheduler to enable leg selection and description. FIG. 47 shows a high-level microarchitecture of a network (e.g., mezzanine) endpoint (e.g., stop), which may be a member of a ring network for context. To support (e.g., high-radix) dataflow operations, the configuration of the endpoint (e.g., operation configuration storage 4726) to include configurations that examine multiple network (e.g., virtual) channels (e.g., as opposed to single virtual channels in a baseline implementation). Certain embodiments of network dataflow endpoint circuit 4700 include data paths from ingress and to egress to control the selection of (e.g., pick and switch types of operations), and/or to describe the choice made by the scheduler in the case of PickAny dataflow operators or SwitchAny dataflow operators. Flow control and backpressure behavior may be utilized in each communication channel, e.g., in a (e.g., packet switched communications) network and (e.g., circuit switched) network (e.g., fabric of a spatial array of processing elements).

As one description of an embodiment of the microarchitecture, a pick dataflow operator may function to pick one output of resultant data from a plurality of inputs of input data, e.g., based on control data. A network dataflow endpoint circuit 4700 may be configured to consider one of the spatial array ingress buffer(s) 4702 of the circuit 4700 (e.g., data from the fabric being control data) as selecting among multiple input data elements stored in network ingress buffer(s) 4724 of the circuit 4700 to steer the resultant data to the spatial array egress buffer 4708 of the circuit 4700. Thus, the network ingress buffer(s) 4724 may be thought of as inputs to a virtual mux, the spatial array ingress buffer 4702 as the multiplexer select, and the spatial array egress buffer 4708 as the multiplexer output. In one embodiment, when a (e.g., control data) value is detected and/or arrives in the spatial array ingress buffer 4702, the scheduler 4728 (e.g., as programmed by an operation configuration in storage 4726) is sensitized to examine the corresponding network ingress channel. When data is available in that channel, it is removed from the network ingress buffer 4724 and moved to the spatial array egress buffer 4708. The control bits of both ingresses and egress may then be updated to reflect the transfer of data. This may result in control flow tokens or credits being propagated in the associated network. In certain embodiment, all inputs (e.g., control or data) may arise locally or over the network.

Initially, it may seem that the use of packet switched networks to implement the (e.g., high-radix staging) operators of multiplexed and/or demultiplexed codes hampers performance. For example, in one embodiment, a packet-switched network is generally shared and the caller and callee dataflow graphs may be distant from one another. Recall, however, that in certain embodiments, the intention of supporting multiplexing and/or demultiplexing is to reduce the area consumed by infrequent code paths within a dataflow operator (e.g., by the spatial array). Thus, certain embodiments herein reduce area and avoid the consumption of more expensive fabric resources, for example, like PEs, e.g., without (substantially) affecting the area and efficiency of individual PEs to supporting those (e.g., infrequent) operations.

Turning now to further detail of FIG. 47, depicted network dataflow endpoint circuit 4700 includes a spatial array (e.g., fabric) ingress buffer 4702, for example, to input data (e.g., control data) from a (e.g., circuit switched) network. As noted above, although a single spatial array (e.g., fabric)

ingress buffer 4702 is depicted, a plurality of spatial array (e.g., fabric) ingress buffers may be in a network dataflow endpoint circuit. In one embodiment, spatial array (e.g., fabric) ingress buffer 4702 is to receive data (e.g., control data) from a communications network of a spatial array (e.g., a spatial array of processing elements), for example, from one or more of network 4704 and network 4706. In one embodiment, network 4704 is part of network 4613 in FIG. 46.

Depicted network dataflow endpoint circuit 4700 includes a spatial array (e.g., fabric) egress buffer 4708, for example, to output data (e.g., control data) to a (e.g., circuit switched) network. As noted above, although a single spatial array (e.g., fabric) egress buffer 4708 is depicted, a plurality of spatial array (e.g., fabric) egress buffers may be in a network dataflow endpoint circuit. In one embodiment, spatial array (e.g., fabric) egress buffer 4708 is to send (e.g., transmit) data (e.g., control data) onto a communications network of a spatial array (e.g., a spatial array of processing elements), for example, onto one or more of network 4710 and network 4712. In one embodiment, network 4710 is part of network 4613 in FIG. 46.

Additionally or alternatively, network dataflow endpoint circuit 4700 may be coupled to another network 4714, e.g., a packet switched network. Another network 4714, e.g., a packet switched network, may be used to transmit (e.g., send or receive) (e.g., input and/or resultant) data to processing elements or other components of a spatial array and/or to transmit one or more of input data or resultant data. In one embodiment, network 4714 is part of the packet switched communications network 4614 in FIG. 46, e.g., a time multiplexed network.

Network buffer 4718 (e.g., register(s)) may be a stop on (e.g., ring) network 4714, for example, to receive data from network 4714.

Depicted network dataflow endpoint circuit 4700 includes a network egress buffer 4722, for example, to output data (e.g., resultant data) to a (e.g., packet switched) network. As noted above, although a single network egress buffer 4722 is depicted, a plurality of network egress buffers may be in a network dataflow endpoint circuit. In one embodiment, network egress buffer 4722 is to send (e.g., transmit) data (e.g., resultant data) onto a communications network of a spatial array (e.g., a spatial array of processing elements), for example, onto network 4714. In one embodiment, network 4714 is part of packet switched network 4614 in FIG. 46. In certain embodiments, network egress buffer 4722 is to output data (e.g., from spatial array ingress buffer 4702) to (e.g., packet switched) network 4714, for example, to be routed (e.g., steered) to other components (e.g., other network dataflow endpoint circuit(s)).

Depicted network dataflow endpoint circuit 4700 includes a network ingress buffer 4722, for example, to input data (e.g., inputted data) from a (e.g., packet switched) network. As noted above, although a single network ingress buffer 4724 is depicted, a plurality of network ingress buffers may be in a network dataflow endpoint circuit. In one embodiment, network ingress buffer 4724 is to receive (e.g., transmit) data (e.g., input data) from a communications network of a spatial array (e.g., a spatial array of processing elements), for example, from network 4714. In one embodiment, network 4714 is part of packet switched network 4614 in FIG. 46. In certain embodiments, network ingress buffer 4724 is to input data (e.g., from spatial array ingress buffer 4702) from (e.g., packet switched) network 4714, for example, to be routed (e.g., steered) there (e.g., into spatial array egress buffer 4708) from other components (e.g., other network dataflow endpoint circuit(s)).

In one embodiment, the data format (e.g., of the data on network 4714) includes a packet having data and a header (e.g., with the destination of that data). In one embodiment, the data format (e.g., of the data on network 4704 and/or 4706) includes only the data (e.g., not a packet having data and a header (e.g., with the destination of that data)). Network dataflow endpoint circuit 4700 may add (e.g., data output from circuit 4700) or remove (e.g., data input into circuit 4700) a header (or other data) to or from a packet. Coupling 4720 (e.g., wire) may send data received from network 4714 (e.g., from network buffer 4718) to network ingress buffer 4724 and/or multiplexer 4716. Multiplexer 4716 may (e.g., via a control signal from the scheduler 4728) output data from network buffer 4718 or from network egress buffer 4722. In one embodiment, one or more of multiplexer 4716 or network buffer 4718 are separate components from network dataflow endpoint circuit 4700. A buffer may include a plurality of (e.g., discrete) entries, for example, a plurality of registers.

In one embodiment, operation configuration storage 4726 (e.g., register or registers) is loaded during configuration (e.g., mapping) and specifies the particular operation (or operations) this network dataflow endpoint circuit 4700 (e.g., not a processing element of a spatial array) is to perform (e.g., data steering operations in contrast to logic and/or arithmetic operations). Buffer(s) (e.g., 4702, 4708, 4722, and/or 4724) activity may be controlled by that operation (e.g., controlled by the scheduler 4728). Scheduler 4728 may schedule an operation or operations of network dataflow endpoint circuit 4700, for example, when (e.g., all) input (e.g., payload) data and/or control data arrives. Dotted lines to and from scheduler 4728 indicate paths that may be utilized for control data, e.g., to and/or from scheduler 4728. Scheduler may also control multiplexer 4716, e.g., to steer data to and/or from network dataflow endpoint circuit 4700 and network 4714.

In reference to the distributed pick operation in FIG. 46 above, network dataflow endpoint circuit 4602 may be configured (e.g., as an operation in its operation configuration register 4726 as in FIG. 47) to receive (e.g., in (two storage locations in) its network ingress buffer 4724 as in FIG. 47) input data from each of network dataflow endpoint circuit 4604 and network dataflow endpoint circuit 4606, and to output resultant data (e.g., from its spatial array egress buffer 4708 as in FIG. 47), for example, according to control data (e.g., in its spatial array ingress buffer 4702 as in FIG. 47). Network dataflow endpoint circuit 4604 may be configured (e.g., as an operation in its operation configuration register 4726 as in FIG. 47) to provide (e.g., send via circuit 4604's network egress buffer 4722 as in FIG. 47) input data to network dataflow endpoint circuit 4602, e.g., on receipt (e.g., in circuit 4604's spatial array ingress buffer 4702 as in FIG. 47) of the input data from processing element 4622. This may be referred to as Input 0 in FIG. 46. In one embodiment, circuit switched network is configured (e.g., programmed) to provide a dedicated communication line between processing element 4622 and network dataflow endpoint circuit 4604 along path 4624. Network dataflow endpoint circuit 4604 may include (e.g., add) a header packet with the received data (e.g., in its network egress buffer 4722 as in FIG. 47) to steer the packet (e.g., input data) to network dataflow endpoint circuit 4602. Network dataflow endpoint circuit 4606 may be configured (e.g., as an operation in its operation configuration register 4726 as in FIG. 47) to provide (e.g., send via circuit 4606's network egress buffer 4722 as in FIG. 47) input data to network dataflow endpoint circuit 4602, e.g., on receipt (e.g., in circuit 4606's spatial array ingress buffer 4702 as in FIG. 47) of the input data from processing element 4620. This may be referred to as Input 1 in FIG. 46. In one embodiment, circuit switched network is configured (e.g., programmed) to provide a dedicated communication line between processing element 4620 and network dataflow endpoint circuit 4606 along path 4616. Network dataflow endpoint circuit 4606 may include (e.g., add) a header packet with the received data (e.g., in its network egress buffer 4722 as in FIG. 47) to steer the packet (e.g., input data) to network dataflow endpoint circuit 4602.

When network dataflow endpoint circuit 4604 is to transmit input data to network dataflow endpoint circuit 4602 (e.g., when network dataflow endpoint circuit 4602 has available storage room for the data and/or network dataflow endpoint circuit 4604 has its input data), network dataflow endpoint circuit 4604 may generate a packet (e.g., including the input data and a header to steer that data to network dataflow endpoint circuit 4602 on the packet switched communications network 4614 (e.g., as a stop on that (e.g., ring) network). This is illustrated schematically with dashed line 4626 in FIG. 46. Network 4614 is shown schematically with multiple dotted boxes in FIG. 46. Network 4614 may include a network controller 4614A, e.g., to manage the ingress and/or egress of data on network 4614A.

When network dataflow endpoint circuit 4606 is to transmit input data to network dataflow endpoint circuit 4602 (e.g., when network dataflow endpoint circuit 4602 has available storage room for the data and/or network dataflow endpoint circuit 4606 has its input data), network dataflow endpoint circuit 4604 may generate a packet (e.g., including the input data and a header to steer that data to network dataflow endpoint circuit 4602 on the packet switched communications network 4614 (e.g., as a stop on that (e.g., ring) network). This is illustrated schematically with dashed line 4618 in FIG. 46.

Network dataflow endpoint circuit 4602 (e.g., on receipt of the Input 0 from network dataflow endpoint circuit 4604 in circuit 4602's network ingress buffer(s), Input 1 from network dataflow endpoint circuit 4606 in circuit 4602's network ingress buffer(s), and/or control data from processing element 4608 in circuit 4602's spatial array ingress buffer) may then perform the programmed dataflow operation (e.g., a Pick operation in this example). The network dataflow endpoint circuit 4602 may then output the according resultant data from the operation, e.g., to processing element 4608 in FIG. 46. In one embodiment, circuit switched network is configured (e.g., programmed) to provide a dedicated communication line between processing element 4608 (e.g., a buffer thereof) and network dataflow endpoint circuit 4602 along path 4628. A further example of a distributed Pick operation is discussed below in reference to FIG. 59-61. Buffers in FIG. 46 may be the small, unlabeled boxes in each PE.

Figure 48:
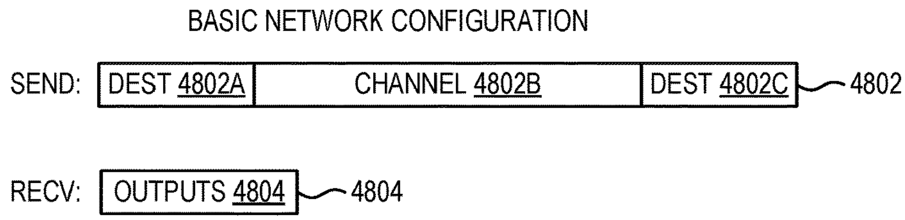
FIG. 48 illustrates data formats for a send operation and a receive operation according to embodiments of the disclosure.

FIGS. 48-8 below include example data formats, but other data formats may be utilized. One or more fields may be included in a data format (e.g., in a packet). Data format may be used by network dataflow endpoint circuits, e.g., to transmit (e.g., send and/or receive) data between a first component (e.g., between a first network dataflow endpoint circuit and a second network dataflow endpoint circuit, component of a spatial array, etc.).

FIG. 48 illustrates data formats for a send operation 4802 and a receive operation 4804 according to embodiments of the disclosure. In one embodiment, send operation 4802 and receive operation 4804 are data formats of data transmitted on a packed switched communication network. Depicted send operation 4802 data format includes a destination field 4802A (e.g., indicating which component in a network the data is to be sent to), a channel field 4802B (e.g. indicating which channel on the network the data is to be sent on), and an input field 4802C (e.g., the payload or input data that is to be sent). Depicted receive operation 4804 includes an output field, e.g., which may also include a destination field (not depicted). These data formats may be used (e.g., for packet(s)) to handle moving data in and out of components. These configurations may be separable and/or happen in parallel. These configurations may use separate resources. The term channel may generally refer to the communication resources (e.g., in management hardware) associated with the request. Association of configuration and queue management hardware may be explicit.

Figure 49:
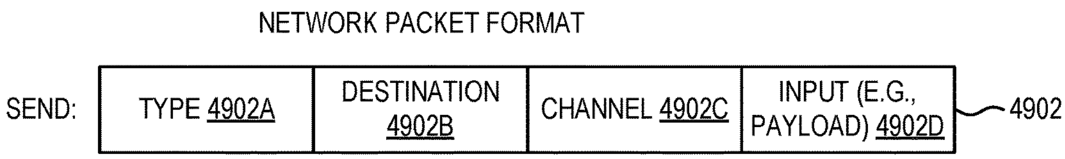
FIG. 49 illustrates another data format for a send operation according to embodiments of the disclosure.

FIG. 49 illustrates another data format for a send operation 4902 according to embodiments of the disclosure. In one embodiment, send operation 4902 is a data format of data transmitted on a packed switched communication network. Depicted send operation 4902 data format includes a type field (e.g., used to annotate special control packets, such as, but not limited to, configuration, extraction, or exception packets), destination field 4902B (e.g., indicating which component in a network the data is to be sent to), a channel field 4902C (e.g. indicating which channel on the network the data is to be sent on), and an input field 4902D (e.g., the payload or input data that is to be sent).

Figure 50:
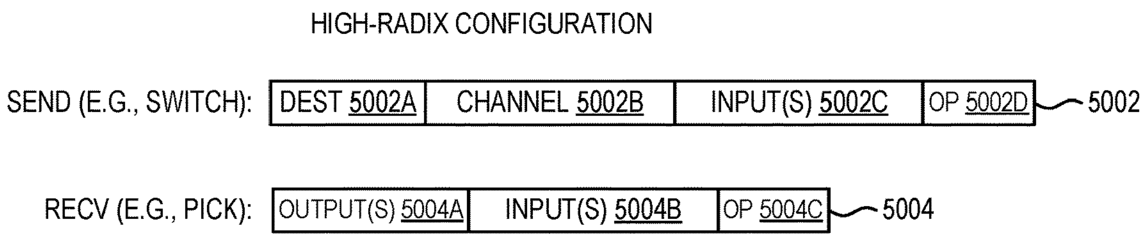
FIG. 50 illustrates to configure a circuit element (e.g., network dataflow endpoint circuit) data formats to configure a circuit element (e.g., network dataflow endpoint circuit) for a send (e.g., switch) operation and a receive (e.g., pick) operation according to embodiments of the disclosure.

FIG. 50 illustrates configuration data formats to configure a circuit element (e.g., network dataflow endpoint circuit) for a send (e.g., switch) operation 5002 and a receive (e.g., pick) operation 5004 according to embodiments of the disclosure. In one embodiment, send operation 5002 and receive operation 5004 are configuration data formats for data to be transmitted on a packed switched communication network, for example, between network dataflow endpoint circuits. Depicted send operation configuration data format 5002 includes a destination field 5002A (e.g., indicating which component(s) in a network the (input) data is to be sent to), a channel field 5002B (e.g. indicating which channel on the network the (input) data is to be sent on), an input field 5002C (for example, an identifier of the component(s) that is to send the input data, e.g., the set of inputs in the (e.g., fabric ingress) buffer that this element is sensitive to), and an operation field 5002D (e.g., indicating which of a plurality of operations are to be performed). In one embodiment, the (e.g., outbound) operation is one of a Switch or SwitchAny dataflow operation, e.g., corresponding to a (e.g., same) dataflow operator of a dataflow graph.

Depicted receive operation configuration data format 5004 includes an output field 5004A (e.g., indicating which component(s) in a network the (resultant) data is to be sent to), an input field 5004B (e.g., an identifier of the component(s) that is to send the input data), and an operation field 5004C (e.g., indicating which of a plurality of operations are to be performed). In one embodiment, the (e.g., inbound) operation is one of a Pick, PickSingleLeg, PickAny, or Merge dataflow operation, e.g., corresponding to a (e.g., same) dataflow operator of a dataflow graph. In one embodiment, a merge dataflow operation is a pick that requires and dequeues all operands (e.g., with the egress endpoint receiving control).

A configuration data format utilized herein may include one or more of the fields described herein, e.g., in any order.

Figure 51:
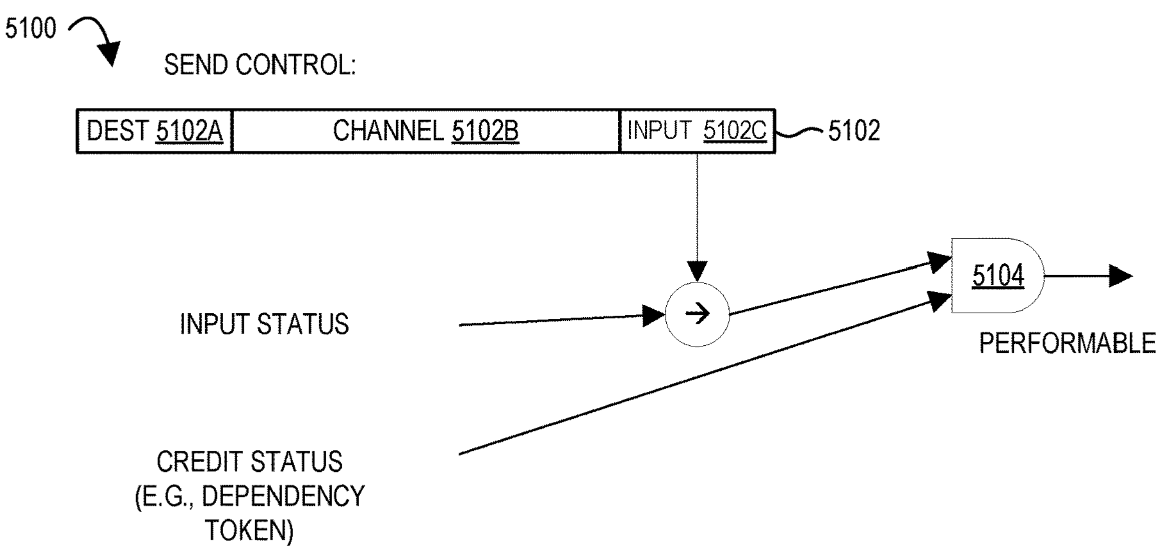
FIG. 51 illustrates a configuration data format to configure a circuit element (e.g., network dataflow endpoint circuit) for a send operation with its input, output, and control data annotated on a circuit according to embodiments of the disclosure.

FIG. 51 illustrates a configuration data format 5102 to configure a circuit element (e.g., network dataflow endpoint circuit) for a send operation with its input, output, and control data annotated on a circuit 5100 according to embodiments of the disclosure. Depicted send operation configuration data format 5102 includes a destination field 5102A (e.g., indicating which component in a network the data is to be sent to), a channel field 5102B (e.g. indicating which channel on the (packet switched) network the data is to be sent on), and an input field 4802C (e.g., an identifier of the component(s) that is to send the input data). In one embodiment, circuit 5100 (e.g., network dataflow endpoint circuit) is to receive packet of data in the data format of send operation configuration data format 5102, for example, with the destination indicating which circuit of a plurality of circuits the resultant is to be sent to, the channel indicating which channel of the (packet switched) network the data is to be sent on, and the input being which circuit of a plurality of circuits the input data is to be received from. The AND gate 5104 is to allow the operation to be performed when both the input data is available and the credit status is a yes (for example, the dependency token indicates) indicating there is room for the output data to be stored, e.g., in a buffer of the destination. In certain embodiments, each operation is annotated with its requirements (e.g., inputs, outputs, and control) and if all requirements are met, the configuration is 'performable' by the circuit (e.g., network dataflow endpoint circuit).

Figure 52:
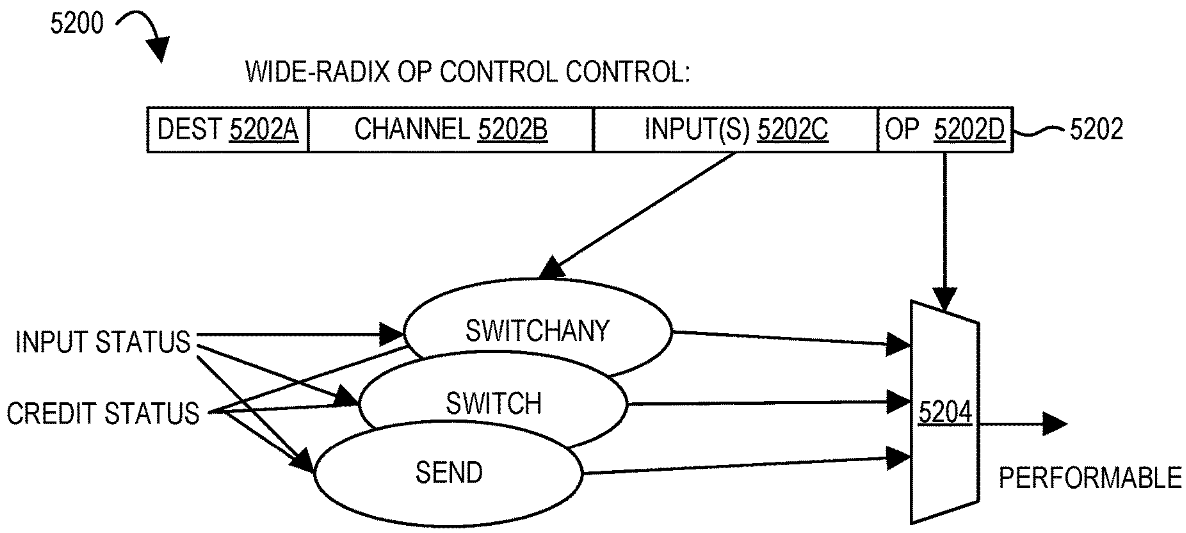
FIG. 52 illustrates a configuration data format to configure a circuit element (e.g., network dataflow endpoint circuit) for a selected operation with its input, output, and control data annotated on a circuit according to embodiments of the disclosure.

FIG. 52 illustrates a configuration data format 5202 to configure a circuit element (e.g., network dataflow endpoint circuit) for a selected (e.g., send) operation with its input, output, and control data annotated on a circuit 5200 according to embodiments of the disclosure. Depicted (e.g., send) operation configuration data format 5202 includes a destination field 5202A (e.g., indicating which component(s) in a network the (input) data is to be sent to), a channel field 5202B (e.g. indicating which channel on the network the (input) data is to be sent on), an input field 5202C (e.g., an identifier of the component(s) that is to send the input data), and an operation field 5202D (e.g., indicating which of a plurality of operations are to be performed and/or the source of the control data for that operation). In one embodiment, the (e.g., outbound) operation is one of a send, Switch, or SwitchAny dataflow operation, e.g., corresponding to a (e.g., same) dataflow operator of a dataflow graph.

In one embodiment, circuit 5200 (e.g., network dataflow endpoint circuit) is to receive packet of data in the data format of (e.g., send) operation configuration data format 5202, for example, with the input being the source(s) of the payload (e.g., input data) and the operation field indicating which operation is to be performed (e.g., shown schematically as Switch or SwitchAny). Depicted multiplexer 5204 may select the operation to be performed from a plurality of available operations, e.g., based on the value in operation field 5202D. In one embodiment, circuit 5200 is to perform that operation when both the input data is available and the credit status is a yes (for example, the dependency token indicates) indicating there is room for the output data to be stored, e.g., in a buffer of the destination.

In one embodiment, the send operation does not utilize control beyond checking its input(s) are available for sending. This may enable switch to perform the operation without credit on all legs. In one embodiment, the Switch and/or SwitchAny operation includes a multiplexer controlled by the value stored in the operation field 5202D to select the correct queue management circuitry.

Value stored in operation field 5202D may select among control options, e.g., with different control (e.g., logic) circuitry for each operation, for example, as in FIGS. 53-56.

Figure 53:
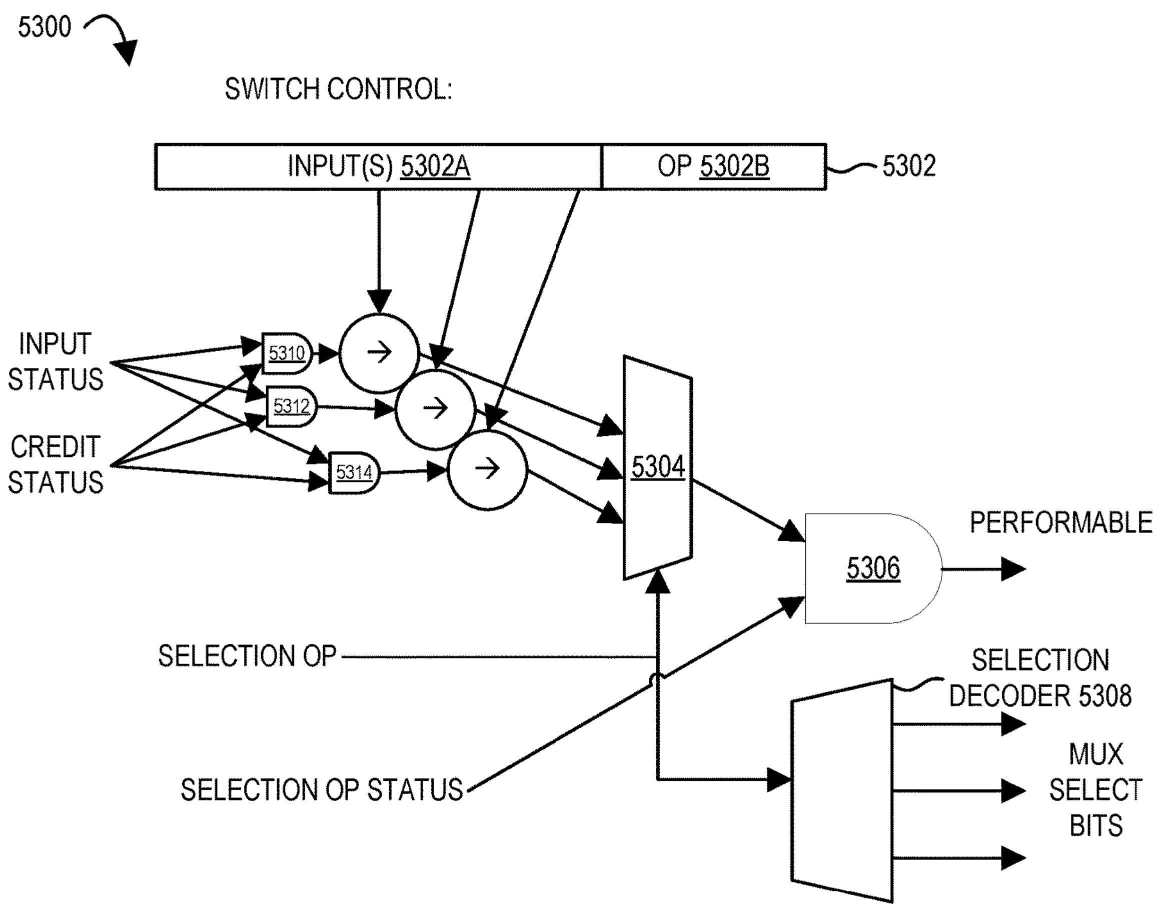
FIG. 53 illustrates a configuration data format to configure a circuit element (e.g., network dataflow endpoint circuit) for a Switch operation with its input, output, and control data annotated on a circuit according to embodiments of the disclosure.
Figure 54:
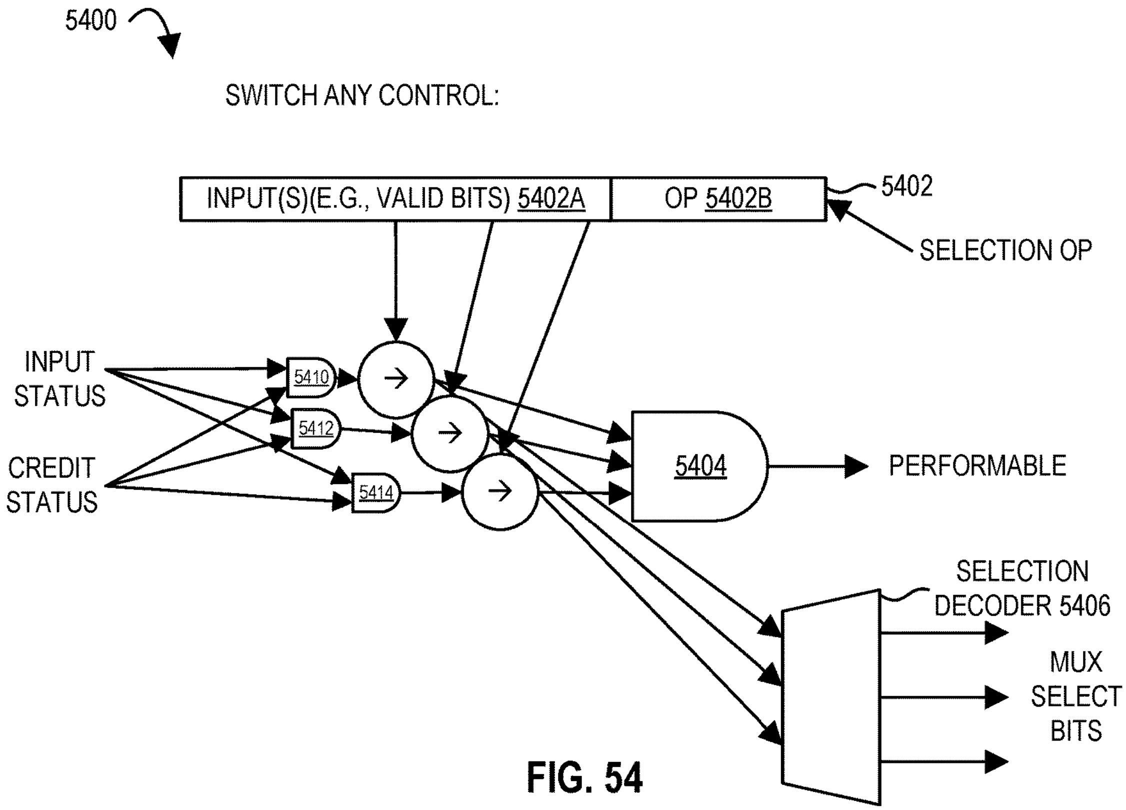
FIG. 54 illustrates a configuration data format to configure a circuit element (e.g., network dataflow endpoint circuit) for a SwitchAny operation with its input, output, and control data annotated on a circuit according to embodiments of the disclosure.

In some embodiments, credit (e.g., credit on a network) status is another input (e.g., as depicted in FIGS. 53-54 here).

FIG. 53 illustrates a configuration data format to configure a circuit element (e.g., network dataflow endpoint circuit) for a Switch operation configuration data format 5302 with its input, output, and control data annotated on a circuit 5300 according to embodiments of the disclosure. In one embodiment, the (e.g., outbound) operation value stored in the operation field 5202D is for a Switch operation, e.g., corresponding to a Switch dataflow operator of a dataflow graph. In one embodiment, circuit 5300 (e.g., network dataflow endpoint circuit) is to receive a packet of data in the data format of Switch operation 5302, for example, with the input in input field 5302A being what component(s) are to be sent the data and the operation field 5302B indicating which operation is to be performed (e.g., shown schematically as Switch). Depicted circuit 5300 may select the operation to be executed from a plurality of available operations based on the operation field 5302B. In one embodiment, circuit 5200 is to perform that operation when both the input data (for example, according to the input status, e.g., there is room for the data in the destination(s)) is available and the credit status (e.g., selection operation (OP) status) is a yes (for example, the network credit indicates that there is availability on the network to send that data to the destination(s)). For example, multiplexers 5310, 5312, 5314 may be used with a respective input status and credit status for each input (e.g., where the output data is to be sent to in the switch operation), e.g., to prevent an input from showing as available until both the input status (e.g., room for data in the destination) and the credit status (e.g., there is room on the network to get to the destination) are true (e.g., yes). In one embodiment, input status is an indication there is or is not room for the (output) data to be stored, e.g., in a buffer of the destination. In certain embodiments, AND gate 5306 is to allow the operation to be performed when both the input data is available (e.g., as output from multiplexer 5304) and the selection operation (e.g., control data) status is a yes, for example, indicating the selection operation (e.g., which of a plurality of outputs an input is to be sent to, see., e.g., FIG. 45). In certain embodiments, the performance of the operation with the control data (e.g., selection op) is to cause input data from one of the inputs to be output on one or more (e.g., a plurality of) outputs (e.g., as indicated by the control data), e.g., according to the multiplexer selection bits from multiplexer 5308. In one embodiment, selection op chooses which leg of the switch output will be used and/or selection decoder creates multiplexer selection bits.

FIG. 54 illustrates a configuration data format to configure a circuit element (e.g., network dataflow endpoint circuit) for a SwitchAny operation configuration data format 5402 with its input, output, and control data annotated on a circuit 5400 according to embodiments of the disclosure. In one embodiment, the (e.g., outbound) operation value stored in the operation field 5202D is for a SwitchAny operation, e.g., corresponding to a SwitchAny dataflow operator of a dataflow graph. In one embodiment, circuit 5400 (e.g., network dataflow endpoint circuit) is to receive a packet of data in the data format of SwitchAny operation configuration data format 5402, for example, with the input in input field 5402A being what component(s) are to be sent the data and the operation field 5402B indicating which operation is to be performed (e.g., shown schematically as SwitchAny) and/or the source of the control data for that operation. In one embodiment, circuit 5200 is to perform that operation when any of the input data (for example, according to the input status, e.g., there is room for the data in the destination (s)) is available and the credit status is a yes (for example, the network credit indicates that there is availability on the network to send that data to the destination(s)). For example, multiplexers 5410, 5412, 5414 may be used with a respective input status and credit status for each input (e.g., where the output data is to be sent to in the SwitchAny operation), e.g., to prevent an input from showing as available until both the input status (e.g., room for data in the destination) and the credit status (e.g., there is room on the network to get to the destination) are true (e.g., yes). In one embodiment, input status is an indication there is room or is not room for the (output) data to be stored, e.g., in a buffer of the destination. In certain embodiments, OR gate 5404 is to allow the operation to be performed when any one of the outputs are available. In certain embodiments, the performance of the operation is to cause the first available input data from one of the inputs to be output on one or more (e.g., a plurality of) outputs, e.g., according to the multiplexer selection bits from multiplexer 5406. In one embodiment, SwitchAny occurs as soon as any output credit is available (e.g., as opposed to a Switch that utilizes a selection op). Multiplexer select bits may be used to steer an input to an (e.g., network) egress buffer of a network dataflow endpoint circuit.

Figure 55:
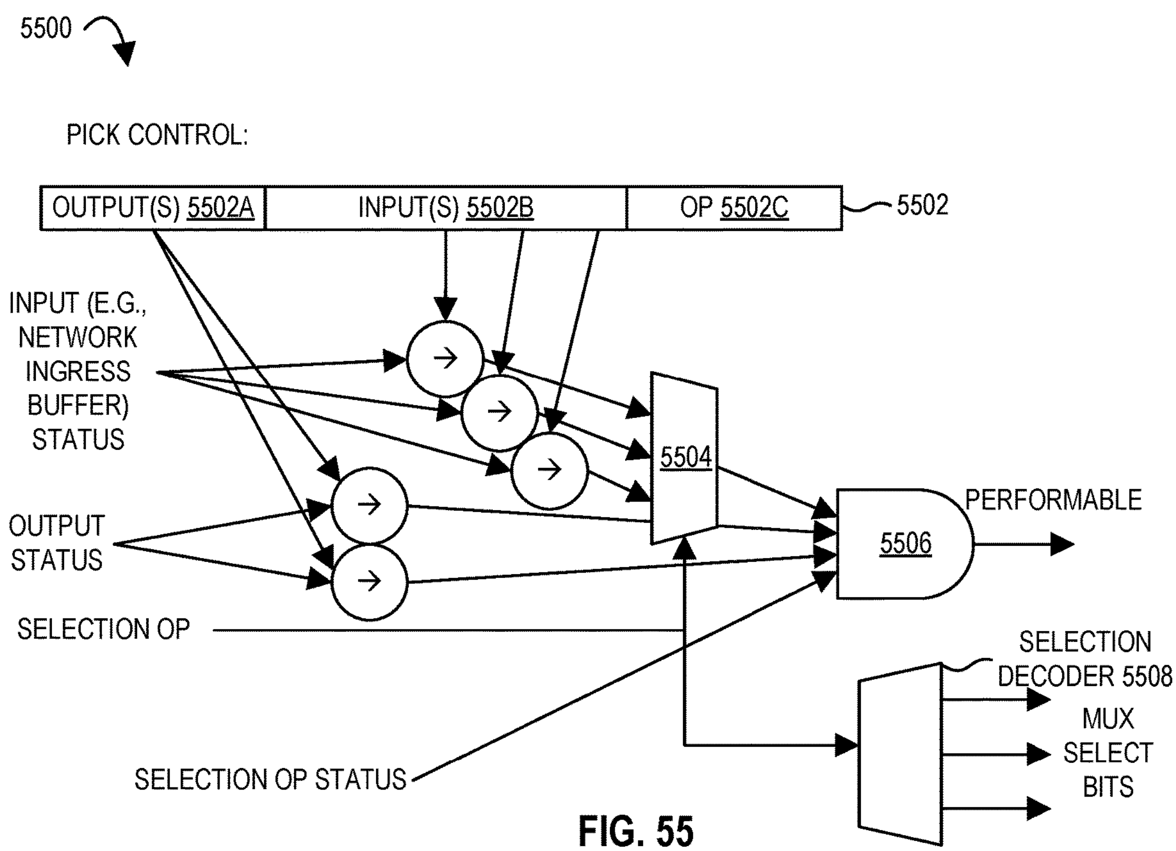
FIG. 55 illustrates a configuration data format to configure a circuit element (e.g., network dataflow endpoint circuit) for a Pick operation with its input, output, and control data annotated on a circuit according to embodiments of the disclosure.

FIG. 55 illustrates a configuration data format to configure a circuit element (e.g., network dataflow endpoint circuit) for a Pick operation configuration data format 5502 with its input, output, and control data annotated on a circuit 5500 according to embodiments of the disclosure. In one embodiment, the (e.g., inbound) operation value stored in the operation field 5502C is for a Pick operation, e.g., corresponding to a Pick dataflow operator of a dataflow graph. In one embodiment, circuit 5500 (e.g., network dataflow endpoint circuit) is to receive a packet of data in the data format of Pick operation configuration data format 5502, for example, with the data in input field 5502B being what component(s) are to send the input data, the data in output field 5502A being what component(s) are to be sent the input data, and the operation field 5502C indicating which operation is to be performed (e.g., shown schematically as Pick) and/or the source of the control data for that operation. Depicted circuit 5500 may select the operation to be executed from a plurality of available operations based on the operation field 5502C. In one embodiment, circuit 5500 is to perform that operation when both the input data (for example, according to the input (e.g., network ingress buffer) status, e.g., all the input data has arrived) is available, the credit status (e.g., output status) is a yes (for example, the spatial array egress buffer) indicating there is room for the output data to be stored, e.g., in a buffer of the destination(s), and the selection operation (e.g., control data) status is a yes. In certain embodiments, AND gate 5506 is to allow the operation to be performed when both the input data is available (e.g., as output from multiplexer 5504), an output space is available, and the selection operation (e.g., control data) status is a yes, for example, indicating the selection operation (e.g., which of a plurality of outputs an input is to be sent to, see., e.g., FIG. 45). In certain embodiments, the performance of the operation with the control data (e.g., selection op) is to cause input data from one of a plurality of inputs (e.g., indicated by the control data) to be output on one or more (e.g., a plurality of) outputs, e.g., according to the multiplexer selection bits from multiplexer 5508. In one embodiment, selection op chooses which leg of the pick will be used and/or selection decoder creates multiplexer selection bits.

Figure 56:
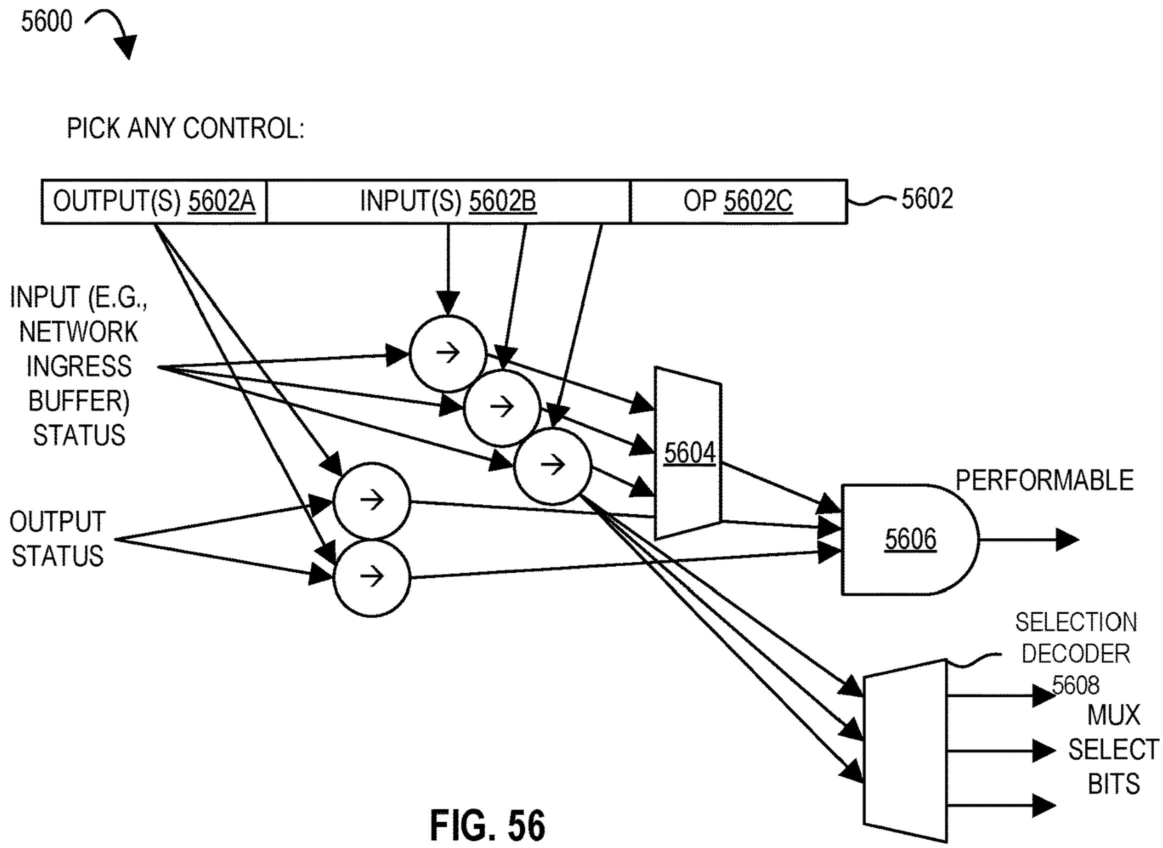
FIG. 56 illustrates a configuration data format to configure a circuit element (e.g., network dataflow endpoint circuit) for a PickAny operation with its input, output, and control data annotated on a circuit according to embodiments of the disclosure.

FIG. 56 illustrates a configuration data format to configure a circuit element (e.g., network dataflow endpoint circuit) for a PickAny operation 5602 with its input, output, and control data annotated on a circuit 5600 according to embodiments of the disclosure. In one embodiment, the (e.g., inbound) operation value stored in the operation field 5602C is for a PickAny operation, e.g., corresponding to a PickAny dataflow operator of a dataflow graph. In one embodiment, circuit 5600 (e.g., network dataflow endpoint circuit) is to receive a packet of data in the data format of PickAny operation configuration data format 5602, for example, with the data in input field 5602B being what component(s) are to send the input data, the data in output field 5602A being what component(s) are to be sent the input data, and the operation field 5602C indicating which operation is to be performed (e.g., shown schematically as PickAny). Depicted circuit 5600 may select the operation to be executed from a plurality of available operations based on the operation field 5602C. In one embodiment, circuit 5600 is to perform that operation when any (e.g., a first arriving of) the input data (for example, according to the input (e.g., network ingress buffer) status, e.g., any of the input data has arrived) is available and the credit status (e.g., output status) is a yes (for example, the spatial array egress buffer indicates) indicating there is room for the output data to be stored, e.g., in a buffer of the destination(s). In certain embodiments, AND gate 5606 is to allow the operation to be performed when any of the input data is available (e.g., as output from multiplexer 5604) and an output space is available. In certain embodiments, the performance of the operation is to cause the (e.g., first arriving) input data from one of a plurality of inputs to be output on one or more (e.g., a plurality of) outputs, e.g., according to the multiplexer selection bits from multiplexer 5608.

In one embodiment, PickAny executes on the presence of any data and/or selection decoder creates multiplexer selection bits.

Figure 57:
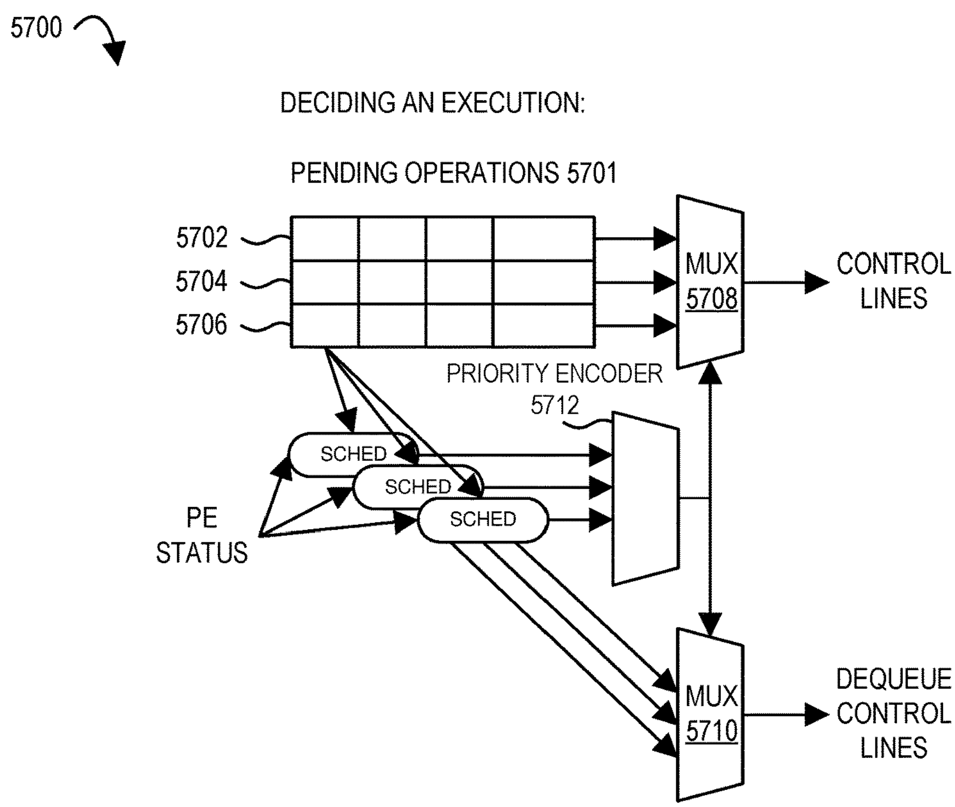
FIG. 57 illustrates selection of an operation by a network dataflow endpoint circuit for performance according to embodiments of the disclosure.

FIG. 57 illustrates selection of an operation (5702, 5704, 5706) by a network dataflow endpoint circuit 5700 for performance according to embodiments of the disclosure. Pending operations storage 5701 (e.g., in scheduler 4728 in FIG. 47) may store one or more dataflow operations, e.g., according to the format(s) discussed herein. Scheduler (for example, based on a fixed priority or the oldest of the operations, e.g., that have all of their operands) may schedule an operation for performance. For example, scheduler may select operation 5702, and according to a value stored in operation field, send the corresponding control signals from multiplexer 5708 and/or multiplexer 5710. As an example, several operations may be simultaneously executeable in a single network dataflow endpoint circuit. Assuming all data is there, the "performable" signal (e.g., as shown in FIGS. 51-56) may be input as a signal into multiplexer 5712. Multiplexer 5712 may send as an output control signals for a selected operation (e.g., one of operation 5702, 5704, and 5706) that cause multiplexer 5708 to configure the connections in a network dataflow endpoint circuit to perform the selected operation (e.g., to source from or send data to buffer(s)). Multiplexer 5712 may send as an output control signals for a selected operation (e.g., one of operation 5702, 5704, and 5706) that cause multiplexer 5710 to configure the connections in a network dataflow endpoint circuit to remove data from the queue(s), e.g., consumed data. As an example, see the discussion herein about having data (e.g., token) removed. The "PE status" in FIG. 57 may be the control data coming from a PE, for example, the empty indicator and full indicators of the queues (e.g., backpressure signals and/or network credit). In one embodiment, the PE status may include the empty or full bits for all the buffers and/or datapaths, e.g., in FIG. 47 herein. FIG. 57 illustrates generalized scheduling for embodiments herein, e.g., with specialized scheduling for embodiments discussed in reference to FIGS. 53-56.

In one embodiment, (e.g., as with scheduling) the choice of dequeue is determined by the operation and its dynamic behavior, e.g., to dequeue the operation after performance. In one embodiment, a circuit is to use the operand selection bits to dequeue data (e.g., input, output and/or control data).

Figure 58:
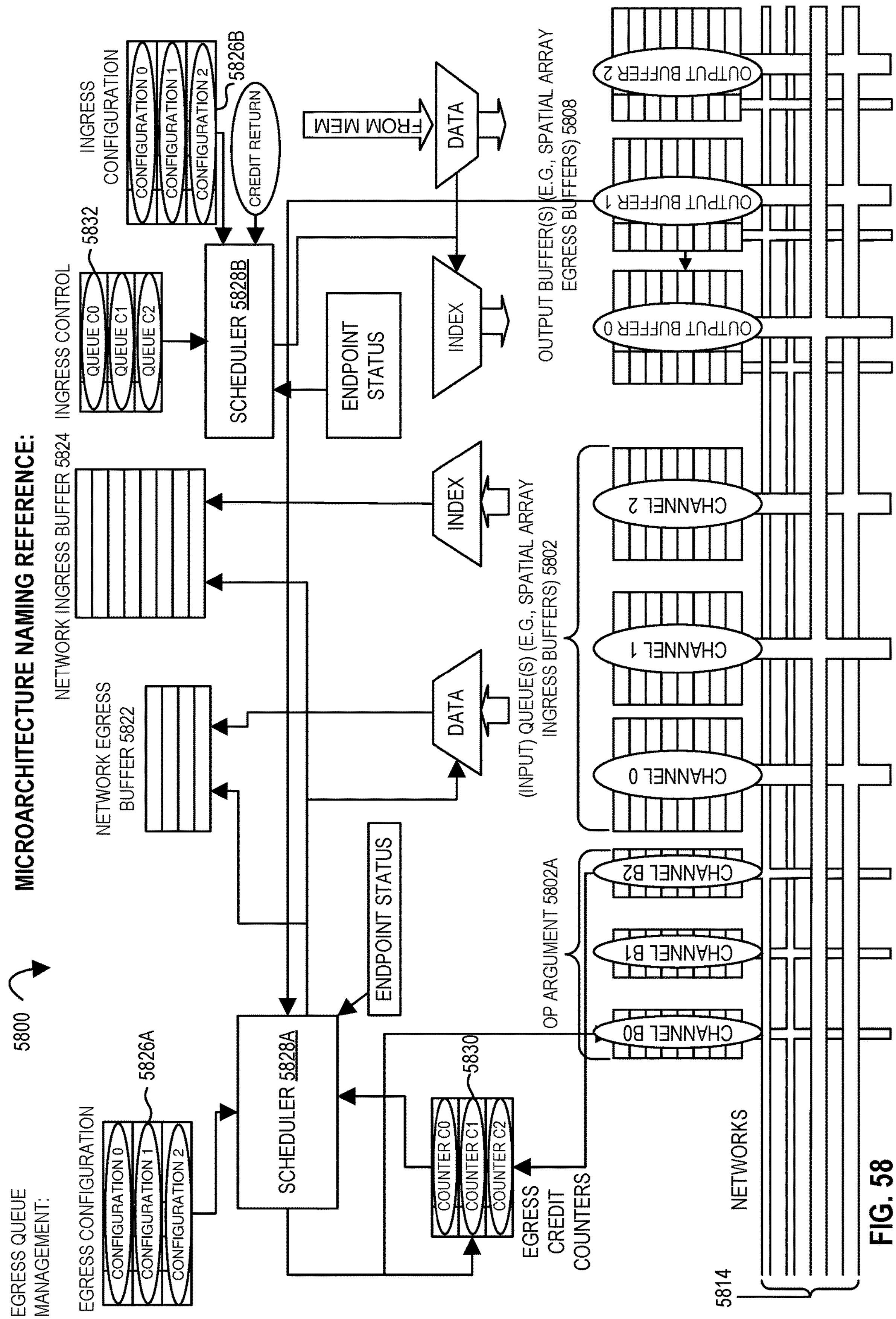
FIG. 58 illustrates a network dataflow endpoint circuit according to embodiments of the disclosure.

FIG. 58 illustrates a network dataflow endpoint circuit 5800 according to embodiments of the disclosure. In comparison to FIG. 47, network dataflow endpoint circuit 5800 has split the configuration and control into two separate schedulers. In one embodiment, egress scheduler 5828A is to schedule an operation on data that is to enter (e.g., from a circuit switched communication network coupled to) the dataflow endpoint circuit 5800 (e.g., at argument queue 5802, for example, spatial array ingress buffer 4702 as in FIG. 47) and output (e.g., from a packet switched communication network coupled to) the dataflow endpoint circuit 5800 (e.g., at network egress buffer 5822, for example, network egress buffer 4722 as in FIG. 47). In one embodiment, ingress scheduler 5828B is to schedule an operation on data that is to enter (e.g., from a packet switched communication network coupled to) the dataflow endpoint circuit 5800 (e.g., at network ingress buffer 5824, for example, network ingress buffer 5724 as in FIG. 47) and output (e.g., from a circuit switched communication network coupled to) the dataflow endpoint circuit 5800 (e.g., at output buffer 5808, for example, spatial array egress buffer 5708 as in FIG. 47). Scheduler 5828A and/or scheduler 5828B may include as an input the (e.g., operating) status of circuit 5800, e.g., fullness level of inputs (e.g., buffers 5802A, 5802), fullness level of outputs (e.g., buffers 5808), values (e.g., value in 5802A), etc. Scheduler 5828B may include a credit return circuit, for example, to denote that credit is returned to sender, e.g., after receipt in network ingress buffer 5824 of circuit 5800.

Figure 59:
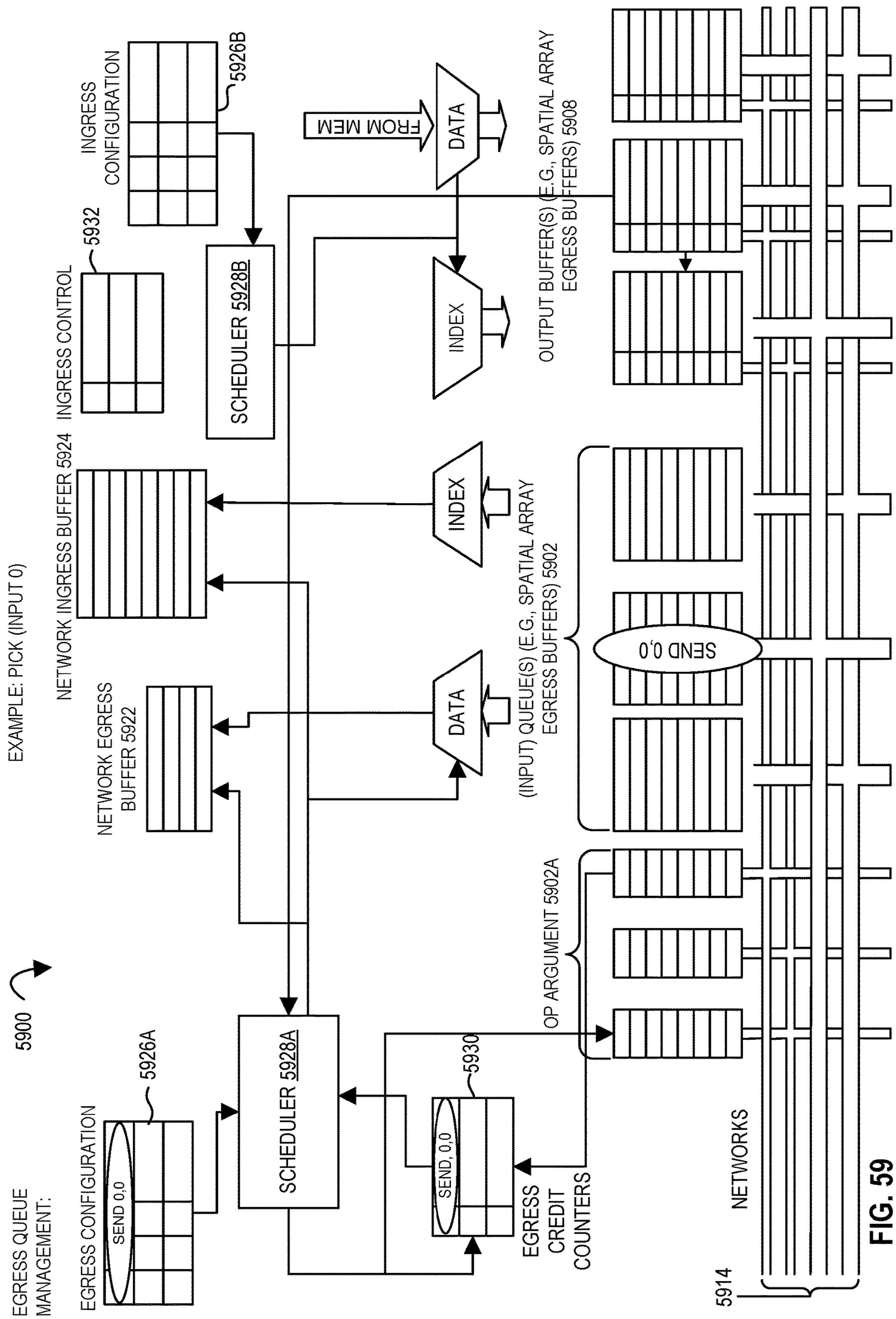
FIG. 59 illustrates a network dataflow endpoint circuit receiving input zero (0) while performing a pick operation according to embodiments of the disclosure.
Figure 60:
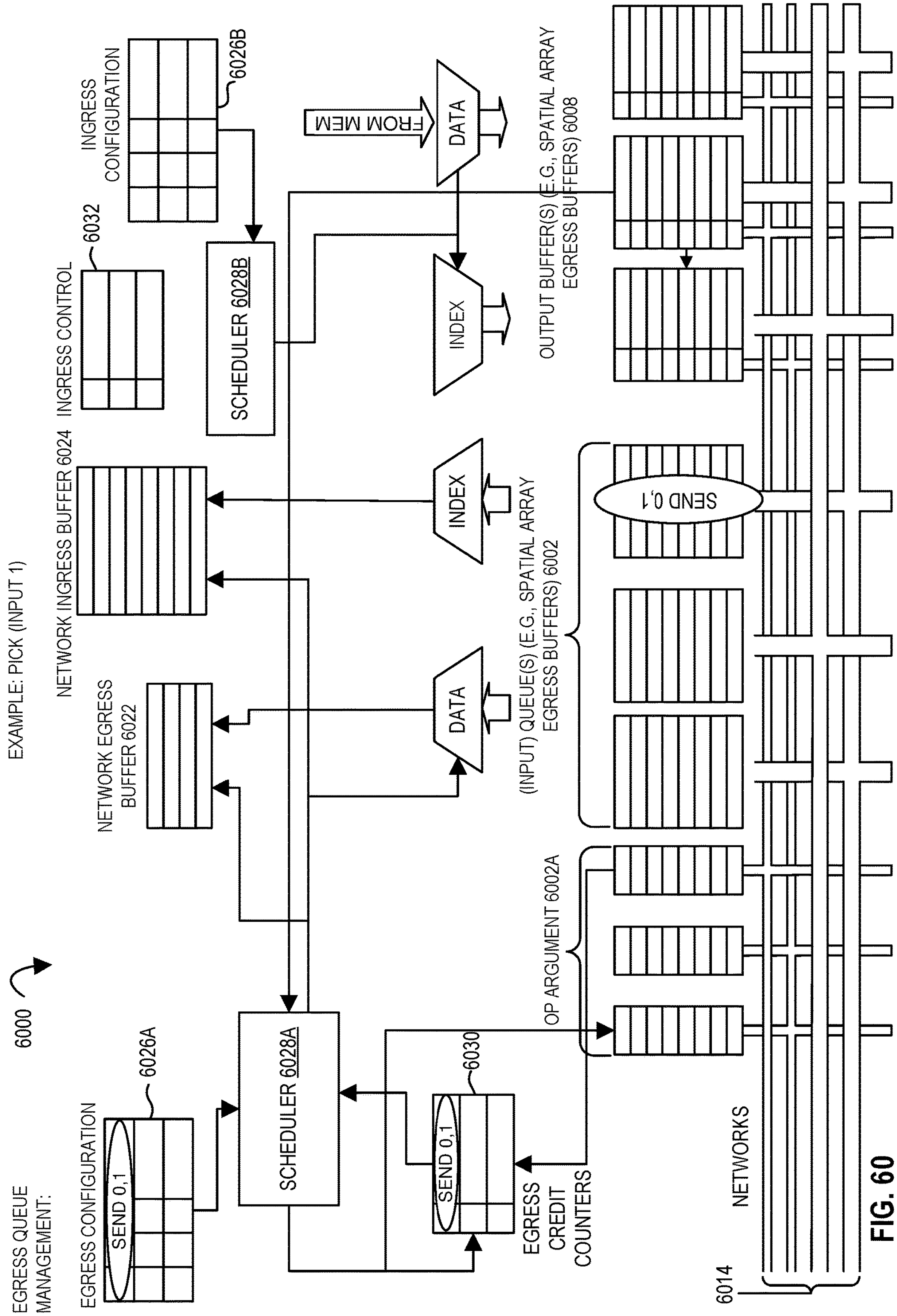
FIG. 60 illustrates a network dataflow endpoint circuit receiving input one (1) while performing a pick operation according to embodiments of the disclosure.
Figure 61:
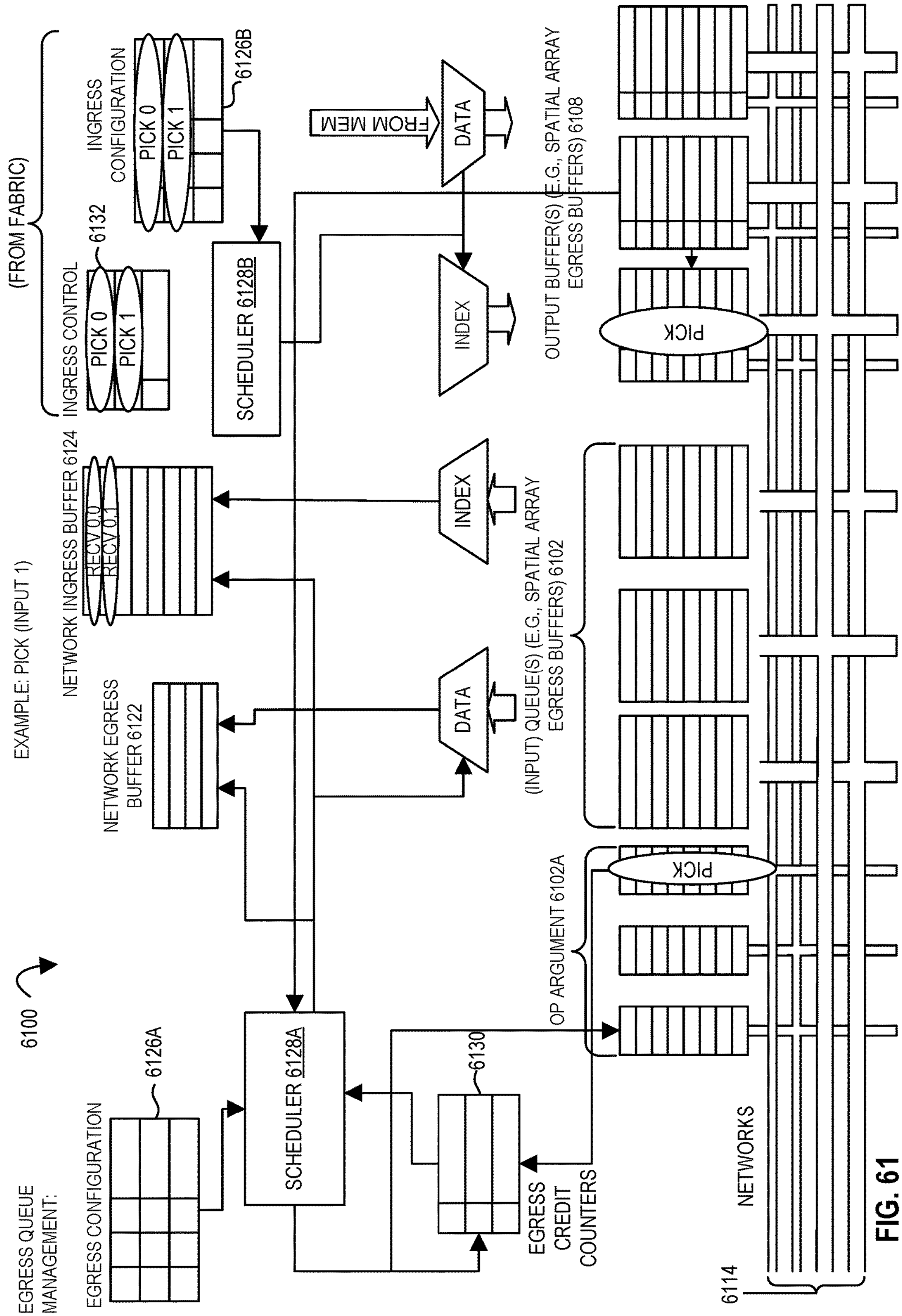
FIG. 61 illustrates a network dataflow endpoint circuit outputting the selected input while performing a pick operation according to embodiments of the disclosure.

Network 5814 may be a circuit switched network, e.g., as discussed herein. Additionally or alternatively, a packet switched network (e.g., as discussed herein) may also be utilized, for example, coupled to network egress buffer 5822, network ingress buffer 5824, or other components herein. Argument queue 5802 may include a control buffer 5802A, for example, to indicate when a respective input queue (e.g., buffer) includes a (new) item of data, e.g., as a single bit. Turning now to FIGS. 59-61, in one embodiment, these cumulatively show the configurations to create a distributed pick.

FIG. 59 illustrates a network dataflow endpoint circuit 5900 receiving input zero (0) while performing a pick operation according to embodiments of the disclosure, for example, as discussed above in reference to FIG. 46. In one embodiment, egress configuration 5926A is loaded (e.g., during a configuration step) with a portion of a pick operation that is to send data to a different network dataflow endpoint circuit (e.g., circuit 6100 in FIG. 61). In one embodiment, egress scheduler 5928A is to monitor the argument queue 5902 (e.g., data queue) for input data (e.g., from a processing element). According to an embodiment of the depicted data format, the "send" (e.g., a binary value therefor) indicates data is to be sent according to fields X, Y, with X being the value indicating a particular target network dataflow endpoint circuit (e.g., 0 being network dataflow endpoint circuit 6100 in FIG. 61) and Y being the value indicating which network ingress buffer (e.g., buffer 6124) location the value is to be stored. In one embodiment, Y is the value indicating a particular channel of a multiple channel (e.g., packet switched) network (e.g., 0 being channel 0 and/or buffer element 0 of network dataflow endpoint circuit 6100 in FIG. 61). When the input data arrives, it is then to be sent (e.g., from network egress buffer 5922) by network dataflow endpoint circuit 5900 to a different network dataflow endpoint circuit (e.g., network dataflow endpoint circuit 6100 in FIG. 61).

FIG. 60 illustrates a network dataflow endpoint circuit 6000 receiving input one (1) while performing a pick operation according to embodiments of the disclosure, for example, as discussed above in reference to FIG. 46. In one embodiment, egress configuration 6026A is loaded (e.g., during a configuration step) with a portion of a pick operation that is to send data to a different network dataflow endpoint circuit (e.g., circuit 6100 in FIG. 61). In one embodiment, egress scheduler 6028A is to monitor the argument queue 6020 (e.g., data queue 6002B) for input data (e.g., from a processing element). According to an embodiment of the depicted data format, the "send" (e.g., a binary value therefor) indicates data is to be sent according to fields X, Y, with X being the value indicating a particular target network dataflow endpoint circuit (e.g., 0 being network dataflow endpoint circuit 6100 in FIG. 61) and Y being the value indicating which network ingress buffer (e.g., buffer 6124) location the value is to be stored. In one embodiment, Y is the value indicating a particular channel of a multiple channel (e.g., packet switched) network (e.g., 1 being channel 1 and/or buffer element 1 of network dataflow endpoint circuit 6100 in FIG. 61). When the input data arrives, it is then to be sent (e.g., from network egress buffer 5922) by network dataflow endpoint circuit 6000 to a different network dataflow endpoint circuit (e.g., network dataflow endpoint circuit 6100 in FIG. 61).

FIG. 61 illustrates a network dataflow endpoint circuit 6100 outputting the selected input while performing a pick operation according to embodiments of the disclosure, for example, as discussed above in reference to FIG. 46. In one embodiment, other network dataflow endpoint circuits (e.g., circuit 5900 and circuit 6000) are to send their input data to network ingress buffer 6124 of circuit 6100. In one embodiment, ingress configuration 6126B is loaded (e.g., during a configuration step) with a portion of a pick operation that is to pick the data sent to network dataflow endpoint circuit 6100, e.g., according to a control value. In one embodiment, control value is to be received in ingress control 6132 (e.g., buffer). In one embodiment, ingress scheduler 6028A is to monitor the receipt of the control value and the input values (e.g., in network ingress buffer 6124). For example, if the control value says pick from buffer element A (e.g., 0 or 1 in this example) (e.g., from channel A) of network ingress buffer 6124, the value stored in that buffer element A is then output as a resultant of the operation by circuit 6100, for example, into an output buffer 6108, e.g., when output buffer has storage space (e.g., as indicated by a backpressure signal). In one embodiment, circuit 6100's output data is sent out when the egress buffer has a token (e.g., input data and control data) and the receiver asserts that it has buffer (e.g., indicating storage is available, although other assignments of resources are possible, this example is simply illustrative).

Figure 62:
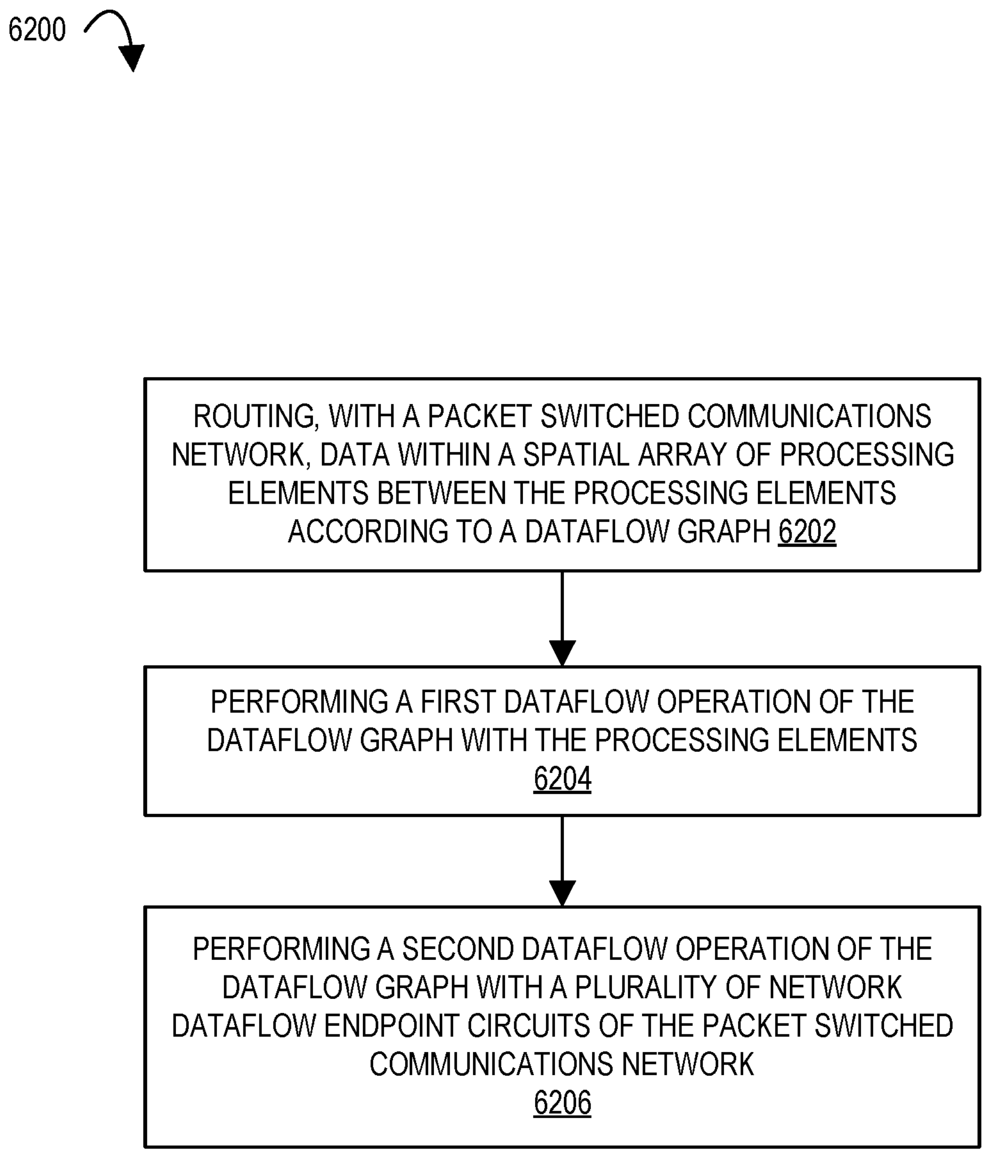
FIG. 62 illustrates a flow diagram according to embodiments of the disclosure.

FIG. 62 illustrates a flow diagram 6200 according to embodiments of the disclosure. Depicted flow 6200 includes providing a spatial array of processing elements 6202; routing, with a packet switched communications network, data within the spatial array between processing elements according to a dataflow graph 6204; performing a first dataflow operation of the dataflow graph with the processing elements 6206; and performing a second dataflow operation of the dataflow graph with a plurality of network dataflow endpoint circuits of the packet switched communications network 6208.

Referring again to FIG. 8, accelerator (e.g., CSA) 802 may perform (e.g., or request performance of) an access (e.g., a load and/or store) of data to one or more of plurality of cache banks (e.g., cache bank 808). A memory interface circuit (e.g., request address file (RAF) circuit(s)) may be included, e.g., as discussed herein, to provide access between memory (e.g., cache banks) and the accelerator 802. Referring again to FIG. 44, a requesting circuit (e.g., a processing element) may perform (e.g., or request performance of) an access (e.g., a load and/or store) of data to one or more of plurality of cache banks (e.g., cache bank 4402). A memory interface circuit (e.g., request address file (RAF) circuit(s)) may be included, e.g., as discussed herein, to provide access between memory (e.g., one or more banks of the cache memory) and the accelerator (e.g., one or more of accelerator tiles (4408, 4410, 4412, 4414)). Referring again to FIGS. 46 and/or 47, a requesting circuit (e.g., a processing element) may perform (e.g., or request performance of) an access (e.g., a load and/or store) of data to one or more of a plurality of cache banks. A memory interface circuit (for example, request address file (RAF) circuit(s), e.g., RAF/cache interface 4612) may be included, e.g., as discussed herein, to provide access between memory (e.g., one or more banks of the cache memory) and the accelerator (e.g., one or more of the processing elements and/or network dataflow endpoint circuits (e.g., circuits 4602, 4604, 4606)).

In certain embodiments, an accelerator (e.g., a PE thereof) couples to a RAF circuit or a plurality of RAF circuits through (i) a circuit switched network (for example, as discussed herein, e.g., in reference to FIGS. 6-44) or (ii) through a packet switched network (for example, as discussed herein, e.g., in reference to FIGS. 45-62)

In certain embodiments, a circuit (e.g., a request address file (RAF) circuit) (e.g., each of a plurality of RAF circuits) includes a translation lookaside buffer (TLB) (e.g., TLB circuit). TLB may receive an input of a virtual address and output a physical address corresponding to the mapping (e.g., address mapping) of the virtual address to the physical address (e.g., different than any mapping of a dataflow graph to hardware). A virtual address may be an address as seen by a program running on circuitry (e.g., on an accelerator and/or processor). A physical address may be an (e.g., different than the virtual) address in memory hardware. A TLB may include a data structure (e.g., table) to store (e.g., recently used) virtual-to-physical memory address translations, e.g., such that the translation does not have to be performed on each virtual address present to obtain the physical memory address corresponding to that virtual address. If the virtual address entry is not in the TLB, a circuit (e.g., a TLB manager circuit) may perform a page walk to determine the virtual-to-physical memory address translation. In one embodiment, a circuit (e.g., a RAF circuit) is to receive an input of a virtual address for translation in a TLB (e.g., TLB in RAF circuit) from a requesting entity (e.g., a PE or other hardware component) via a circuit switched network, e.g., as in FIGS. 6-44. Additionally or alternatively, a circuit (e.g., a RAF circuit) may receive an input of a virtual address for translation in a TLB (e.g., TLB in RAF circuit) from a requesting entity (e.g., a PE, network dataflow endpoint circuit, or other hardware component) via a packet switched network, e.g., as in FIGS. 45-62. In certain embodiments, data received for a memory (e.g., cache) access request is a memory command. A memory command may include the virtual address to-be-accessed, operation to be performed (e.g., a load or a store), and/or payload data (e.g., for a store).

In certain embodiments, the request data received for a memory (e.g., cache) access request is received by a request address file circuit or circuits, e.g., of a configurable spatial accelerator. Certain embodiments of spatial architectures are an energy-efficient and high-performance way of accelerating user applications. One of the ways that a spatial accelerator(s) may achieve energy efficiency is through spatial distribution, e.g., rather than energy-hungry, centralized structures present in cores, spatial architectures may generally use small, disaggregated structures (e.g., which are both simpler and more energy efficient). For example, the circuit (e.g., spatial array) of FIG. 44 may spread its load and store operations across several RAFs. This organization may result in a reduction in the size of address translation buffers (e.g., TLBs) at each RAF (e.g., in comparison to using fewer (or a single) TLB in the RAF). Certain embodiments herein provide for distributed coordination for distributed structures (e.g., distributed TLBs), e.g., in contrast to a local management circuit. As discussed further below, embodiments herein include unified translation lookaside buffer (TLB) management hardware or distributed translation lookaside buffer (TLB) management hardware, e.g., for a shared virtual memory.

Certain embodiments herein provide for shared virtual memory microarchitecture, e.g., that facilitates programming by providing a memory paradigm in the accelerator. Certain embodiments herein do not utilize a monolithic (e.g., single) translation mechanism (e.g., TLB) per accelerator. Certain embodiments herein utilize distributed TLBs, e.g., that are not in the accelerator (e.g., not in the fabric of an accelerator). Certain embodiments herein provide for a (e.g., complex part of) the shared virtual memory control to be implemented in hardware. Certain embodiments herein provide the microarchitecture for an accelerator virtual memory translation mechanism. In certain embodiment of this microarchitecture, a distributed set of TLBs are used, e.g., such that many parallel accesses to memory are simultaneously translated.

2.6 Translation Lookaside Buffer (TLB) Management Hardware

Certain embodiments herein include multiple (e.g., L1) TLBs, but as a single, next level (e.g., second-level) TLB to balance a desire for low energy usage at the L1 TLB and reduced page walks (e.g., for misses in the L1 TLB). Certain embodiments herein provide a unified L2 TLB microarchitecture with a single L2 TLB located outside of a RAF circuit. A (e.g., each of a plurality of) L1 TLB may refer to (e.g. cause an access of) a L2 TLB first when a miss occurs, for example, and misses in L2 TLB may result in the invocation of a page walk. Certain embodiments herein provide a distributed, multiple (e.g., two) level TLB microarchitecture. Certain embodiments of this microarchitecture improve the performance of an accelerator by reducing the TLB miss penalty of the energy efficient L1 TLBs. Messages (e.g., commands) may be carried between the two level TLBs (e.g., and the page walker) by a network, which may also be shared with other (e.g., not translation or not TLB related) memory requests. Page walker may be privileged, for example, operate in privileged mode in contract to a use mode, e.g., page walker may access page table which is privileged data. In one embodiment with multiple (e.g., L2) caches, a respective page walker may be included at each cache.

2.7 Floating Point Support

Figure 63:
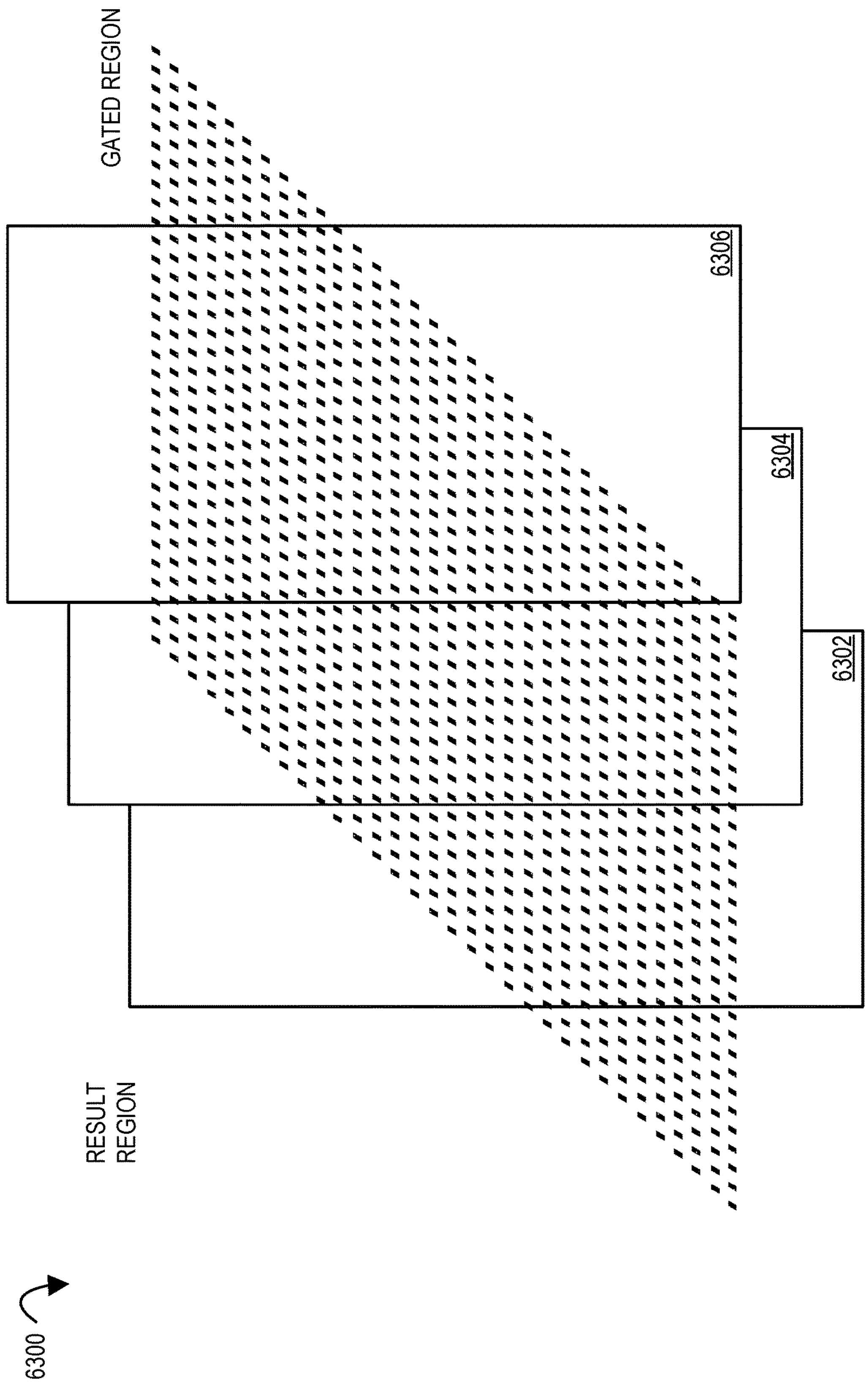
FIG. 63 illustrates a floating point multiplier partitioned into three regions (the result region, three potential carry regions, and the gated region) according to embodiments of the disclosure.

Certain HPC applications are characterized by their need for significant floating point bandwidth. To meet this need, embodiments of a CSA may be provisioned with multiple (e.g., between 128 and 256 each) of floating add and multiplication PEs, e.g., depending on tile configuration. A CSA may provide a few other extended precision modes, e.g., to simplify math library implementation. CSA floating point PEs may support both single and double precision, but lower precision PEs may support machine learning workloads. A CSA may provide an order of magnitude more floating point performance than a processor core. In one embodiment, in addition to increasing floating point bandwidth, in order to power all of the floating point units, the energy consumed in floating point operations is reduced. For example, to reduce energy, a CSA may selectively gate the low-order bits of the floating point multiplier array. In examining the behavior of floating point arithmetic, the low order bits of the multiplication array may often not influence the final, rounded product. FIG. 63 illustrates a floating point multiplier 6300 partitioned into three regions (the result region, three potential carry regions (6302, 6304, 6306), and the gated region) according to embodiments of the disclosure. In certain embodiments, the carry region is likely to influence the result region and the gated region is unlikely to influence the result region. Considering a gated region of g bits, the maximum carry may be:

$$\text{carry}_g \leq \frac{1}{2^g}\sum_{1}^{g} i2^{i-1} \leq \sum_{1}^{g} \frac{i}{2^g} - \sum_{1}^{g} \frac{1}{2^g} + 1 \leq g - 1$$

Given this maximum carry, if the result of the carry region is less than $2^c$-g, where the carry region is c bits wide, then the gated region may be ignored since it does not influence the result region. Increasing g means that it is more likely the gated region will be needed, while increasing c means that, under random assumption, the gated region will be unused and may be disabled to avoid energy consumption. In embodiments of a CSA floating multiplication PE, a two stage pipelined approach is utilized in which first the carry region is determined and then the gated region is determined if it is found to influence the result. If more information about the context of the multiplication is known, a CSA more aggressively tune the size of the gated region. In FMA, the multiplication result may be added to an accumulator, which is often much larger than either of the multiplicands. In this case, the addend exponent may be observed in advance of multiplication and the CSDA may adjust the gated region accordingly. One embodiment of the CSA includes a scheme in which a context value, which bounds the minimum result of a computation, is provided to related multipliers, in order to select minimum energy gating configurations.

2.8 Runtime Services

Figure 64:
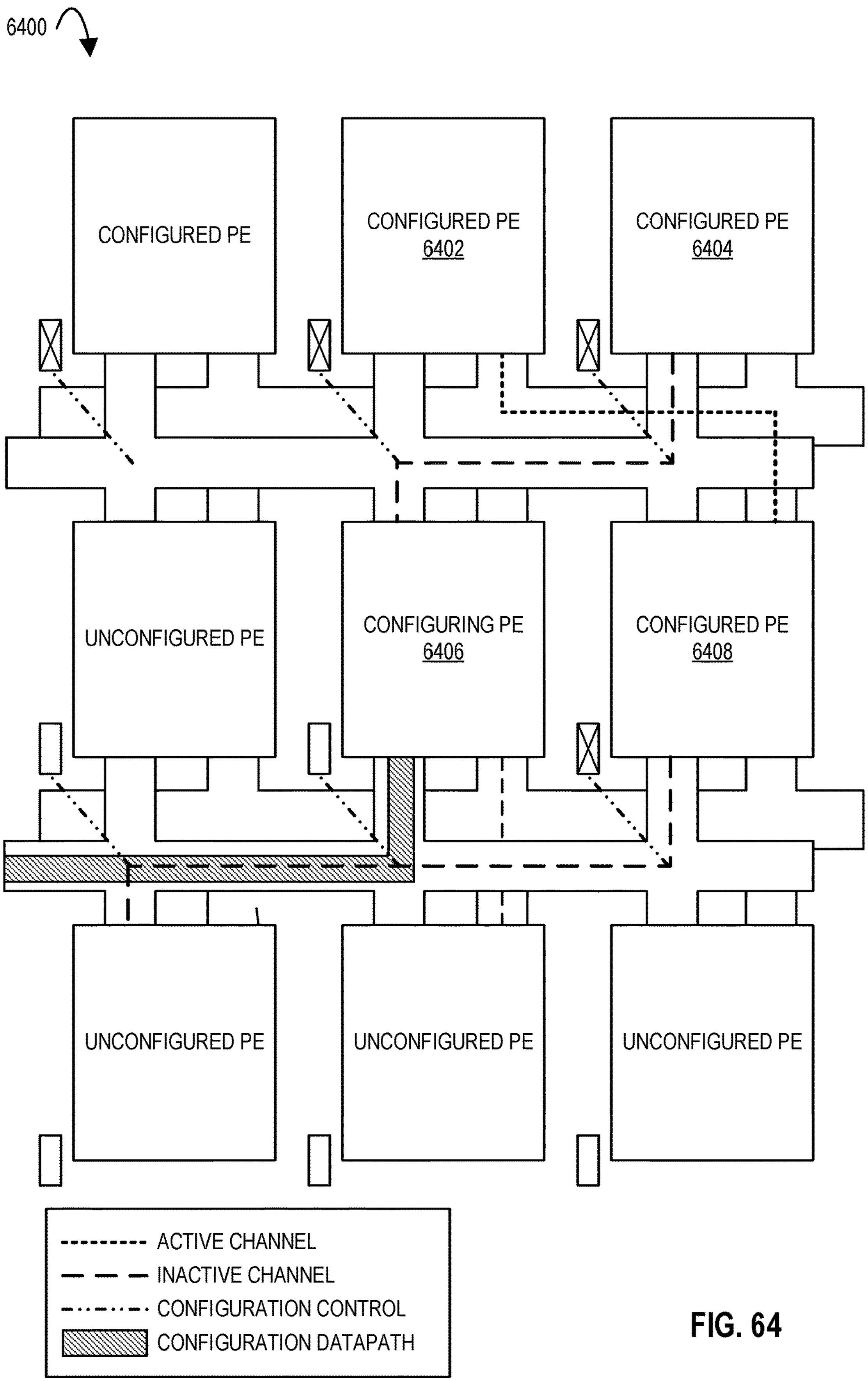
FIG. 64 illustrates an in-flight configuration of an accelerator with a plurality of processing elements according to embodiments of the disclosure.

In certain embodiment, a CSA includes a heterogeneous and distributed fabric, and consequently, runtime service implementations are to accommodate several kinds of PEs in a parallel and distributed fashion. Although runtime services in a CSA may be critical, they may be infrequent relative to user-level computation. Certain implementations, therefore, focus on overlaying services on hardware resources. To meet these goals, CSA runtime services may be cast as a hierarchy, e.g., with each layer corresponding to a CSA network. At the tile level, a single external-facing controller may accepts or sends service commands to an associated core with the CSA tile. A tile-level controller may serve to coordinate regional controllers at the RAFs, e.g., using the ACI network. In turn, regional controllers may coordinate local controllers at certain mezzanine network stops (e.g., network dataflow endpoint circuits). At the lowest level, service specific micro-protocols may execute over the local network, e.g., during a special mode controlled through the mezzanine controllers. The micro-protocols may permit each PE (e.g., PE class by type) to interact with the runtime service according to its own needs. Parallelism is thus implicit in this hierarchical organization, and operations at the lowest levels may occur simultaneously. This parallelism may enables the configuration of a CSA tile in between hundreds of nanoseconds to a few microseconds, e.g., depending on the configuration size and its location in the memory hierarchy. Embodiments of the CSA thus leverage properties of dataflow graphs to improve implementation of each runtime service. One key observation is that runtime services may need only to preserve a legal logical view of the dataflow graph, e.g., a state that can be produced through some ordering of dataflow operator executions. Services may generally not need to guarantee a temporal view of the dataflow graph, e.g., the state of a dataflow graph in a CSA at a specific point in time. This may permit the CSA to conduct most runtime services in a distributed, pipelined, and parallel fashion, e.g., provided that the service is orchestrated to preserve the logical view of the dataflow graph. The local configuration micro-protocol may be a packet-based protocol overlaid on the local network. Configuration targets may be organized into a configuration chain, e.g., which is fixed in the microarchitecture. Fabric (e.g., PE) targets may be configured one at a time, e.g., using a single extra register per target to achieve distributed coordination. To start configuration, a controller may drive an out-of-band signal which places all fabric targets in its neighborhood into an unconfigured, paused state and swings multiplexors in the local network to a pre-defined conformation. As the fabric (e.g., PE) targets are configured, that is they completely receive their configuration packet, they may set their configuration microprotocol registers, notifying the immediately succeeding target (e.g., PE) that it may proceed to configure using the subsequent packet. There is no limitation to the size of a configuration packet, and packets may have dynamically variable length. For example, PEs configuring constant operands may have a configuration packet that is lengthened to include the constant field (e.g., X and Y in FIGS. 3B-3C). FIG. 64 illustrates an in-flight configuration of an accelerator 6400 with a plurality of processing elements (e.g., PEs 6402, 6404, 6406, 6408) according to embodiments of the disclosure. Once configured, PEs may execute subject to dataflow constraints. However, channels involving unconfigured PEs may be disabled by the microarchitecture, e.g., preventing any undefined operations from occurring. These properties allow embodiments of a CSA to initialize and execute in a distributed fashion with no centralized control whatsoever. From an unconfigured state, configuration may occur completely in parallel, e.g., in perhaps as few as 200 nanoseconds. However, due to the distributed initialization of embodiments of a CSA, PEs may become active, for example sending requests to memory, well before the entire fabric is configured. Extraction may proceed in much the same way as configuration. The local network may be conformed to extract data from one target at a time, and state bits used to achieve distributed coordination. A CSA may orchestrate extraction to be non-destructive, that is, at the completion of extraction each extractable target has returned to its starting state. In this implementation, all state in the target may be circulated to an egress register tied to the local network in a scan-like fashion. Although in-place extraction may be achieved by introducing new paths at the register-transfer level (RTL), or using existing lines to provide the same functionalities with lower overhead. Like configuration, hierarchical extraction is achieved in parallel.

Figure 65:
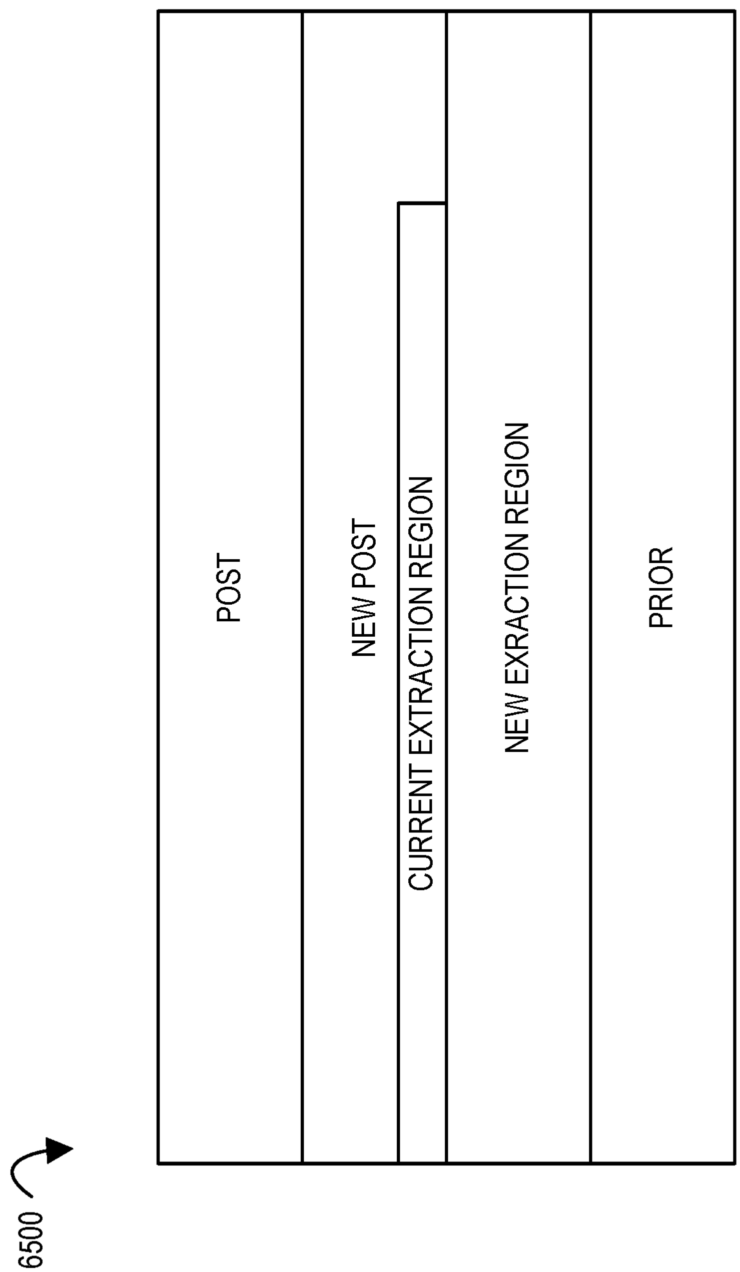
FIG. 65 illustrates a snapshot of an in-flight, pipelined extraction according to embodiments of the disclosure.

FIG. 65 illustrates a snapshot 6500 of an in-flight, pipelined extraction according to embodiments of the disclosure. In some use cases of extraction, such as checkpointing, latency may not be a concern so long as fabric throughput is maintained. In these cases, extraction may be orchestrated in a pipelined fashion. This arrangement, shown in FIG. 65, permits most of the fabric to continue executing, while a narrow region is disabled for extraction. Configuration and extraction may be coordinated and composed to achieve a pipelined context switch. Exceptions may differ qualitatively from configuration and extraction in that, rather than occurring at a specified time, they arise anywhere in the fabric at any point during runtime. Thus, in one embodiment, the exception micro-protocol may not be overlaid on the local network, which is occupied by the user program at runtime, and utilizes its own network. However, by nature, exceptions are rare and insensitive to latency and bandwidth. Thus certain embodiments of CSA utilize a packet switched network to carry exceptions to the local mezzanine stop, e.g., where they are forwarded up the service hierarchy (e.g., as in FIG. 80). Packets in the local exception network may be extremely small. In many cases, a PE identification (ID) of only two to eight bits suffices as a complete packet, e.g., since the CSA may create a unique exception identifier as the packet traverses the exception service hierarchy. Such a scheme may be desirable because it also reduces the area overhead of producing exceptions at each PE.

3. COMPILATION

The ability to compile programs written in high-level languages onto a CSA may be essential for industry adoption. This section gives a high-level overview of compilation strategies for embodiments of a CSA. First is a proposal for a CSA software framework that illustrates the desired properties of an ideal production-quality toolchain. Next, a prototype compiler framework is discussed. A "control-to-dataflow conversion" is then discussed, e.g., to converts ordinary sequential control-flow code into CSA dataflow assembly code.

3.1 Example Production Framework

Figure 66:
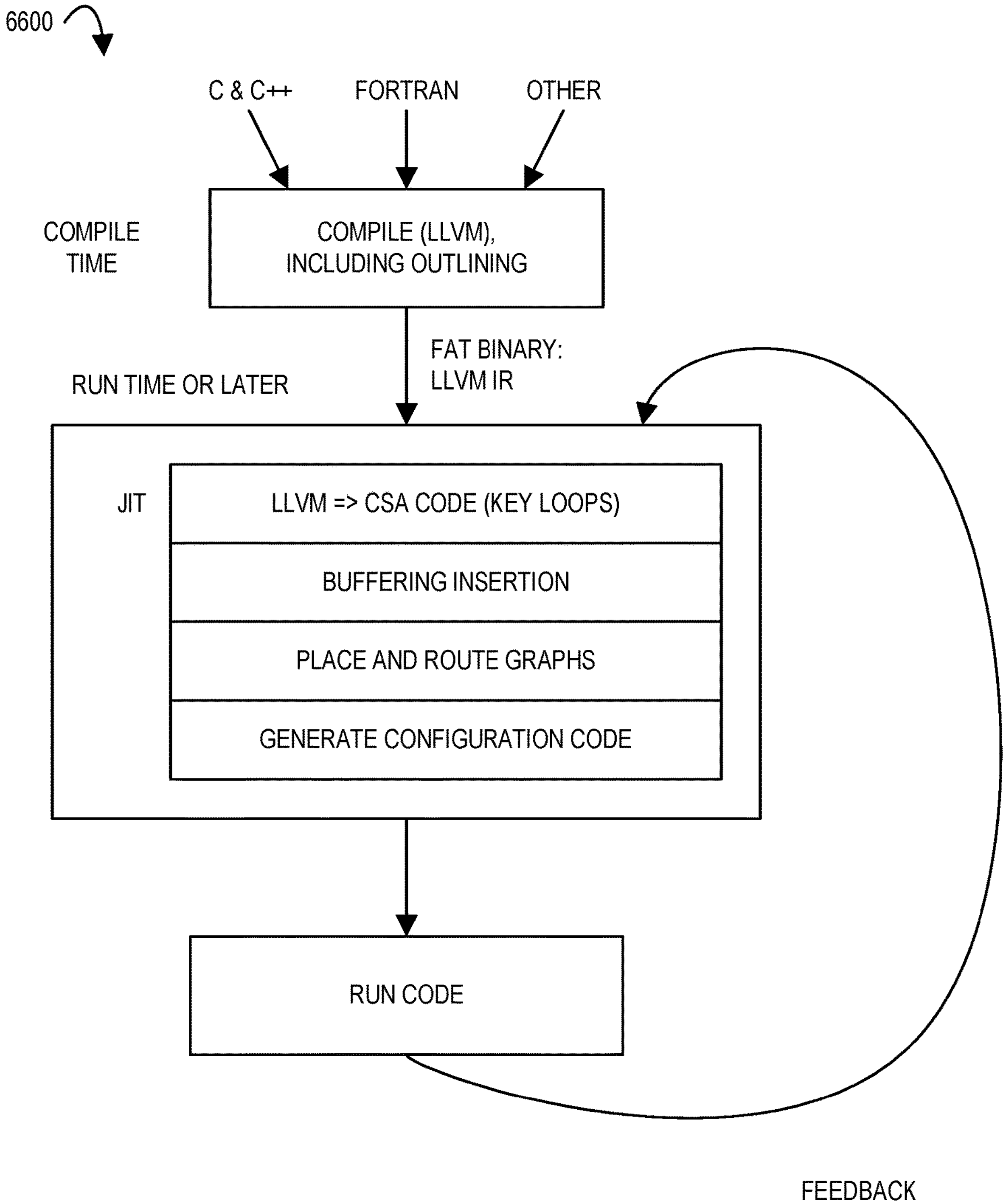
FIG. 66 illustrates a compilation toolchain for an accelerator according to embodiments of the disclosure.

FIG. 66 illustrates a compilation toolchain 6600 for an accelerator according to embodiments of the disclosure. This toolchain compiles high-level languages (such as C, C++, and Fortran) into a combination of host code (LLVM) intermediate representation (IR) for the specific regions to be accelerated. The CSA-specific portion of this compilation toolchain takes LLVM IR as its input, optimizes and compiles this IR into a CSA assembly, e.g., adding appropriate buffering on latency-insensitive channels for performance. It then places and routes the CSA assembly on the hardware fabric, and configures the PEs and network for execution. In one embodiment, the toolchain supports the CSA-specific compilation as a just-in-time (JIT), incorporating potential runtime feedback from actual executions. One of the key design characteristics of the framework is compilation of (LLVM) IR for the CSA, rather than using a higher-level language as input. While a program written in a high-level programming language designed specifically for the CSA might achieve maximal performance and/or energy efficiency, the adoption of new high-level languages or programming frameworks may be slow and limited in practice because of the difficulty of converting existing code bases. Using (LLVM) IR as input enables a wide range of existing programs to potentially execute on a CSA, e.g., without the need to create a new language or significantly modify the front-end of new languages that want to run on the CSA.

3.2 Prototype Compiler

Figure 67:
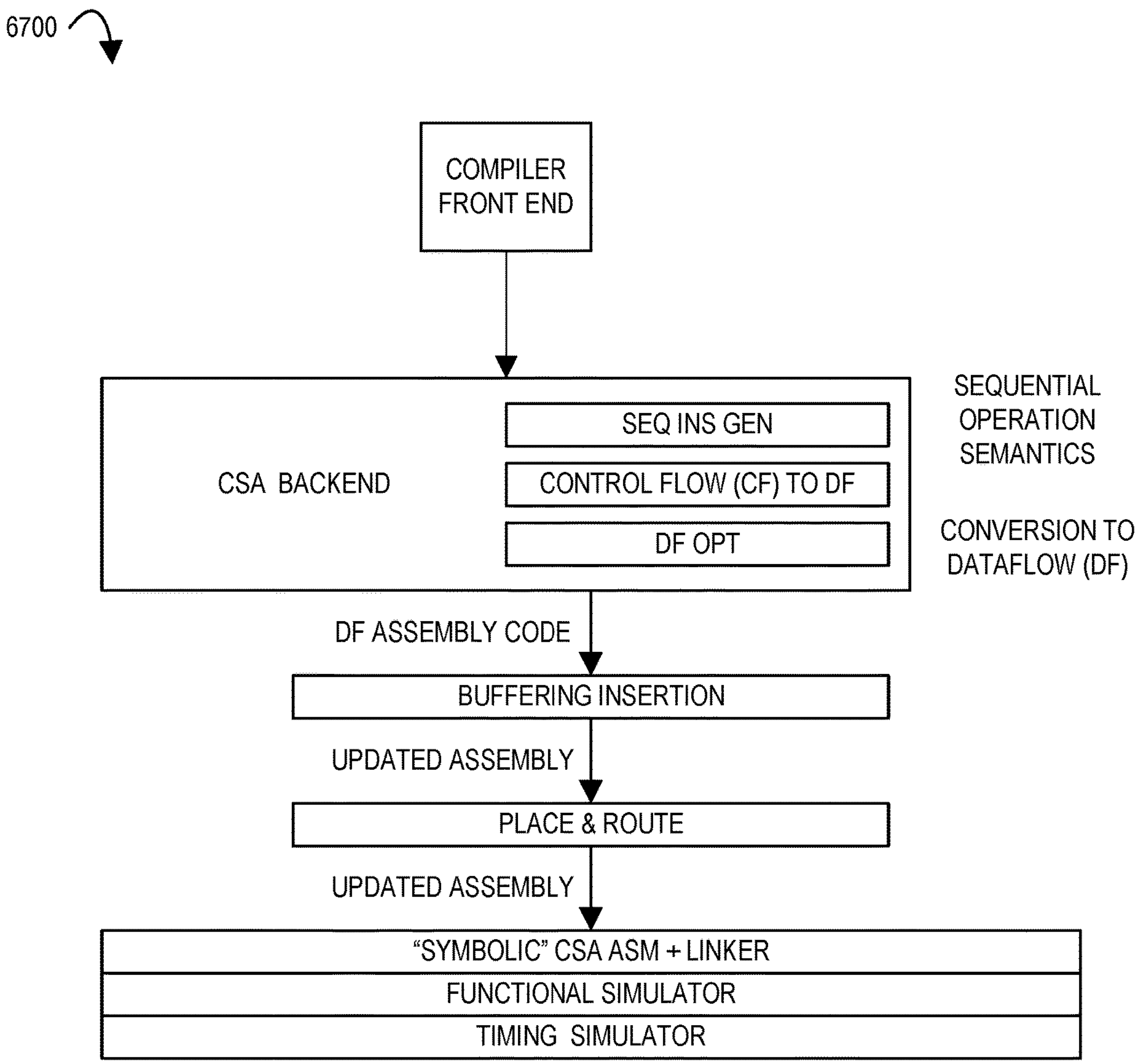
FIG. 67 illustrates a compiler for an accelerator according to embodiments of the disclosure.

FIG. 67 illustrates a compiler 6700 for an accelerator according to embodiments of the disclosure. Compiler 6700 initially focuses on ahead-of-time compilation of C and C++ through the (e.g., Clang) front-end. To compile (LLVM) IR, the compiler implements a CSA back-end target within LLVM with three main stages. First, the CSA back-end lowers LLVM IR into a target-specific machine instructions for the sequential unit, which implements most CSA operations combined with a traditional RISC-like control-flow architecture (e.g., with branches and a program counter). The sequential unit in the toolchain may serve as a useful aid for both compiler and application developers, since it enables an incremental transformation of a program from control flow (CF) to dataflow (DF), e.g., converting one section of code at a time from control-flow to dataflow and validating program correctness. The sequential unit may also provide a model for handling code that does not fit in the spatial array. Next, the compiler converts these control-flow instructions into dataflow operators (e.g., code) for the CSA. This phase is described later in Section 3.3. Then, the CSA back-end may run its own optimization passes on the dataflow instructions. Finally, the compiler may dump the instructions in a CSA assembly format. This assembly format is taken as input to late-stage tools which place and route the dataflow instructions on the actual CSA hardware.

3.3 Control to Dataflow Conversion

A key portion of the compiler may be implemented in the control-to-dataflow conversion pass, or dataflow conversion pass for short. This pass takes in a function represented in control flow form, e.g., a control-flow graph (CFG) with sequential machine instructions operating on virtual registers, and converts it into a dataflow function that is conceptually a graph of dataflow operations (instructions) connected by latency-insensitive channels (LICs). This section gives a high-level description of this pass, describing how it conceptually deals with memory operations, branches, and loops in certain embodiments.

Straight-Line Code

Figure 68C:
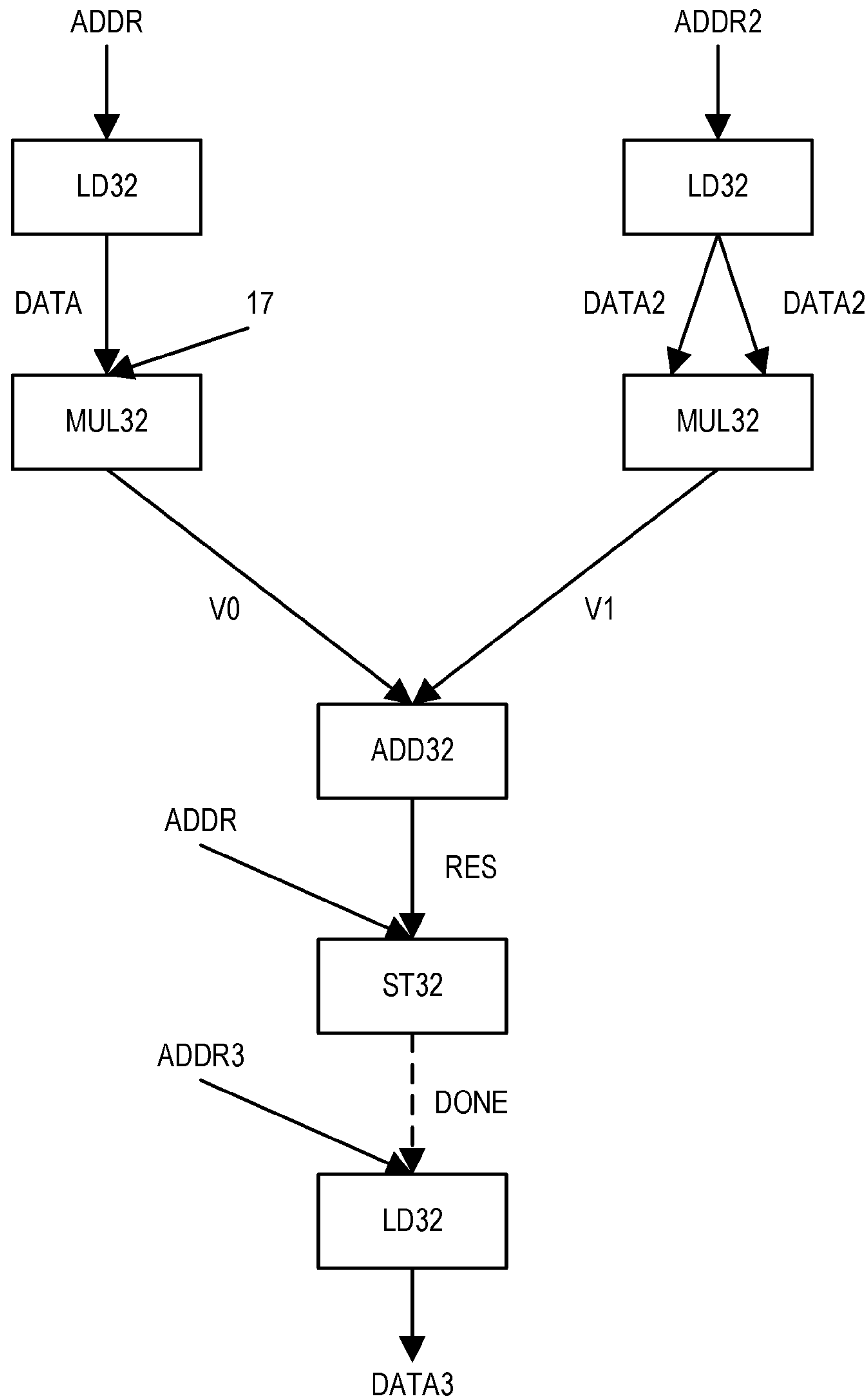
FIG. 68C illustrates a dataflow graph for the dataflow assembly code of FIG. 68B for an accelerator according to embodiments of the disclosure.

FIG. 68A illustrates sequential assembly code 6802 according to embodiments of the disclosure. FIG. 68B illustrates dataflow assembly code 6804 for the sequential assembly code 6802 of FIG. 68A according to embodiments of the disclosure. FIG. 68C illustrates a dataflow graph 6806 for the dataflow assembly code 6804 of FIG. 68B for an accelerator according to embodiments of the disclosure.

First, consider the simple case of converting straight-line sequential code to dataflow. The dataflow conversion pass may convert a basic block of sequential code, such as the code shown in FIG. 68A into CSA assembly code, shown in FIG. 68B. Conceptually, the CSA assembly in FIG. 68B represents the dataflow graph shown in FIG. 68C. In this example, each sequential instruction is translated into a matching CSA assembly. The .lic statements (e.g., for data) declare latency-insensitive channels which correspond to the virtual registers in the sequential code (e.g., Rdata). In practice, the input to the dataflow conversion pass may be in numbered virtual registers. For clarity, however, this section uses descriptive register names. Note that load and store operations are supported in the CSA architecture in this embodiment, allowing for many more programs to run than an architecture supporting only pure dataflow. Since the sequential code input to the compiler is in SSA (singlestatic assignment) form, for a simple basic block, the control-to-dataflow pass may convert each virtual register definition into the production of a single value on a latency-insensitive channel. The SSA form allows multiple uses of a single definition of a virtual register, such as in Rdata2). To support this model, the CSA assembly code supports multiple uses of the same LIC (e.g., data2), with the simulator implicitly creating the necessary copies of the LIC s. One key difference between sequential code and dataflow code is in the treatment of memory operations. The code in FIG. 68A is conceptually serial, which means that the load32 (ld32) of addr3 should appear to happen after the st32 of addr, in case that addr and addr3 addresses overlap.

Branches

To convert programs with multiple basic blocks and conditionals to dataflow, the compiler generates special dataflow operators to replace the branches. More specifically, the compiler uses switch operators to steer outgoing data at the end of a basic block in the original CFG, and pick operators to select values from the appropriate incoming channel at the beginning of a basic block. As a concrete example, consider the code and corresponding dataflow graph in FIGS. 69A-69C, which conditionally computes a value of y based on several inputs: a i, x, and n. After computing the branch condition test, the dataflow code uses a switch operator (e.g., see FIGS. 3B-3C) steers the value in channel x to channel xF if test is 0, or channel xT if test is 1. Similarly, a pick operator (e.g., see FIGS. 3B-3C) is used to send channel yF to y if test is 0, or send channel yT to y if test is 1. In this example, it turns out that even though the value of a is only used in the true branch of the conditional, the CSA is to include a switch operator which steers it to channel aT when test is 1, and consumes (eats) the value when test is 0. This latter case is expressed by setting the false output of the switch to % ign. It may not be correct to simply connect channel a directly to the true path, because in the cases where execution actually takes the false path, this value of "a" will be left over in the graph, leading to incorrect value of a for the next execution of the function. This example highlights the property of control equivalence, a key property in embodiments of correct dataflow conversion.

Control Equivalence: Consider a single-entry-single-exit control flow graph G with two basic blocks A and B. A and B are control-equivalent if all complete control flow paths through G visit A and B the same number of times.

Figure 69C:
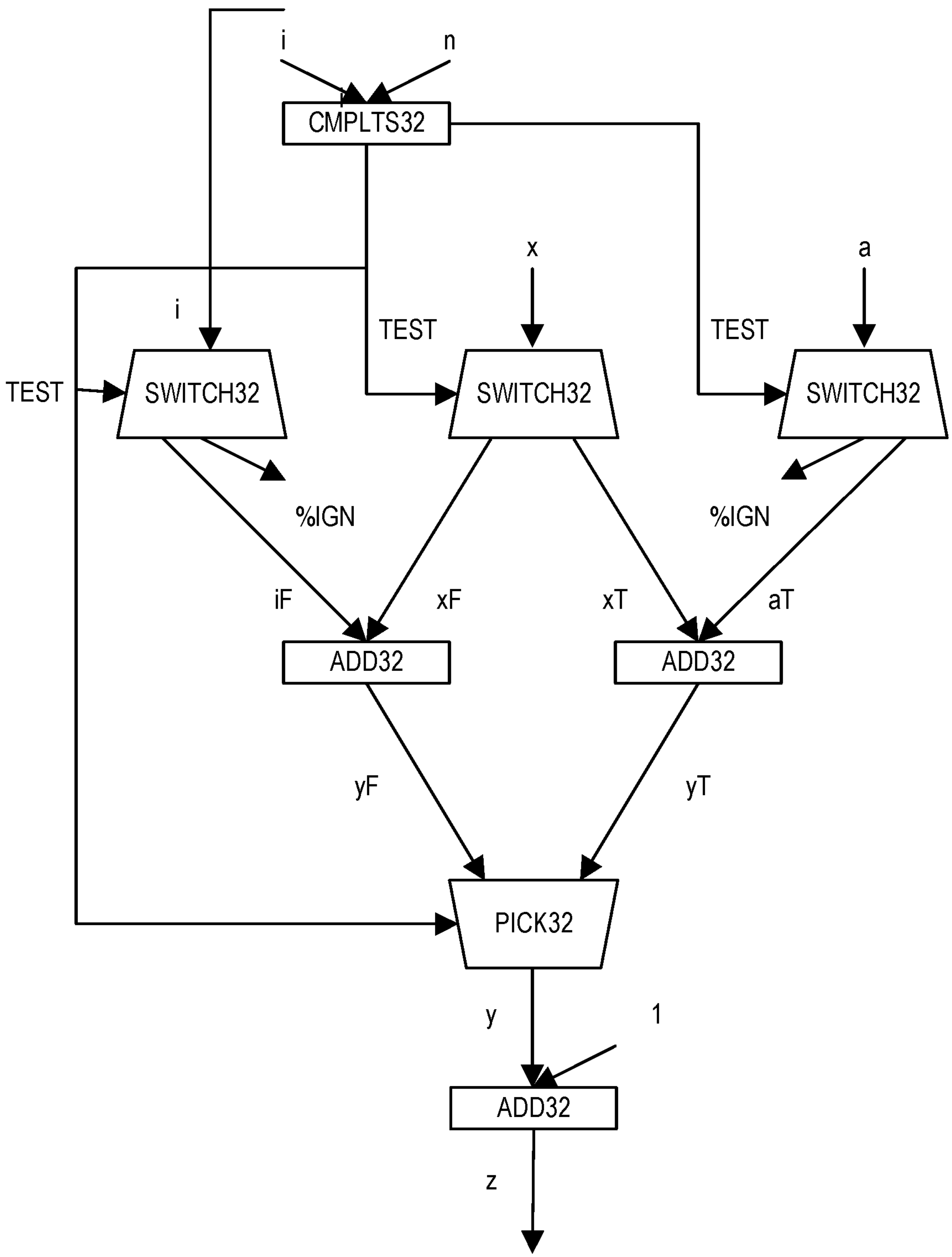
FIG. 69C illustrates a dataflow graph for the dataflow assembly code of FIG. 69B for an accelerator according to embodiments of the disclosure.

LIC Replacement: In a control flow graph G, suppose an operation in basic block A defines a virtual register x, and an operation in basic block B that uses x. Then a correct control-to-dataflow transformation can replace x with a latency-insensitive channel only if A and B are control equivalent. The control-equivalence relation partitions the basic blocks of a CFG into strong control-dependence regions. FIG. 69A illustrates C source code 6902 according to embodiments of the disclosure. FIG. 69B illustrates dataflow assembly code 6904 for the C source code 6902 of FIG. 69A according to embodiments of the disclosure. FIG. 69C illustrates a dataflow graph 6906 for the dataflow assembly code 6904 of FIG. 69B for an accelerator according to embodiments of the disclosure. In the example in FIGS. 69A-69C, the basic block before and after the conditionals are control-equivalent to each other, but the basic blocks in the true and false paths are each in their own control dependence region. One correct algorithm for converting a CFG to dataflow is to have the compiler insert (1) switches to compensate for the mismatch in execution frequency for any values that flow between basic blocks which are not control equivalent, and (2) picks at the beginning of basic blocks to choose correctly from any incoming values to a basic block. Generating the appropriate control signals for these picks and switches may be the key part of dataflow conversion.

Loops

Figure 70C:
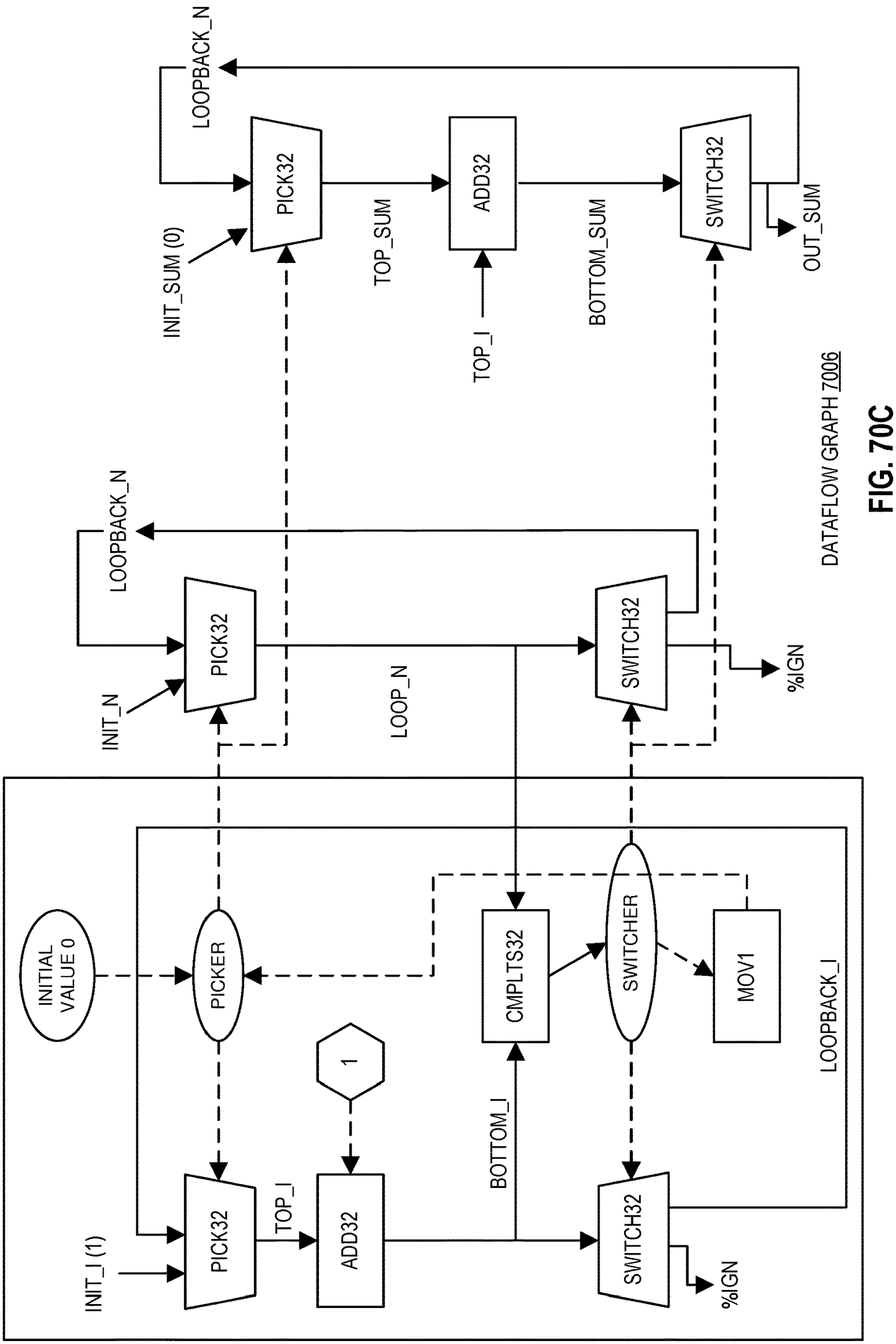
FIG. 70C illustrates a dataflow graph for the dataflow assembly code of FIG. 70B for an accelerator according to embodiments of the disclosure.

Another important class of CFGs in dataflow conversion are CFGs for single-entry-single-exit loops, a common form of loop generated in (LLVM) IR. These loops may be almost acyclic, except for a single back edge from the end of the loop back to a loop header block. The dataflow conversion pass may use same high-level strategy to convert loops as for branches, e.g., it inserts switches at the end of the loop to direct values out of the loop (either out the loop exit or around the back-edge to the beginning of the loop), and inserts picks at the beginning of the loop to choose between initial values entering the loop and values coming through the back edge. FIG. 70A illustrates C source code 7002 according to embodiments of the disclosure. FIG. 70B illustrates dataflow assembly code 7004 for the C source code 7002 of FIG. 70A according to embodiments of the disclosure. FIG. 70C illustrates a dataflow graph 7006 for the dataflow assembly code 7004 of FIG. 70B for an accelerator according to embodiments of the disclosure. FIGS. 70A-70C shows C and CSA assembly code for an example do—while loop that adds up values of a loop induction variable i, as well as the corresponding dataflow graph. For each variable that conceptually cycles around the loop (i and sum), this graph has a corresponding pick/switch pair that controls the flow of these values. Note that this example also uses a pick/switch pair to cycle the value of n around the loop, even though n is loop-invariant. This repetition of n enables conversion of n's virtual register into a LIC, since it matches the execution frequencies between a conceptual definition of n outside the loop and the one or more uses of n inside the loop. In general, for a correct dataflow conversion, registers that are live-in into a loop are to be repeated once for each iteration inside the loop body when the register is converted into a LIC. Similarly, registers that are updated inside a loop and are live-out from the loop are to be consumed, e.g., with a single final value sent out of the loop. Loops introduce a wrinkle into the dataflow conversion process, namely that the control for a pick at the top of the loop and the switch for the bottom of the loop are offset. For example, if the loop in FIG. 69A executes three iterations and exits, the control to picker should be 0, 1, 1, while the control to switcher should be 1, 1, 0. This control is implemented by starting the picker channel with an initial extra 0 when the function begins on cycle 0 (which is specified in the assembly by the directives .value 0 and .avail 0), and then copying the output switcher into picker. Note that the last 0 in switcher restores a final 0 into picker, ensuring that the final state of the dataflow graph matches its initial state.

Figure 71A:
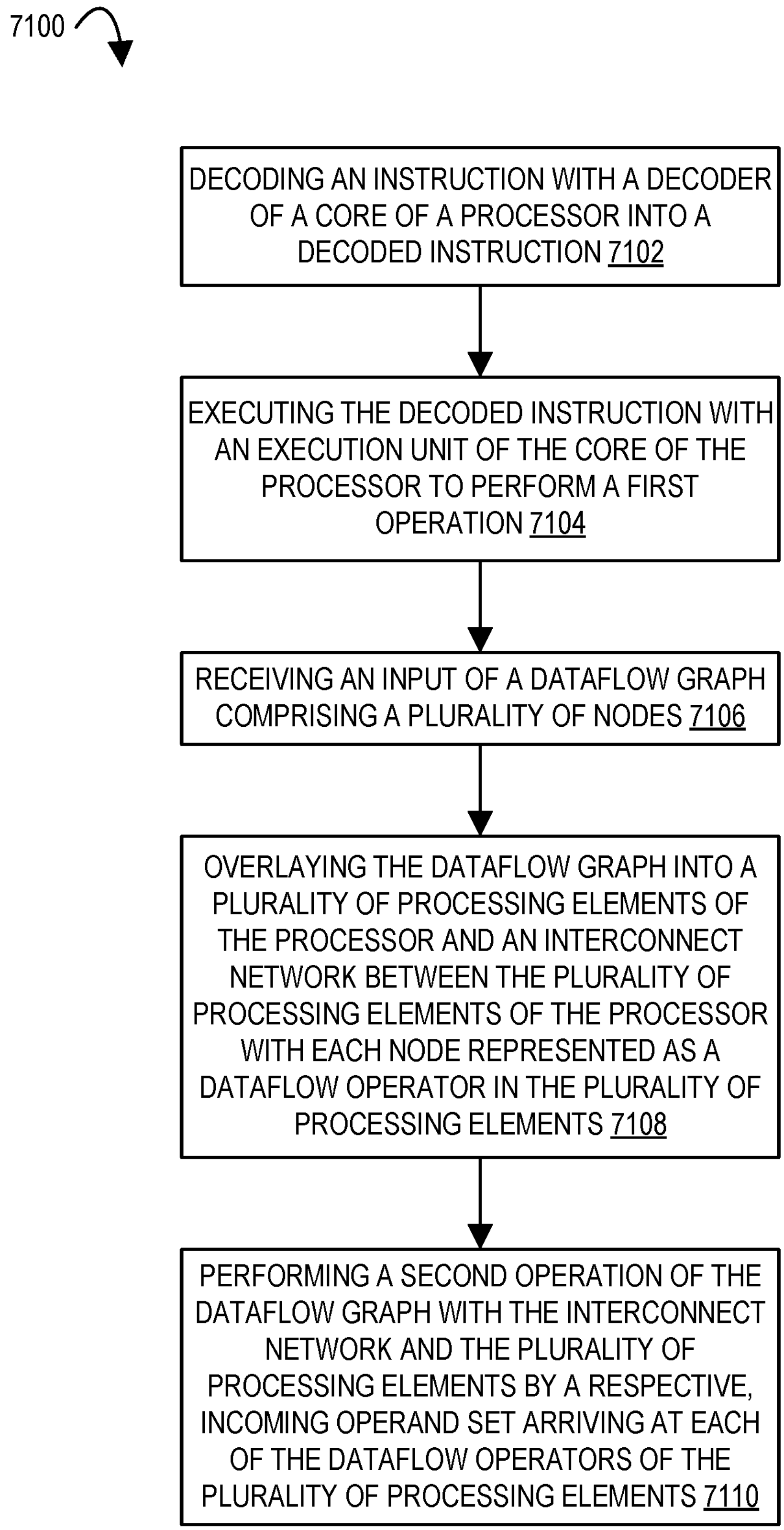
FIG. 71A illustrates a flow diagram according to embodiments of the disclosure.

FIG. 71A illustrates a flow diagram 7100 according to embodiments of the disclosure. Depicted flow 7100 includes decoding an instruction with a decoder of a core of a processor into a decoded instruction 7102; executing the decoded instruction with an execution unit of the core of the processor to perform a first operation 7104; receiving an input of a dataflow graph comprising a plurality of nodes 7106; overlaying the dataflow graph into a plurality of processing elements of the processor and an interconnect network between the plurality of processing elements of the processor with each node represented as a dataflow operator in the plurality of processing elements 7108; and performing a second operation of the dataflow graph with the interconnect network and the plurality of processing elements by a respective, incoming operand set arriving at each of the dataflow operators of the plurality of processing elements 7110.

Figure 71B:
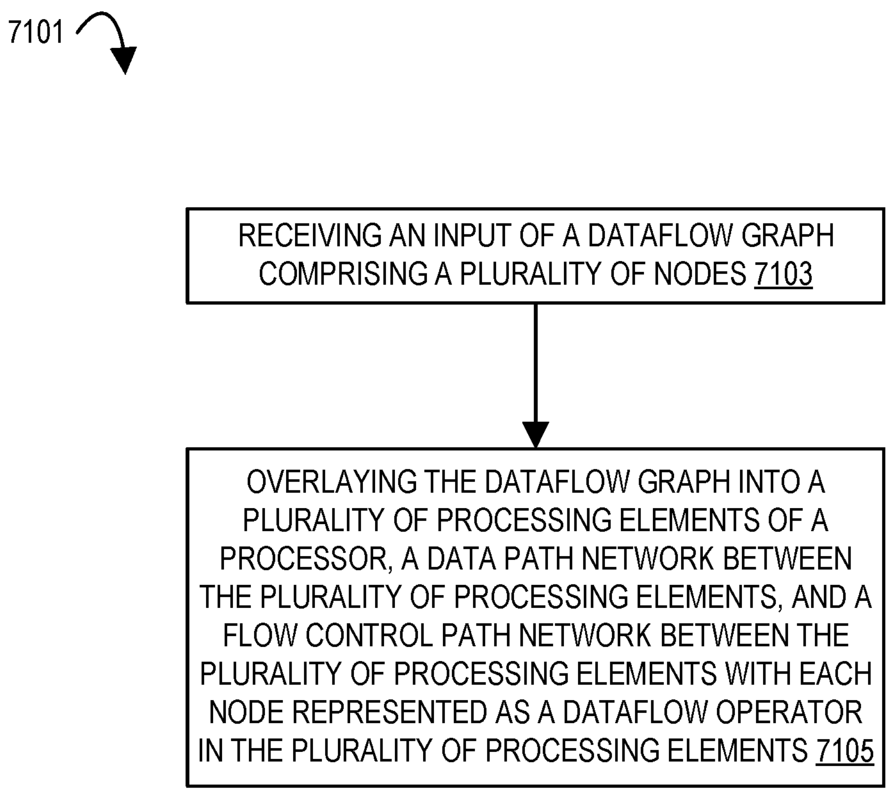
FIG. 71B illustrates a flow diagram according to embodiments of the disclosure.

FIG. 71B illustrates a flow diagram 7101 according to embodiments of the disclosure. Depicted flow 7101 includes receiving an input of a dataflow graph comprising a plurality of nodes 7103; and overlaying the dataflow graph into a plurality of processing elements of a processor, a data path network between the plurality of processing elements, and a flow control path network between the plurality of processing elements with each node represented as a dataflow operator in the plurality of processing elements 7105.

In one embodiment, the core writes a command into a memory queue and a CSA (e.g., the plurality of processing elements) monitors the memory queue and begins executing when the command is read. In one embodiment, the core executes a first part of a program and a CSA (e.g., the plurality of processing elements) executes a second part of the program. In one embodiment, the core does other work while the CSA is executing its operations.

4. CSA ADVANTAGES

In certain embodiments, the CSA architecture and microarchitecture provides profound energy, performance, and usability advantages over roadmap processor architectures and FPGAs. In this section, these architectures are compared to embodiments of the CSA and highlights the superiority of CSA in accelerating parallel dataflow graphs relative to each.

4.1 Processors

Figure 72:
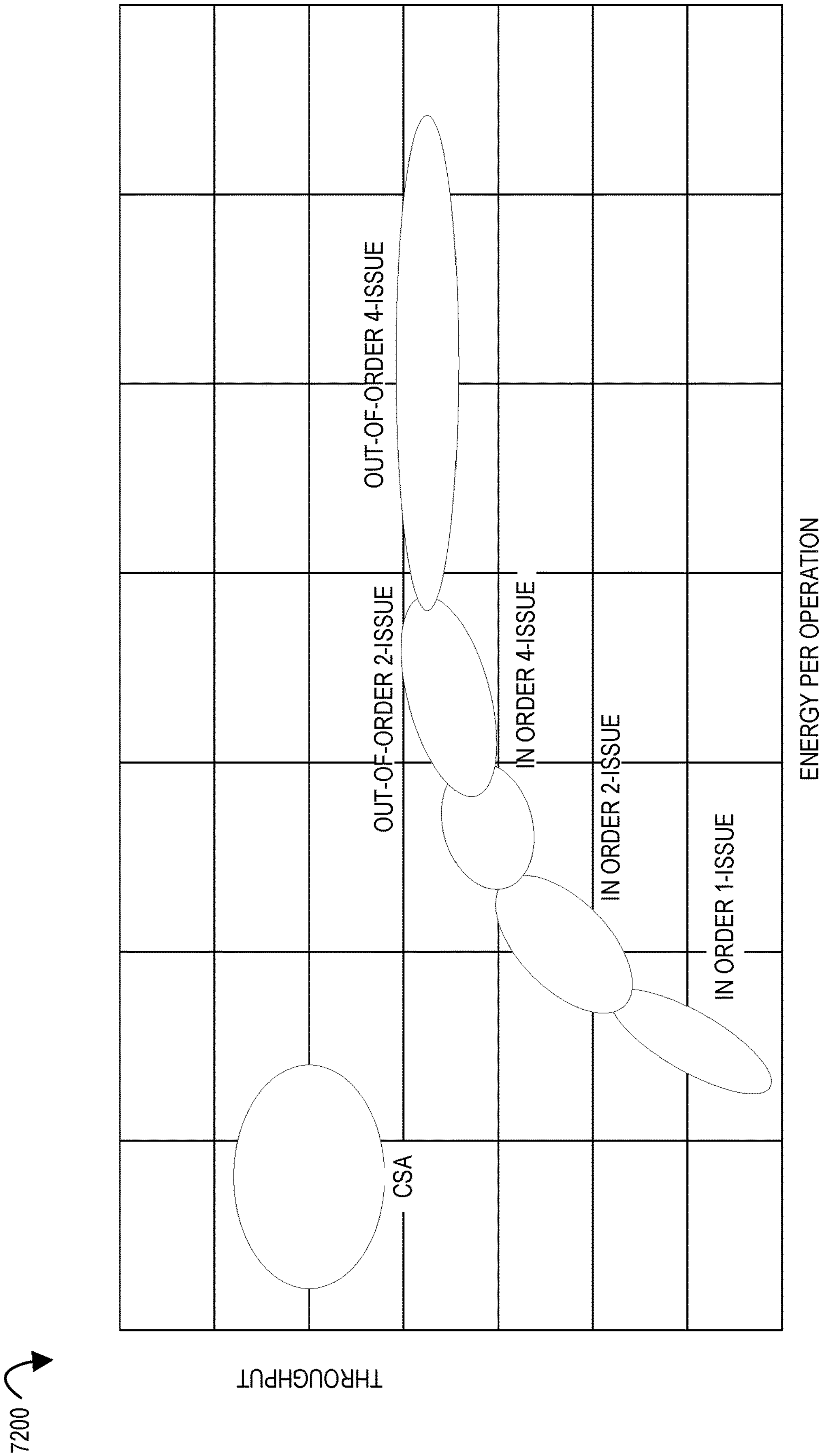
FIG. 72 illustrates a throughput versus energy per operation graph according to embodiments of the disclosure.

FIG. 72 illustrates a throughput versus energy per operation graph 7200 according to embodiments of the disclosure. As shown in FIG. 72, small cores are generally more energy efficient than large cores, and, in some workloads, this advantage may be translated to absolute performance through higher core counts. The CSA microarchitecture follows these observations to their conclusion and removes (e.g., most) energy-hungry control structures associated with von Neumann architectures, including most of the instruction-side microarchitecture. By removing these overheads and implementing simple, single operation PEs, embodiments of a CSA obtains a dense, efficient spatial array. Unlike small cores, which are usually quite serial, a CSA may gang its PEs together, e.g., via the circuit switched local network, to form explicitly parallel aggregate dataflow graphs. The result is performance in not only parallel applications, but also serial applications as well. Unlike cores, which may pay dearly for performance in terms area and energy, a CSA is already parallel in its native execution model. In certain embodiments, a CSA neither requires speculation to increase performance nor does it need to repeatedly re-extract parallelism from a sequential program representation, thereby avoiding two of the main energy taxes in von Neumann architectures. Most structures in embodiments of a CSA are distributed, small, and energy efficient, as opposed to the centralized, bulky, energy hungry structures found in cores. Consider the case of registers in the CSA: each PE may have a few (e.g., 10 or less) storage registers. Taken individually, these registers may be more efficient that traditional register files. In aggregate, these registers may provide the effect of a large, in-fabric register file. As a result, embodiments of a CSA avoids most of stack spills and fills incurred by classical architectures, while using much less energy per state access. Of course, applications may still access memory. In embodiments of a CSA, memory access request and response are architecturally decoupled, enabling workloads to sustain many more outstanding memory accesses per unit of area and energy. This property yields substantially higher performance for cache-bound workloads and reduces the area and energy needed to saturate main memory in memory-bound workloads. Embodiments of a CSA expose new forms of energy efficiency which are unique to non-von Neumann architectures. One consequence of executing a single operation (e.g., instruction) at a (e.g., most) PEs is reduced operand entropy. In the case of an increment operation, each execution may result in a handful of circuit-level toggles and little energy consumption, a case examined in detail in Section 5.2. In contrast, von Neumann architectures are multiplexed, resulting in large numbers of bit transitions. The asynchronous style of embodiments of a CSA also enables microarchitectural optimizations, such as the floating point optimizations described in Section 2.7 that are difficult to realize in tightly scheduled core pipelines. Because PEs may be relatively simple and their behavior in a particular dataflow graph be statically known, clock gating and power gating techniques may be applied more effectively than in coarser architectures. The graph-execution style, small size, and malleability of embodiments of CSA PEs and the network together enable the expression many kinds of parallelism: instruction, data, pipeline, vector, memory, thread, and task parallelism may all be implemented. For example, in embodiments of a CSA, one application may use arithmetic units to provide a high degree of address bandwidth, while another application may use those same units for computation. In many cases, multiple kinds of parallelism may be combined to achieve even more performance. Many key HPC operations may be both replicated and pipelined, resulting in orders-of-magnitude performance gains. In contrast, von Neumann-style cores typically optimize for one style of parallelism, carefully chosen by the architects, resulting in a failure to capture all important application kernels. Just as embodiments of a CSA expose and facilitates many forms of parallelism, it does not mandate a particular form of parallelism, or, worse, a particular subroutine be present in an application in order to benefit from the CSA. Many applications, including single-stream applications, may obtain both performance and energy benefits from embodiments of a CSA, e.g., even when compiled without modification. This reverses the long trend of requiring significant programmer effort to obtain a substantial performance gain in singlestream applications. Indeed, in some applications, embodiments of a CSA obtain more performance from functionally equivalent, but less "modern" codes than from their convoluted, contemporary cousins which have been tortured to target vector instructions.

4.2 Comparison of CSA Embodiments and FGPAs

The choice of dataflow operators as the fundamental architecture of embodiments of a CSA differentiates those CSAs from a FGPA, and particularly the CSA is as superior accelerator for HPC dataflow graphs arising from traditional programming languages. Dataflow operators are fundamentally asynchronous. This enables embodiments of a CSA not only to have great freedom of implementation in the microarchitecture, but it also enables them to simply and succinctly accommodate abstract architectural concepts. For example, embodiments of a CSA naturally accommodate many memory microarchitectures, which are essentially asynchronous, with a simple load-store interface. One need only examine an FPGA DRAM controller to appreciate the difference in complexity. Embodiments of a CSA also leverage asynchrony to provide faster and more-fully-featured runtime services like configuration and extraction, which are believed to be four to six orders of magnitude faster than an FPGA. By narrowing the architectural interface, embodiments of a CSA provide control over most timing paths at the microarchitectural level. This allows embodiments of a CSA to operate at a much higher frequency than the more general control mechanism offered in a FPGA. Similarly, clock and reset, which may be architecturally fundamental to FPGAs, are microarchitectural in the CSA, e.g., obviating the need to support them as programmable entities. Dataflow operators may be, for the most part, coarse-grained. By only dealing in coarse operators, embodiments of a CSA improve both the density of the fabric and its energy consumption: CSA executes operations directly rather than emulating them with look-up tables. A second consequence of coarseness is a simplification of the place and route problem. CSA dataflow graphs are many orders of magnitude smaller than FPGA net-lists and place and route time are commensurately reduced in embodiments of a CSA. The significant differences between embodiments of a CSA and a FPGA make the CSA superior as an accelerator, e.g., for dataflow graphs arising from traditional programming languages.

5. EVALUATION

The CSA is a novel computer architecture with the potential to provide enormous performance and energy advantages relative to roadmap processors. Consider the case of computing a single strided address for walking across an array. This case may be important in HPC applications, e.g., which spend significant integer effort in computing address offsets. In address computation, and especially strided address computation, one argument is constant and the other varies only slightly per computation. Thus, only a handful of bits per cycle toggle in the majority of cases. Indeed, it may be shown, using a derivation similar to the bound on floating point carry bits described in Section 2.7, that less than two bits of input toggle per computation in average for a stride calculation, reducing energy by 50% over a random toggle distribution. Were a time-multiplexed approach used, much of this energy savings may be lost. In one embodiment, the CSA achieves approximately 3× energy efficiency over a core while delivering an 8× performance gain. The parallelism gains achieved by embodiments of a CSA may result in reduced program run times, yielding a proportionate, substantial reduction in leakage energy. At the PE level, embodiments of a CSA are extremely energy efficient. A second important question for the CSA is whether the CSA consumes a reasonable amount of energy at the tile level. Since embodiments of a CSA are capable of exercising every floating point PE in the fabric at every cycle, it serves as a reasonable upper bound for energy and power consumption, e.g., such that most of the energy goes into floating point multiply and add.

6. FURTHER CSA DETAILS

This section discusses further details for configuration and exception handling.

6.1 Microarchitecture for Configuring a CSA

This section discloses examples of how to configure a CSA (e.g., fabric), how to achieve this configuration quickly, and how to minimize the resource overhead of configuration. Configuring the fabric quickly may be of preeminent importance in accelerating small portions of a larger algorithm, and consequently in broadening the applicability of a CSA. The section further discloses features that allow embodiments of a CSA to be programmed with configurations of different length.

Embodiments of a CSA (e.g., fabric) may differ from traditional cores in that they make use of a configuration step in which (e.g., large) parts of the fabric are loaded with program configuration in advance of program execution. An advantage of static configuration may be that very little energy is spent at runtime on the configuration, e.g., as opposed to sequential cores which spend energy fetching configuration information (an instruction) nearly every cycle. The previous disadvantage of configuration is that it was a coarse-grained step with a potentially large latency, which places an under-bound on the size of program that can be accelerated in the fabric due to the cost of context switching. This disclosure describes a scalable microarchitecture for rapidly configuring a spatial array in a distributed fashion, e.g., that avoids the previous disadvantages.

As discussed above, a CSA may include light-weight processing elements connected by an inter-PE network. Programs, viewed as control-dataflow graphs, are then mapped onto the architecture by configuring the configurable fabric elements (CFEs), for example PEs and the interconnect (fabric) networks. Generally, PEs may be configured as dataflow operators and once all input operands arrive at the PE, some operation occurs, and the results are forwarded to another PE or PEs for consumption or output. PEs may communicate over dedicated virtual circuits which are formed by statically configuring the circuit switched communications network. These virtual circuits may be flow controlled and fully back-pressured, e.g., such that PEs will stall if either the source has no data or destination is full. At runtime, data may flow through the PEs implementing the mapped algorithm. For example, data may be streamed in from memory, through the fabric, and then back out to memory. Such a spatial architecture may achieve remarkable performance efficiency relative to traditional multicore processors: compute, in the form of PEs, may be simpler and more numerous than larger cores and communications may be direct, as opposed to an extension of the memory system.

Embodiments of a CSA may not utilize (e.g., software controlled) packet switching, e.g., packet switching that requires significant software assistance to realize, which slows configuration. Embodiments of a CSA include out-of-band signaling in the network (e.g., of only 2-3 bits, depending on the feature set supported) and a fixed configuration topology to avoid the need for significant software support.

One key difference between embodiments of a CSA and the approach used in FPGAs is that a CSA approach may use a wide data word, is distributed, and includes mechanisms to fetch program data directly from memory. Embodiments of a CSA may not utilize JTAG-style single bit communications in the interest of area efficiency, e.g., as that may require milliseconds to completely configure a large FPGA fabric.

Embodiments of a CSA include a distributed configuration protocol and microarchitecture to support this protocol. Initially, configuration state may reside in memory. Multiple (e.g., distributed) local configuration controllers (boxes)

(LCCs) may stream portions of the overall program into their local region of the spatial fabric, e.g., using a combination of a small set of control signals and the fabric-provided network. State elements may be used at each CFE to form configuration chains, e.g., allowing individual CFEs to self-program without global addressing.

Embodiments of a CSA include specific hardware support for the formation of configuration chains, e.g., not software establishing these chains dynamically at the cost of increasing configuration time. Embodiments of a CSA are not purely packet switched and do include extra out-of-band control wires (e.g., control is not sent through the data path requiring extra cycles to strobe this information and reserialize this information). Embodiments of a CSA decreases configuration latency by fixing the configuration ordering and by providing explicit out-of-band control (e.g., by at least a factor of two), while not significantly increasing network complexity.

Embodiments of a CSA do not use a serial mechanism for configuration in which data is streamed bit by bit into the fabric using a JTAG-like protocol. Embodiments of a CSA utilize a coarse-grained fabric approach. In certain embodiments, adding a few control wires or state elements to a 64 or 32-bit-oriented CSA fabric has a lower cost relative to adding those same control mechanisms to a 4 or 6 bit fabric.

Figure 73:
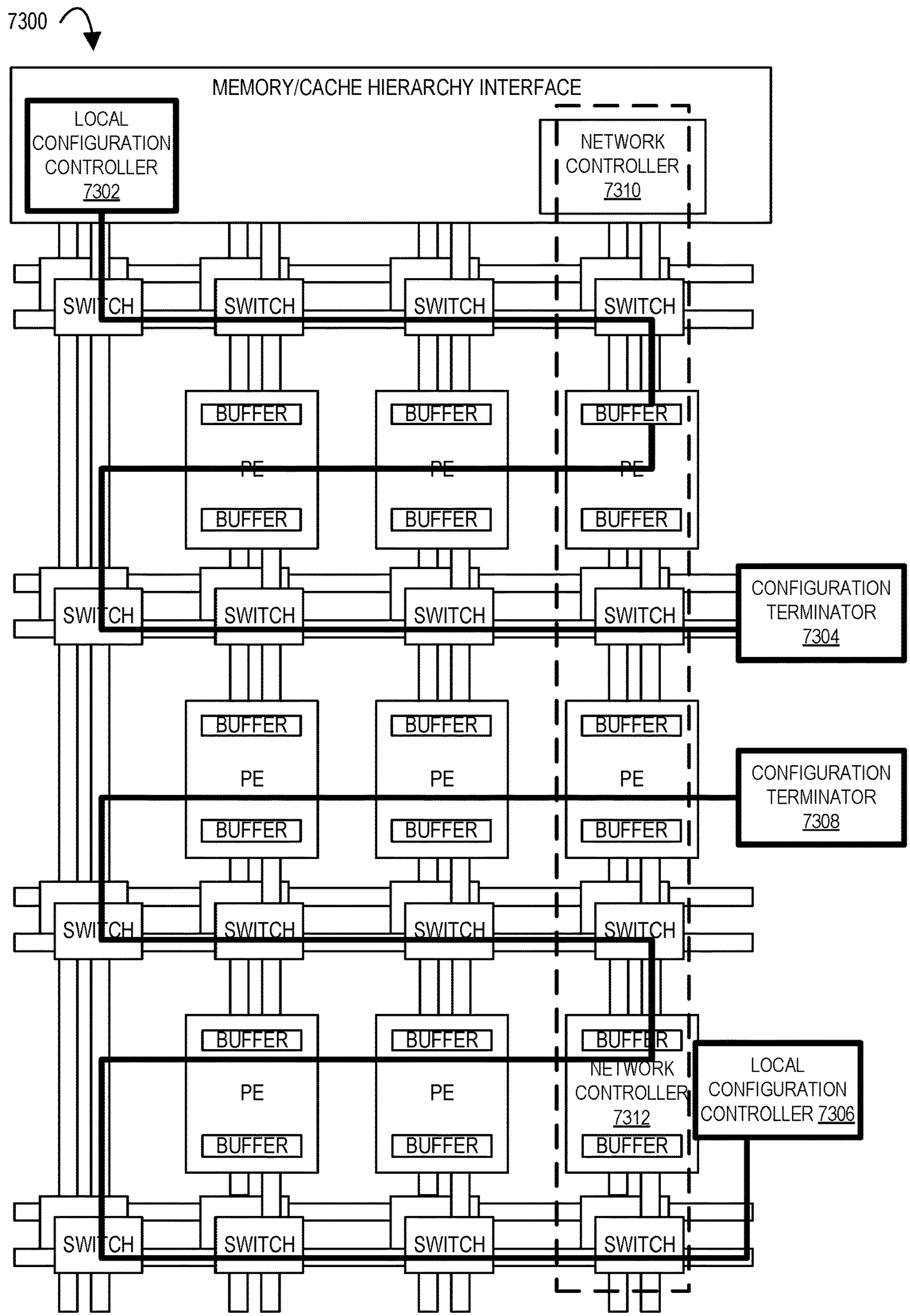
FIG. 73 illustrates an accelerator tile comprising an array of processing elements and a local configuration controller according to embodiments of the disclosure.

FIG. 73 illustrates an accelerator tile 7300 comprising an array of processing elements (PE) and a local configuration controller (7302, 7306) according to embodiments of the disclosure. Each PE, each network controller (e.g., network dataflow endpoint circuit), and each switch may be a configurable fabric elements (CFEs), e.g., which are configured (e.g., programmed) by embodiments of the CSA architecture.

Embodiments of a CSA include hardware that provides for efficient, distributed, low-latency configuration of a heterogeneous spatial fabric. This may be achieved according to four techniques. First, a hardware entity, the local configuration controller (LCC) is utilized, for example, as in FIGS. 73-75. An LCC may fetch a stream of configuration information from (e.g., virtual) memory. Second, a configuration data path may be included, e.g., that is as wide as the native width of the PE fabric and which may be overlaid on top of the PE fabric. Third, new control signals may be received into the PE fabric which orchestrate the configuration process. Fourth, state elements may be located (e.g., in a register) at each configurable endpoint which track the status of adjacent CFEs, allowing each CFE to unambiguously self-configure without extra control signals. These four microarchitectural features may allow a CSA to configure chains of its CFEs. To obtain low configuration latency, the configuration may be partitioned by building many LCCs and CFE chains. At configuration time, these may operate independently to load the fabric in parallel, e.g., dramatically reducing latency. As a result of these combinations, fabrics configured using embodiments of a CSA architecture, may be completely configured (e.g., in hundreds of nanoseconds). In the following, the detailed the operation of the various components of embodiments of a CSA configuration network are disclosed.

Figure 74A:
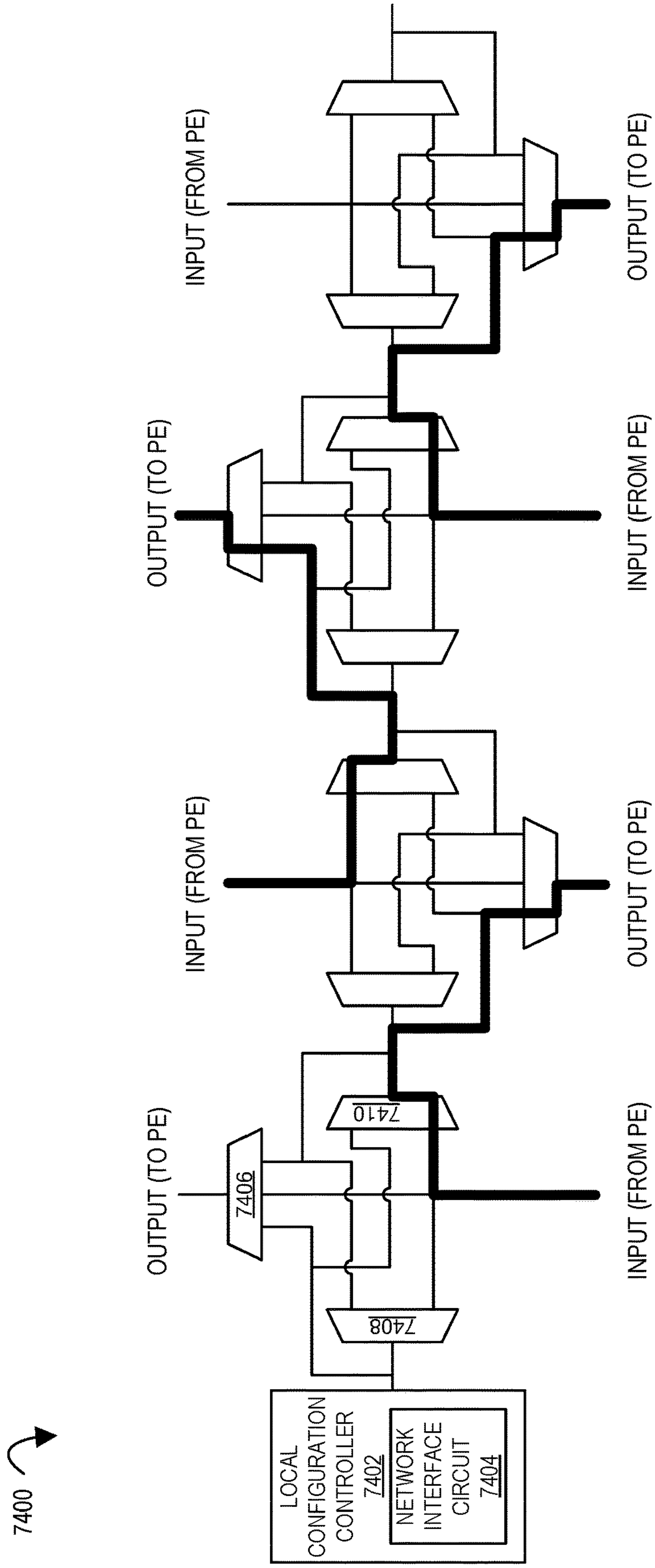
FIGS. 74A-74C illustrate a local configuration controller configuring a data path network according to embodiments of the disclosure.
Figure 74B:
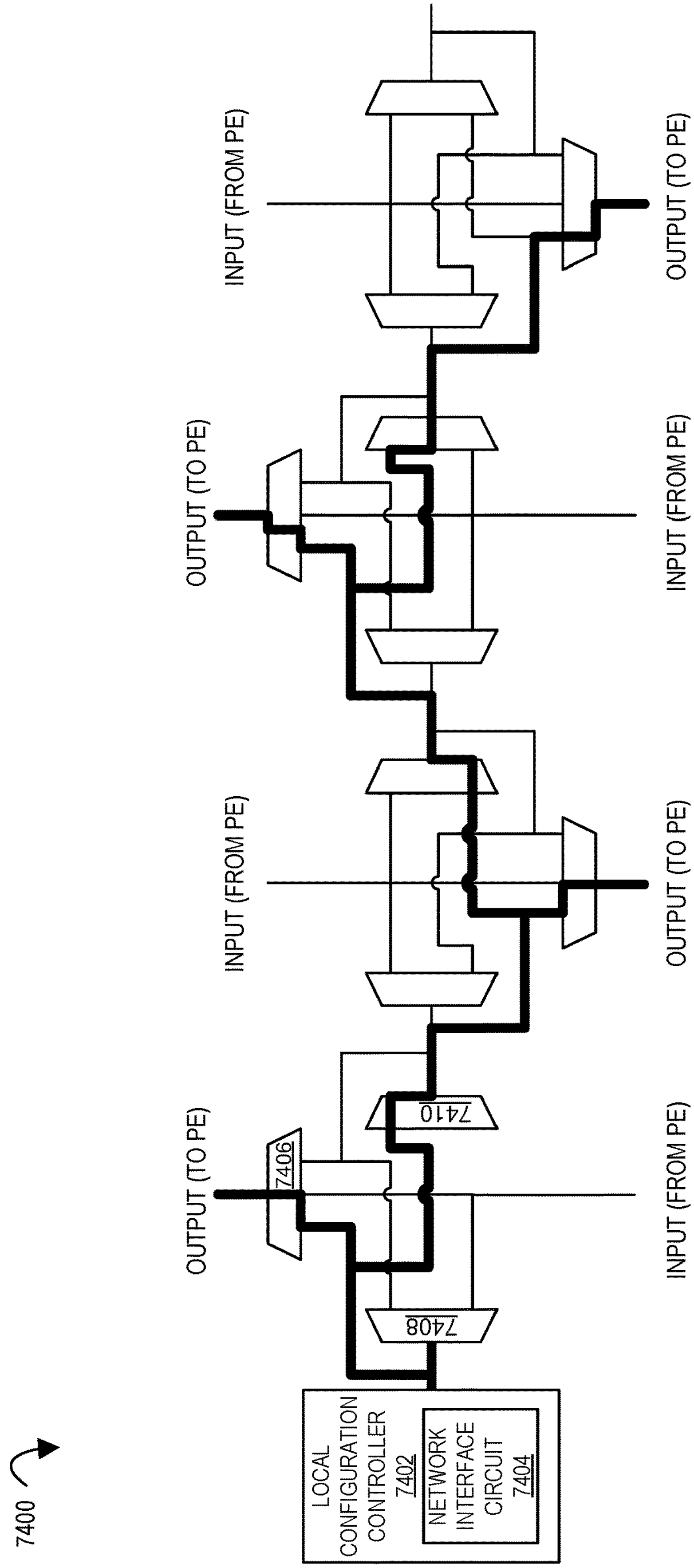
Figure 74C:
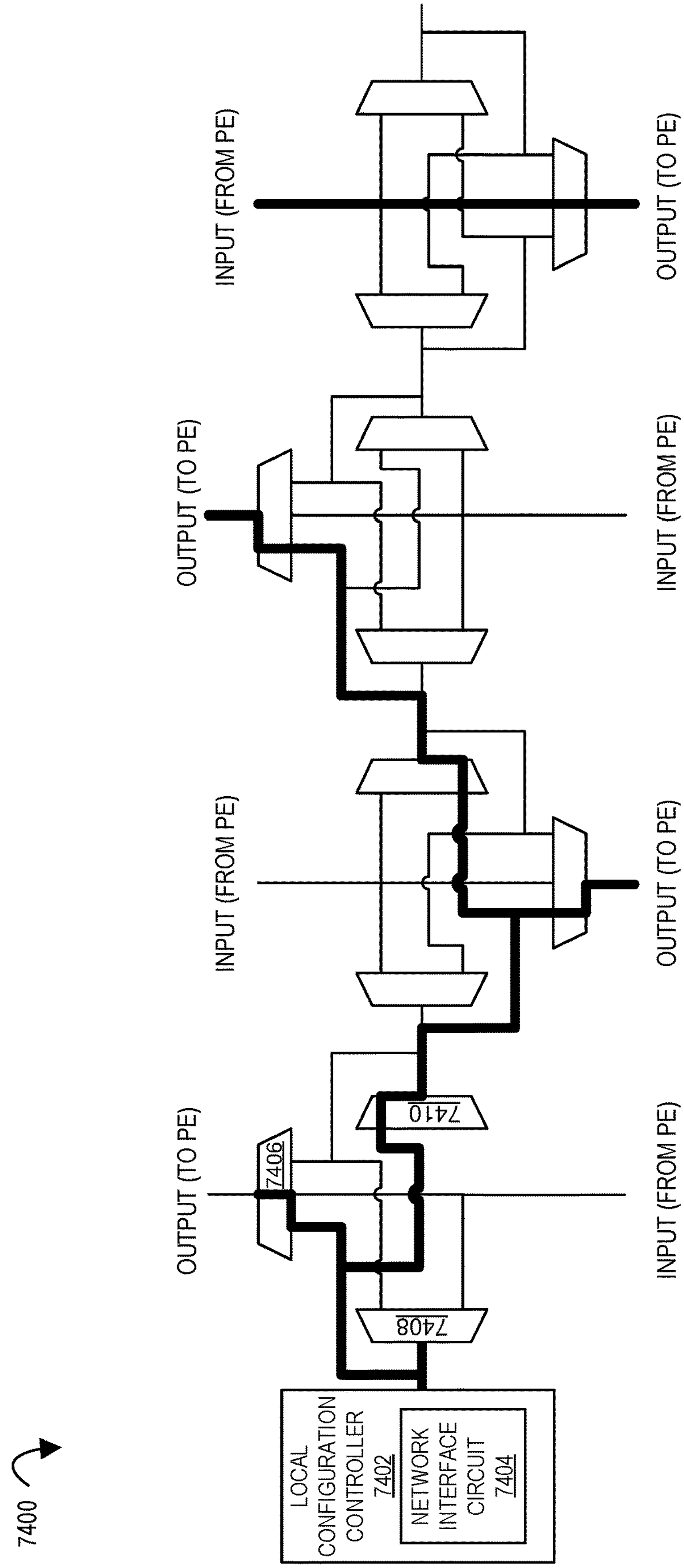

FIGS. 74A-74C illustrate a local configuration controller 7402 configuring a data path network according to embodiments of the disclosure. Depicted network includes a plurality of multiplexers (e.g., multiplexers 7406, 7408, 7410) that may be configured (e.g., via their respective control signals) to connect one or more data paths (e.g., from PEs) together. FIG. 74A illustrates the network 7400 (e.g., fabric) configured (e.g., set) for some previous operation or program. FIG. 74B illustrates the local configuration controller 7402 (e.g., including a network interface circuit 7404 to send and/or receive signals) strobing a configuration signal and the local network is set to a default configuration (e.g., as depicted) that allows the LCC to send configuration data to all configurable fabric elements (CFEs), e.g., muxes. FIG. 74C illustrates the LCC strobing configuration information across the network, configuring CFEs in a predetermined (e.g., silicon-defined) sequence. In one embodiment, when CFEs are configured they may begin operation immediately. In another embodiments, the CFEs wait to begin operation until the fabric has been completely configured (e.g., as signaled by configuration terminator (e.g., configuration terminator 7604 and configuration terminator 7608 in FIG. 76) for each local configuration controller). In one embodiment, the LCC obtains control over the network fabric by sending a special message, or driving a signal. It then strobes configuration data (e.g., over a period of many cycles) to the CFEs in the fabric. In these figures, the multiplexor networks are analogues of the "Switch" shown in certain Figures (e.g., FIG. 6).

Local Configuration Controller

Figure 75:
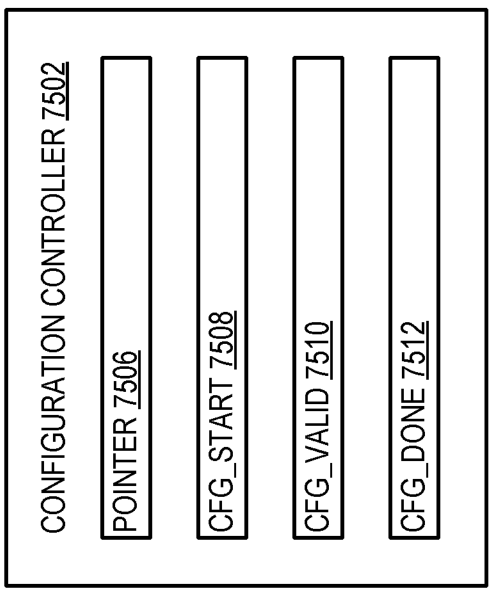
FIG. 75 illustrates a configuration controller according to embodiments of the disclosure.

FIG. 75 illustrates a (e.g., local) configuration controller 7502 according to embodiments of the disclosure. A local configuration controller (LCC) may be the hardware entity which is responsible for loading the local portions (e.g., in a subset of a tile or otherwise) of the fabric program, interpreting these program portions, and then loading these program portions into the fabric by driving the appropriate protocol on the various configuration wires. In this capacity, the LCC may be a special-purpose, sequential microcontroller.

LCC operation may begin when it receives a pointer to a code segment. Depending on the LCB microarchitecture, this pointer (e.g., stored in pointer register 7506) may come either over a network (e.g., from within the CSA (fabric) itself) or through a memory system access to the LCC. When it receives such a pointer, the LCC optionally drains relevant state from its portion of the fabric for context storage, and then proceeds to immediately reconfigure the portion of the fabric for which it is responsible. The program loaded by the LCC may be a combination of configuration data for the fabric and control commands for the LCC, e.g., which are lightly encoded. As the LCC streams in the program portion, it may interprets the program as a command stream and perform the appropriate encoded action to configure (e.g., load) the fabric.

Two different microarchitectures for the LCC are shown in FIG. 73, e.g., with one or both being utilized in a CSA. The first places the LCC 7302 at the memory interface. In this case, the LCC may make direct requests to the memory system to load data. In the second case the LCC 7306 is placed on a memory network, in which it may make requests to the memory only indirectly. In both cases, the logical operation of the LCB is unchanged. In one embodiment, an LCCs is informed of the program to load, for example, by a set of (e.g., OS-visible) control-status-registers which will be used to inform individual LCCs of new program pointers, etc.

Extra Out-of-band Control Channels (e.g., Wires)

In certain embodiments, configuration relies on 2-8 extra, out-of-band control channels to improve configuration speed, as defined below. For example, configuration controller 7502 may include the following control channels, e.g., CFG_START control channel 7508, CFG_VALID control channel 7510, and CFG_DONE control channel 7512, with examples of each discussed in Table 3 below.

TABLE 3

| Control Channels | |
|---|---|
| CFG_START | Asserted at beginning of configuration. Sets configuration state at each CFE and sets the configuration bus. |
| CFG_VALID | Denotes validity of values on configuration bus. |
| CFG_DONE | Optional. Denotes completion of the configuration of a particular CFE. This allows configuration to be short circuited in case a CFE does not require additional configuration |

Generally, the handling of configuration information may be left to the implementer of a particular CFE. For example, a selectable function CFE may have a provision for setting registers using an existing data path, while a fixed function CFE might simply set a configuration register.

Due to long wire delays when programming a large set of CFEs, the CFG_VALID signal may be treated as a clock/latch enable for CFE components. Since this signal is used as a clock, in one embodiment the duty cycle of the line is at most 50%. As a result, configuration throughput is approximately halved. Optionally, a second CFG_VALID signal may be added to enable continuous programming.

In one embodiment, only CFG_START is strictly communicated on an independent coupling (e.g., wire), for example, CFG_VALID and CFG_DONE may be overlaid on top of other network couplings.

Reuse of Network Resources

To reduce the overhead of configuration, certain embodiments of a CSA make use of existing network infrastructure to communicate configuration data. A LCC may make use of both a chip-level memory hierarchy and a fabric-level communications networks to move data from storage into the fabric. As a result, in certain embodiments of a CSA, the configuration infrastructure adds no more than 2% to the overall fabric area and power.

Reuse of network resources in certain embodiments of a CSA may cause a network to have some hardware support for a configuration mechanism. Circuit switched networks of embodiments of a CSA cause an LCC to set their multiplexors in a specific way for configuration when the 'CFG_START' signal is asserted. Packet switched networks do not require extension, although LCC endpoints (e.g., configuration terminators) use a specific address in the packet switched network. Network reuse is optional, and some embodiments may find dedicated configuration buses to be more convenient.

Per CFE State

Each CFE may maintain a bit denoting whether or not it has been configured (see, e.g., FIG. 64). This bit may be de-asserted when the configuration start signal is driven, and then asserted once the particular CFE has been configured. In one configuration protocol, CFEs are arranged to form chains with the CFE configuration state bit determining the topology of the chain. A CFE may read the configuration state bit of the immediately adjacent CFE. If this adjacent CFE is configured and the current CFE is not configured, the CFE may determine that any current configuration data is targeted at the current CFE. When the 'CFG_DONE' signal is asserted, the CFE may set its configuration bit, e.g., enabling upstream CFEs to configure. As a base case to the configuration process, a configuration terminator (e.g., configuration terminator 7304 for LCC 7302 or configuration terminator 7308 for LCC 7306 in FIG. 73) which asserts that it is configured may be included at the end of a chain.

Internal to the CFE, this bit may be used to drive flow control ready signals. For example, when the configuration bit is de-asserted, network control signals may automatically be clamped to a values that prevent data from flowing, while, within PEs, no operations or other actions will be scheduled.

Dealing with High-Delay Configuration Paths

One embodiment of an LCC may drive a signal over a long distance, e.g., through many multiplexors and with many loads. Thus, it may be difficult for a signal to arrive at a distant CFE within a short clock cycle. In certain embodiments, configuration signals are at some division (e.g., fraction of) of the main (e.g., CSA) clock frequency to ensure digital timing discipline at configuration. Clock division may be utilized in an out-of-band signaling protocol, and does not require any modification of the main clock tree.

Ensuring Consistent Fabric Behavior During Configuration

Since certain configuration schemes are distributed and have non-deterministic timing due to program and memory effects, different portions of the fabric may be configured at different times. As a result, certain embodiments of a CSA provide mechanisms to prevent inconsistent operation among configured and unconfigured CFEs. Generally, consistency is viewed as a property required of and maintained by CFEs themselves, e.g., using the internal CFE state. For example, when a CFE is in an unconfigured state, it may claim that its input buffers are full, and that its output is invalid. When configured, these values will be set to the true state of the buffers. As enough of the fabric comes out of configuration, these techniques may permit it to begin operation. This has the effect of further reducing context switching latency, e.g., if long-latency memory requests are issued early.

Variable-Width Configuration

Different CFEs may have different configuration word widths. For smaller CFE configuration words, implementers may balance delay by equitably assigning CFE configuration loads across the network wires. To balance loading on network wires, one option is to assign configuration bits to different portions of network wires to limit the net delay on any one wire. Wide data words may be handled by using serialization/deserialization techniques. These decisions may be taken on a per-fabric basis to optimize the behavior of a specific CSA (e.g., fabric). Network controller (e.g., one or more of network controller 7310 and network controller 7312 may communicate with each domain (e.g., subset) of the CSA (e.g., fabric), for example, to send configuration information to one or more LCCs. Network controller may be part of a communications network (e.g., separate from circuit switched network). Network controller may include a network dataflow endpoint circuit.

6.2 Microarchitecture for Low Latency Configuration of a CSA and for Timely Fetching of Configuration Data for a CSA Embodiments of a CSA may be an energy-efficient and high-performance means of accelerating user applications. When considering whether a program (e.g., a dataflow graph thereof) may be successfully accelerated by an accelerator, both the time to configure the accelerator and the time to run the program may be considered. If the run time is short, then the configuration time may play a large role in determining successful acceleration. Therefore, to maximize the domain of accelerable programs, in some embodiments the configuration time is made as short as possible. One or more configuration caches may be includes in a CSA, e.g., such that the high bandwidth, low-latency store enables rapid reconfiguration. Next is a description of several embodiments of a configuration cache.

In one embodiment, during configuration, the configuration hardware (e.g., LCC) optionally accesses the configuration cache to obtain new configuration information. The configuration cache may operate either as a traditional address based cache, or in an OS managed mode, in which configurations are stored in the local address space and addressed by reference to that address space. If configuration state is located in the cache, then no requests to the backing store are to be made in certain embodiments. In certain embodiments, this configuration cache is separate from any (e.g., lower level) shared cache in the memory hierarchy.

Figure 76:
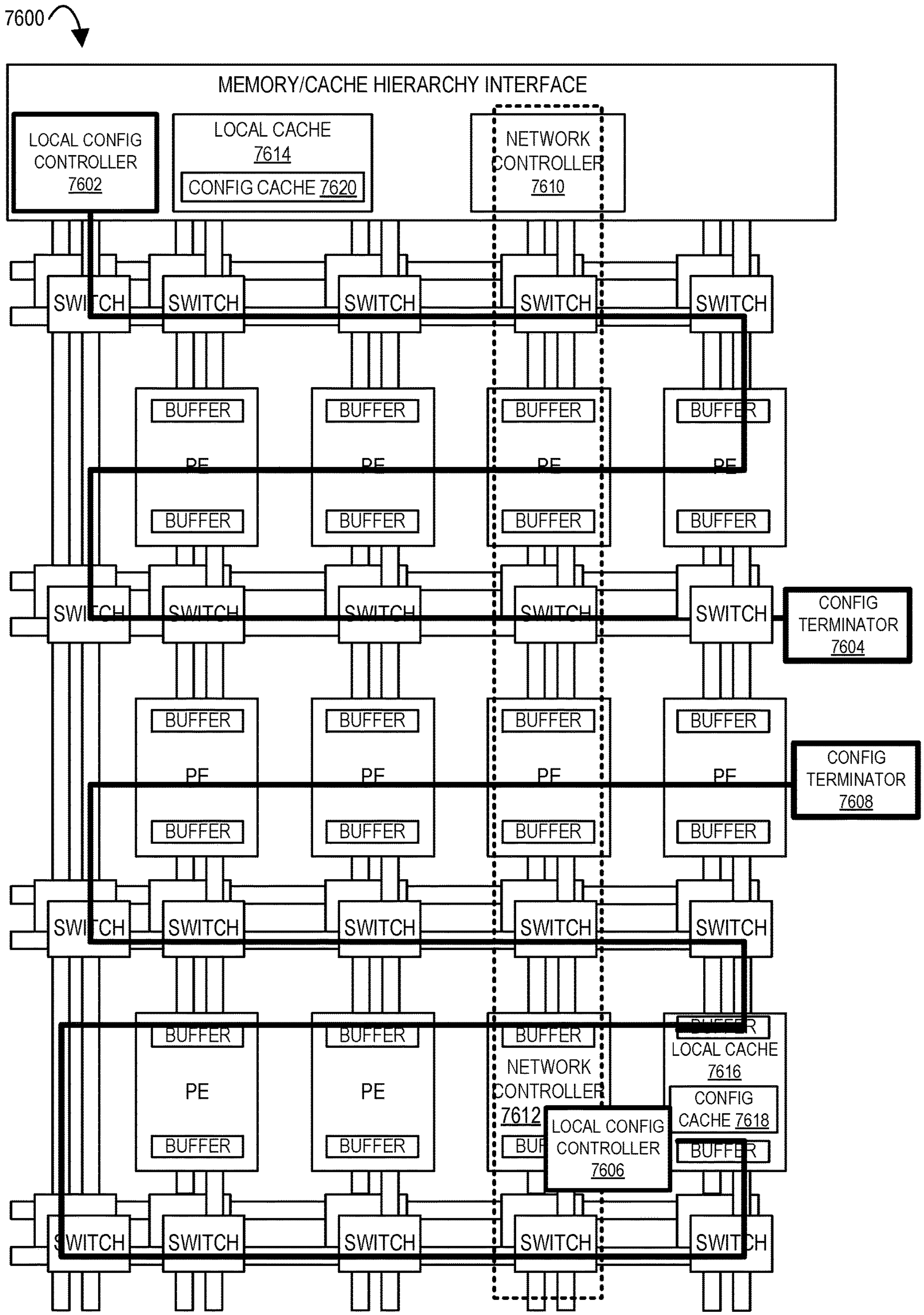
FIG. 76 illustrates an accelerator tile comprising an array of processing elements, a configuration cache, and a local configuration controller according to embodiments of the disclosure.

FIG. 76 illustrates an accelerator tile 7600 comprising an array of processing elements, a configuration cache (e.g., 7618 or 7620), and a local configuration controller (e.g., 7602 or 7606) according to embodiments of the disclosure. In one embodiment, configuration cache 7614 is co-located with local configuration controller 7602. In one embodiment, configuration cache 7618 is located in the configuration domain of local configuration controller 7606, e.g., with a first domain ending at configuration terminator 7604 and a second domain ending at configuration terminator 7608). A configuration cache may allow a local configuration controller may refer to the configuration cache during configuration, e.g., in the hope of obtaining configuration state with lower latency than a reference to memory. A configuration cache (storage) may either be dedicated or may be accessed as a configuration mode of an in-fabric storage element, e.g., local cache 7616.

Caching Modes

1. Demand Caching—In this mode, the configuration cache operates as a true cache. The configuration controller issues address-based requests, which are checked against tags in the cache. Misses are loaded into the cache and then may be re-referenced during future reprogramming.
2. In-Fabric Storage (Scratchpad) Caching—In this mode the configuration cache receives a reference to a configuration sequence in its own, small address space, rather than the larger address space of the host. This may improve memory density since the portion of cache used to store tags may instead be used to store configuration.

In certain embodiments, a configuration cache may have the configuration data preloaded into it, e.g., either by external direction or internal direction. This may allow reduction in the latency to load programs. Certain embodiments herein provide for an interface to a configuration cache which permits the loading of new configuration state into the cache, e.g., even if a configuration is running in the fabric already. The initiation of this load may occur from either an internal or external source. Embodiments of a pre-loading mechanism further reduce latency by removing the latency of cache loading from the configuration path.

Pre Fetching Modes

1. Explicit Prefetching—A configuration path is augmented with a new command, ConfigurationCachePrefetch. Instead of programming the fabric, this command simply cause a load of the relevant program configuration into a configuration cache, without programming the fabric. Since this mechanism piggybacks on the existing configuration infrastructure, it is exposed both within the fabric and externally, e.g., to cores and other entities accessing the memory space.
2. Implicit prefetching—A global configuration controller may maintain a prefetch predictor, and use this to initiate the explicit prefetching to a configuration cache, e.g., in an automated fashion.

6.3 Hardware for Rapid Reconfiguration of a CSA in Response to an Exception

Certain embodiments of a CSA (e.g., a spatial fabric) include large amounts of instruction and configuration state, e.g., which is largely static during the operation of the CSA. Thus, the configuration state may be vulnerable to soft errors. Rapid and error-free recovery of these soft errors may be critical to the long-term reliability and performance of spatial systems.

Certain embodiments herein provide for a rapid configuration recovery loop, e.g., in which configuration errors are detected and portions of the fabric immediately reconfigured. Certain embodiments herein include a configuration controller, e.g., with reliability, availability, and serviceability (RAS) reprogramming features. Certain embodiments of CSA include circuitry for high-speed configuration, error reporting, and parity checking within the spatial fabric. Using a combination of these three features, and optionally, a configuration cache, a configuration/exception handling circuit may recover from soft errors in configuration. When detected, soft errors may be conveyed to a configuration cache which initiates an immediate reconfiguration of (e.g., that portion of) the fabric. Certain embodiments provide for a dedicated reconfiguration circuit, e.g., which is faster than any solution that would be indirectly implemented in the fabric. In certain embodiments, co-located exception and configuration circuit cooperates to reload the fabric on configuration error detection.

Figure 77:
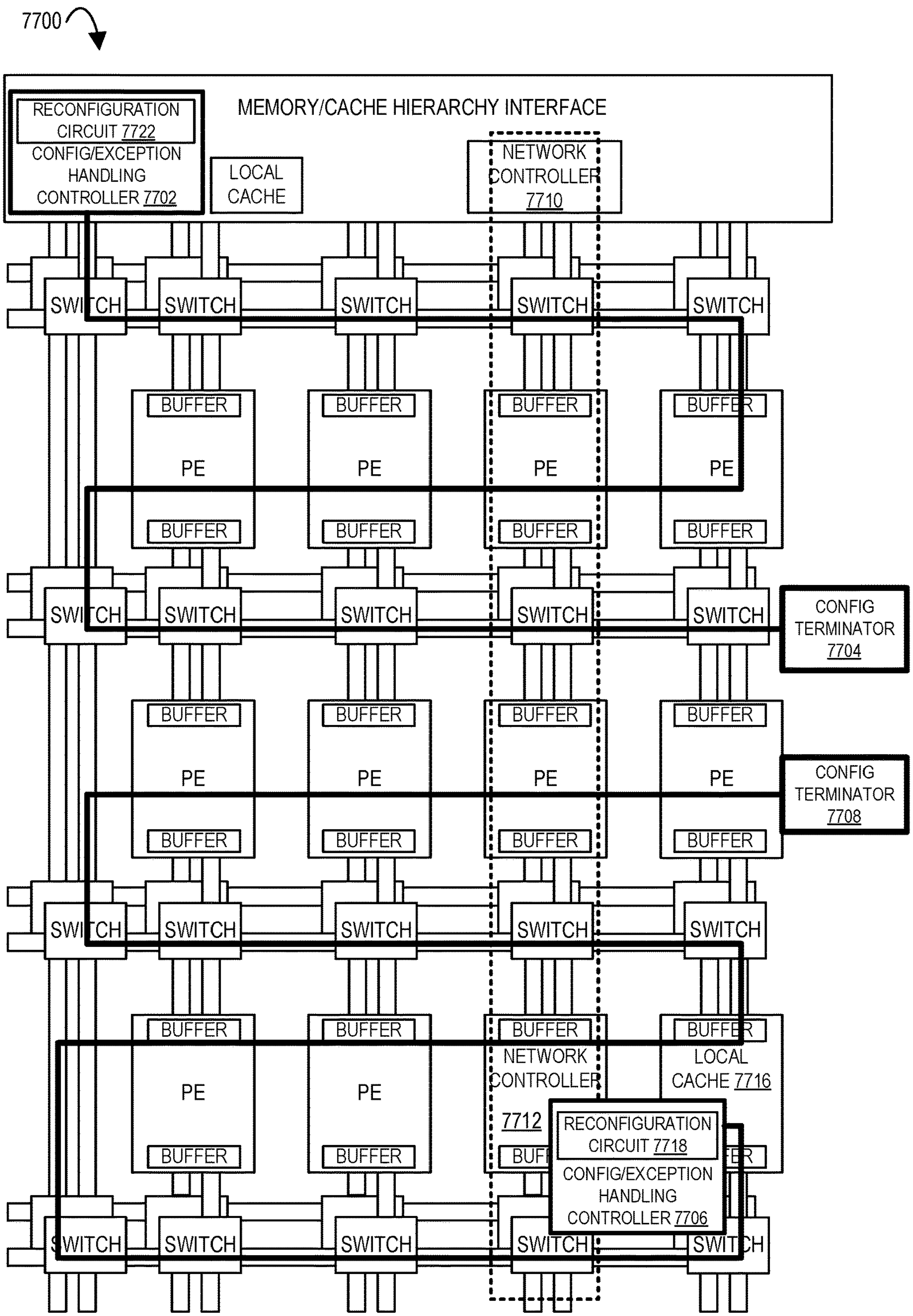
FIG. 77 illustrates an accelerator tile comprising an array of processing elements and a configuration and exception handling controller with a reconfiguration circuit according to embodiments of the disclosure.

FIG. 77 illustrates an accelerator tile 7700 comprising an array of processing elements and a configuration and exception handling controller (7702, 7706) with a reconfiguration circuit (7718, 7722) according to embodiments of the disclosure. In one embodiment, when a PE detects a configuration error through its local RAS features, it sends a (e.g., configuration error or reconfiguration error) message by its exception generator to the configuration and exception handling controller (e.g., 7702 or 7706). On receipt of this message, the configuration and exception handling controller (e.g., 7702 or 7706) initiates the co-located reconfiguration circuit (e.g., 7718 or 7722, respectively) to reload configuration state. The configuration microarchitecture proceeds and reloads (e.g., only) configurations state, and in certain embodiments, only the configuration state for the PE reporting the RAS error. Upon completion of reconfiguration, the fabric may resume normal operation. To decrease latency, the configuration state used by the configuration and exception handling controller (e.g., 7702 or 7706) may be sourced from a configuration cache. As a base case to the configuration or reconfiguration process, a configuration terminator (e.g., configuration terminator 7704 for configuration and exception handling controller 7702 or configuration terminator 7708 for configuration and exception handling controller 7706) in FIG. 77) which asserts that it is configured (or reconfigures) may be included at the end of a chain.

Figure 78:
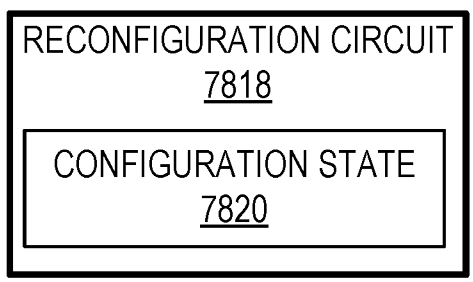
FIG. 78 illustrates a reconfiguration circuit according to embodiments of the disclosure.

FIG. 78 illustrates a reconfiguration circuit 7818 according to embodiments of the disclosure. Reconfiguration circuit 7818 includes a configuration state register 7820 to store the configuration state (or a pointer thereto).

7.4 Hardware for Fabric-Initiated Reconfiguration of a CSA

Some portions of an application targeting a CSA (e.g., spatial array) may be run infrequently or may be mutually exclusive with other parts of the program. To save area, to improve performance, and/or reduce power, it may be useful to time multiplex portions of the spatial fabric among several different parts of the program dataflow graph. Certain embodiments herein include an interface by which a CSA (e.g., via the spatial program) may request that part of the fabric be reprogrammed. This may enable the CSA to dynamically change itself according to dynamic control flow. Certain embodiments herein allow for fabric initiated reconfiguration (e.g., reprogramming). Certain embodiments herein provide for a set of interfaces for triggering configuration from within the fabric. In some embodiments, a PE issues a reconfiguration request based on some decision in the program dataflow graph. This request may travel a network to our new configuration interface, where it triggers reconfiguration. Once reconfiguration is completed, a message may optionally be returned notifying of the completion. Certain embodiments of a CSA thus provide for a program (e.g., dataflow graph) directed reconfiguration capability.

Figure 79:
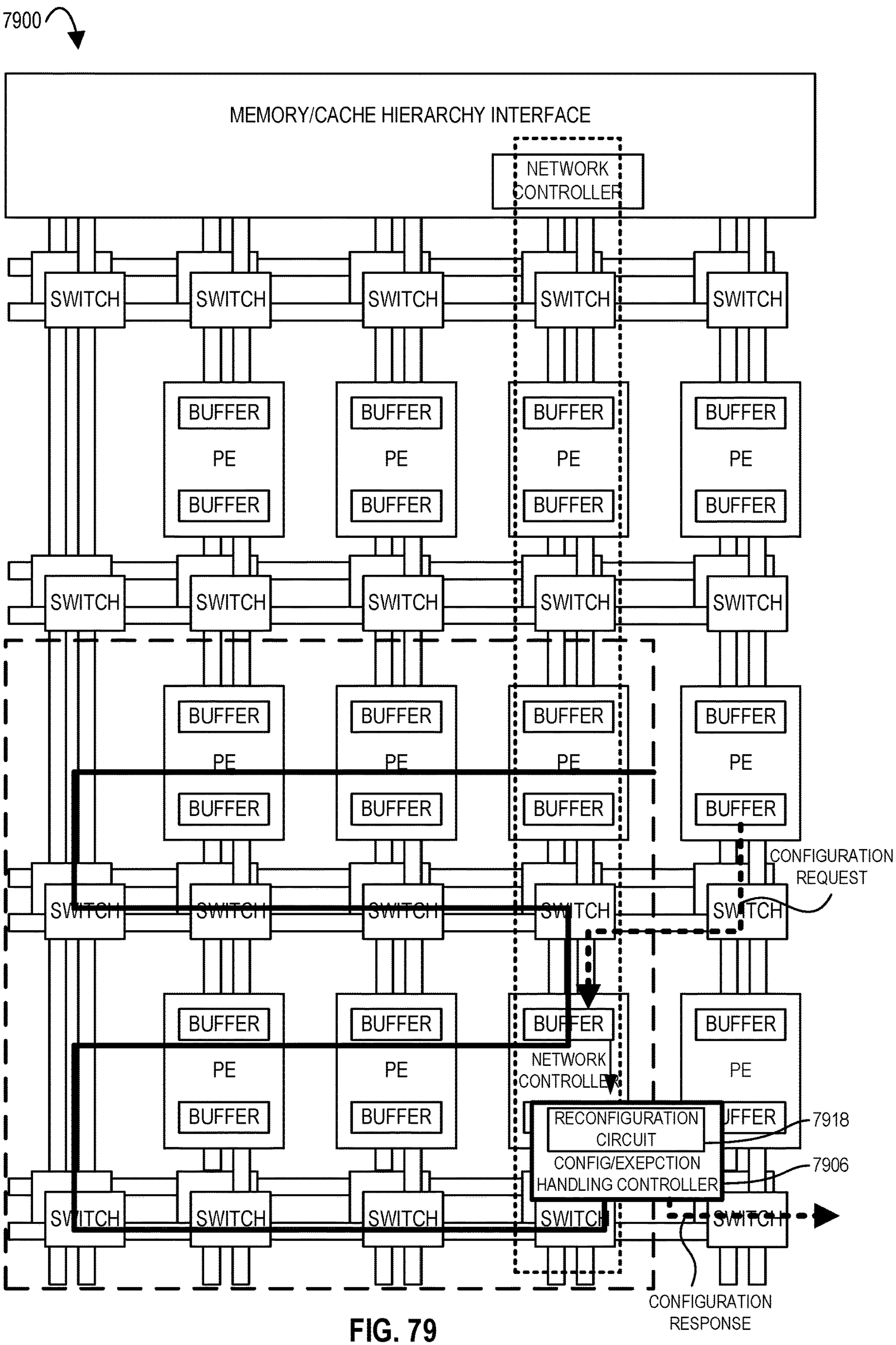
FIG. 79 illustrates an accelerator tile comprising an array of processing elements and a configuration and exception handling controller with a reconfiguration circuit according to embodiments of the disclosure.

FIG. 79 illustrates an accelerator tile 7900 comprising an array of processing elements and a configuration and exception handling controller 7906 with a reconfiguration circuit 7918 according to embodiments of the disclosure. Here, a portion of the fabric issues a request for (re)configuration to a configuration domain, e.g., of configuration and exception handling controller 7906 and/or reconfiguration circuit 7918. The domain (re)configures itself, and when the request has been satisfied, the configuration and exception handling controller 7906 and/or reconfiguration circuit 7918 issues a response to the fabric, to notify the fabric that (re)configuration is complete. In one embodiment, configuration and exception handling controller 7906 and/or reconfiguration circuit 7918 disables communication during the time that (re)configuration is ongoing, so the program has no consistency issues during operation.

Configuration Modes

Configure-by-address—In this mode, the fabric makes a direct request to load configuration data from a particular address.

Configure-by-reference—In this mode the fabric makes a request to load a new configuration, e.g., by a pre-determined reference ID. This may simplify the determination of the code to load, since the location of the code has been abstracted.

Configuring Multiple Domains

A CSA may include a higher level configuration controller to support a multicast mechanism to cast (e.g., via network indicated by the dotted box) configuration requests to multiple (e.g., distributed or local) configuration controllers. This may enable a single configuration request to be replicated across larger portions of the fabric, e.g., triggering a broad reconfiguration.

6.5 Exception Aggregators

Certain embodiments of a CSA may also experience an exception (e.g., exceptional condition), for example, floating point underflow. When these conditions occur, a special handlers may be invoked to either correct the program or to terminate it. Certain embodiments herein provide for a system-level architecture for handling exceptions in spatial fabrics. Since certain spatial fabrics emphasize area efficiency, embodiments herein minimize total area while providing a general exception mechanism. Certain embodiments herein provides a low area means of signaling exceptional conditions occurring in within a CSA (e.g., a spatial array). Certain embodiments herein provide an interface and signaling protocol for conveying such exceptions, as well as a PE-level exception semantics. Certain embodiments herein are dedicated exception handling capabilities, e.g., and do not require explicit handling by the programmer.

Figure 80:
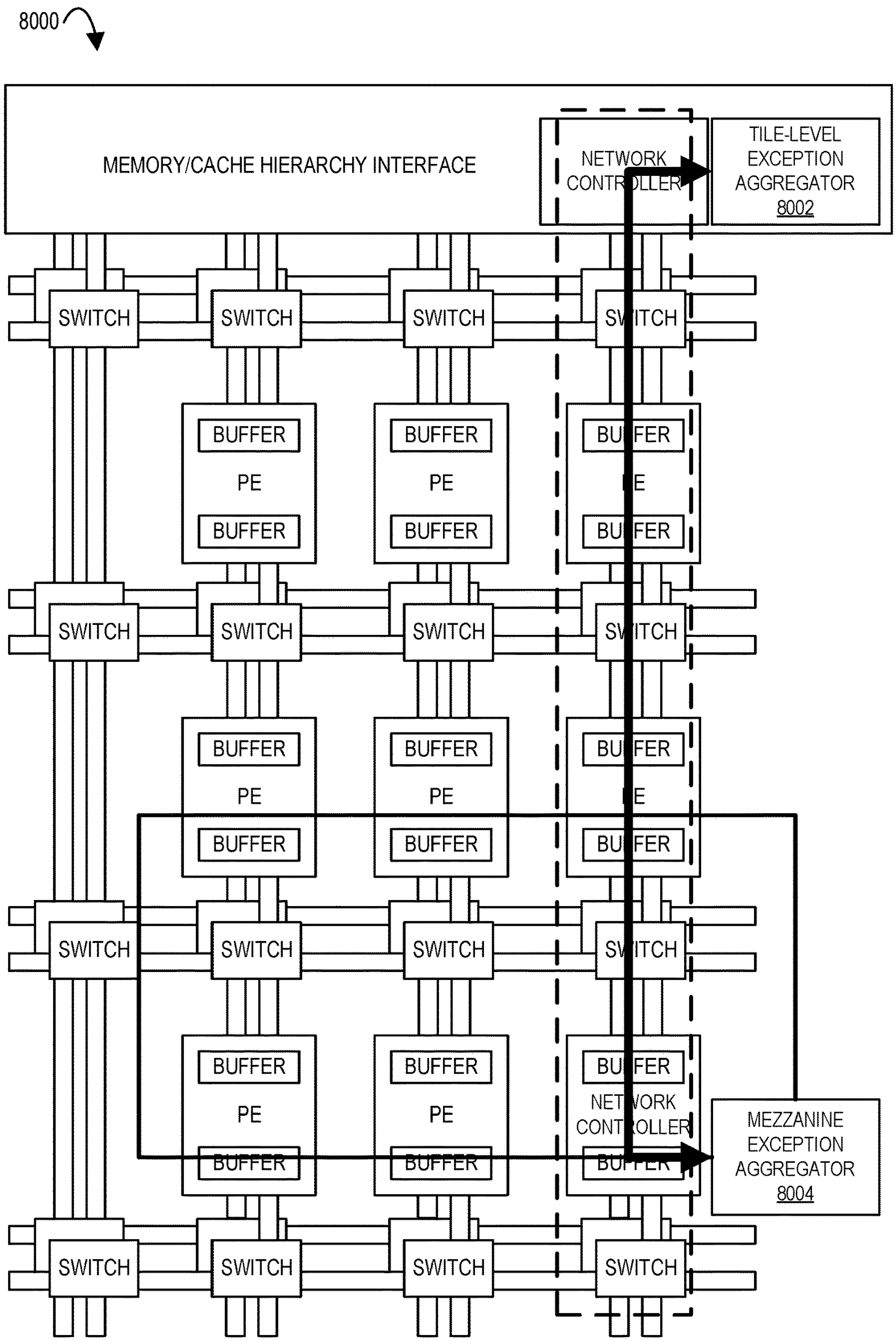
FIG. 80 illustrates an accelerator tile comprising an array of processing elements and a mezzanine exception aggregator coupled to a tile-level exception aggregator according to embodiments of the disclosure.
Figure 81:
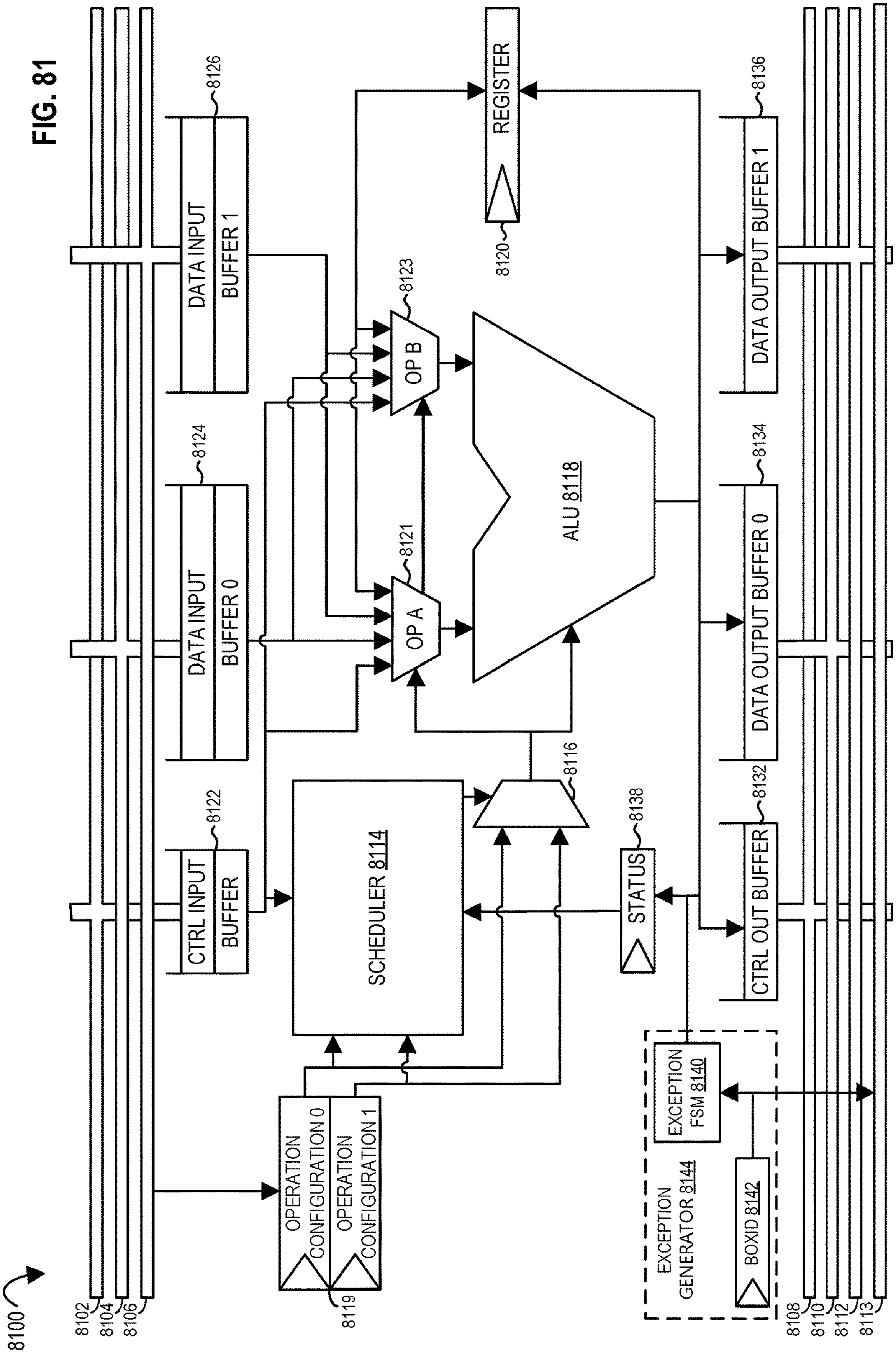
FIG. 81 illustrates a processing element with an exception generator according to embodiments of the disclosure.

One embodiments of a CSA exception architecture consists of four portions, e.g., shown in FIGS. 80-81. These portions may be arranged in a hierarchy, in which exceptions flow from the producer, and eventually up to the tile-level exception aggregator (e.g., handler), which may rendezvous with an exception servicer, e.g., of a core. The four portions may be:

1. PE Exception Generator
2. Local Exception Network
3. Mezzanine Exception Aggregator
4. Tile-Level Exception Aggregator FIG. 80 illustrates an accelerator tile 8000 comprising an array of processing elements and a mezzanine exception aggregator 8002 coupled to a tile-level exception aggregator 8004 according to embodiments of the disclosure. FIG. 81 illustrates a processing element 8100 with an exception generator 8144 according to embodiments of the disclosure.

PE Exception Generator

Processing element 8100 may include processing element 900 from FIG. 9, for example, with similar numbers being similar components, e.g., local network 902 and local network 8102. Additional network 8113 (e.g., channel) may be an exception network. A PE may implement an interface to an exception network (e.g., exception network 8113 (e.g., channel) on FIG. 81). For example, FIG. 81 shows the microarchitecture of such an interface, wherein the PE has an exception generator 8144 (e.g., initiate an exception finite state machine (FSM) 8140 to strobe an exception packet (e.g., BOXID 8142) out on to the exception network. BOXID 8142 may be a unique identifier for an exception producing entity (e.g., a PE or box) within a local exception network. When an exception is detected, exception generator 8144 senses the exception network and strobes out the BOXID when the network is found to be free. Exceptions may be caused by many conditions, for example, but not limited to, arithmetic error, failed ECC check on state, etc. however, it may also be that an exception dataflow operation is introduced, with the idea of support constructs like breakpoints.

The initiation of the exception may either occur explicitly, by the execution of a programmer supplied instruction, or implicitly when a hardened error condition (e.g., a floating point underflow) is detected. Upon an exception, the PE 8100 may enter a waiting state, in which it waits to be serviced by the eventual exception handler, e.g., external to the PE 8100. The contents of the exception packet depend on the implementation of the particular PE, as described below.

Local Exception Network

A (e.g., local) exception network steers exception packets from PE 8100 to the mezzanine exception network. Exception network (e.g., 8113) may be a serial, packet switched network consisting of a (e.g., single) control wire and one or more data wires, e.g., organized in a ring or tree topology, e.g., for a subset of PEs. Each PE may have a (e.g., ring) stop in the (e.g., local) exception network, e.g., where it can arbitrate to inject messages into the exception network.

PE endpoints needing to inject an exception packet may observe their local exception network egress point. If the control signal indicates busy, the PE is to wait to commence inject its packet. If the network is not busy, that is, the downstream stop has no packet to forward, then the PE will proceed commence injection.

Network packets may be of variable or fixed length. Each packet may begin with a fixed length header field identifying the source PE of the packet. This may be followed by a variable number of PE-specific field containing information, for example, including error codes, data values, or other useful status information.

Mezzanine Exception Aggregator

The mezzanine exception aggregator 8004 is responsible for assembling local exception network into larger packets and sending them to the tile-level exception aggregator 8002. The mezzanine exception aggregator 8004 may prepend the local exception packet with its own unique ID, e.g., ensuring that exception messages are unambiguous. The mezzanine exception aggregator 8004 may interface to a special exception-only virtual channel in the mezzanine network, e.g., ensuring the deadlock-freedom of exceptions.

The mezzanine exception aggregator 8004 may also be able to directly service certain classes of exception. For example, a configuration request from the fabric may be served out of the mezzanine network using caches local to the mezzanine network stop.

Tile-Level Exception Aggregator

The final stage of the exception system is the tile-level exception aggregator 8002. The tile-level exception aggregator 8002 is responsible for collecting exceptions from the various mezzanine-level exception aggregators (e.g., 8004) and forwarding them to the appropriate servicing hardware (e.g., core). As such, the tile-level exception aggregator 8002 may include some internal tables and controller to associate particular messages with handler routines. These tables may be indexed either directly or with a small state machine in order to steer particular exceptions.

Like the mezzanine exception aggregator, the tile-level exception aggregator may service some exception requests. For example, it may initiate the reprogramming of a large portion of the PE fabric in response to a specific exception.

6.6 Extraction Controllers

Certain embodiments of a CSA include an extraction controller(s) to extract data from the fabric. The below discusses embodiments of how to achieve this extraction quickly and how to minimize the resource overhead of data extraction. Data extraction may be utilized for such critical tasks as exception handling and context switching. Certain embodiments herein extract data from a heterogeneous spatial fabric by introducing features that allow extractable fabric elements (EFEs) (for example, PEs, network controllers, and/or switches) with variable and dynamically variable amounts of state to be extracted.

Embodiments of a CSA include a distributed data extraction protocol and microarchitecture to support this protocol. Certain embodiments of a CSA include multiple local extraction controllers (LECs) which stream program data out of their local region of the spatial fabric using a combination of a (e.g., small) set of control signals and the fabric-provided network. State elements may be used at each extractable fabric element (EFE) to form extraction chains, e.g., allowing individual EFEs to self-extract without global addressing.

Embodiments of a CSA do not use a local network to extract program data. Embodiments of a CSA include specific hardware support (e.g., an extraction controller) for the formation of extraction chains, for example, and do not rely on software to establish these chains dynamically, e.g., at the cost of increasing extraction time. Embodiments of a CSA are not purely packet switched and do include extra out-of-band control wires (e.g., control is not sent through the data path requiring extra cycles to strobe and reserialize this information). Embodiments of a CSA decrease extraction latency by fixing the extraction ordering and by providing explicit out-of-band control (e.g., by at least a factor of two), while not significantly increasing network complexity.

Embodiments of a CSA do not use a serial mechanism for data extraction, in which data is streamed bit by bit from the fabric using a JTAG-like protocol. Embodiments of a CSA utilize a coarse-grained fabric approach. In certain embodiments, adding a few control wires or state elements to a 64 or 32-bit-oriented CSA fabric has a lower cost relative to adding those same control mechanisms to a 4 or 6 bit fabric.

Figure 82:
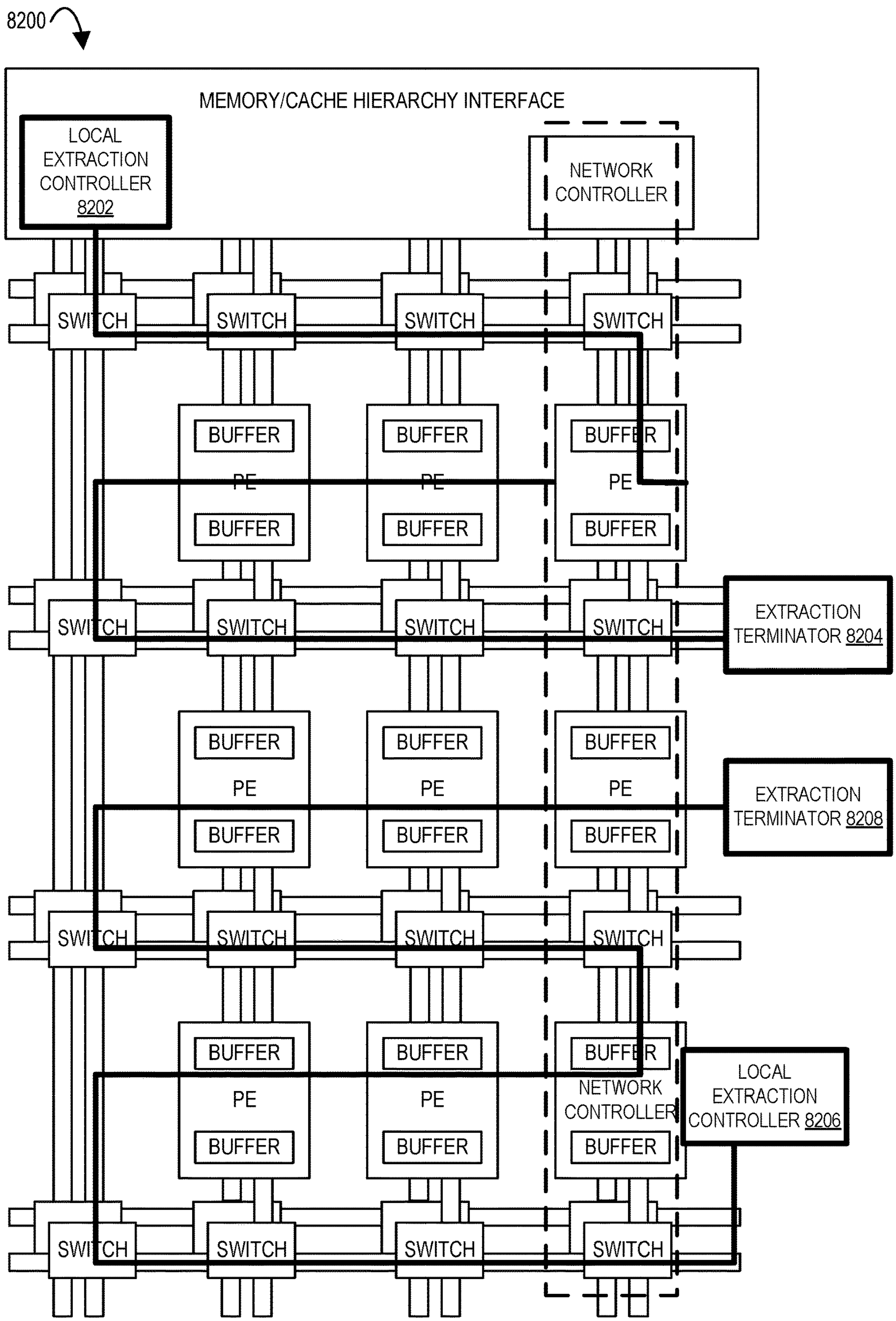
FIG. 82 illustrates an accelerator tile comprising an array of processing elements and a local extraction controller according to embodiments of the disclosure.

FIG. 82 illustrates an accelerator tile 8200 comprising an array of processing elements and a local extraction controller (8202, 8206) according to embodiments of the disclosure. Each PE, each network controller, and each switch may be an extractable fabric elements (EFEs), e.g., which are configured (e.g., programmed) by embodiments of the CSA architecture.

Embodiments of a CSA include hardware that provides for efficient, distributed, low-latency extraction from a heterogeneous spatial fabric. This may be achieved according to four techniques. First, a hardware entity, the local extraction controller (LEC) is utilized, for example, as in FIGS. 82-84. A LEC may accept commands from a host (for example, a processor core), e.g., extracting a stream of data from the spatial array, and writing this data back to virtual memory for inspection by the host. Second, a extraction data path may be included, e.g., that is as wide as the native width of the PE fabric and which may be overlaid on top of the PE fabric. Third, new control signals may be received into the PE fabric which orchestrate the extraction process. Fourth, state elements may be located (e.g., in a register) at each configurable endpoint which track the status of adjacent EFEs, allowing each EFE to unambiguously export its state without extra control signals. These four microarchitectural features may allow a CSA to extract data from chains of EFEs. To obtain low data extraction latency, certain embodiments may partition the extraction problem by including multiple (e.g., many) LECs and EFE chains in the fabric. At extraction time, these chains may operate independently to extract data from the fabric in parallel, e.g., dramatically reducing latency. As a result of these combinations, a CSA may perform a complete state dump (e.g., in hundreds of nanoseconds).

Figure 83A:
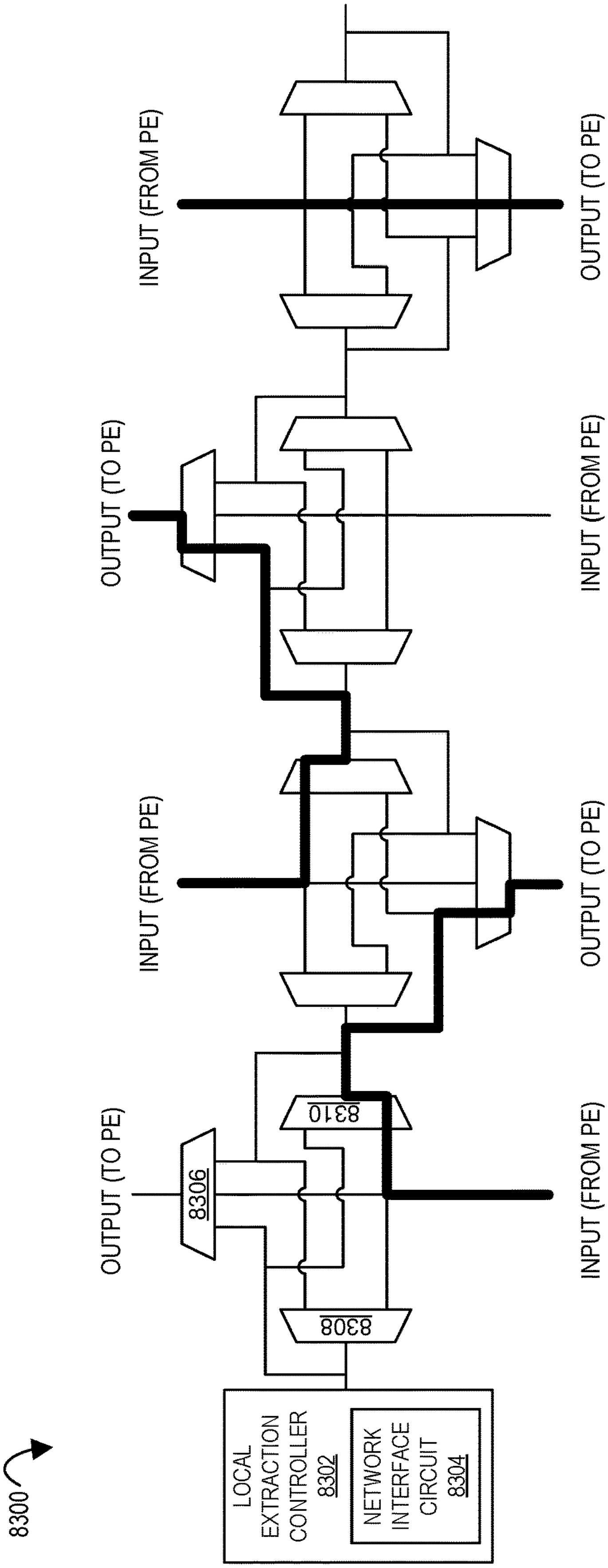
FIGS. 83A-83C illustrate a local extraction controller configuring a data path network according to embodiments of the disclosure.
Figure 83B:
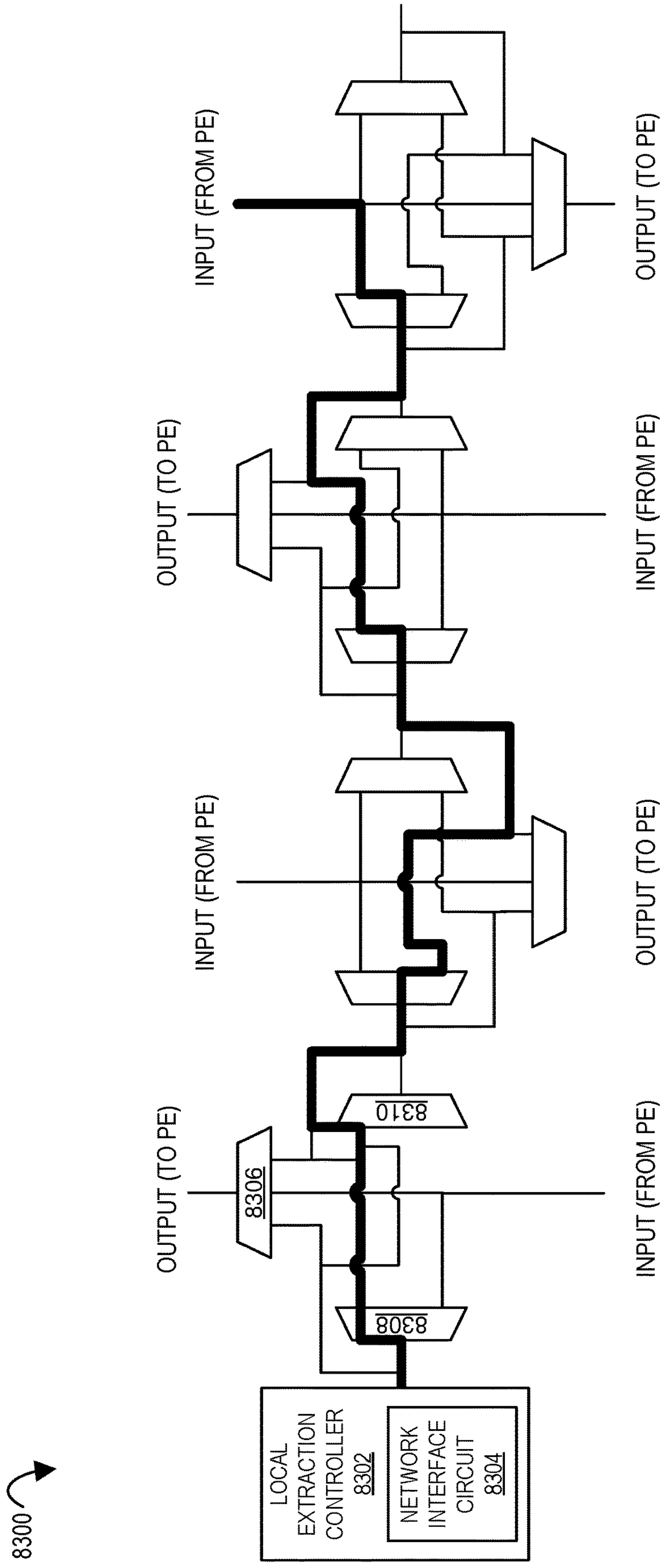
Figure 83C:
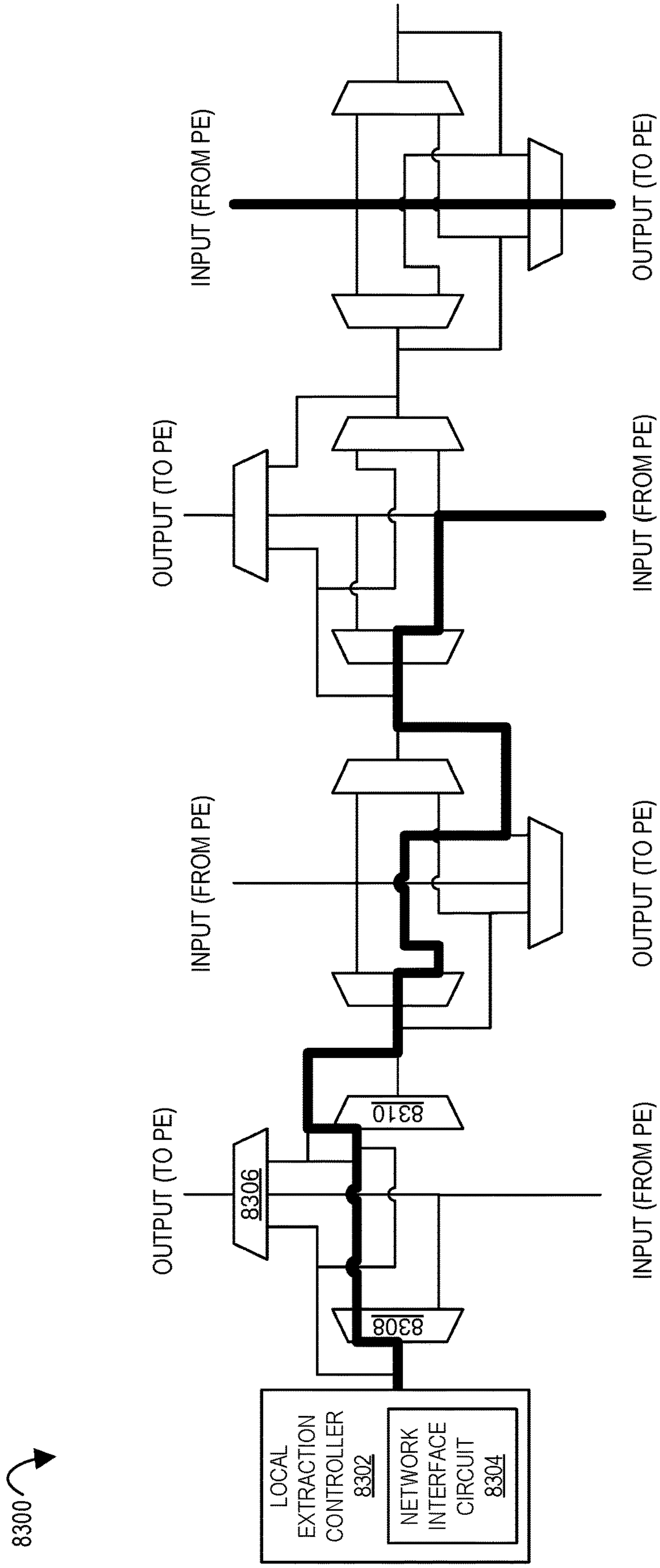

FIGS. 83A-83C illustrate a local extraction controller 8302 configuring a data path network according to embodiments of the disclosure. Depicted network includes a plurality of multiplexers (e.g., multiplexers 8306, 8308, 8310) that may be configured (e.g., via their respective control signals) to connect one or more data paths (e.g., from PEs) together. FIG. 83A illustrates the network 8300 (e.g., fabric) configured (e.g., set) for some previous operation or program. FIG. 83B illustrates the local extraction controller 8302 (e.g., including a network interface circuit 8304 to send and/or receive signals) strobing an extraction signal and all PEs controlled by the LEC enter into extraction mode. The last PE in the extraction chain (or an extraction terminator) may master the extraction channels (e.g., bus) and being sending data according to either (1) signals from the LEC or (2) internally produced signals (e.g., from a PE). Once completed, a PE may set its completion flag, e.g., enabling the next PE to extract its data. FIG. 83C illustrates the most distant PE has completed the extraction process and as a result it has set its extraction state bit or bits, e.g., which swing the muxes into the adjacent network to enable the next PE to begin the extraction process. The extracted PE may resume normal operation. In some embodiments, the PE may remain disabled until other action is taken. In these figures, the multiplexor networks are analogues of the "Switch" shown in certain Figures (e.g., FIG. 6).

The following sections describe the operation of the various components of embodiments of an extraction network.

Local Extraction Controller

Figure 84:
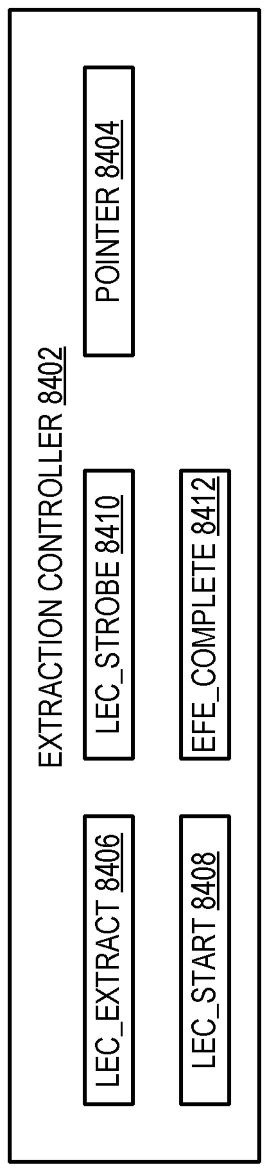
FIG. 84 illustrates an extraction controller according to embodiments of the disclosure.

FIG. 84 illustrates an extraction controller 8402 according to embodiments of the disclosure. A local extraction controller (LEC) may be the hardware entity which is responsible for accepting extraction commands, coordinating the extraction process with the EFEs, and/or storing extracted data, e.g., to virtual memory. In this capacity, the LEC may be a special-purpose, sequential microcontroller.

LEC operation may begin when it receives a pointer to a buffer (e.g., in virtual memory) where fabric state will be written, and, optionally, a command controlling how much of the fabric will be extracted. Depending on the LEC microarchitecture, this pointer (e.g., stored in pointer register 8404) may come either over a network or through a memory system access to the LEC. When it receives such a pointer (e.g., command), the LEC proceeds to extract state from the portion of the fabric for which it is responsible. The LEC may stream this extracted data out of the fabric into the buffer provided by the external caller.

Two different microarchitectures for the LEC are shown in FIG. 82. The first places the LEC 8202 at the memory interface. In this case, the LEC may make direct requests to the memory system to write extracted data. In the second case the LEC 8206 is placed on a memory network, in which it may make requests to the memory only indirectly. In both cases, the logical operation of the LEC may be unchanged. In one embodiment, LECs are informed of the desire to extract data from the fabric, for example, by a set of (e.g., OS-visible) control-status-registers which will be used to inform individual LECs of new commands.

Extra Out-of-Band Control Channels (e.g., Wires)

In certain embodiments, extraction relies on 2-8 extra, out-of-band signals to improve configuration speed, as defined below. Signals driven by the LEC may be labelled LEC. Signals driven by the EFE (e.g., PE) may be labelled EFE. Configuration controller 8402 may include the following control channels, e.g., LEC_EXTRACT control channel 8506, LEC_START control channel 8408, LEC_STROBE control channel 8410, and EFE_COMPLETE control channel 8412, with examples of each discussed in Table 4 below.

TABLE 4

| Extraction Channels | |
|---|---|
| LEC_EXTRACT | Optional signal asserted by the LEC during extraction process. Lowering this signal causes normal operation to resume. |
| LEC_START | Signal denoting start of extraction, allowing setup of local EFE state |
| LEC_STROBE | Optional strobe signal for controlling extraction related state machines at EFEs. EFEs may generate this signal internally in some implementations. |
| EFE_COMPLETE | Optional signal strobed when EFE has completed dumping state. This helps LEC identify the completion of individual EFE dumps. |

Generally, the handling of extraction may be left to the implementer of a particular EFE. For example, selectable function EFE may have a provision for dumping registers using an existing data path, while a fixed function EFE might simply have a multiplexor.

Due to long wire delays when programming a large set of EFEs, the LEC_STROBE signal may be treated as a clock/latch enable for EFE components. Since this signal is used as a clock, in one embodiment the duty cycle of the line is at most 50%. As a result, extraction throughput is approximately halved. Optionally, a second LEC_STROBE signal may be added to enable continuous extraction.

In one embodiment, only LEC_START is strictly communicated on an independent coupling (e.g., wire), for example, other control channels may be overlayed on existing network (e.g., wires).

Reuse of Network Resources

To reduce the overhead of data extraction, certain embodiments of a CSA make use of existing network infrastructure to communicate extraction data. A LEC may make use of both a chip-level memory hierarchy and a fabric-level communications networks to move data from the fabric into storage. As a result, in certain embodiments of a CSA, the extraction infrastructure adds no more than 2% to the overall fabric area and power.

Reuse of network resources in certain embodiments of a CSA may cause a network to have some hardware support for an extraction protocol. Circuit switched networks require of certain embodiments of a CSA cause a LEC to set their multiplexors in a specific way for configuration when the 'LEC_START' signal is asserted. Packet switched networks may not require extension, although LEC endpoints (e.g., extraction terminators) use a specific address in the packet switched network. Network reuse is optional, and some embodiments may find dedicated configuration buses to be more convenient.

Per EFE State

Each EFE may maintain a bit denoting whether or not it has exported its state. This bit may de-asserted when the extraction start signal is driven, and then asserted once the particular EFE finished extraction. In one extraction protocol, EFEs are arranged to form chains with the EFE extraction state bit determining the topology of the chain. A EFE may read the extraction state bit of the immediately adjacent EFE. If this adjacent EFE has its extraction bit set and the current EFE does not, the EFE may determine that it owns the extraction bus. When an EFE dumps its last data value, it may drives the 'EFE_DONE' signal and sets its extraction bit, e.g., enabling upstream EFEs to configure for extraction. The network adjacent to the EFE may observe this signal and also adjust its state to handle the transition. As a base case to the extraction process, an extraction terminator (e.g., extraction terminator 8204 for LEC 8202 or extraction terminator 8208 for LEC 8206 in FIG. 73) which asserts that extraction is complete may be included at the end of a chain.

Internal to the EFE, this bit may be used to drive flow control ready signals. For example, when the extraction bit is de-asserted, network control signals may automatically be clamped to a values that prevent data from flowing, while, within PEs, no operations or actions will be scheduled.

Dealing with High-Delay Paths

One embodiment of a LEC may drive a signal over a long distance, e.g., through many multiplexors and with many loads. Thus, it may be difficult for a signal to arrive at a distant EFE within a short clock cycle. In certain embodiments, extraction signals are at some division (e.g., fraction of) of the main (e.g., CSA) clock frequency to ensure digital timing discipline at extraction. Clock division may be utilized in an out-of-band signaling protocol, and does not require any modification of the main clock tree.

Ensuring Consistent Fabric Behavior During Extraction

Since certain extraction scheme are distributed and have non-deterministic timing due to program and memory effects, different members of the fabric may be under extraction at different times. While LEC_EXTRACT is driven, all network flow control signals may be driven logically low, e.g., thus freezing the operation of a particular segment of the fabric.

An extraction process may be non-destructive. Therefore a set of PEs may be considered operational once extraction has completed. An extension to an extraction protocol may allow PEs to optionally be disabled post extraction. Alternatively, beginning configuration during the extraction process will have similar effect in embodiments.

Single PE Extraction

In some cases, it may be expedient to extract a single PE. In this case, an optional address signal may be driven as part of the commencement of the extraction process. This may enable the PE targeted for extraction to be directly enabled. Once this PE has been extracted, the extraction process may cease with the lowering of the LEC_EXTRACT signal. In this way, a single PE may be selectively extracted, e.g., by the local extraction controller.

Handling Extraction Backpressure

In an embodiment where the LEC writes extracted data to memory (for example, for post-processing, e.g., in software), it may be subject to limitted memory bandwidth. In the case that the LEC exhausts its buffering capacity, or expects that it will exhaust its buffering capacity, it may stops strobing the LEC_STROBE signal until the buffering issue has resolved.

Note that in certain figures (e.g., FIGS. 73, 76, 77, 79, 80, and 82) communications are shown schematically. In certain embodiments, those communications may occur over the (e.g., interconnect) network.

6.7 Flow Diagrams

Figure 85:
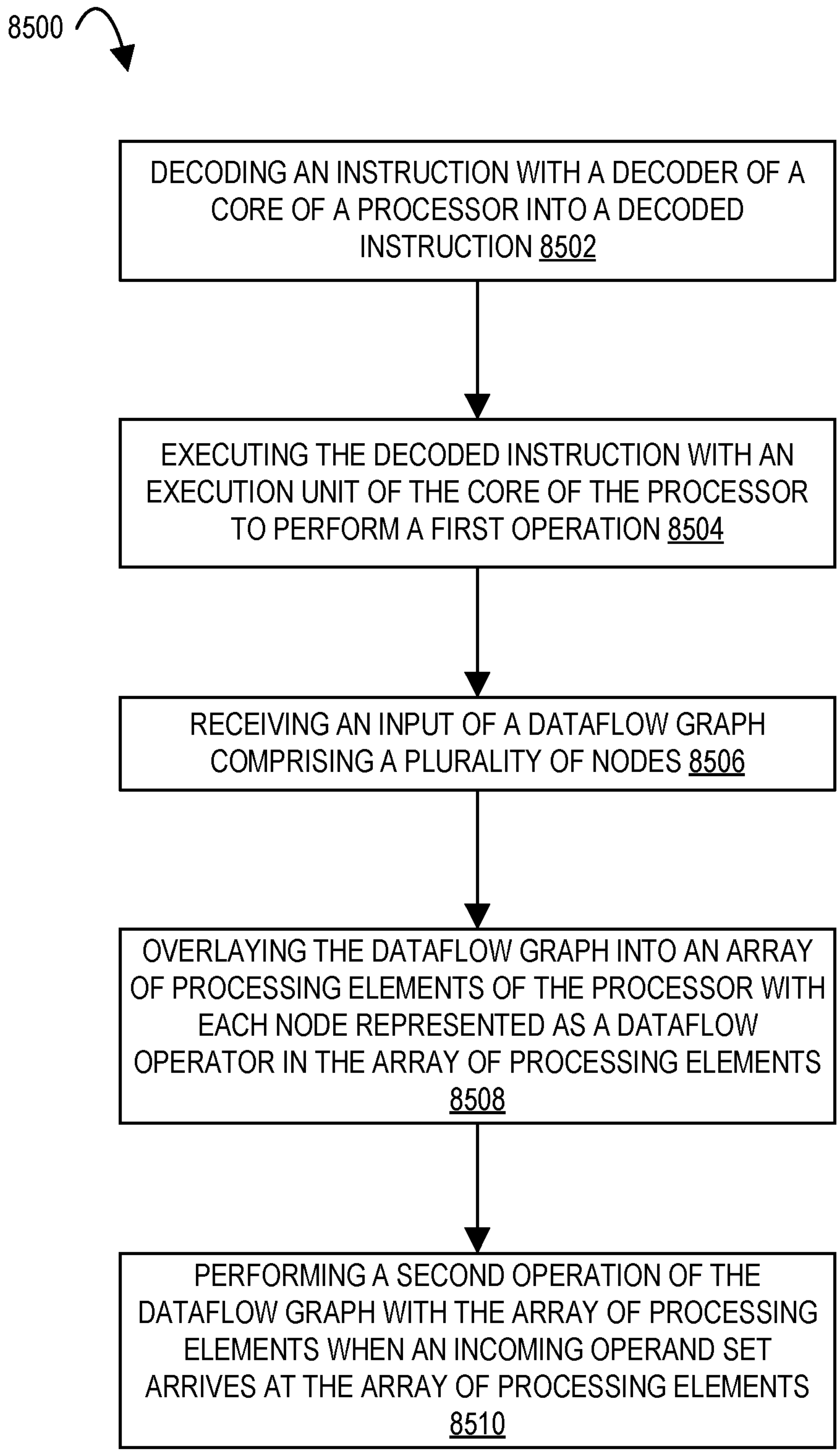
FIG. 85 illustrates a flow diagram according to embodiments of the disclosure.

FIG. 85 illustrates a flow diagram 8500 according to embodiments of the disclosure. Depicted flow 8500 includes decoding an instruction with a decoder of a core of a processor into a decoded instruction 8502; executing the decoded instruction with an execution unit of the core of the processor to perform a first operation 8504; receiving an input of a dataflow graph comprising a plurality of nodes 8506; overlaying the dataflow graph into an array of processing elements of the processor with each node represented as a dataflow operator in the array of processing elements 8508; and performing a second operation of the dataflow graph with the array of processing elements when an incoming operand set arrives at the array of processing elements 8510.

Figure 86:
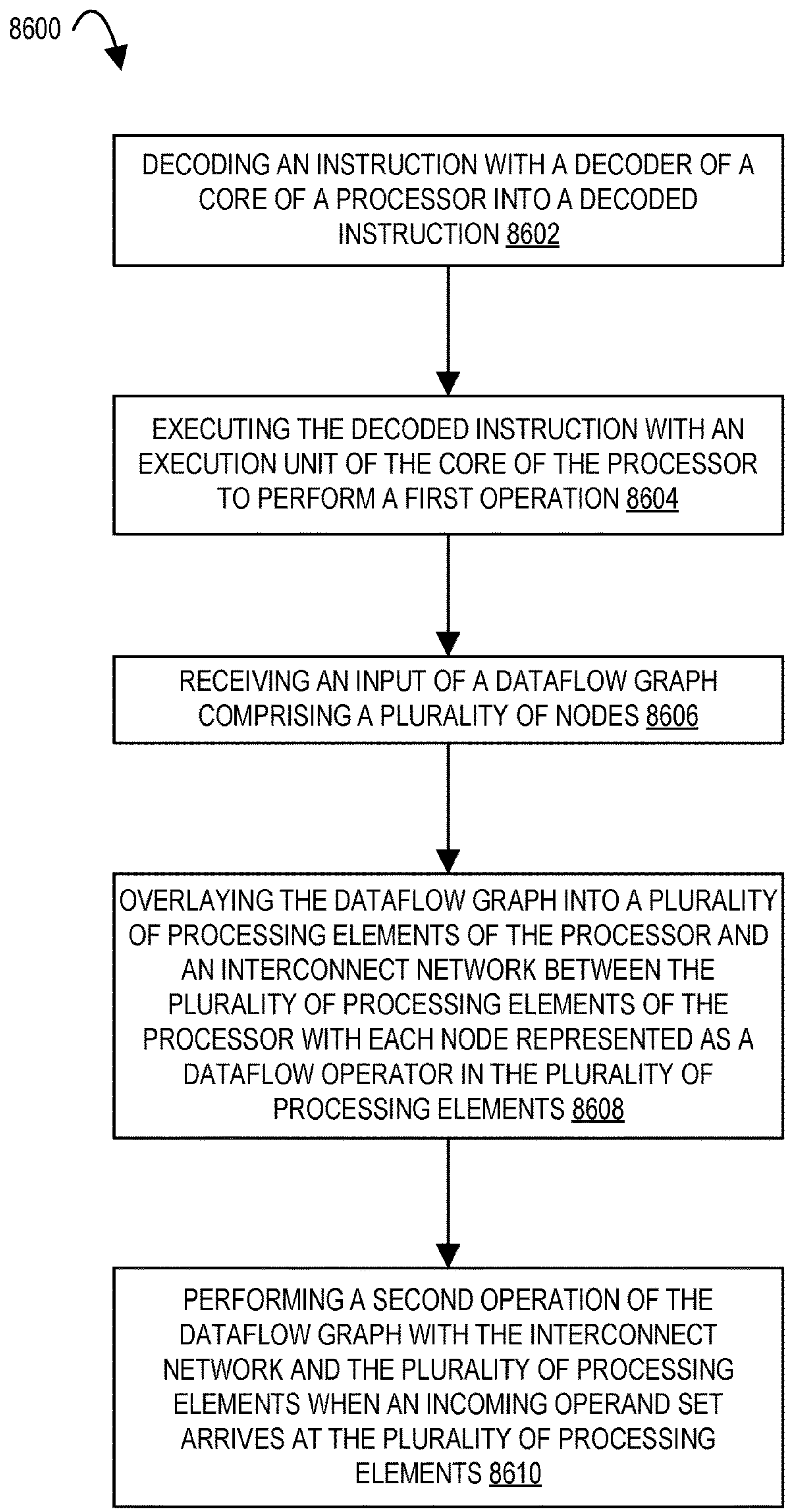
FIG. 86 illustrates a flow diagram according to embodiments of the disclosure.

FIG. 86 illustrates a flow diagram 8600 according to embodiments of the disclosure. Depicted flow 8600 includes decoding an instruction with a decoder of a core of a processor into a decoded instruction 8602; executing the decoded instruction with an execution unit of the core of the processor to perform a first operation 8604; receiving an input of a dataflow graph comprising a plurality of nodes 8606; overlaying the dataflow graph into a plurality of processing elements of the processor and an interconnect network between the plurality of processing elements of the processor with each node represented as a dataflow operator in the plurality of processing elements 8608; and performing a second operation of the dataflow graph with the interconnect network and the plurality of processing elements when an incoming operand set arrives at the plurality of processing elements 8610.

6.8 Memory

Figure 87A:
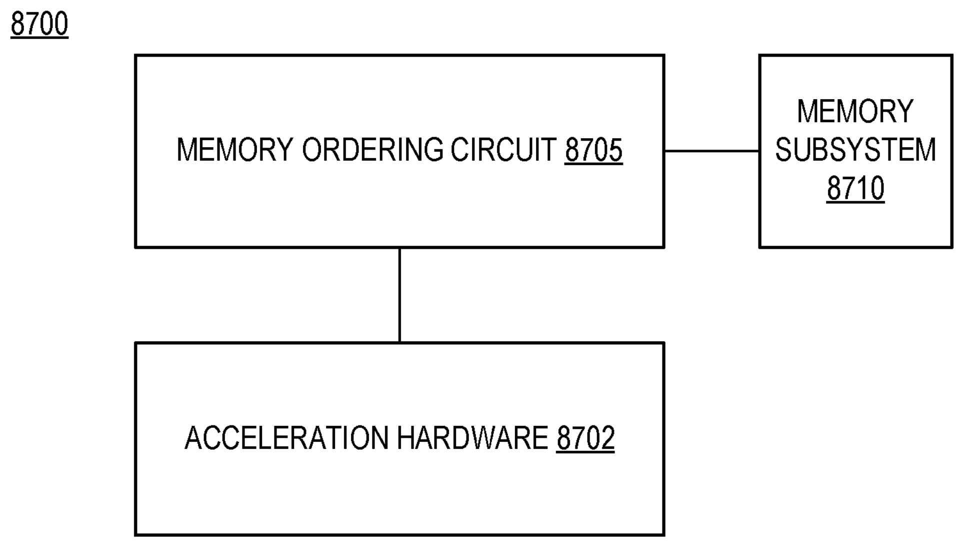
FIG. 87A is a block diagram of a system that employs a memory ordering circuit interposed between a memory subsystem and acceleration hardware according to embodiments of the disclosure.

FIG. 87A is a block diagram of a system 8700 that employs a memory ordering circuit 8705 interposed between a memory subsystem 8710 and acceleration hardware 8702, according to an embodiment of the present disclosure. The memory subsystem 8710 may include known memory components, including cache, memory, and one or more memory controller(s) associated with a processor-based architecture. The acceleration hardware 8702 may be coarse-grained spatial architecture made up of lightweight processing elements (or other types of processing components) connected by an inter-processing element (PE) network or another type of inter-component network.

In one embodiment, programs, viewed as control data flow graphs, are mapped onto the spatial architecture by configuring PEs and a communications network. Generally, PEs are configured as dataflow operators, similar to functional units in a processor: once the input operands arrive at the PE, some operation occurs, and results are forwarded to downstream PEs in a pipelined fashion. Dataflow operators (or other types of operators) may choose to consume incoming data on a per-operator basis. Simple operators, like those handling the unconditional evaluation of arithmetic expressions often consume all incoming data. It is sometimes useful, however, for operators to maintain state, for example, in accumulation.

The PEs communicate using dedicated virtual circuits, which are formed by statically configuring a circuit-switched communications network. These virtual circuits are flow controlled and fully back pressured, such that PEs will stall if either the source has no data or the destination is full. At runtime, data flows through the PEs implementing a mapped algorithm according to a dataflow graph, also referred to as a subprogram herein. For example, data may be streamed in from memory, through the acceleration hardware 8702, and then back out to memory. Such an architecture can achieve remarkable performance efficiency relative to traditional multicore processors: compute, in the form of PEs, is simpler and more numerous than larger cores and communication is direct, as opposed to an extension of the memory subsystem 8710. Memory system parallelism, however, helps to support parallel PE computation. If memory accesses are serialized, high parallelism is likely unachievable. To facilitate parallelism of memory accesses, the disclosed memory ordering circuit 8705 includes memory ordering architecture and microarchitecture, as will be explained in detail. In one embodiment, the memory ordering circuit 8705 is a request address file circuit (or "RAF") or other memory request circuitry.

Figure 87B:
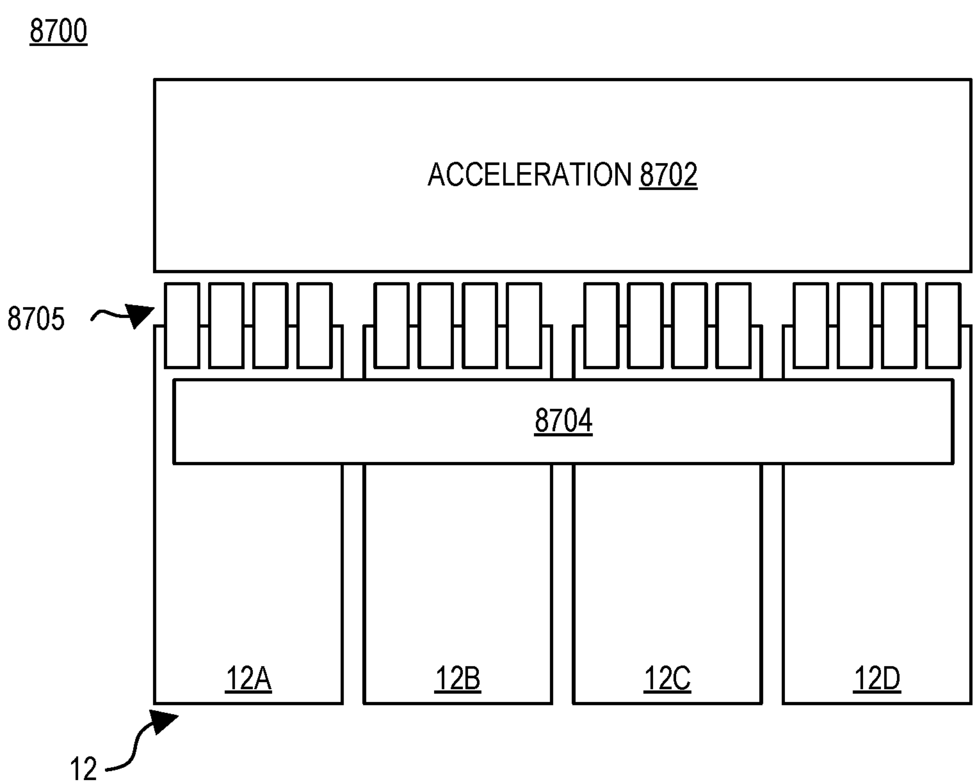
FIG. 87B is a block diagram of the system of FIG. 87A, but which employs multiple memory ordering circuits according to embodiments of the disclosure.

FIG. 87B is a block diagram of the system 8700 of FIG. 87A but which employs multiple memory ordering circuits 8705, according to an embodiment of the present disclosure. Each memory ordering circuit 8705 may function as an interface between the memory subsystem 8710 and a portion of the acceleration hardware 8702 (e.g., spatial array of processing elements or tile). The memory subsystem 8710 may include a plurality of cache slices 12 (e.g., cache slices 12A, 12B, 12C, and 12D in the embodiment of FIG. 87B), and a certain number of memory ordering circuits 8705 (four in this embodiment) may be used for each cache slice 12. A crossbar 8704 (e.g., RAF circuit) may connect the memory ordering circuits 8705 to banks of cache that make up each cache slice 12A, 12B, 12C, and 12D. For example, there may be eight banks of memory in each cache slice in one embodiment. The system 8700 may be instantiated on a single die, for example, as a system on a chip (SoC). In one embodiment, the SoC includes the acceleration hardware 8702. In an alternative embodiment, the acceleration hardware 8702 is an external programmable chip such as an FPGA or CGRA, and the memory ordering circuits 8705 interface with the acceleration hardware 8702 through an input/output hub or the like.

Each memory ordering circuit 8705 may accept read and write requests to the memory subsystem 8710. The requests from the acceleration hardware 8702 arrive at the memory ordering circuit 8705 in a separate channel for each node of the dataflow graph that initiates read or write accesses, also referred to as load or store accesses herein. Buffering is provided so that the processing of loads will return the requested data to the acceleration hardware 8702 in the order it was requested. In other words, iteration six data is returned before iteration seven data, and so forth. Furthermore, note that the request channel from a memory ordering circuit 8705 to a particular cache bank may be implemented as an ordered channel and any first request that leaves before a second request will arrive at the cache bank before the second request.

Figure 88:
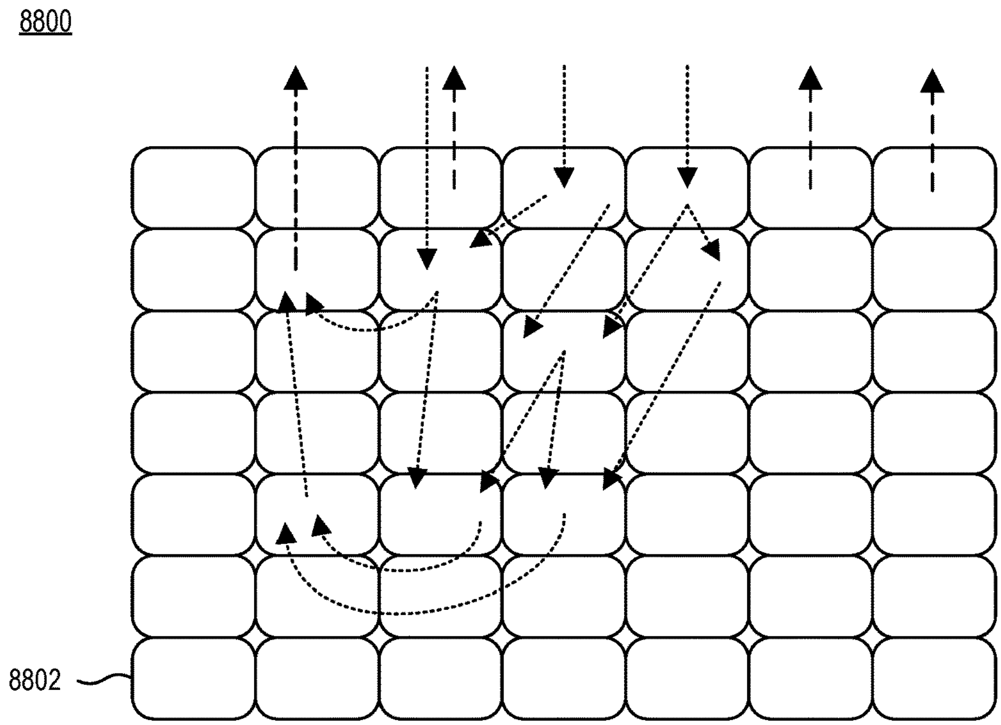
FIG. 88 is a block diagram illustrating general functioning of memory operations into and out of acceleration hardware according to embodiments of the disclosure.

FIG. 88 is a block diagram 8800 illustrating general functioning of memory operations into and out of the acceleration hardware 8702, according to an embodiment of the present disclosure. The operations occurring out the top of the acceleration hardware 8702 are understood to be made to and from a memory of the memory subsystem 8710. Note that two load requests are made, followed by corresponding load responses. While the acceleration hardware 8702 performs processing on data from the load responses, a third load request and response occur, which trigger additional acceleration hardware processing. The results of the acceleration hardware processing for these three load operations are then passed into a store operation, and thus a final result is stored back to memory.

By considering this sequence of operations, it may be evident that spatial arrays more naturally map to channels. Furthermore, the acceleration hardware 8702 is latency-insensitive in terms of the request and response channels, and inherent parallel processing that may occur. The acceleration hardware may also decouple execution of a program from implementation of the memory subsystem 8710 (FIG. 87A), as interfacing with the memory occurs at discrete moments separate from multiple processing steps taken by the acceleration hardware 8702. For example, a load request to and a load response from memory are separate actions, and may be scheduled differently in different circumstances depending on dependency flow of memory operations. The use of spatial fabric, for example, for processing instructions facilitates spatial separation and distribution of such a load request and a load response.

Figure 89:
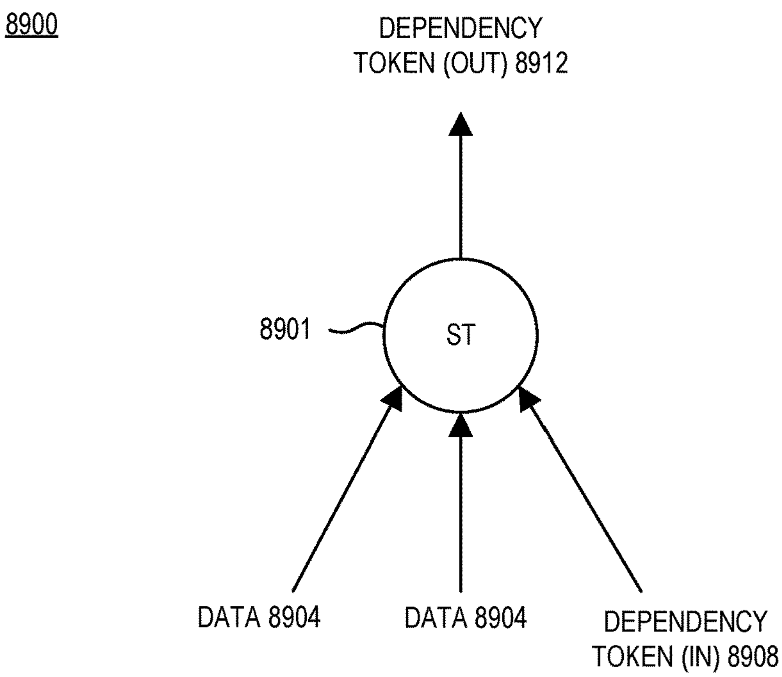
FIG. 89 is a block diagram illustrating a spatial dependency flow for a store operation according to embodiments of the disclosure.

FIG. 89 is a block diagram 8900 illustrating a spatial dependency flow for a store operation 8901, according to an embodiment of the present disclosure. Reference to a store operation is exemplary, as the same flow may apply to a load operation (but without incoming data), or to other operators such as a fence. A fence is an ordering operation for memory subsystems that ensures that all prior memory operations of a type (such as all stores or all loads) have completed. The store operation 8901 may receive an address 8902 (of memory) and data 8904 received from the acceleration hardware 8702. The store operation 8901 may also receive an incoming dependency token 8908, and in response to the availability of these three items, the store operation 8901 may generate an outgoing dependency token 8912. The incoming dependency token, which may, for example, be an initial dependency token of a program, may be provided in a compiler-supplied configuration for the program, or may be provided by execution of memory-mapped input/output (I/O). Alternatively, if the program has already been running, the incoming dependency token 8908 may be received from the acceleration hardware 8702, e.g., in association with a preceding memory operation from which the store operation 8901 depends. The outgoing dependency token 8912 may be generated based on the address 8902 and data 8904 being required by a program-subsequent memory operation.

Figure 90:
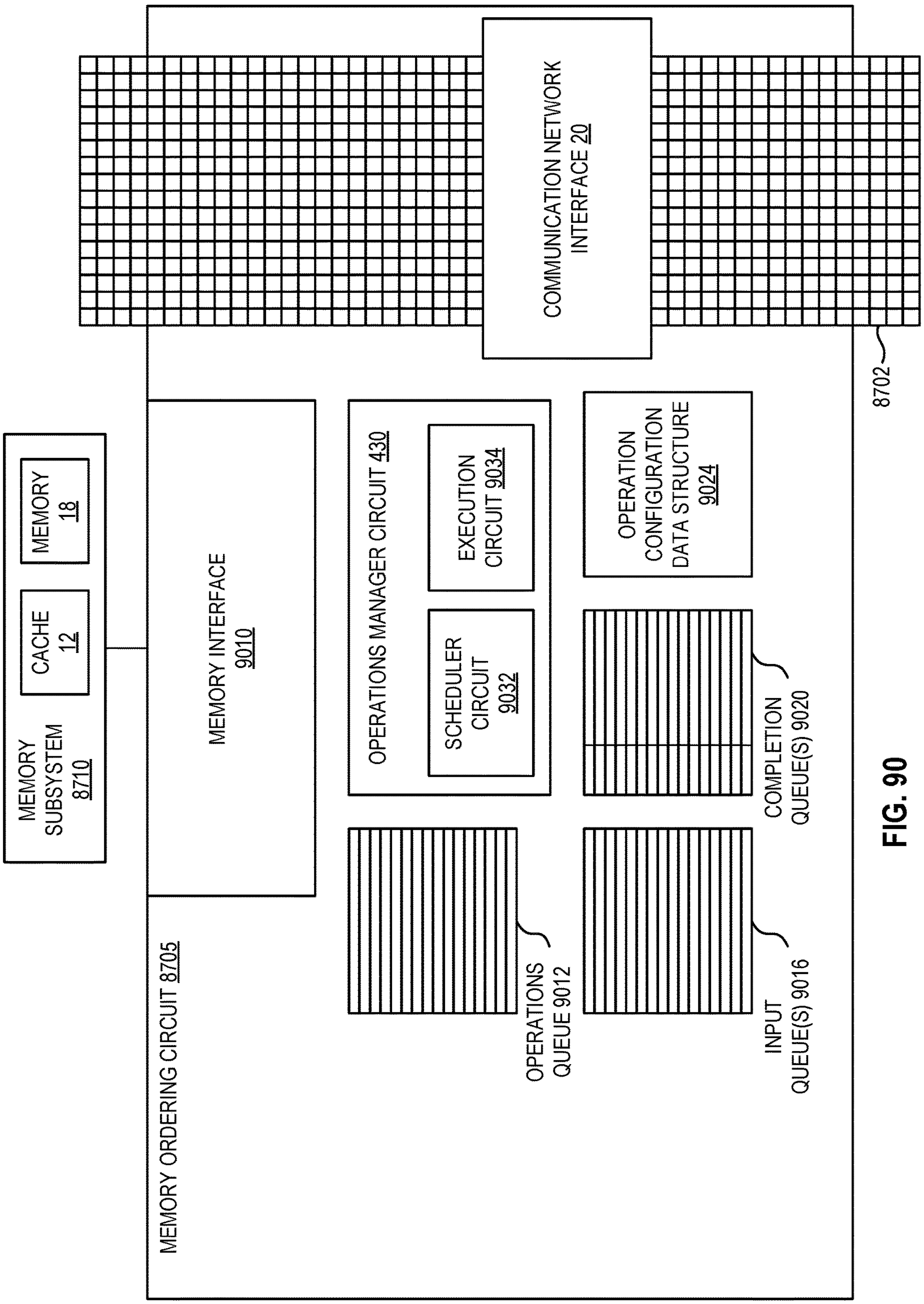
FIG. 90 is a detailed block diagram of the memory ordering circuit of FIG. 87 according to embodiments of the disclosure.

FIG. 90 is a detailed block diagram of the memory ordering circuit 8705 of FIG. 87A, according to an embodiment of the present disclosure. The memory ordering circuit 8705 may be coupled to an out-of-order memory subsystem 8710, which as discussed, may include cache 12 and memory 18, and associated out-of-order memory controller(s). The memory ordering circuit 8705 may include, or be coupled to, a communications network interface 20 that may be either an inter-tile or an intra-tile network interface, and may be a circuit switched network interface (as illustrated), and thus include circuit-switched interconnects. Alternatively, or additionally, the communications network interface 20 may include packet-switched interconnects.

The memory ordering circuit 8705 may further include, but not be limited to, a memory interface 9010, an operations queue 9012, input queue(s) 9016, a completion queue 9020, an operation configuration data structure 9024, and an operations manager circuit 9030 that may further include a scheduler circuit 9032 and an execution circuit 9034. In one embodiment, the memory interface 9010 may be circuit-switched, and in another embodiment, the memory interface 9010 may be packet-switched, or both may exist simultaneously. The operations queue 9012 may buffer memory operations (with corresponding arguments) that are being processed for request, and may, therefore, correspond to addresses and data coming into the input queues 9016.

More specifically, the input queues 9016 may be an aggregation of at least the following: a load address queue, a store address queue, a store data queue, and a dependency queue. When implementing the input queue 9016 as aggregated, the memory ordering circuit 8705 may provide for sharing of logical queues, with additional control logic to logically separate the queues, which are individual channels with the memory ordering circuit. This may maximize input queue usage, but may also require additional complexity and space for the logic circuitry to manage the logical separation of the aggregated queue. Alternatively, as will be discussed with reference to FIG. 91, the input queues 9016 may be implemented in a segregated fashion, with a separate hardware queue for each. Whether aggregated (FIG. 90) or disaggregated (FIG. 91), implementation for purposes of this disclosure is substantially the same, with the former using additional logic to logically separate the queues within a single, shared hardware queue.

When shared, the input queues 9016 and the completion queue 9020 may be implemented as ring buffers of a fixed size. A ring buffer is an efficient implementation of a circular queue that has a first-in-first-out (FIFO) data characteristic. These queues may, therefore, enforce a semantical order of a program for which the memory operations are being requested. In one embodiment, a ring buffer (such as for the store address queue) may have entries corresponding to entries flowing through an associated queue (such as the store data queue or the dependency queue) at the same rate. In this way, a store address may remain associated with corresponding store data.

More specifically, the load address queue may buffer an incoming address of the memory 18 from which to retrieve data. The store address queue may buffer an incoming address of the memory 18 to which to write data, which is buffered in the store data queue. The dependency queue may buffer dependency tokens in association with the addresses of the load address queue and the store address queue. Each queue, representing a separate channel, may be implemented with a fixed or dynamic number of entries. When fixed, the more entries that are available, the more efficient complicated loop processing may be made. But, having too many entries costs more area and energy to implement. In some cases, e.g., with the aggregated architecture, the disclosed input queue 9016 may share queue slots. Use of the slots in a queue may be statically allocated.

The completion queue 9020 may be a separate set of queues to buffer data received from memory in response to memory commands issued by load operations. The completion queue 9020 may be used to hold a load operation that has been scheduled but for which data has not yet been received (and thus has not yet completed). The completion queue 9020, may therefore, be used to reorder data and operation flow.

The operations manager circuit 9030, which will be explained in more detail with reference to FIGS. 91 through 55, may provide logic for scheduling and executing queued memory operations when taking into account dependency tokens used to provide correct ordering of the memory operations. The operation manager 9030 may access the operation configuration data structure 9024 to determine which queues are grouped together to form a given memory operation. For example, the operation configuration data structure 9024 may include that a specific dependency counter (or queue), input queue, output queue, and completion queue are all grouped together for a particular memory operation. As each successive memory operation may be assigned a different group of queues, access to varying queues may be interleaved across a sub-program of memory operations. Knowing all of these queues, the operations manager circuit 9030 may interface with the operations queue 9012, the input queue(s) 9016, the completion queue(s) 9020, and the memory subsystem 8710 to initially issue memory operations to the memory subsystem 8710 when successive memory operations become "executable," and to next complete the memory operation with some acknowledgement from the memory subsystem. This acknowledgement may be, for example, data in response to a load operation command or an acknowledgement of data being stored in the memory in response to a store operation command.

Figure 91:
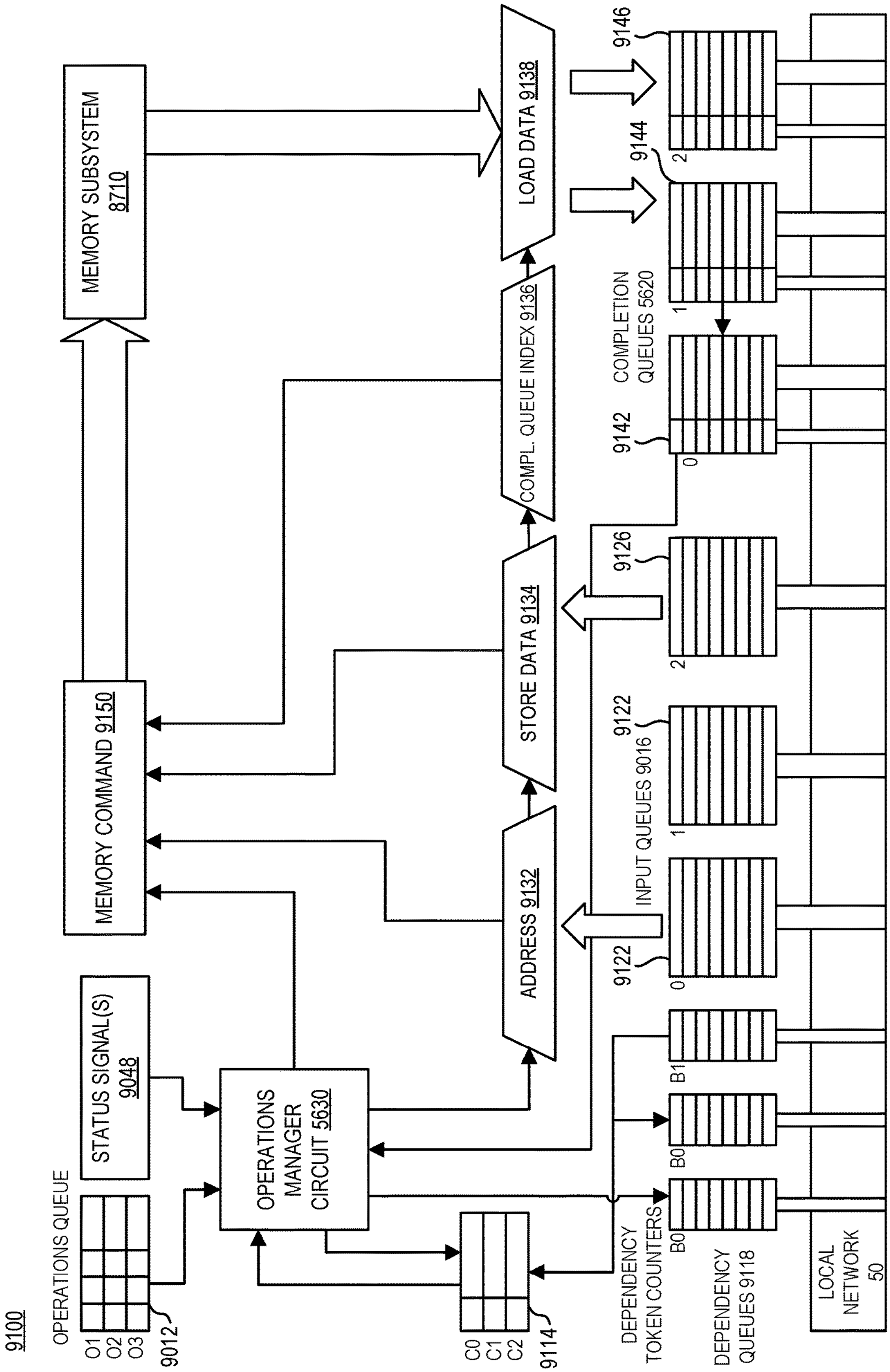
FIG. 91 is a flow diagram of a microarchitecture of the memory ordering circuit of FIG. 87 according to embodiments of the disclosure.

FIG. 91 is a flow diagram of a microarchitecture 9100 of the memory ordering circuit 8705 of FIG. 87A, according to an embodiment of the present disclosure. The memory subsystem 8710 may allow illegal execution of a program in which ordering of memory operations is wrong, due to the semantics of C language (and other object-oriented program languages). The microarchitecture 9100 may enforce the ordering of the memory operations (sequences of loads from and stores to memory) so that results of instructions that the acceleration hardware 8702 executes are properly ordered. A number of local networks 50 are illustrated to represent a portion of the acceleration hardware 8702 coupled to the microarchitecture 9100.

From an architectural perspective, there are at least two goals: first, to run general sequential codes correctly, and second, to obtain high performance in the memory operations performed by the microarchitecture 9100. To ensure program correctness, the compiler expresses the dependency between the store operation and the load operation to an array, p, in some fashion, which are expressed via dependency tokens as will be explained. To improve performance, the microarchitecture 9100 finds and issues as many load commands of an array in parallel as is legal with respect to program order.

In one embodiment, the microarchitecture 9100 may include the operations queue 9012, the input queues 9016, the completion queues 9020, and the operations manager circuit 9030 discussed with reference to FIG. 90, above, where individual queues may be referred to as channels. The microarchitecture 9100 may further include a plurality of dependency token counters 9114 (e.g., one per input queue), a set of dependency queues 9118 (e.g., one each per input queue), an address multiplexer 9132, a store data multiplexer 9134, a completion queue index multiplexer 9136, and a load data multiplexer 9138. The operations manager circuit 9030, in one embodiment, may direct these various multiplexers in generating a memory command 9150 (to be sent to the memory subsystem 8710) and in receipt of responses of load commands back from the memory subsystem 8710, as will be explained.

The input queues 9016, as mentioned, may include a load address queue 9122, a store address queue 9124, and a store data queue 9126. (The small numbers 0, 1, 2 are channel labels and will be referred to later in FIG. 94 and FIG. 97A.) In various embodiments, these input queues may be multiplied to contain additional channels, to handle additional parallelization of memory operation processing. Each dependency queue 9118 may be associated with one of the input queues 9016. More specifically, the dependency queue 9118 labeled B0 may be associated with the load address queue 9122 and the dependency queue labeled B1 may be associated with the store address queue 9124. If additional channels of the input queues 9016 are provided, the dependency queues 9118 may include additional, corresponding channels.

In one embodiment, the completion queues 9020 may include a set of output buffers 9144 and 9146 for receipt of load data from the memory subsystem 8710 and a completion queue 9142 to buffer addresses and data for load operations according to an index maintained by the operations manager circuit 9030. The operations manager circuit 9030 can manage the index to ensure in-order execution of the load operations, and to identify data received into the output buffers 9144 and 9146 that may be moved to scheduled load operations in the completion queue 9142.

More specifically, because the memory subsystem 8710 is out of order, but the acceleration hardware 8702 completes operations in order, the microarchitecture 9100 may re-order memory operations with use of the completion queue 9142. Three different sub-operations may be performed in relation to the completion queue 9142, namely to allocate, enqueue, and dequeue. For allocation, the operations manager circuit 9030 may allocate an index into the completion queue 9142 in an in-order next slot of the completion queue. The operations manager circuit may provide this index to the memory subsystem 8710, which may then know the slot to which to write data for a load operation. To enqueue, the memory subsystem 8710 may write data as an entry to the indexed, in-order next slot in the completion queue 9142 like random access memory (RAM), setting a status bit of the entry to valid. To dequeue, the operations manager circuit 9030 may present the data stored in this in-order next slot to complete the load operation, setting the status bit of the entry to invalid. Invalid entries may then be available for a new allocation.

In one embodiment, the status signals 9048 may refer to statuses of the input queues 9016, the completion queues 9020, the dependency queues 9118, and the dependency token counters 9114. These statuses, for example, may include an input status, an output status, and a control status, which may refer to the presence or absence of a dependency token in association with an input or an output. The input status may include the presence or absence of addresses and the output status may include the presence or absence of store values and available completion buffer slots. The dependency token counters 9114 may be a compact representation of a queue and track a number of dependency tokens used for any given input queue. If the dependency token counters 9114 saturate, no additional dependency tokens may be generated for new memory operations. Accordingly, the memory ordering circuit 8705 may stall scheduling new memory operations until the dependency token counters 9114 becomes unsaturated.

Figure 92:
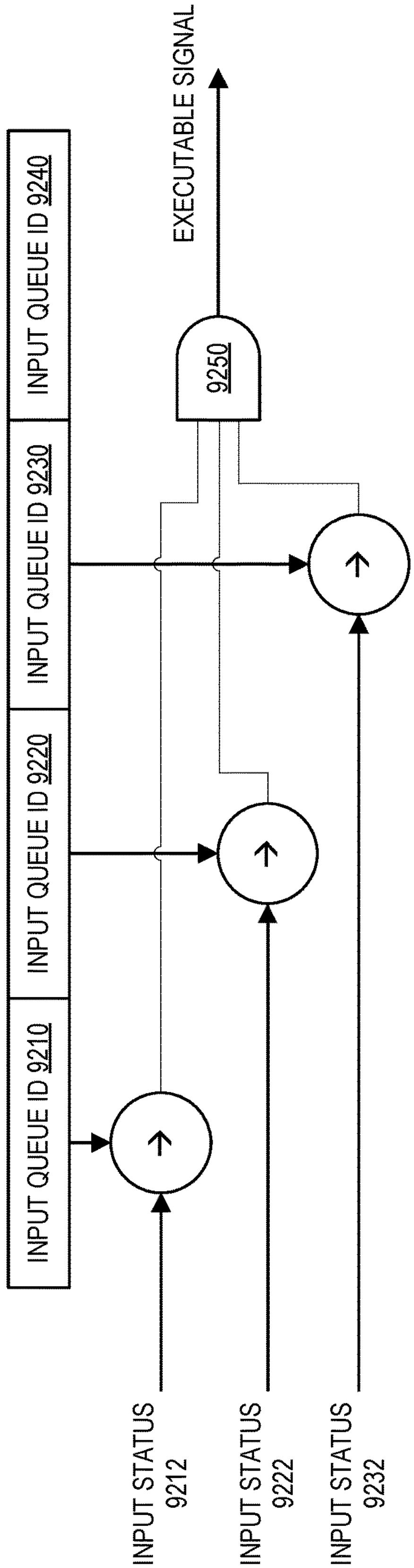
FIG. 92 is a block diagram of an executable determiner circuit according to embodiments of the disclosure.

With additional reference to FIG. 92, FIG. 92 is a block diagram of an executable determiner circuit 9200, according to an embodiment of the present disclosure. The memory ordering circuit 8705 may be set up with several different kinds of memory operations, for example a load and a store:

ldNo[d,x] result.outN, addr.in64, order.in0, order.out0 stNo[d,x] addr.in64, data.inN, order.in0, order.out0

The executable determiner circuit 9200 may be integrated as a part of the scheduler circuit 9032 and which may perform a logical operation to determine whether a given memory operation is executable, and thus ready to be issued to memory. A memory operation may be executed when the queues corresponding to its memory arguments have data and an associated dependency token is present. These memory arguments may include, for example, an input queue identifier 9210 (indicative of a channel of the input queue 9016), an output queue identifier 9220 (indicative of a channel of the completion queues 9020), a dependency queue identifier 9230 (e.g., what dependency queue or counter should be referenced), and an operation type indicator 9240 (e.g., load operation or store operation). A field (e.g., of a memory request) may be included, e.g., in the above format, that stores a bit or bits to indicate to use the hazard checking hardware.

These memory arguments may be queued within the operations queue 9012, and used to schedule issuance of memory operations in association with incoming addresses and data from memory and the acceleration hardware 8702. (See FIG. 93.) Incoming status signals 9048 may be logically combined with these identifiers and then the results may be added (e.g., through an AND gate 9250) to output an executable signal, e.g., which is asserted when the memory operation is executable. The incoming status signals 9048 may include an input status 9212 for the input queue identifier 9210, an output status 9222 for the output queue identifier 9220, and a control status 9232 (related to dependency tokens) for the dependency queue identifier 9230.

For a load operation, and by way of example, the memory ordering circuit 8705 may issue a load command when the load operation has an address (input status) and room to buffer the load result in the completion queue 9142 (output status). Similarly, the memory ordering circuit 8705 may issue a store command for a store operation when the store operation has both an address and data value (input status). Accordingly, the status signals 9048 may communicate a level of emptiness (or fullness) of the queues to which the status signals pertain. The operation type may then dictate whether the logic results in an executable signal depending on what address and data should be available.

To implement dependency ordering, the scheduler circuit 9032 may extend memory operations to include dependency tokens as underlined above in the example load and store operations. The control status 9232 may indicate whether a dependency token is available within the dependency queue identified by the dependency queue identifier 9230, which could be one of the dependency queues 9118 (for an incoming memory operation) or a dependency token counter 9114 (for a completed memory operation). Under this formulation, a dependent memory operation requires an additional ordering token to execute and generates an additional ordering token upon completion of the memory operation, where completion means that data from the result of the memory operation has become available to program-subsequent memory operations.

In one embodiment, with further reference to FIG. 91, the operations manager circuit 9030 may direct the address multiplexer 9132 to select an address argument that is buffered within either the load address queue 9122 or the store address queue 9124, depending on whether a load operation or a store operation is currently being scheduled for execution. If it is a store operation, the operations manager circuit 9030 may also direct the store data multiplexer 9134 to select corresponding data from the store data queue 9126. The operations manager circuit 9030 may also direct the completion queue index multiplexer 9136 to retrieve a load operation entry, indexed according to queue status and/or program order, within the completion queues 9020, to complete a load operation. The operations manager circuit 9030 may also direct the load data multiplexer 9138 to select data received from the memory subsystem 8710 into the completion queues 9020 for a load operation that is awaiting completion. In this way, the operations manager circuit 9030 may direct selection of inputs that go into forming the memory command 9150, e.g., a load command or a store command, or that the execution circuit 9034 is waiting for to complete a memory operation.

Figure 93:
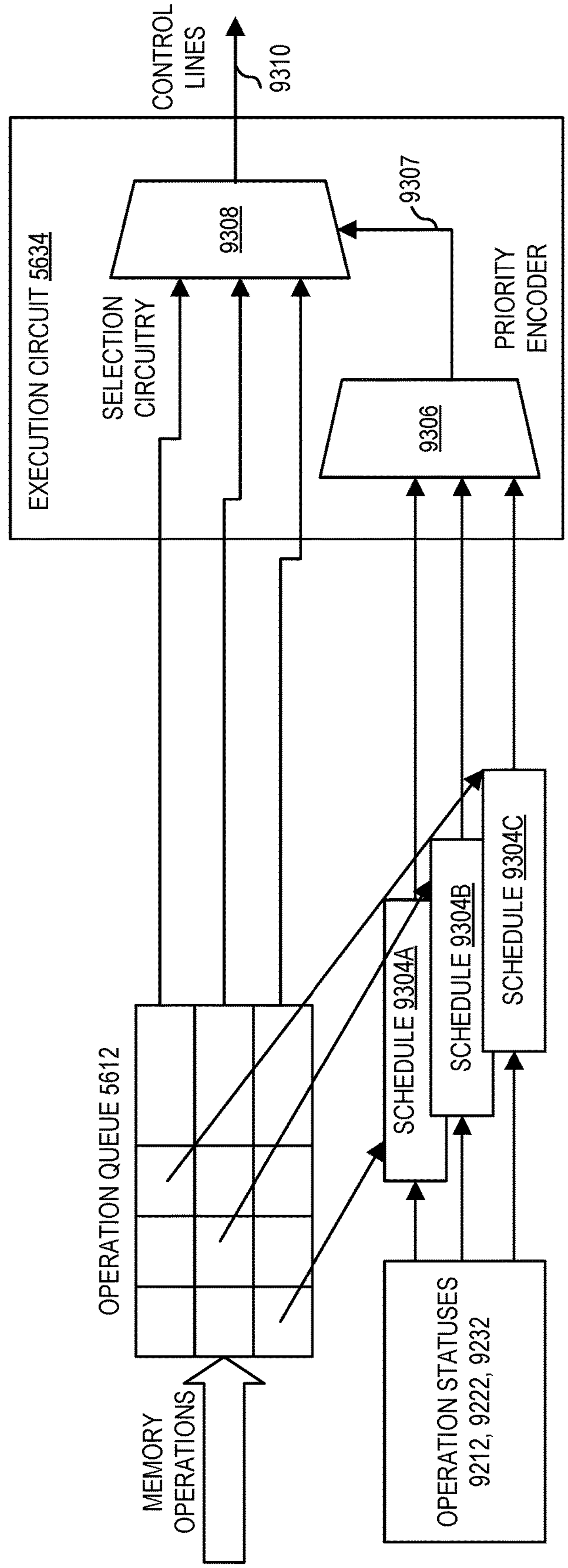
FIG. 93 is a block diagram of a priority encoder according to embodiments of the disclosure.

FIG. 93 is a block diagram the execution circuit 9034 that may include a priority encoder 9306 and selection circuitry 9308 and which generates output control line(s) 9310, according to one embodiment of the present disclosure. In one embodiment, the execution circuit 9034 may access queued memory operations (in the operations queue 9012) that have been determined to be executable (FIG. 92). The execution circuit 9034 may also receive the schedules 9304A, 9304B, 9304C for multiple of the queued memory operations that have been queued and also indicated as ready to issue to memory. The priority encoder 9306 may thus receive an identity of the executable memory operations that have been scheduled and execute certain rules (or follow particular logic) to select the memory operation from those coming in that has priority to be executed first. The priority encoder 9306 may output a selector signal 9307 that identifies the scheduled memory operation that has a highest priority, and has thus been selected.

The priority encoder 9306, for example, may be a circuit (such as a state machine or a simpler converter) that compresses multiple binary inputs into a smaller number of outputs, including possibly just one output. The output of a priority encoder is the binary representation of the original number starting from zero of the most significant input bit. So, in one example, when memory operation 0 ("zero"), memory operation one ("1"), and memory operation two ("2") are executable and scheduled, corresponding to 9304A, 9304B, and 9304C, respectively. The priority encoder 9306 may be configured to output the selector signal 9307 to the selection circuitry 9308 indicating the memory operation zero as the memory operation that has highest priority. The selection circuitry 9308 may be a multiplexer in one embodiment, and be configured to output its selection (e.g., of memory operation zero) onto the control lines 9310, as a control signal, in response to the selector signal from the priority encoder 9306 (and indicative of selection of memory operation of highest priority). This control signal may go to the multiplexers 9132, 9134, 9136, and/or 9138, as discussed with reference to FIG. 91, to populate the memory command 9150 that is next to issue (be sent) to the memory subsystem 8710. The transmittal of the memory command may be understood to be issuance of a memory operation to the memory subsystem 8710.

FIG. 94 is a block diagram of an exemplary load operation 9400, both logical and in binary form, according to an embodiment of the present disclosure. Referring back to FIG. 92, the logical representation of the load operation 9400 may include channel zero ("0") (corresponding to the load address queue 9122) as the input queue identifier 9210 and completion channel one ("1") (corresponding to the output buffer 9144) as the output queue identifier 9220. The dependency queue identifier 9230 may include two identifiers, channel B0 (corresponding to the first of the dependency queues 9118) for incoming dependency tokens and counter C0 for outgoing dependency tokens. The operation type 9240 has an indication of "Load," which could be a numerical indicator as well, to indicate the memory operation is a load operation. Below the logical representation of the logical memory operation is a binary representation for exemplary purposes, e.g., where a load is indicated by "00." The load operation of FIG. 94 may be extended to include other configurations such as a store operation (FIG. 96A) or other type of memory operations, such as a fence.

An example of memory ordering by the memory ordering circuit 8705 will be illustrated with a simplified example for purposes of explanation with relation to FIGS. 95A-95B, 96A-96B, and 97A-97G. For this example, the following code includes an array, p, which is accessed by indices i and i+2:

```
for(i) {
   temp=p[i];
   p[i+2]=temp;
}
```

Figure 95A:
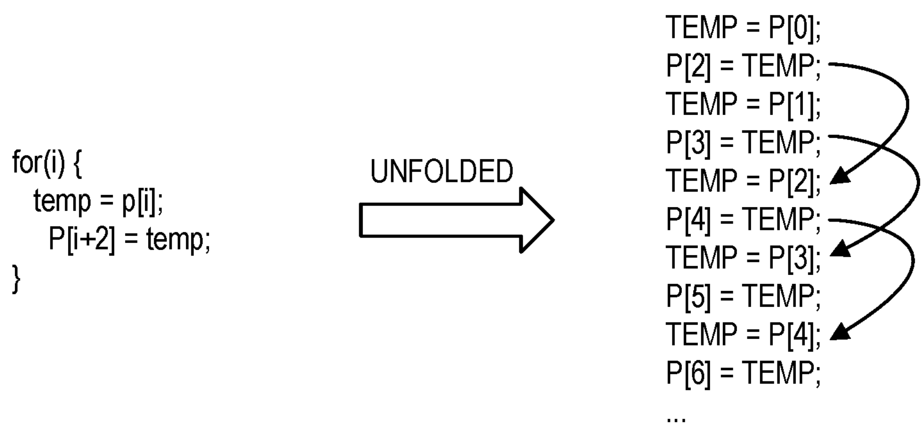
FIG. 95A is flow diagram illustrating logical execution of an example code according to embodiments of the disclosure.
Figure 95B:
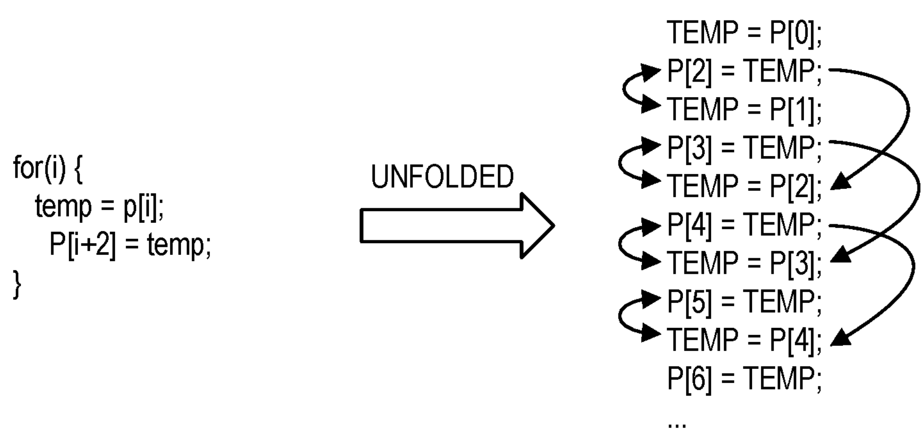
FIG. 95B is the flow diagram of FIG. 95A, illustrating memory-level parallelism in an unfolded version of the example code according to embodiments of the disclosure.

Assume, for this example, that array p contains 0, 1, 2, 3, 4, 5, 6, and at the end of loop execution, array p will contain 0, 1, 0, 1, 0, 1, 0. This code may be transformed by unrolling the loop, as illustrated in FIGS. 95A and 95B. True address dependencies are annotated by arrows in FIG. 95A, which in each case, a load operation is dependent on a store operation to the same address. For example, for the first of such dependencies, a store (e.g., a write) to p[2] needs to occur before a load (e.g., a read) from p[2], and second of such dependencies, a store to p[3] needs to occur before a load from p[3], and so forth. As a compiler is to be pessimistic, the compiler annotates dependencies between two memory operations, load p[i] and store p[i+2]. Note that only sometimes do reads and writes conflict. The micro-architecture 9100 is designed to extract memory-level parallelism where memory operations may move forward at the same time when there are no conflicts to the same address. This is especially the case for load operations, which expose latency in code execution due to waiting for preceding dependent store operations to complete. In the example code in FIG. 95B, safe reorderings are noted by the arrows on the left of the unfolded code.

The way the microarchitecture may perform this reordering is discussed with reference to FIGS. 96A-96B and 97A-97G. Note that this approach is not as optimal as possible because the microarchitecture 9100 may not send a memory command to memory every cycle. However, with minimal hardware, the microarchitecture supports dependency flows by executing memory operations when operands (e.g., address and data, for a store, or address for a load) and dependency tokens are available.

Figure 96A:
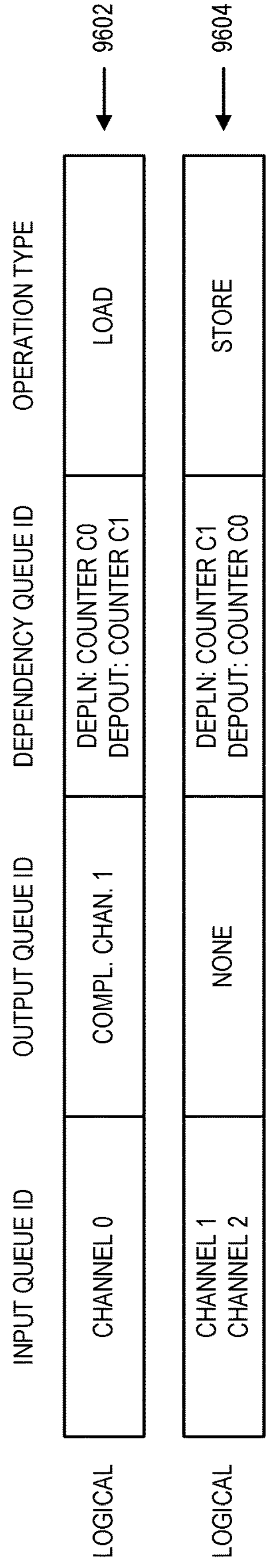
FIG. 96A is a block diagram of exemplary memory arguments for a load operation and for a store operation according to embodiments of the disclosure.

FIG. 96A is a block diagram of exemplary memory arguments for a load operation 9602 and for a store operation 9604, according to an embodiment of the present disclosure. These, or similar, memory arguments were discussed with relation to FIG. 94 and will not be repeated here. Note, however, that the store operation 9604 has no indicator for the output queue identifier because no data is being output to the acceleration hardware 8702. Instead, the store address in channel 1 and the data in channel 2 of the input queues 9016, as identified in the input queue identifier memory argument, are to be scheduled for transmission to the memory subsystem 8710 in a memory command to complete the store operation 9604. Furthermore, the input channels and output channels of the dependency queues are both implemented with counters. Because the load operations and the store operations as displayed in FIGS. 95A and 95B are interdependent, the counters may be cycled between the load operations and the store operations within the flow of the code.

Figure 96B:
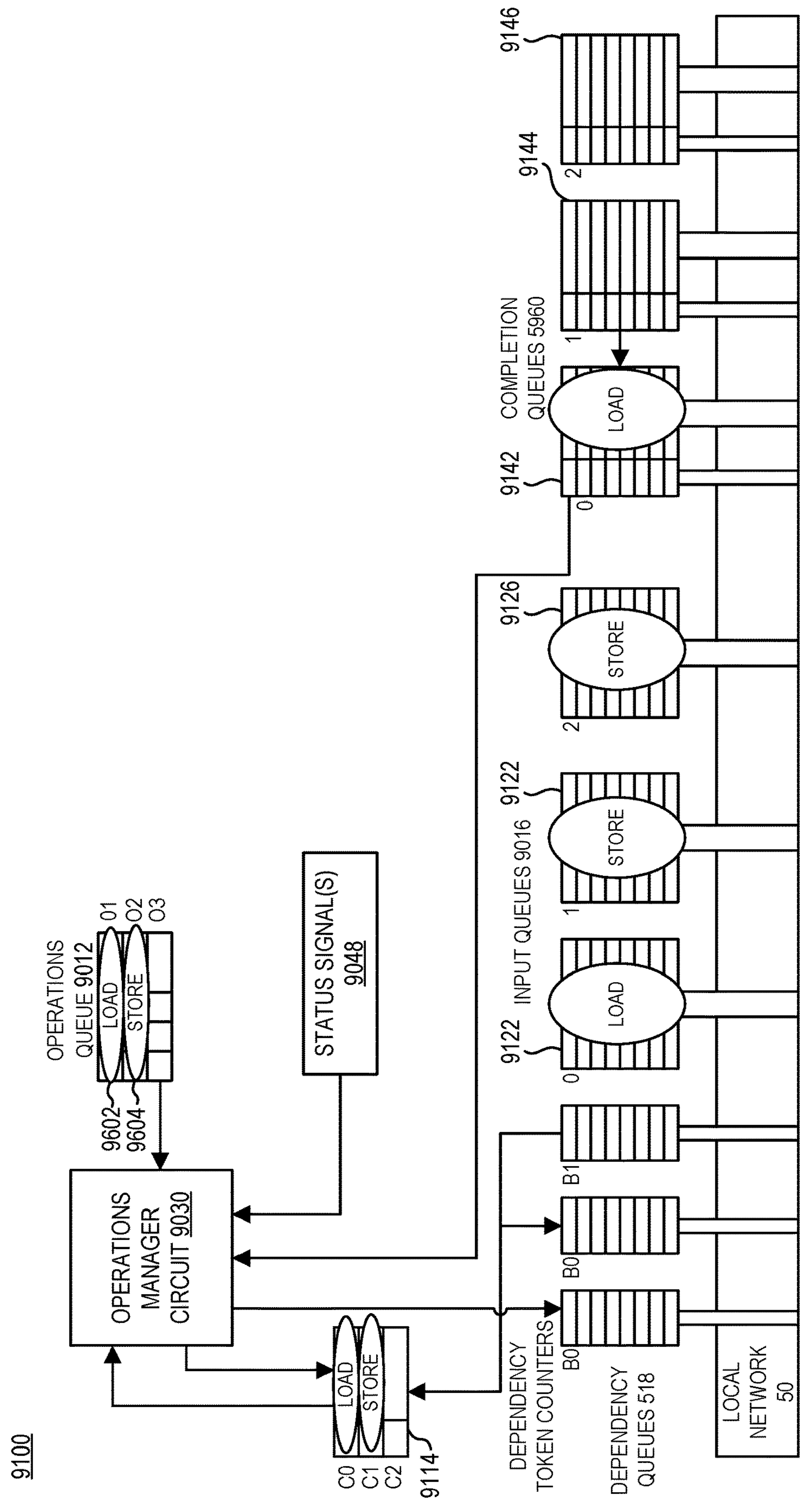
FIG. 96B is a block diagram illustrating flow of load operations and the store operations, such as those of FIG. 96A, through the microarchitecture of the memory ordering circuit of FIG. 91 according to embodiments of the disclosure.

FIG. 96B is a block diagram illustrating flow of the load operations and store operations, such as the load operation 9602 and the store 9604 operation of FIG. 95A, through the microarchitecture 9100 of the memory ordering circuit of FIG. 91, according to an embodiment of the present disclosure. For simplicity of explanation, not all of the components are displayed, but reference may be made back to the additional components displayed in FIG. 91. Various ovals indicating "Load" for the load operation 9602 and "Store" for the store operation 9604 are overlaid on some of the components of the microarchitecture 9100 as indication of how various channels of the queues are being used as the memory operations are queued and ordered through the microarchitecture 9100.

FIGS. 97A, 97B, 97C, 97D, 97E, 97F, 97G, and 97H are block diagrams illustrating functional flow of load operations and store operations for the exemplary program of FIGS. 95A and 95B through queues of the microarchitecture of FIG. 96B, according to an embodiment of the present disclosure. Each figure may correspond to a next cycle of processing by the microarchitecture 9100. Values that are italicized are incoming values (into the queues) and values that are bolded are outgoing values (out of the queues). All other values with normal fonts are retained values already existing in the queues.

Figure 97A:
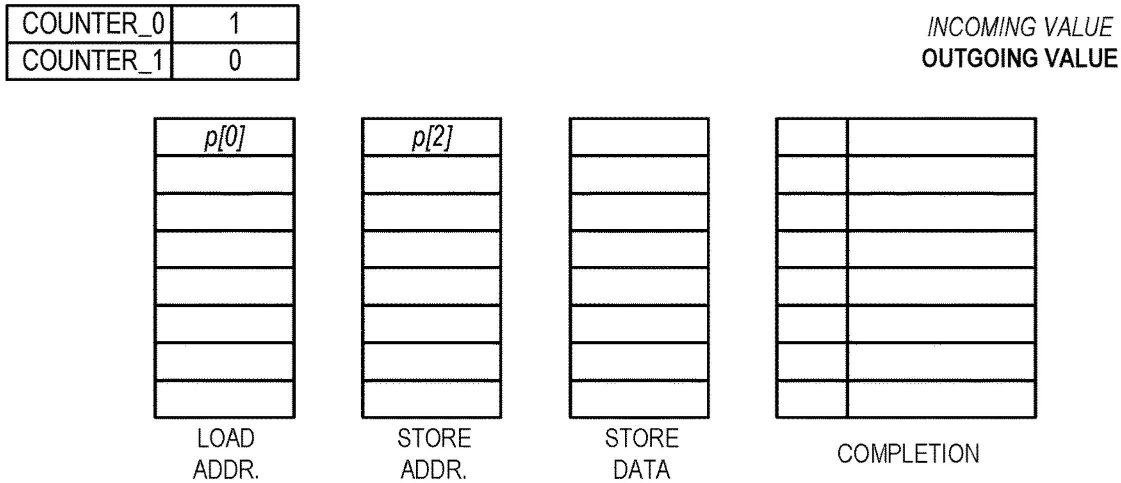
FIGS. 97A, 97B, 97C, 97D, 97E, 97F, 97G, and 97H are block diagrams illustrating functional flow of load operations and store operations for an exemplary program through queues of the microarchitecture of FIG. 97B according to embodiments of the disclosure.

In FIG. 97A, the address p[0] is incoming into the load address queue 9122, and the address p[2] is incoming into the store address queue 9124, starting the control flow process. Note that counter C0, for dependency input for the load address queue, is "1" and counter C1, for dependency output, is zero. In contrast, the "1" of C0 indicates a dependency out value for the store operation. This indicates an incoming dependency for the load operation of p[0] and an outgoing dependency for the store operation of p[2]. These values, however, are not yet active, but will become active, in this way, in FIG. 97B.

Figure 97B:
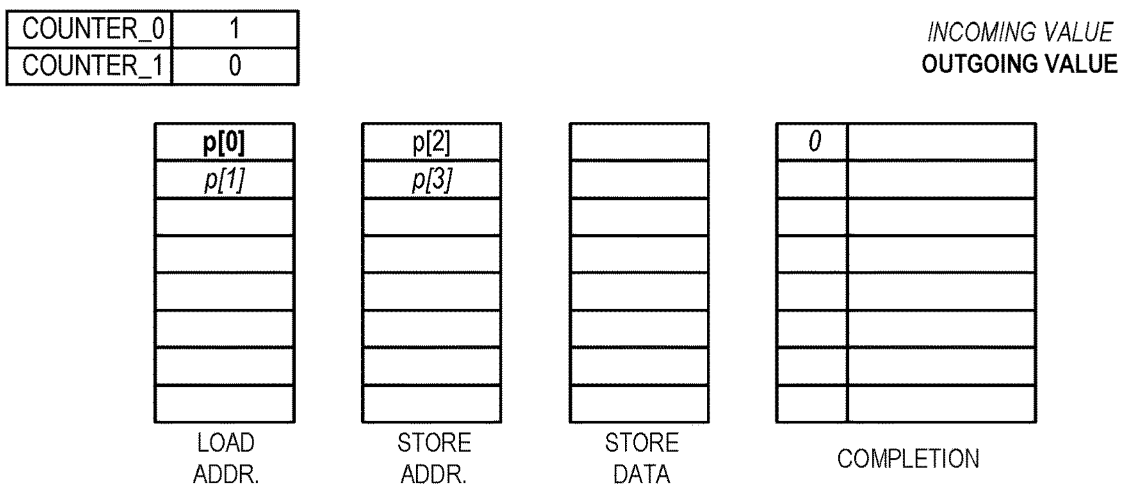

In FIG. 97B, address p[0] is bolded to indicate it is outgoing in this cycle. A new address p[1] is incoming into the load address queue and a new address p[3] is incoming into the store address queue. A zero ("0")-valued bit in the completion queue 9142 is also incoming, which indicates any data present for that indexed entry is invalid. As mentioned, the values for the counters C0 and C1 are now indicated as incoming, and are thus now active this cycle.

Figure 97C:
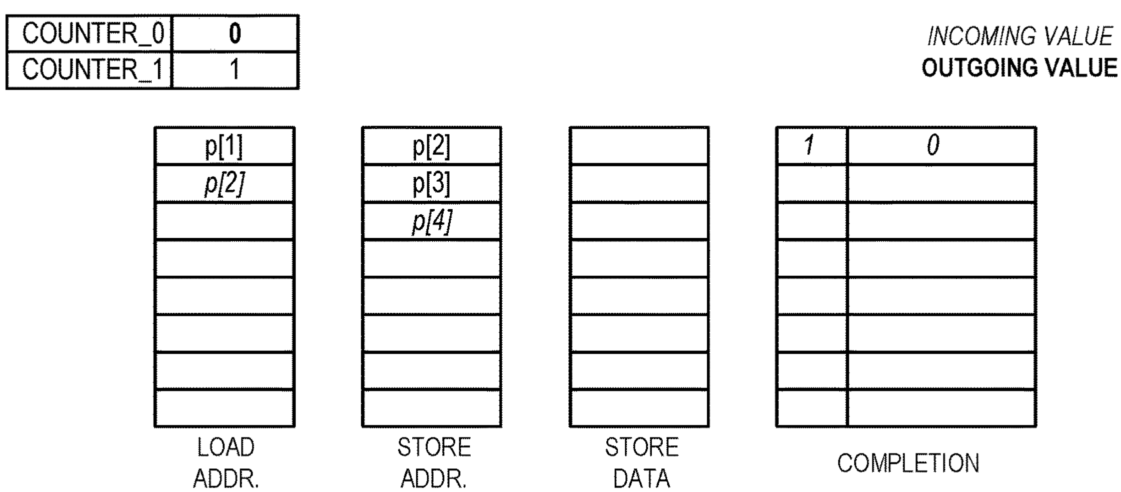

In FIG. 97C, the outgoing address p[0] has now left the load address queue and a new address p[2] is incoming into the load address queue. And, the data ("0") is incoming into the completion queue for address p[0]. The validity bit is set to "1" to indicate that the data in the completion queue is valid. Furthermore, a new address p[4] is incoming into the store address queue. The value for counter C0 is indicated as outgoing and the value for counter C1 is indicated as incoming. The value of "1" for C1 indicates an incoming dependency for store operation to address p[4].

Note that the address p[2] for the newest load operation is dependent on the value that first needs to be stored by the store operation for address p[2], which is at the top of the store address queue. Later, the indexed entry in the completion queue for the load operation from address p[2] may remain buffered until the data from the store operation to the address p[2] is completed (see FIGS. 97F-97H).

Figure 97D:
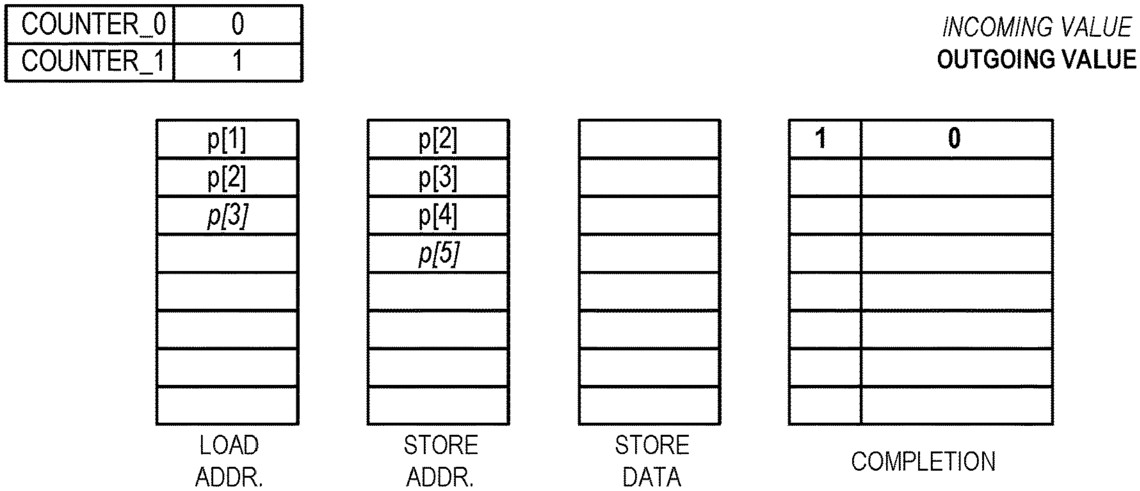

In FIG. 97D, the data ("0") is outgoing from the completion queue for address p[0], which is therefore being sent out to the acceleration hardware 8702. Furthermore, a new address p[3] is incoming into the load address queue and a new address p[5] is incoming into the store address queue. The values for the counters C0 and C1 remain unchanged.

Figure 97E:
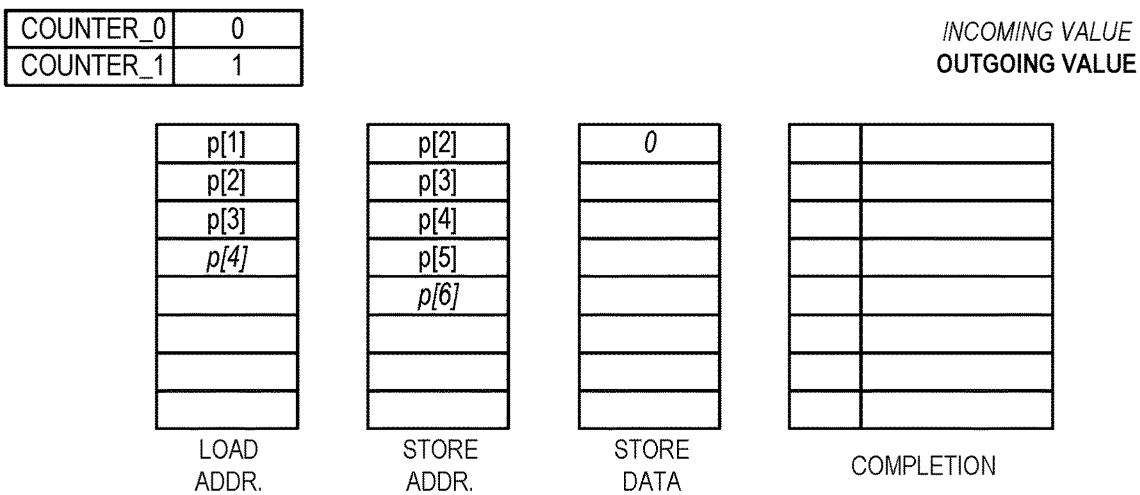

In FIG. 97E, the value ("0") for the address p[2] is incoming into the store data queue, while a new address p[4] comes into the load address queue and a new address p[6] comes into the store address queue. The counter values for C0 and C1 remain unchanged.

Figure 97F:
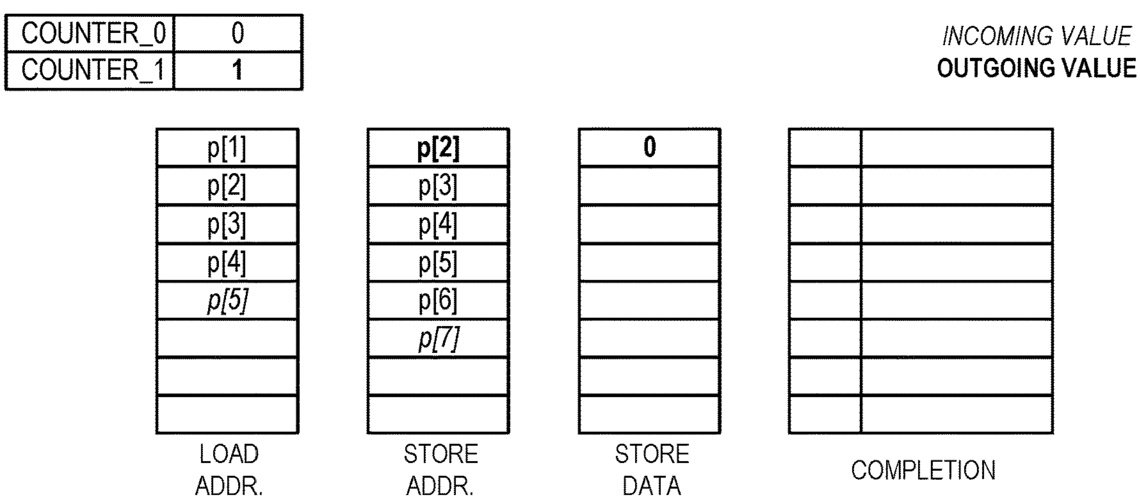

In FIG. 97F, the value ("0") for the address p[2] in the store data queue, and the address p[2] in the store address queue are both outgoing values. Likewise, the value for the counter C1 is indicated as outgoing, while the value ("0") for counter C0 remain unchanged. Furthermore, a new address p[5] is incoming into the load address queue and a new address p[7] is incoming into the store address queue.

Figure 97G:
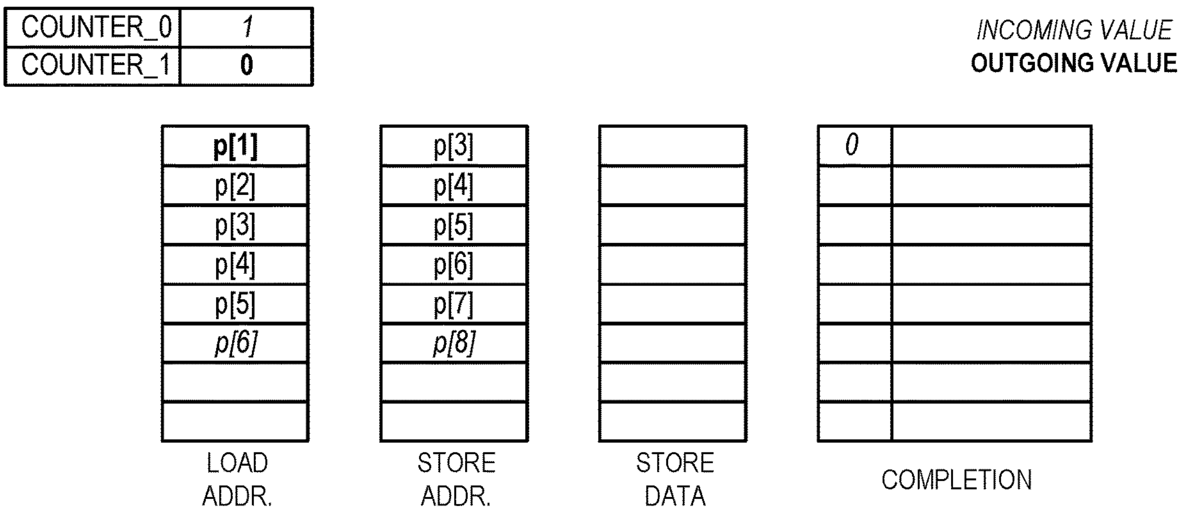

In FIG. 97G, the value ("0") is incoming to indicate the indexed value within the completion queue 9142 is invalid. The address p[1] is bolded to indicate it is outgoing from the load address queue while a new address p[6] is incoming into the load address queue. A new address p[8] is also incoming into the store address queue. The value of counter C0 is incoming as a "1," corresponding to an incoming dependency for the load operation of address p[6] and an outgoing dependency for the store operation of address p[8]. The value of counter C1 is now "0," and is indicated as outgoing.

Figure 97H:
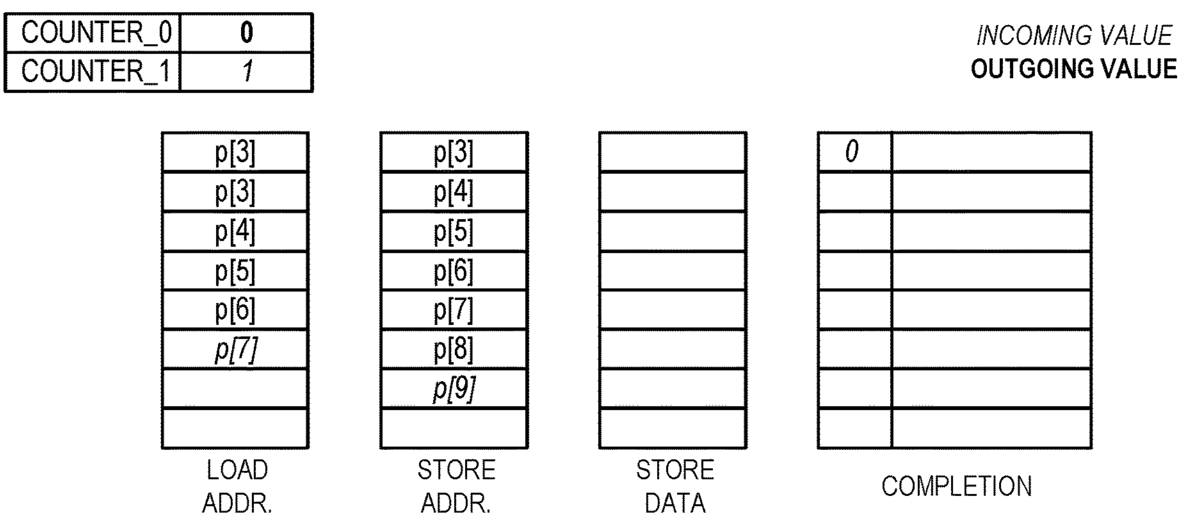

In FIG. 97H, a data value of "1" is incoming into the completion queue 9142 while the validity bit is also incoming as a "1," meaning that the buffered data is valid. This is the data needed to complete the load operation for p[2]. Recall that this data had to first be stored to address p[2], which happened in FIG. 97F. The value of "0" for counter C0 is outgoing, and a value of "1," for counter C1 is incoming. Furthermore, a new address p[7] is incoming into the load address queue and a new address p[9] is incoming into the store address queue.

In the present embodiment, the process of executing the code of FIGS. 95A and 95B may continue on with bouncing dependency tokens between "0" and "1" for the load operations and the store operations. This is due to the tight dependencies between p[i] and p[i+2]. Other code with less frequent dependencies may generate dependency tokens at a slower rate, and thus reset the counters C0 and C1 at a slower rate, causing the generation of tokens of higher values (corresponding to further semantically-separated memory operations).

Figure 98:
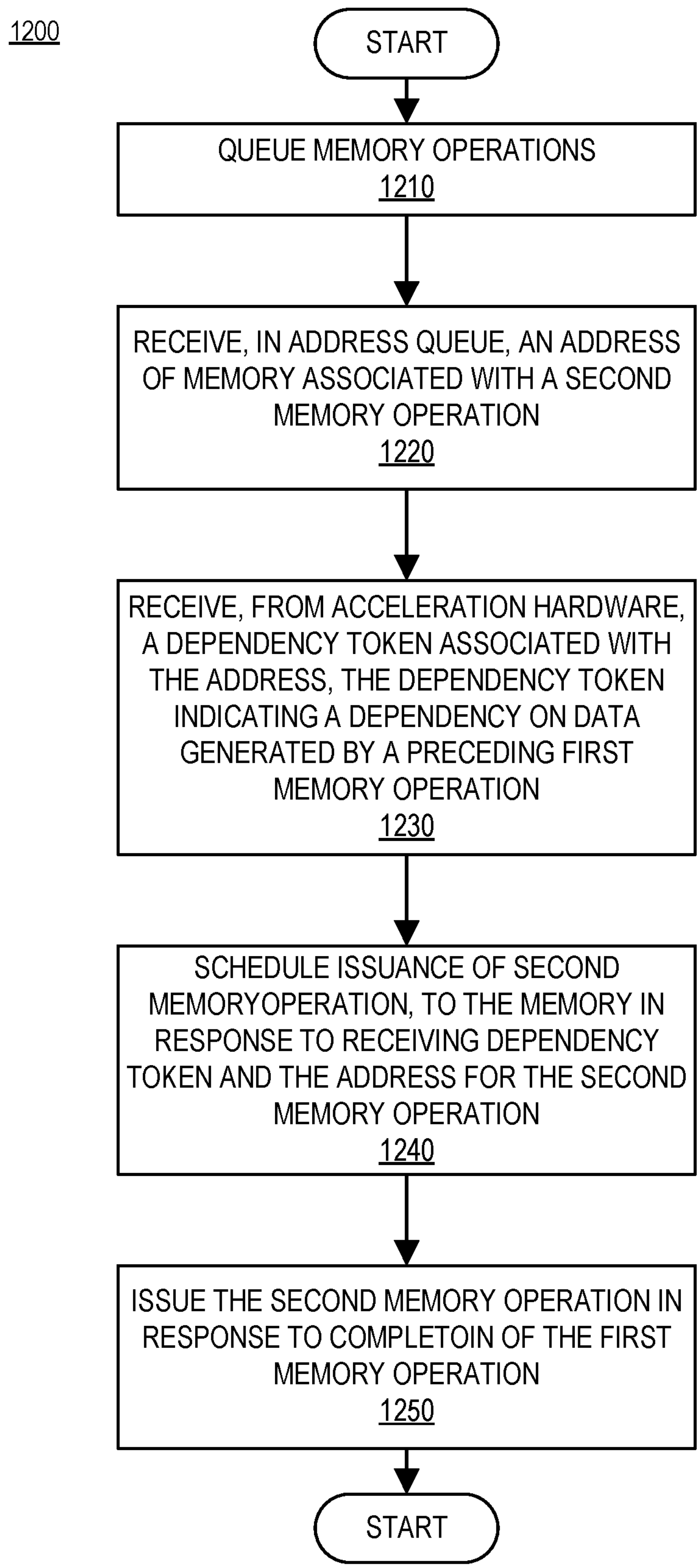
FIG. 98 is a flow chart of a method for ordering memory operations between a acceleration hardware and an out-of-order memory subsystem according to embodiments of the disclosure.

FIG. 98 is a flow chart of a method 9800 for ordering memory operations between acceleration hardware and an out-of-order memory subsystem, according to an embodiment of the present disclosure. The method 9800 may be performed by a system that may include hardware (e.g., circuitry, dedicated logic, and/or programmable logic), software (e.g., instructions executable on a computer system to perform hardware simulation), or a combination thereof. In an illustrative example, the method 9800 may be performed by the memory ordering circuit 8705 and various subcomponents of the memory ordering circuit 8705.

More specifically, referring to FIG. 98, the method 9800 may start with the memory ordering circuit queuing memory operations in an operations queue of the memory ordering circuit (9810). Memory operation and control arguments may make up the memory operations, as queued, where the memory operation and control arguments are mapped to certain queues within the memory ordering circuit as discussed previously. The memory ordering circuit may work to issue the memory operations to a memory in association with acceleration hardware, to ensure the memory operations complete in program order. The method 9800 may continue with the memory ordering circuit receiving, in set of input queues, from the acceleration hardware, an address of the memory associated with a second memory operation of the memory operations (9820). In one embodiment, a load address queue of the set of input queues is the channel to receive the address. In another embodiment, a store address queue of the set of input queues is the channel to receive the address. The method 9800 may continue with the memory ordering circuit receiving, from the acceleration hardware, a dependency token associated with the address, wherein the dependency token indicates a dependency on data generated by a first memory operation, of the memory operations, which precedes the second memory operation (9830). In one embodiment, a channel of a dependency queue is to receive the dependency token. The first memory operation may be either a load operation or a store operation.

The method 9800 may continue with the memory ordering circuit scheduling issuance of the second memory operation to the memory in response to receiving the dependency token and the address associated with the dependency token (9840). For example, when the load address queue receives the address for an address argument of a load operation and the dependency queue receives the dependency token for a control argument of the load operation, the memory ordering circuit may schedule issuance of the second memory operation as a load operation. The method 9800 may continue with the memory ordering circuit issuing the second memory operation (e.g., in a command) to the memory in response to completion of the first memory operation (9850). For example, if the first memory operation is a store, completion may be verified by acknowledgement that the data in a store data queue of the set of input queues has been written to the address in the memory. Similarly, if the first memory operation is a load operation, completion may be verified by receipt of data from the memory for the load operation.

7. SUMMARY

Supercomputing at the ExaFLOP scale may be a challenge in high-performance computing, a challenge which is not likely to be met by conventional von Neumann architectures. To achieve ExaFLOPs, embodiments of a CSA provide a heterogeneous spatial array that targets direct execution of (e.g., compiler-produced) dataflow graphs. In addition to laying out the architectural principles of embodiments of a CSA, the above also describes and evaluates embodiments of a CSA which showed performance and energy of larger than 10× over existing products. Compiler-generated code may have significant performance and energy gains over roadmap architectures. As a heterogeneous, parametric architecture, embodiments of a CSA may be readily adapted to all computing uses. For example, a mobile version of CSA might be tuned to 32-bits, while a machine-learning focused array might feature significant numbers of vectorized 8-bit multiplication units. The main advantages of embodiments of a CSA are high performance and extreme energy efficiency, characteristics relevant to all forms of computing ranging from supercomputing and datacenter to the internet-of-things.

In one embodiment, a processor includes a spatial array of processing elements; and a packet switched communications network to route data within the spatial array between processing elements according to a dataflow graph to perform a first dataflow operation of the dataflow graph, wherein the packet switched communications network further comprises a plurality of network dataflow endpoint circuits to perform a second dataflow operation of the dataflow graph. A network dataflow endpoint circuit of the plurality of network dataflow endpoint circuits may include a network ingress buffer to receive input data from the packet switched communications network; and a spatial array egress buffer to output resultant data to the spatial array of processing elements according to the second dataflow operation on the input data. The spatial array egress buffer may output the resultant data based on a scheduler within the network dataflow endpoint circuit monitoring the packet switched communications network. The spatial array egress buffer may output the resultant data based on the scheduler within the network dataflow endpoint circuit monitoring a selected channel of multiple network virtual channels of the packet switched communications network. A network dataflow endpoint circuit of the plurality of network dataflow endpoint circuits may include a spatial array ingress buffer to receive control data from the spatial array that causes a network ingress buffer of the network dataflow endpoint circuit that received input data from the packet switched communications network to output resultant data to the spatial array of processing elements according to the second dataflow operation on the input data and the control data. A network dataflow endpoint circuit of the plurality of network dataflow endpoint circuits may stall an output of resultant data of the second dataflow operation from a spatial array egress buffer of the network dataflow endpoint circuit when a backpressure signal from a downstream processing element of the spatial array of processing elements indicates that storage in the downstream processing element is not available for the output of the network dataflow endpoint circuit. A network dataflow endpoint circuit of the plurality of network dataflow endpoint circuits may send a backpressure signal to stall a source from sending input data on the packet switched communications network into a network ingress buffer of the network dataflow endpoint circuit when the network ingress buffer is not available. The spatial array of processing elements may include a plurality of processing elements; and an interconnect network between the plurality of processing elements to receive an input of the dataflow graph comprising a plurality of nodes, wherein the dataflow graph is to be overlaid into the interconnect network, the plurality of processing elements, and the plurality of network dataflow endpoint circuits with each node represented as a dataflow operator in either of the plurality of processing elements and the plurality of network dataflow endpoint circuits, and the plurality of processing elements and the plurality of network dataflow endpoint circuits are to perform an operation by an incoming operand set arriving at each of the dataflow operators of the plurality of processing elements and the plurality of network dataflow endpoint circuits. The spatial array of processing elements may include a circuit switched network to transport the data within the spatial array between processing elements according to the dataflow graph.

In another embodiment, a method includes providing a spatial array of processing elements; routing, with a packet switched communications network, data within the spatial array between processing elements according to a dataflow graph; performing a first dataflow operation of the dataflow graph with the processing elements; and performing a second dataflow operation of the dataflow graph with a plurality of network dataflow endpoint circuits of the packet switched communications network. The performing the second dataflow operation may include receiving input data from the packet switched communications network with a network ingress buffer of a network dataflow endpoint circuit of the plurality of network dataflow endpoint circuits; and outputting resultant data from a spatial array egress buffer of the network dataflow endpoint circuit to the spatial array of processing elements according to the second dataflow operation on the input data. The outputting may include outputting the resultant data based on a scheduler within the network dataflow endpoint circuit monitoring the packet switched communications network. The outputting may include outputting the resultant data based on the scheduler within the network dataflow endpoint circuit monitoring a selected channel of multiple network virtual channels of the packet switched communications network. The performing the second dataflow operation may include receiving control data, with a spatial array ingress buffer of a network dataflow endpoint circuit of the plurality of network dataflow endpoint circuits, from the spatial array; and configuring the network dataflow endpoint circuit to cause a network ingress buffer of the network dataflow endpoint circuit that received input data from the packet switched communications network to output resultant data to the spatial array of processing elements according to the second dataflow operation on the input data and the control data. The performing the second dataflow operation may include stalling an output of the second dataflow operation from a spatial array egress buffer of a network dataflow endpoint circuit of the plurality of network dataflow endpoint circuits when a backpressure signal from a downstream processing element of the spatial array of processing elements indicates that storage in the downstream processing element is not available for the output of the network dataflow endpoint circuit. The performing the second dataflow operation may include sending a backpressure signal from a network dataflow endpoint circuit of the plurality of network dataflow endpoint circuits to stall a source from sending input data on the packet switched communications network into a network ingress buffer of the network dataflow endpoint circuit when the network ingress buffer is not available. The routing, performing the first dataflow operation, and performing the second dataflow operation may include receiving an input of a dataflow graph comprising a plurality of nodes; overlaying the dataflow graph into the spatial array of processing elements and the plurality of network dataflow endpoint circuits with each node represented as a dataflow operator in either of the processing elements and the plurality of network dataflow endpoint circuits; and performing the first dataflow operation with the processing elements and performing the second dataflow operation with the plurality of network dataflow endpoint circuits when an incoming operand set arrives at each of the dataflow operators of the processing elements and the plurality of network dataflow endpoint circuits. The method may include transporting the data within the spatial array between processing elements according to the dataflow graph with a circuit switched network of the spatial array.

In yet another embodiment, a non-transitory machine readable medium that stores code that when executed by a machine causes the machine to perform a method including providing a spatial array of processing elements; routing, with a packet switched communications network, data within the spatial array between processing elements according to a dataflow graph; performing a first dataflow operation of the dataflow graph with the processing elements; and performing a second dataflow operation of the dataflow graph with a plurality of network dataflow endpoint circuits of the packet switched communications network. The performing the second dataflow operation may include receiving input data from the packet switched communications network with a network ingress buffer of a network dataflow endpoint circuit of the plurality of network dataflow endpoint circuits; and outputting resultant data from a spatial array egress buffer of the network dataflow endpoint circuit to the spatial array of processing elements according to the second dataflow operation on the input data. The outputting may include outputting the resultant data based on a scheduler within the network dataflow endpoint circuit monitoring the packet switched communications network. The outputting may include outputting the resultant data based on the scheduler within the network dataflow endpoint circuit monitoring a selected channel of multiple network virtual channels of the packet switched communications network. The performing the second dataflow operation may include receiving control data, with a spatial array ingress buffer of a network dataflow endpoint circuit of the plurality of network dataflow endpoint circuits, from the spatial array; and configuring the network dataflow endpoint circuit to cause a network ingress buffer of the network dataflow endpoint circuit that received input data from the packet switched communications network to output resultant data to the spatial array of processing elements according to the second dataflow operation on the input data and the control data. The performing the second dataflow operation may include stalling an output of the second dataflow operation from a spatial array egress buffer of a network dataflow endpoint circuit of the plurality of network dataflow endpoint circuits when a backpressure signal from a downstream processing element of the spatial array of processing elements indicates that storage in the downstream processing element is not available for the output of the network dataflow endpoint circuit. The performing the second dataflow operation may include sending a backpressure signal from a network dataflow endpoint circuit of the plurality of network dataflow endpoint circuits to stall a source from sending input data on the packet switched communications network into a network ingress buffer of the network dataflow endpoint circuit when the network ingress buffer is not available. The routing, performing the first dataflow operation, and performing the second dataflow operation may include receiving an input of a dataflow graph comprising a plurality of nodes; overlaying the dataflow graph into the spatial array of processing elements and the plurality of network dataflow endpoint circuits with each node represented as a dataflow operator in either of the processing elements and the plurality of network dataflow endpoint circuits; and performing the first dataflow operation with the processing elements and performing the second dataflow operation with the plurality of network dataflow endpoint circuits when an incoming operand set arrives at each of the dataflow operators of the processing elements and the plurality of network dataflow endpoint circuits. The method may include transporting the data within the spatial array between processing elements according to the dataflow graph with a circuit switched network of the spatial array.

In another embodiment, a processor includes a spatial array of processing elements; and a packet switched communications network to route data within the spatial array between processing elements according to a dataflow graph to perform a first dataflow operation of the dataflow graph, wherein the packet switched communications network further comprises means to perform a second dataflow operation of the dataflow graph.

In one embodiment, a processor includes a core with a decoder to decode an instruction into a decoded instruction and an execution unit to execute the decoded instruction to perform a first operation; a plurality of processing elements; and an interconnect network between the plurality of processing elements to receive an input of a dataflow graph comprising a plurality of nodes, wherein the dataflow graph is to be overlaid into the interconnect network and the plurality of processing elements with each node represented as a dataflow operator in the plurality of processing elements, and the plurality of processing elements are to perform a second operation by a respective, incoming operand set arriving at each of the dataflow operators of the plurality of processing elements. A processing element of the plurality of processing elements may stall execution when a backpressure signal from a downstream processing element indicates that storage in the downstream processing element is not available for an output of the processing element. The processor may include a flow control path network to carry the backpressure signal according to the dataflow graph. A dataflow token may cause an output from a dataflow operator receiving the dataflow token to be sent to an input buffer of a particular processing element of the plurality of processing elements. The second operation may include a memory access and the plurality of processing elements comprises a memory-accessing dataflow operator that is not to perform the memory access until receiving a memory dependency token from a logically previous dataflow operator. The plurality of processing elements may include a first type of processing element and a second, different type of processing element.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements by a respective, incoming operand set arriving at each of the dataflow operators of the plurality of processing elements. The method may include stalling execution by a processing element of the plurality of processing elements when a backpressure signal from a downstream processing element indicates that storage in the downstream processing element is not available for an output of the processing element. The method may include sending the backpressure signal on a flow control path network according to the dataflow graph. A dataflow token may cause an output from a dataflow operator receiving the dataflow token to be sent to an input buffer of a particular processing element of the plurality of processing elements. The method may include not performing a memory access until receiving a memory dependency token from a logically previous dataflow operator, wherein the second operation comprises the memory access and the plurality of processing elements comprises a memory-accessing dataflow operator. The method may include providing a first type of processing element and a second, different type of processing element of the plurality of processing elements.

In yet another embodiment, an apparatus includes a data path network between a plurality of processing elements; and a flow control path network between the plurality of processing elements, wherein the data path network and the flow control path network are to receive an input of a dataflow graph comprising a plurality of nodes, the dataflow graph is to be overlaid into the data path network, the flow control path network, and the plurality of processing elements with each node represented as a dataflow operator in the plurality of processing elements, and the plurality of processing elements are to perform a second operation by a respective, incoming operand set arriving at each of the dataflow operators of the plurality of processing elements. The flow control path network may carry backpressure signals to a plurality of dataflow operators according to the dataflow graph. A dataflow token sent on the data path network to a dataflow operator may cause an output from the dataflow operator to be sent to an input buffer of a particular processing element of the plurality of processing elements on the data path network. The data path network may be a static, circuit switched network to carry the respective, input operand set to each of the dataflow operators according to the dataflow graph. The flow control path network may transmit a backpressure signal according to the dataflow graph from a downstream processing element to indicate that storage in the downstream processing element is not available for an output of the processing element. At least one data path of the data path network and at least one flow control path of the flow control path network may form a channelized circuit with backpressure control. The flow control path network may pipeline at least two of the plurality of processing elements in series.

In another embodiment, a method includes receiving an input of a dataflow graph comprising a plurality of nodes; and overlaying the dataflow graph into a plurality of processing elements of a processor, a data path network between the plurality of processing elements, and a flow control path network between the plurality of processing elements with each node represented as a dataflow operator in the plurality of processing elements. The method may include carrying backpressure signals with the flow control path network to a plurality of dataflow operators according to the dataflow graph. The method may include sending a dataflow token on the data path network to a dataflow operator to cause an output from the dataflow operator to be sent to an input buffer of a particular processing element of the plurality of processing elements on the data path network. The method may include setting a plurality of switches of the data path network and/or a plurality of switches of the flow control path network to carry the respective, input operand set to each of the dataflow operators according to the dataflow graph, wherein the data path network is a static, circuit switched network. The method may include transmitting a backpressure signal with the flow control path network according to the dataflow graph from a downstream processing element to indicate that storage in the downstream processing element is not available for an output of the processing element. The method may include forming a channelized circuit with backpressure control with at least one data path of the data path network and at least one flow control path of the flow control path network.

In yet another embodiment, a processor includes a core with a decoder to decode an instruction into a decoded instruction and an execution unit to execute the decoded instruction to perform a first operation; a plurality of processing elements; and a network means between the plurality of processing elements to receive an input of a dataflow graph comprising a plurality of nodes, wherein the dataflow graph is to be overlaid into the network means and the plurality of processing elements with each node represented as a dataflow operator in the plurality of processing elements, and the plurality of processing elements are to perform a second operation by a respective, incoming operand set arriving at each of the dataflow operators of the plurality of processing elements.

In another embodiment, an apparatus includes a data path means between a plurality of processing elements; and a flow control path means between the plurality of processing elements, wherein the data path means and the flow control path means are to receive an input of a dataflow graph comprising a plurality of nodes, the dataflow graph is to be overlaid into the data path means, the flow control path means, and the plurality of processing elements with each node represented as a dataflow operator in the plurality of processing elements, and the plurality of processing elements are to perform a second operation by a respective, incoming operand set arriving at each of the dataflow operators of the plurality of processing elements.

In one embodiment, a processor includes a core with a decoder to decode an instruction into a decoded instruction and an execution unit to execute the decoded instruction to perform a first operation; and an array of processing elements to receive an input of a dataflow graph comprising a plurality of nodes, wherein the dataflow graph is to be overlaid into the array of processing elements with each node represented as a dataflow operator in the array of processing elements, and the array of processing elements is to perform a second operation when an incoming operand set arrives at the array of processing elements. The array of processing element may not perform the second operation until the incoming operand set arrives at the array of processing elements and storage in the array of processing elements is available for output of the second operation. The array of processing elements may include a network (or channel(s)) to carry dataflow tokens and control tokens to a plurality of dataflow operators. The second operation may include a memory access and the array of processing elements may include a memory-accessing dataflow operator that is not to perform the memory access until receiving a memory dependency token from a logically previous dataflow operator. Each processing element may perform only one or two operations of the dataflow graph.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into an array of processing elements of the processor with each node represented as a dataflow operator in the array of processing elements; and performing a second operation of the dataflow graph with the array of processing elements when an incoming operand set arrives at the array of processing elements. The array of processing elements may not perform the second operation until the incoming operand set arrives at the array of processing elements and storage in the array of processing elements is available for output of the second operation. The array of processing elements may include a network carrying dataflow tokens and control tokens to a plurality of dataflow operators. The second operation may include a memory access and the array of processing elements comprises a memory-accessing dataflow operator that is not to perform the memory access until receiving a memory dependency token from a logically previous dataflow operator. Each processing element may performs only one or two operations of the dataflow graph.

In yet another embodiment, a non-transitory machine readable medium that stores code that when executed by a machine causes the machine to perform a method including decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into an array of processing elements of the processor with each node represented as a dataflow operator in the array of processing elements; and performing a second operation of the dataflow graph with the array of processing elements when an incoming operand set arrives at the array of processing elements. The array of processing element may not perform the second operation until the incoming operand set arrives at the array of processing elements and storage in the array of processing elements is available for output of the second operation. The array of processing elements may include a network carrying dataflow tokens and control tokens to a plurality of dataflow operators. The second operation may include a memory access and the array of processing elements comprises a memory-accessing dataflow operator that is not to perform the memory access until receiving a memory dependency token from a logically previous dataflow operator. Each processing element may performs only one or two operations of the dataflow graph.

In another embodiment, a processor includes a core with a decoder to decode an instruction into a decoded instruction and an execution unit to execute the decoded instruction to perform a first operation; and means to receive an input of a dataflow graph comprising a plurality of nodes, wherein the dataflow graph is to be overlaid into the means with each node represented as a dataflow operator in the means, and the means is to perform a second operation when an incoming operand set arrives at the means.

In one embodiment, a processor includes a core with a decoder to decode an instruction into a decoded instruction and an execution unit to execute the decoded instruction to perform a first operation; a plurality of processing elements; and an interconnect network between the plurality of processing elements to receive an input of a dataflow graph comprising a plurality of nodes, wherein the dataflow graph is to be overlaid into the interconnect network and the plurality of processing elements with each node represented as a dataflow operator in the plurality of processing elements, and the plurality of processing elements is to perform a second operation when an incoming operand set arrives at the plurality of processing elements. The processor may further comprise a plurality of configuration controllers, each configuration controller is coupled to a respective subset of the plurality of processing elements, and each configuration controller is to load configuration information from storage and cause coupling of the respective subset of the plurality of processing elements according to the configuration information. The processor may include a plurality of configuration caches, and each configuration controller is coupled to a respective configuration cache to fetch the configuration information for the respective subset of the plurality of processing elements. The first operation performed by the execution unit may prefetch configuration information into each of the plurality of configuration caches. Each of the plurality of configuration controllers may include a reconfiguration circuit to cause a reconfiguration for at least one processing element of the respective subset of the plurality of processing elements on receipt of a configuration error message from the at least one processing element. Each of the plurality of configuration controllers may a reconfiguration circuit to cause a reconfiguration for the respective subset of the plurality of processing elements on receipt of a reconfiguration request message, and disable communication with the respective subset of the plurality of processing elements until the reconfiguration is complete. The processor may include a plurality of exception aggregators, and each exception aggregator is coupled to a respective subset of the plurality of processing elements to collect exceptions from the respective subset of the plurality of processing elements and forward the exceptions to the core for servicing. The processor may include a plurality of extraction controllers, each extraction controller is coupled to a respective subset of the plurality of processing elements, and each extraction controller is to cause state data from the respective subset of the plurality of processing elements to be saved to memory.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements when an incoming operand set arrives at the plurality of processing elements. The method may include loading configuration information from storage for respective subsets of the plurality of processing elements and causing coupling for each respective subset of the plurality of processing elements according to the configuration information. The method may include fetching the configuration information for the respective subset of the plurality of processing elements from a respective configuration cache of a plurality of configuration caches. The first operation performed by the execution unit may be prefetching configuration information into each of the plurality of configuration caches. The method may include causing a reconfiguration for at least one processing element of the respective subset of the plurality of processing elements on receipt of a configuration error message from the at least one processing element. The method may include causing a reconfiguration for the respective subset of the plurality of processing elements on receipt of a reconfiguration request message; and disabling communication with the respective subset of the plurality of processing elements until the reconfiguration is complete. The method may include collecting exceptions from a respective subset of the plurality of processing elements; and forwarding the exceptions to the core for servicing. The method may include causing state data from a respective subset of the plurality of processing elements to be saved to memory.

In yet another embodiment, a non-transitory machine readable medium that stores code that when executed by a machine causes the machine to perform a method including decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements when an incoming operand set arrives at the plurality of processing elements. The method may include loading configuration information from storage for respective subsets of the plurality of processing elements and causing coupling for each respective subset of the plurality of processing elements according to the configuration information. The method may include fetching the configuration information for the respective subset of the plurality of processing elements from a respective configuration cache of a plurality of configuration caches. The first operation performed by the execution unit may be prefetching configuration information into each of the plurality of configuration caches. The method may include causing a reconfiguration for at least one processing element of the respective subset of the plurality of processing elements on receipt of a configuration error message from the at least one processing element. The method may include causing a reconfiguration for the respective subset of the plurality of processing elements on receipt of a reconfiguration request message; and disabling communication with the respective subset of the plurality of processing elements until the reconfiguration is complete. The method may include collecting exceptions from a respective subset of the plurality of processing elements; and forwarding the exceptions to the core for servicing. The method may include causing state data from a respective subset of the plurality of processing elements to be saved to memory.

In another embodiment, a processor includes a core with a decoder to decode an instruction into a decoded instruction and an execution unit to execute the decoded instruction to perform a first operation; a plurality of processing elements; and means between the plurality of processing elements to receive an input of a dataflow graph comprising a plurality of nodes, wherein the dataflow graph is to be overlaid into the m and the plurality of processing elements with each node represented as a dataflow operator in the plurality of processing elements, and the plurality of processing elements is to perform a second operation when an incoming operand set arrives at the plurality of processing elements.

In one embodiment, an apparatus (e.g., a processor) includes: a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform an operation by a respective, incoming operand set arriving at each of the dataflow operators; a plurality of request address file circuits coupled to the spatial array of processing elements and a cache memory, each request address file circuit of the plurality of request address file circuits to access data in the cache memory in response to a request for data access from the spatial array of processing elements; a plurality of translation lookaside buffers comprising a translation lookaside buffer in each of the plurality of request address file circuits to provide an output of a physical address for an input of a virtual address; and a translation lookaside buffer manager circuit comprising a higher level translation lookaside buffer than the plurality of translation lookaside buffers, the translation lookaside buffer manager circuit to perform a first page walk in the cache memory for a miss of an input of a virtual address into a first translation lookaside buffer and into the higher level translation lookaside buffer to determine a physical address mapped to the virtual address, store a mapping of the virtual address to the physical address from the first page walk in the higher level translation lookaside buffer to cause the higher level translation lookaside buffer to send the physical address to the first translation lookaside buffer in a first request address file circuit. The translation lookaside buffer manager circuit may simultaneously, with the first page walk, perform a second page walk in the cache memory, wherein the second page walk is for a miss of an input of a virtual address into a second translation lookaside buffer and into the higher level translation lookaside buffer to determine a physical address mapped to the virtual address, store a mapping of the virtual address to the physical address from the second page walk in the higher level translation lookaside buffer to cause the higher level translation lookaside buffer to send the physical address to the second translation lookaside buffer in a second request address file circuit. The receipt of the physical address in the first translation lookaside buffer may cause the first request address file circuit to perform a data access for the request for data access from the spatial array of processing elements on the physical address in the cache memory. The translation lookaside buffer manager circuit may insert an indicator in the higher level translation lookaside buffer for the miss of the input of the virtual address in the first translation lookaside buffer and the higher level translation lookaside buffer to prevent an additional page walk for the input of the virtual address during the first page walk. The translation lookaside buffer manager circuit may receive a shootdown message from a requesting entity for a mapping of a physical address to a virtual address, invalidate the mapping in the higher level translation lookaside buffer, and send shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The translation lookaside buffer manager circuit may receive a shootdown message from a requesting entity for a mapping of a physical address to a virtual address, invalidate the mapping in the higher level translation lookaside buffer, and send shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In another embodiment, a method includes overlaying an input of a dataflow graph comprising a plurality of nodes into a spatial array of processing elements comprising a communications network with each node represented as a dataflow operator in the spatial array of processing elements; coupling a plurality of request address file circuits to the spatial array of processing elements and a cache memory with each request address file circuit of the plurality of request address file circuits accessing data in the cache memory in response to a request for data access from the spatial array of processing elements; providing an output of a physical address for an input of a virtual address into a translation lookaside buffer of a plurality of translation lookaside buffers comprising a translation lookaside buffer in each of the plurality of request address file circuits; coupling a translation lookaside buffer manager circuit comprising a higher level translation lookaside buffer than the plurality of translation lookaside buffers to the plurality of request address file circuits and the cache memory; and performing a first page walk in the cache memory for a miss of an input of a virtual address into a first translation lookaside buffer and into the higher level translation lookaside buffer with the translation lookaside buffer manager circuit to determine a physical address mapped to the virtual address, store a mapping of the virtual address to the physical address from the first page walk in the higher level translation lookaside buffer to cause the higher level translation lookaside buffer to send the physical address to the first translation lookaside buffer in a first request address file circuit. The method may include simultaneously, with the first page walk, performing a second page walk in the cache memory with the translation lookaside buffer manager circuit, wherein the second page walk is for a miss of an input of a virtual address into a second translation lookaside buffer and into the higher level translation lookaside buffer to determine a physical address mapped to the virtual address, and storing a mapping of the virtual address to the physical address from the second page walk in the higher level translation lookaside buffer to cause the higher level translation lookaside buffer to send the physical address to the second translation lookaside buffer in a second request address file circuit. The method may include causing the first request address file circuit to perform a data access for the request for data access from the spatial array of processing elements on the physical address in the cache memory in response to receipt of the physical address in the first translation lookaside buffer. The method may include inserting, with the translation lookaside buffer manager circuit, an indicator in the higher level translation lookaside buffer for the miss of the input of the virtual address in the first translation lookaside buffer and the higher level translation lookaside buffer to prevent an additional page walk for the input of the virtual address during the first page walk. The method may include receiving, with the translation lookaside buffer manager circuit, a shootdown message from a requesting entity for a mapping of a physical address to a virtual address, invalidating the mapping in the higher level translation lookaside buffer, and sending shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The method may include receiving, with the translation lookaside buffer manager circuit, a shootdown message from a requesting entity for a mapping of a physical address to a virtual address, invalidate the mapping in the higher level translation lookaside buffer, and sending shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In another embodiment, an apparatus includes a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform an operation by a respective, incoming operand set arriving at each of the dataflow operators; a plurality of request address file circuits coupled to the spatial array of processing elements and a plurality of cache memory banks, each request address file circuit of the plurality of request address file circuits to access data in (e.g., each of) the plurality of cache memory banks in response to a request for data access from the spatial array of processing elements; a plurality of translation lookaside buffers comprising a translation lookaside buffer in each of the plurality of request address file circuits to provide an output of a physical address for an input of a virtual address; a plurality of higher level, than the plurality of translation lookaside buffers, translation lookaside buffers comprising a higher level translation lookaside buffer in each of the plurality of cache memory banks to provide an output of a physical address for an input of a virtual address; and a translation lookaside buffer manager circuit to perform a first page walk in the plurality of cache memory banks for a miss of an input of a virtual address into a first translation lookaside buffer and into a first higher level translation lookaside buffer to determine a physical address mapped to the virtual address, store a mapping of the virtual address to the physical address from the first page walk in the first higher level translation lookaside buffer to cause the first higher level translation lookaside buffer to send the physical address to the first translation lookaside buffer in a first request address file circuit. The translation lookaside buffer manager circuit may simultaneously, with the first page walk, perform a second page walk in the plurality of cache memory banks, wherein the second page walk is for a miss of an input of a virtual address into a second translation lookaside buffer and into a second higher level translation lookaside buffer to determine a physical address mapped to the virtual address, store a mapping of the virtual address to the physical address from the second page walk in the second higher level translation lookaside buffer to cause the second higher level translation lookaside buffer to send the physical address to the second translation lookaside buffer in a second request address file circuit. The receipt of the physical address in the first translation lookaside buffer may cause the first request address file circuit to perform a data access for the request for data access from the spatial array of processing elements on the physical address in the plurality of cache memory banks. The translation lookaside buffer manager circuit may insert an indicator in the first higher level translation lookaside buffer for the miss of the input of the virtual address in the first translation lookaside buffer and the first higher level translation lookaside buffer to prevent an additional page walk for the input of the virtual address during the first page walk. The translation lookaside buffer manager circuit may receive a shootdown message from a requesting entity for a mapping of a physical address to a virtual address, invalidate the mapping in a higher level translation lookaside buffer storing the mapping, and send shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The translation lookaside buffer manager circuit may receive a shootdown message from a requesting entity for a mapping of a physical address to a virtual address, invalidate the mapping in a higher level translation lookaside buffer storing the mapping, and send shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In yet another embodiment, a method includes: overlaying an input of a dataflow graph comprising a plurality of nodes into a spatial array of processing elements comprising a communications network with each node represented as a dataflow operator in the spatial array of processing elements; coupling a plurality of request address file circuits to the spatial array of processing elements and a plurality of cache memory banks with each request address file circuit of the plurality of request address file circuits accessing data in the plurality of cache memory banks in response to a request for data access from the spatial array of processing elements;

providing an output of a physical address for an input of a virtual address into a translation lookaside buffer of a plurality of translation lookaside buffers comprising a translation lookaside buffer in each of the plurality of request address file circuits; providing an output of a physical address for an input of a virtual address into a higher level, than the plurality of translation lookaside buffers, translation lookaside buffer of a plurality of higher level translation lookaside buffers comprising a higher level translation lookaside buffer in each of the plurality of cache memory banks; coupling a translation lookaside buffer manager circuit to the plurality of request address file circuits and the plurality of cache memory banks; and performing a first page walk in the plurality of cache memory banks for a miss of an input of a virtual address into a first translation lookaside buffer and into a first higher level translation lookaside buffer with the translation lookaside buffer manager circuit to determine a physical address mapped to the virtual address, store a mapping of the virtual address to the physical address from the first page walk in the first higher level translation lookaside buffer to cause the first higher level translation lookaside buffer to send the physical address to the first translation lookaside buffer in a first request address file circuit. The method may include simultaneously, with the first page walk, performing a second page walk in the plurality of cache memory banks with the translation lookaside buffer manager circuit, wherein the second page walk is for a miss of an input of a virtual address into a second translation lookaside buffer and into a second higher level translation lookaside buffer to determine a physical address mapped to the virtual address, and storing a mapping of the virtual address to the physical address from the second page walk in the second higher level translation lookaside buffer to cause the second higher level translation lookaside buffer to send the physical address to the second translation lookaside buffer in a second request address file circuit. The method may include causing the first request address file circuit to perform a data access for the request for data access from the spatial array of processing elements on the physical address in the plurality of cache memory banks in response to receipt of the physical address in the first translation lookaside buffer. The method may include inserting, with the translation lookaside buffer manager circuit, an indicator in the first higher level translation lookaside buffer for the miss of the input of the virtual address in the first translation lookaside buffer and the first higher level translation lookaside buffer to prevent an additional page walk for the input of the virtual address during the first page walk. The method may include receiving, with the translation lookaside buffer manager circuit, a shootdown message from a requesting entity for a mapping of a physical address to a virtual address, invalidating the mapping in a higher level translation lookaside buffer storing the mapping, and sending shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The method may include receiving, with the translation lookaside buffer manager circuit, a shootdown message from a requesting entity for a mapping of a physical address to a virtual address, invalidate the mapping in a higher level translation lookaside buffer storing the mapping, and sending shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In another embodiment, a system includes a core with a decoder to decode an instruction into a decoded instruction and an execution unit to execute the decoded instruction to perform a first operation; a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform a second operation by a respective, incoming operand set arriving at each of the dataflow operators; a plurality of request address file circuits coupled to the spatial array of processing elements and a cache memory, each request address file circuit of the plurality of request address file circuits to access data in the cache memory in response to a request for data access from the spatial array of processing elements; a plurality of translation lookaside buffers comprising a translation lookaside buffer in each of the plurality of request address file circuits to provide an output of a physical address for an input of a virtual address; and a translation lookaside buffer manager circuit comprising a higher level translation lookaside buffer than the plurality of translation lookaside buffers, the translation lookaside buffer manager circuit to perform a first page walk in the cache memory for a miss of an input of a virtual address into a first translation lookaside buffer and into the higher level translation lookaside buffer to determine a physical address mapped to the virtual address, store a mapping of the virtual address to the physical address from the first page walk in the higher level translation lookaside buffer to cause the higher level translation lookaside buffer to send the physical address to the first translation lookaside buffer in a first request address file circuit. The translation lookaside buffer manager circuit may simultaneously, with the first page walk, perform a second page walk in the cache memory, wherein the second page walk is for a miss of an input of a virtual address into a second translation lookaside buffer and into the higher level translation lookaside buffer to determine a physical address mapped to the virtual address, store a mapping of the virtual address to the physical address from the second page walk in the higher level translation lookaside buffer to cause the higher level translation lookaside buffer to send the physical address to the second translation lookaside buffer in a second request address file circuit. The receipt of the physical address in the first translation lookaside buffer may cause the first request address file circuit to perform a data access for the request for data access from the spatial array of processing elements on the physical address in the cache memory. The translation lookaside buffer manager circuit may insert an indicator in the higher level translation lookaside buffer for the miss of the input of the virtual address in the first translation lookaside buffer and the higher level translation lookaside buffer to prevent an additional page walk for the input of the virtual address during the first page walk. The translation lookaside buffer manager circuit may receive a shootdown message from a requesting entity for a mapping of a physical address to a virtual address, invalidate the mapping in the higher level translation lookaside buffer, and send shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The translation lookaside buffer manager circuit may receive a shootdown message from a requesting entity for a mapping of a physical address to a virtual address, invalidate the mapping in the higher level translation lookaside buffer, and send shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In yet another embodiment, a system includes a core with a decoder to decode an instruction into a decoded instruction and an execution unit to execute the decoded instruction to perform a first operation; a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform a second operation by a respective, incoming operand set arriving at each of the dataflow operators; a plurality of request address file circuits coupled to the spatial array of processing elements and a plurality of cache memory banks, each request address file circuit of the plurality of request address file circuits to access data in (e.g., each of) the plurality of cache memory banks in response to a request for data access from the spatial array of processing elements; a plurality of translation lookaside buffers comprising a translation lookaside buffer in each of the plurality of request address file circuits to provide an output of a physical address for an input of a virtual address; a plurality of higher level, than the plurality of translation lookaside buffers, translation lookaside buffers comprising a higher level translation lookaside buffer in each of the plurality of cache memory banks to provide an output of a physical address for an input of a virtual address; and a translation lookaside buffer manager circuit to perform a first page walk in the plurality of cache memory banks for a miss of an input of a virtual address into a first translation lookaside buffer and into a first higher level translation lookaside buffer to determine a physical address mapped to the virtual address, store a mapping of the virtual address to the physical address from the first page walk in the first higher level translation lookaside buffer to cause the first higher level translation lookaside buffer to send the physical address to the first translation lookaside buffer in a first request address file circuit. The translation lookaside buffer manager circuit may simultaneously, with the first page walk, perform a second page walk in the plurality of cache memory banks, wherein the second page walk is for a miss of an input of a virtual address into a second translation lookaside buffer and into a second higher level translation lookaside buffer to determine a physical address mapped to the virtual address, store a mapping of the virtual address to the physical address from the second page walk in the second higher level translation lookaside buffer to cause the second higher level translation lookaside buffer to send the physical address to the second translation lookaside buffer in a second request address file circuit. The receipt of the physical address in the first translation lookaside buffer may cause the first request address file circuit to perform a data access for the request for data access from the spatial array of processing elements on the physical address in the plurality of cache memory banks. The translation lookaside buffer manager circuit may insert an indicator in the first higher level translation lookaside buffer for the miss of the input of the virtual address in the first translation lookaside buffer and the first higher level translation lookaside buffer to prevent an additional page walk for the input of the virtual address during the first page walk. The translation lookaside buffer manager circuit may receive a shootdown message from a requesting entity for a mapping of a physical address to a virtual address, invalidate the mapping in a higher level translation lookaside buffer storing the mapping, and send shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The translation lookaside buffer manager circuit may receive a shootdown message from a requesting entity for a mapping of a physical address to a virtual address, invalidate the mapping in a higher level translation lookaside buffer storing the mapping, and send shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In another embodiment, an apparatus (e.g., a processor) includes: a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform an operation by a respective, incoming operand set arriving at each of the dataflow operators; a plurality of request address file circuits coupled to the spatial array of processing elements and a cache memory, each request address file circuit of the plurality of request address file circuits to access data in the cache memory in response to a request for data access from the spatial array of processing elements; a plurality of translation lookaside buffers comprising a translation lookaside buffer in each of the plurality of request address file circuits to provide an output of a physical address for an input of a virtual address; and a means comprising a higher level translation lookaside buffer than the plurality of translation lookaside buffers, the means to perform a first page walk in the cache memory for a miss of an input of a virtual address into a first translation lookaside buffer and into the higher level translation lookaside buffer to determine a physical address mapped to the virtual address, store a mapping of the virtual address to the physical address from the first page walk in the higher level translation lookaside buffer to cause the higher level translation lookaside buffer to send the physical address to the first translation lookaside buffer in a first request address file circuit.

In yet another embodiment, an apparatus includes a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform an operation by a respective, incoming operand set arriving at each of the dataflow operators; a plurality of request address file circuits coupled to the spatial array of processing elements and a plurality of cache memory banks, each request address file circuit of the plurality of request address file circuits to access data in (e.g., each of) the plurality of cache memory banks in response to a request for data access from the spatial array of processing elements; a plurality of translation lookaside buffers comprising a translation lookaside buffer in each of the plurality of request address file circuits to provide an output of a physical address for an input of a virtual address; a plurality of higher level, than the plurality of translation lookaside buffers, translation lookaside buffers comprising a higher level translation lookaside buffer in each of the plurality of cache memory banks to provide an output of a physical address for an input of a virtual address; and a means to perform a first page walk in the plurality of cache memory banks for a miss of an input of a virtual address into a first translation lookaside buffer and into a first higher level translation lookaside buffer to determine a physical address mapped to the virtual address, store a mapping of the virtual address to the physical address from the first page walk in the first higher level translation lookaside buffer to cause the first higher level translation lookaside buffer to send the physical address to the first translation lookaside buffer in a first request address file circuit.

In one embodiment, an apparatus (e.g., an accelerator) includes an output buffer of a first processing element coupled to an input buffer of a second processing element via a first data path that may send a first dataflow token from the output buffer of the first processing element to the input buffer of the second processing element when the first dataflow token is received in the output buffer of the first processing element; an output buffer of a third processing element coupled to the input buffer of the second processing element via a second data path that may send a second dataflow token from the output buffer of the third processing element to the input buffer of the second processing element when the second dataflow token is received in the output buffer of the third processing element; a first backpressure path from the input buffer of the second processing element to the first processing element to indicate to the first processing element when storage is not available in the input buffer of the second processing element; a second backpressure path from the input buffer of the second processing element to the third processing element to indicate to the third processing element when storage is not available in the input buffer of the second processing element; and a scheduler of the second processing element to cause storage of the first dataflow token from the first data path into the input buffer of the second processing element when both the first backpressure path indicates storage is available in the input buffer of the second processing element and a conditional token received in a conditional queue of the second processing element from another processing element is a first value. The scheduler of the second processing element may cause storage of the second dataflow token from the second data path into the input buffer of the second processing element when both the second backpressure path indicates storage is available in the input buffer of the second processing element and the conditional token received in the conditional queue of the second processing element from the another processing element is a second value. The apparatus may include a scheduler of the third processing element to clear the second dataflow token from the output buffer of the third processing element after both the conditional queue of the second processing element receives the conditional token having the second value and the second dataflow token is stored in the input buffer of the second processing element. The apparatus may include a scheduler of the first processing element to clear the first dataflow token from the output buffer of the first processing element after both the conditional queue of the second processing element receives the conditional token having the first value and the first dataflow token is stored in the input buffer of the second processing element. The scheduler of the second processing element may cause the first backpressure path to indicate that storage is not available in the input buffer of the second processing element even when storage is actually available in the input buffer of the second processing element when the conditional token received in the conditional queue of the second processing element from another processing element is the second value. The apparatus may include a scheduler of the first processing element to clear the first dataflow token from the output buffer of the first processing element after both the conditional queue of the second processing element receives the conditional token having the first value and the first dataflow token is stored in the input buffer of the second processing element. The scheduler of the second processing element may cause the second backpressure path to indicate that storage is not available in the input buffer of the second processing element even when storage is actually available in the input buffer of the second processing element when the conditional token received in the conditional queue of the second processing element from another processing element is the first value. The scheduler of the second processing element may, when no conditional token is in the conditional queue, cause the first backpressure path to indicate that storage is not available in the input buffer of the second processing element even when storage is actually available in the input buffer of the second processing element, and the second backpressure path to indicate that storage is not available in the input buffer of the second processing element even when storage is actually available in the input buffer of the second processing element.

coupling an output buffer of a first processing element to an input buffer of a second processing element via a first data path that may send a first dataflow token from the output buffer of the first processing element to the input buffer of the second processing element when the first dataflow token is received in the output buffer of the first processing element; coupling an output buffer of a third processing element to the input buffer of the second processing element via a second data path that may send a second dataflow token from the output buffer of the third processing element to the input buffer of the second processing element when the second dataflow token is received in the output buffer of the third processing element; coupling a first backpressure path from the input buffer of the second processing element to the first processing element to indicate to the first processing element when storage is not available in the input buffer of the second processing element; coupling a second backpressure path from the input buffer of the second processing element to the third processing element to indicate to the third processing element when storage is not available in the input buffer of the second processing element; and storing, by a scheduler of the second processing element, the first dataflow token from the first data path into the input buffer of the second processing element when both the first backpressure path indicates storage is available in the input buffer of the second processing element and a conditional token received in a conditional queue of the second processing element from another processing element is a first value. The method may include storing, by the scheduler of the second processing element, the second dataflow token from the second data path into the input buffer of the second processing element when both the second backpressure path indicates storage is available in the input buffer of the second processing element and the conditional token received in the conditional queue of the second processing element from the another processing element is a second value. The method may include a scheduler of the third processing element clearing the second dataflow token from the output buffer of the third processing element after both the conditional queue of the second processing element receives the conditional token having the second value and the second dataflow token is stored in the input buffer of the second processing element. The method may include a scheduler of the first processing element clearing the first dataflow token from the output buffer of the first processing element after both the conditional queue of the second processing element receives the conditional token having the first value and the first dataflow token is stored in the input buffer of the second processing element. The method may include the scheduler of the second processing element causes the first backpressure path to indicate that storage is not available in the input buffer of the second processing element even when storage is actually available in the input buffer of the second processing element when the conditional token received in the conditional queue of the second processing element from another processing element is the second value. The method may include a scheduler of the first processing element clearing the first dataflow token from the output buffer of the first processing element after both the conditional queue of the second processing element receives the conditional token having the first value and the first dataflow token is stored in the input buffer of the second processing element. The method may include the scheduler of the second processing element causes the second backpressure path to indicate that storage is not available in the input buffer of the second processing element even when storage is actually available in the input buffer of the second processing element when the conditional token received in the conditional queue of the second processing element from another processing element is the first value. The method may include the scheduler of the second processing element, when no conditional token is in the conditional queue, causes the first backpressure path to indicate that storage is not available in the input buffer of the second processing element even when storage is actually available in the input buffer of the second processing element, and the second backpressure path to indicate that storage is not available in the input buffer of the second processing element even when storage is actually available in the input buffer of the second processing element. In yet another embodiment, a non-transitory machine readable medium stores code that when executed by a machine causes the machine to perform a method including coupling an output buffer of a first processing element to an input buffer of a second processing element via a first data path that may send a first dataflow token from the output buffer of the first processing element to the input buffer of the second processing element when the first dataflow token is received in the output buffer of the first processing element; coupling an output buffer of a third processing element to the input buffer of the second processing element via a second data path that may send a second dataflow token from the output buffer of the third processing element to the input buffer of the second processing element when the second dataflow token is received in the output buffer of the third processing element; coupling a first backpressure path from the input buffer of the second processing element to the first processing element to indicate to the first processing element when storage is not available in the input buffer of the second processing element; coupling a second backpressure path from the input buffer of the second processing element to the third processing element to indicate to the third processing element when storage is not available in the input buffer of the second processing element; and storing, by a scheduler of the second processing element, the first dataflow token from the first data path into the input buffer of the second processing element when both the first backpressure path indicates storage is available in the input buffer of the second processing element and a conditional token received in a conditional queue of the second processing element from another processing element is a first value. The method may include storing, by the scheduler of the second processing element, the second dataflow token from the second data path into the input buffer of the second processing element when both the second backpressure path indicates storage is available in the input buffer of the second processing element and the conditional token received in the conditional queue of the second processing element from the another processing element is a second value. The method may include a scheduler of the third processing element clearing the second dataflow token from the output buffer of the third processing element after both the conditional queue of the second processing element receives the conditional token having the second value and the second dataflow token is stored in the input buffer of the second processing element. The method may include a scheduler of the first processing element clearing the first dataflow token from the output buffer of the first processing element after both the conditional queue of the second processing element receives the conditional token having the first value and the first dataflow token is stored in the input buffer of the second processing element. The method may include the scheduler of the second processing element causes the first backpressure path to indicate that storage is not available in the input buffer of the second processing element even when storage is actually available in the input buffer of the second processing element when the conditional token received in the conditional queue of the second processing element from another processing element is the second value. The method may include a scheduler of the first processing element clearing the first dataflow token from the output buffer of the first processing element after both the conditional queue of the second processing element receives the conditional token having the first value and the first dataflow token is stored in the input buffer of the second processing element. The method may include the scheduler of the second processing element causes the second backpressure path to indicate that storage is not available in the input buffer of the second processing element even when storage is actually available in the input buffer of the second processing element when the conditional token received in the conditional queue of the second processing element from another processing element is the first value. The method may include the scheduler of the second processing element, when no conditional token is in the conditional queue, causes the first backpressure path to indicate that storage is not available in the input buffer of the second processing element even when storage is actually available in the input buffer of the second processing element, and the second backpressure path to indicate that storage is not available in the input buffer of the second processing element even when storage is actually available in the input buffer of the second processing element. In another embodiment, an apparatus (e.g., an accelerator) includes an output buffer of a first processing element coupled to an input buffer of a second processing element via a first data path that may send a first dataflow token from the output buffer of the first processing element to the input buffer of the second processing element when the first dataflow token is received in the output buffer of the first processing element; an output buffer of a third processing element coupled to the input buffer of the second processing element via a second data path that may send a second dataflow token from the output buffer of the third processing element to the input buffer of the second processing element when the second dataflow token is received in the output buffer of the third processing element; a first backpressure path from the input buffer of the second processing element to the first processing element to indicate to the first processing element when storage is not available in the input buffer of the second processing element; a second backpressure path from the input buffer of the second processing element to the third processing element to indicate to the third processing element when storage is not available in the input buffer of the second processing element; and means to cause storage of the first dataflow token from the first data path into the input buffer of the second processing element when both the first backpressure path indicates storage is available in the input buffer of the second processing element and a conditional token received in a conditional queue of the second processing element from another processing element is a first value.

In another embodiment, an apparatus comprises a data storage device that stores code that when executed by a hardware processor causes the hardware processor to perform any method disclosed herein. An apparatus may be as described in the detailed description. A method may be as described in the detailed description.

In yet another embodiment, a non-transitory machine readable medium that stores code that when executed by a machine causes the machine to perform a method comprising any method disclosed herein.

An instruction set (e.g., for execution by a core) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, June 2016; and see Intel® Architecture Instruction Set Extensions Programming Reference, February 2016).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 99A:
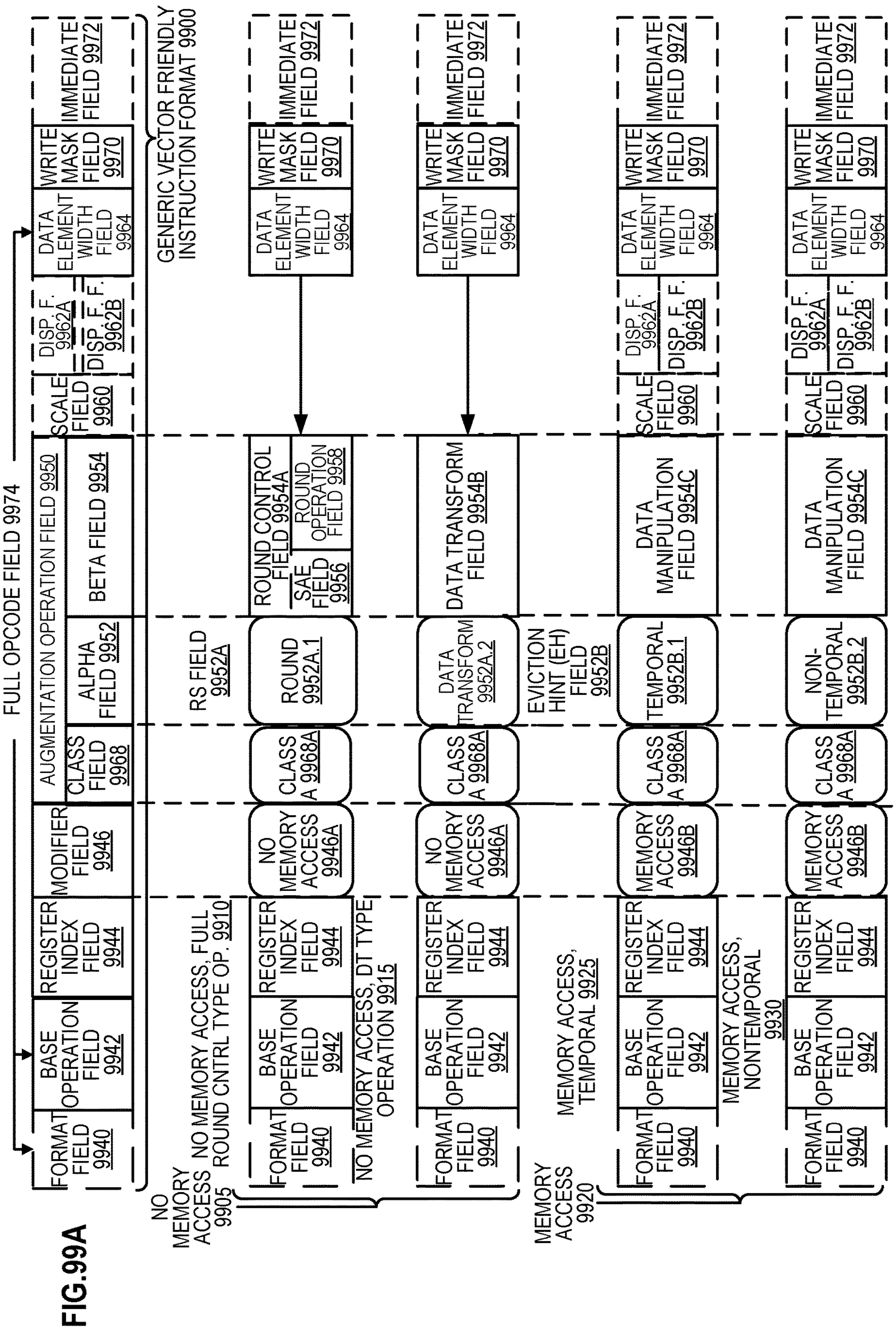
FIG. 99A is a block diagram illustrating a generic vector friendly instruction format and class A instruction templates thereof according to embodiments of the disclosure.
Figure 99B:
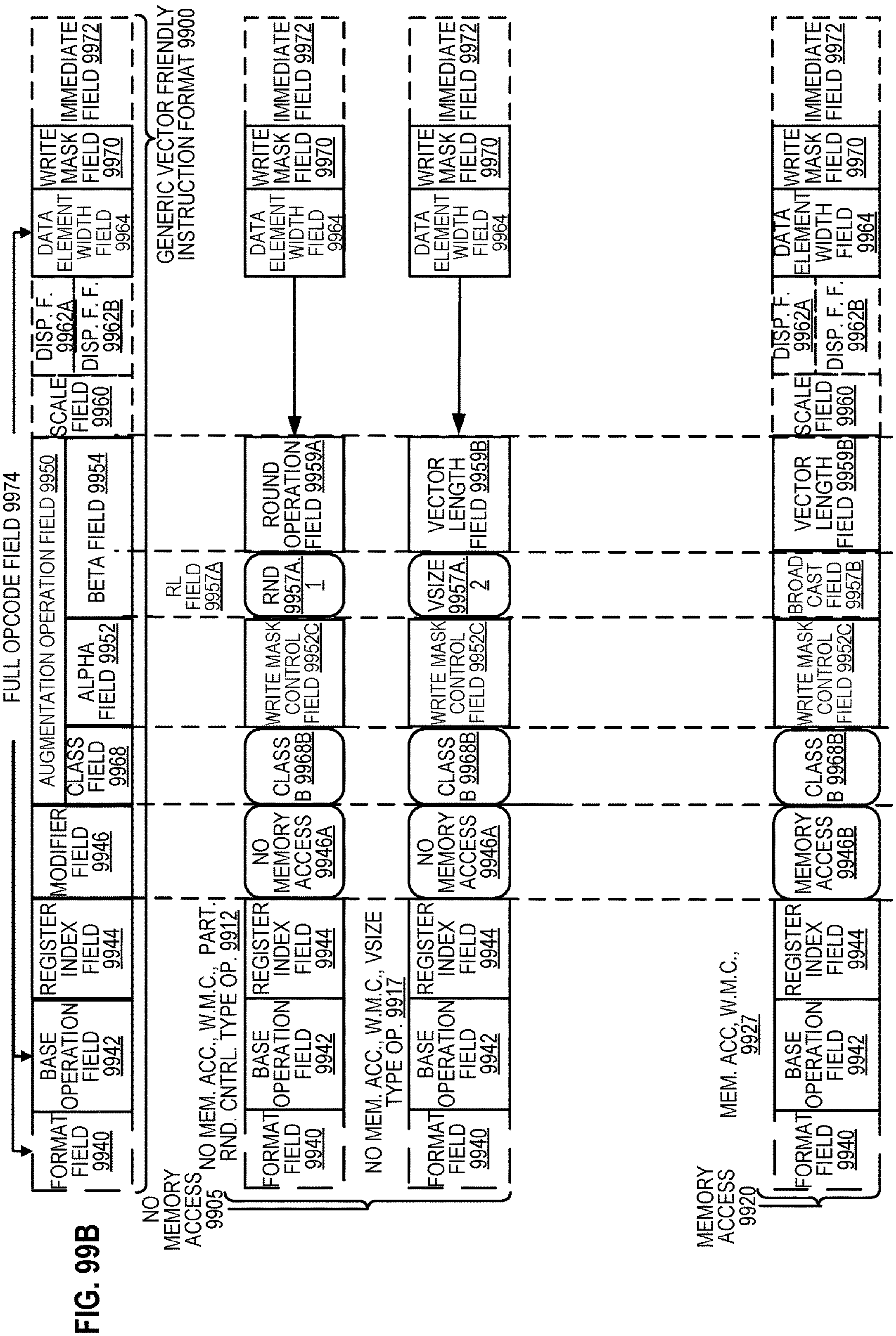
FIG. 99B is a block diagram illustrating the generic vector friendly instruction format and class B instruction templates thereof according to embodiments of the disclosure.

FIGS. 99A-99B are block diagrams illustrating a generic vector friendly instruction format and instruction templates thereof according to embodiments of the disclosure. FIG. 99A is a block diagram illustrating a generic vector friendly instruction format and class A instruction templates thereof according to embodiments of the disclosure; while FIG. 99B is a block diagram illustrating the generic vector friendly instruction format and class B instruction templates thereof according to embodiments of the disclosure. Specifically, a generic vector friendly instruction format 9900 for which are defined class A and class B instruction templates, both of which include no memory access 9905 instruction templates and memory access 9920 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 99A include: 1) within the no memory access 9905 instruction templates there is shown a no memory access, full round control type operation 9910 instruction template and a no memory access, data transform type operation 9915 instruction template; and 2) within the memory access 9920 instruction templates there is shown a memory access, temporal 9925 instruction template and a memory access, non-temporal 9930 instruction template. The class B instruction templates in FIG. 99B include: 1) within the no memory access 9905 instruction templates there is shown a no memory access, write mask control, partial round control type operation 9912 instruction template and a no memory access, write mask control, vsize type operation 9917 instruction template; and 2) within the memory access 9920 instruction templates there is shown a memory access, write mask control 9927 instruction template.

The generic vector friendly instruction format 9900 includes the following fields listed below in the order illustrated in FIGS. 99A-99B.

Format field 9940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 9942—its content distinguishes different base operations.

Register index field 9944—its content, directly or through address generation, specifies the locations of the source and destination operands, be they in registers or in memory. These include a sufficient number of bits to select N registers from a PxQ (e.g. 32x512, 16x128, 32x1024, 64x1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 9946—its content distinguishes occurrences of instructions in the generic vector instruction format that specify memory access from those that do not; that is, between no memory access 9905 instruction templates and memory access 9920 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations. Augmentation operation field 9950—its content distinguishes which one of a variety of different operations to be performed in addition to the base operation. This field is context specific. In one embodiment of the disclosure, this field is divided into a class field 9968, an alpha field 9952, and a beta field 9954. The augmentation operation field 9950 allows common groups of operations to be performed in a single instruction rather than 2, 3, or 4 instructions.

Scale field 9960—its content allows for the scaling of the index field's content for memory address generation (e.g., for address generation that uses $2^{scale}$*index+base).

Displacement Field 9962A—its content is used as part of memory address generation (e.g., for address generation that uses $2^{scale}$*index+base+displacement).

Displacement Factor Field 9962B (note that the juxtaposition of displacement field 9962A directly over displacement factor field 9962B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 9974 (described later herein) and the data manipulation field 9954C. The displacement field 9962A and the displacement factor field 9962B are optional in the sense that they are not used for the no memory access 9905 instruction templates and/or different embodiments may implement only one or none of the two.

Data element width field 9964—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 9970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 9970 allows for partial vector operations, including loads, stores, arithmetic, logical, etc. While embodiments of the disclosure are described in which the write mask field's 9970 content selects one of a number of write mask registers that contains the write mask to be used (and thus the write mask field's 9970 content indirectly identifies that masking to be performed), alternative embodiments instead or additional allow the mask write field's 9970 content to directly specify the masking to be performed.

Immediate field 9972—its content allows for the specification of an immediate. This field is optional in the sense that is it not present in an implementation of the generic vector friendly format that does not support immediate and it is not present in instructions that do not use an immediate.

Class field 9968—its content distinguishes between different classes of instructions. With reference to FIGS. 99A-B, the contents of this field select between class A and class B instructions. In FIGS. 99A-B, rounded corner squares are used to indicate a specific value is present in a field (e.g., class A 9968A and class B 9968B for the class field 9968 respectively in FIGS. 99A-B).

Instruction Templates of Class A

In the case of the non-memory access 9905 instruction templates of class A, the alpha field 9952 is interpreted as an RS field 9952A, whose content distinguishes which one of the different augmentation operation types are to be performed (e.g., round 9952A.1 and data transform 9952A.2 are respectively specified for the no memory access, round type operation 9910 and the no memory access, data transform type operation 9915 instruction templates), while the beta field 9954 distinguishes which of the operations of the specified type is to be performed. In the no memory access 9905 instruction templates, the scale field 9960, the displacement field 9962A, and the displacement scale filed 9962B are not present.

No-Memory Access Instruction Templates—Full Round Control Type Operation

In the no memory access full round control type operation 9910 instruction template, the beta field 9954 is interpreted as a round control field 9954A, whose content(s) provide static rounding. While in the described embodiments of the disclosure the round control field 9954A includes a suppress all floating point exceptions (SAE) field 9956 and a round operation control field 9958, alternative embodiments may support may encode both these concepts into the same field or only have one or the other of these concepts/fields (e.g., may have only the round operation control field 9958).

SAE field 9956—its content distinguishes whether or not to disable the exception event reporting; when the SAE field's 9956 content indicates suppression is enabled, a given instruction does not report any kind of floating-point exception flag and does not raise any floating point exception handler.

Round operation control field 9958—its content distinguishes which one of a group of rounding operations to perform (e.g., Round-up, Round-down, Round-towards-zero and Round-to-nearest). Thus, the round operation control field 9958 allows for the changing of the rounding mode on a per instruction basis. In one embodiment of the disclosure where a processor includes a control register for specifying rounding modes, the round operation control field's 9950 content overrides that register value.

No Memory Access Instruction Templates—Data Transform Type Operation

In the no memory access data transform type operation 9915 instruction template, the beta field 9954 is interpreted as a data transform field 9954B, whose content distinguishes which one of a number of data transforms is to be performed (e.g., no data transform, swizzle, broadcast).

In the case of a memory access 9920 instruction template of class A, the alpha field 9952 is interpreted as an eviction hint field 9952B, whose content distinguishes which one of the eviction hints is to be used (in FIG. 99A, temporal 9952B.1 and non-temporal 9952B.2 are respectively specified for the memory access, temporal 9925 instruction template and the memory access, non-temporal 9930 instruction template), while the beta field 9954 is interpreted as a data manipulation field 9954C, whose content distinguishes which one of a number of data manipulation operations (also known as primitives) is to be performed (e.g., no manipulation; broadcast; up conversion of a source; and down conversion of a destination). The memory access 9920 instruction templates include the scale field 9960, and optionally the displacement field 9962A or the displacement scale field 9962B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1 st-level cache and should be given priority for eviction. This is, however, a hint, and different processors may implement it in different ways, including ignoring the hint entirely.

Instruction Templates of Class B

In the case of the instruction templates of class B, the alpha field 9952 is interpreted as a write mask control (Z) field 9952C, whose content distinguishes whether the write masking controlled by the write mask field 9970 should be a merging or a zeroing.

In the case of the non-memory access 9905 instruction templates of class B, part of the beta field 9954 is interpreted as an RL field 9957A, whose content distinguishes which one of the different augmentation operation types are to be performed (e.g., round 9957A.1 and vector length (VSIZE) 9957A.2 are respectively specified for the no memory access, write mask control, partial round control type operation 9912 instruction template and the no memory access, write mask control, VSIZE type operation 9917 instruction template), while the rest of the beta field 9954 distinguishes which of the operations of the specified type is to be performed. In the no memory access 9905 instruction templates, the scale field 9960, the displacement field 9962A, and the displacement scale filed 9962B are not present.

In the no memory access, write mask control, partial round control type operation 9910 instruction template, the rest of the beta field 9954 is interpreted as a round operation field 9959A and exception event reporting is disabled (a given instruction does not report any kind of floating-point exception flag and does not raise any floating point exception handler).

Round operation control field 9959A—just as round operation control field 9958, its content distinguishes which one of a group of rounding operations to perform (e.g., Round-up, Round-down, Round-towards-zero and Round-to-nearest). Thus, the round operation control field 9959A allows for the changing of the rounding mode on a per instruction basis. In one embodiment of the disclosure where a processor includes a control register for specifying rounding modes, the round operation control field's 9950 content overrides that register value.

In the no memory access, write mask control, VSIZE type operation 9917 instruction template, the rest of the beta field 9954 is interpreted as a vector length field 9959B, whose content distinguishes which one of a number of data vector lengths is to be performed on (e.g., 128, 256, or 512 byte).

In the case of a memory access 9920 instruction template of class B, part of the beta field 9954 is interpreted as a broadcast field 9957B, whose content distinguishes whether or not the broadcast type data manipulation operation is to be performed, while the rest of the beta field 9954 is interpreted the vector length field 9959B. The memory access 9920 instruction templates include the scale field 9960, and optionally the displacement field 9962A or the displacement scale field 9962B.

With regard to the generic vector friendly instruction format 9900, a full opcode field 9974 is shown including the format field 9940, the base operation field 9942, and the data element width field 9964. While one embodiment is shown where the full opcode field 9974 includes all of these fields, the full opcode field 9974 includes less than all of these fields in embodiments that do not support all of them. The full opcode field 9974 provides the operation code (opcode).

The augmentation operation field 9950, the data element width field 9964, and the write mask field 9970 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 100 is a block diagram illustrating an exemplary specific vector friendly instruction format according to embodiments of the disclosure. FIG. 100 shows a specific vector friendly instruction format 10000 that is specific in the sense that it specifies the location, size, interpretation, and order of the fields, as well as values for some of those fields. The specific vector friendly instruction format 10000 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 99 into which the fields from FIG. 100 map are illustrated.

It should be understood that, although embodiments of the disclosure are described with reference to the specific vector friendly instruction format 10000 in the context of the generic vector friendly instruction format 9900 for illustrative purposes, the disclosure is not limited to the specific vector friendly instruction format 10000 except where claimed. For example, the generic vector friendly instruction format 9900 contemplates a variety of possible sizes for the various fields, while the specific vector friendly instruction format 10000 is shown as having fields of specific sizes. By way of specific example, while the data element width field 9964 is illustrated as a one bit field in the specific vector friendly instruction format 10000, the disclosure is not so limited (that is, the generic vector friendly instruction format 9900 contemplates other sizes of the data element width field 9964).

The generic vector friendly instruction format 9900 includes the following fields listed below in the order illustrated in FIG. 100A.

EVEX Prefix (Bytes 0-3) 10002—is encoded in a four-byte form.

Format Field 9940 (EVEX Byte 0, bits [7:0])—the first byte (EVEX Byte 0) is the format field 9940 and it contains 0x62 (the unique value used for distinguishing the vector friendly instruction format in one embodiment of the disclosure).

The second-fourth bytes (EVEX Bytes 1-3) include a number of bit fields providing specific capability.

REX field 10005 (EVEX Byte 1, bits [7-5])—consists of a EVEX.R bit field (EVEX Byte 1, bit [7]—R), EVEX.X bit field (EVEX byte 1, bit [6]—X), and 9957BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 4411B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 9910—this is the first part of the REX' field 9910 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 10015 (EVEX byte 1, bits [3:0]—mmmm)—its content encodes an implied leading opcode byte (OF, OF 38, or OF 3).

Data element width field 9964 (EVEX byte 2, bit [7]—W)—is represented by the notation EVEX.W. EVEX.W is used to define the granularity (size) of the datatype (either 32-bit data elements or 64-bit data elements).

EVEX.vvvv 10020 (EVEX Byte 2, bits [6:3]-vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 4411b. Thus, EVEX.vvvv field 10020 encodes the 4 low-order bits of the first source register specifier stored in inverted (1 s complement) form. Depending on the instruction, an extra different EVEX bit field is used to extend the specifier size to 32 registers.

EVEX.U 9968 Class field (EVEX byte 2, bit [2]—U)—If EVEX.0=0, it indicates class A or EVEX.U0; if EVEX.0=1, it indicates class B or EVEX.U1.

Prefix encoding field 10025 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 9952 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 9954 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 9910—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 9970 (EVEX byte 3, bits [2:0]—kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 10030 (Byte 4) is also known as the opcode byte. Part of the opcode is specified in this field.

MOD R/M Field 10040 (Byte 5) includes MOD field 10042, Reg field 10044, and R/M field 10046. As previously described, the MOD field's 10042 content distinguishes between memory access and non-memory access operations. The role of Reg field 10044 can be summarized to two situations: encoding either the destination register operand or a source register operand, or be treated as an opcode extension and not used to encode any instruction operand. The role of R/M field 10046 may include the following: encoding the instruction operand that references a memory address, or encoding either the destination register operand or a source register operand.

Scale, Index, Base (SIB) Byte (Byte 6)—As previously described, the scale field's 5450 content is used for memory address generation. SIB.xxx 10054 and SIB.bbb 10056—the contents of these fields have been previously referred to with regard to the register indexes Xxxx and Bbbb.

Displacement field 9962A (Bytes 7-10)—when MOD field 10042 contains 10, bytes 7-10 are the displacement field9962A, and it works the same as the legacy 32-bit displacement (disp32) and works at byte granularity.

Displacement factor field9962B (Byte 7)—when MOD field 10042 contains 01, byte 7 is the displacement factor field9962B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field9962B is a reinterpretation of disp8; when using displacement factor field9962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field9962B substitutes the legacy x86 instruction set 8-bit displacement. Thus, the displacement factor field9962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field9972 operates as previously described.

Full Opcode Field

Figures 100A, 100B, 100C:
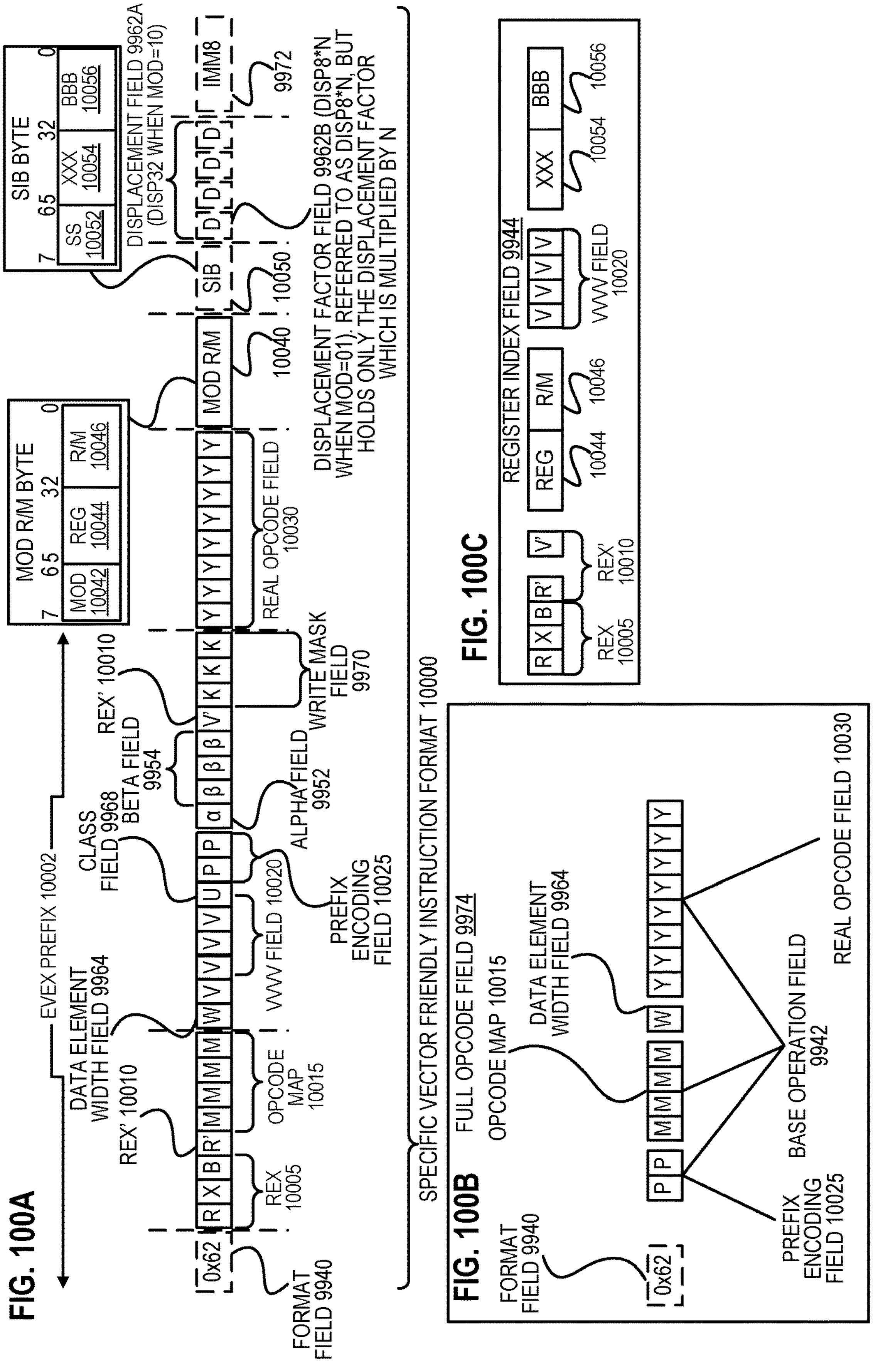
FIG. 100A is a block diagram illustrating fields for the generic vector friendly instruction formats in FIGS. 99A and 99B according to embodiments of the disclosure.
FIG. 100B is a block diagram illustrating the fields of the specific vector friendly instruction format in FIG. 100A that make up a full opcode field according to one embodiment of the disclosure.
FIG. 100C is a block diagram illustrating the fields of the specific vector friendly instruction format in FIG. 100A that make up a register index field according to one embodiment of the disclosure.

FIG. 100B is a block diagram illustrating the fields of the specific vector friendly instruction format 10000 that make up the full opcode field9974 according to one embodiment of the disclosure. Specifically, the full opcode field9974 includes the format field 9940, the base operation field 9942, and the data element width (W) field 9964. The base operation field 9942 includes the prefix encoding field 10025, the opcode map field 10015, and the real opcode field 10030.

Register Index Field

FIG. 100C is a block diagram illustrating the fields of the specific vector friendly instruction format 10000 that make up the register index field 9944 according to one embodiment of the disclosure. Specifically, the register index field 9944 includes the REX field 10005, the REX' field 10010, the MODR/M.reg field 10044, the MODR/M.r/m field 10046, the VVVV field 10020, xxx field 10054, and the bbb field 10056.

Augmentation Operation Field

Figure 100D:
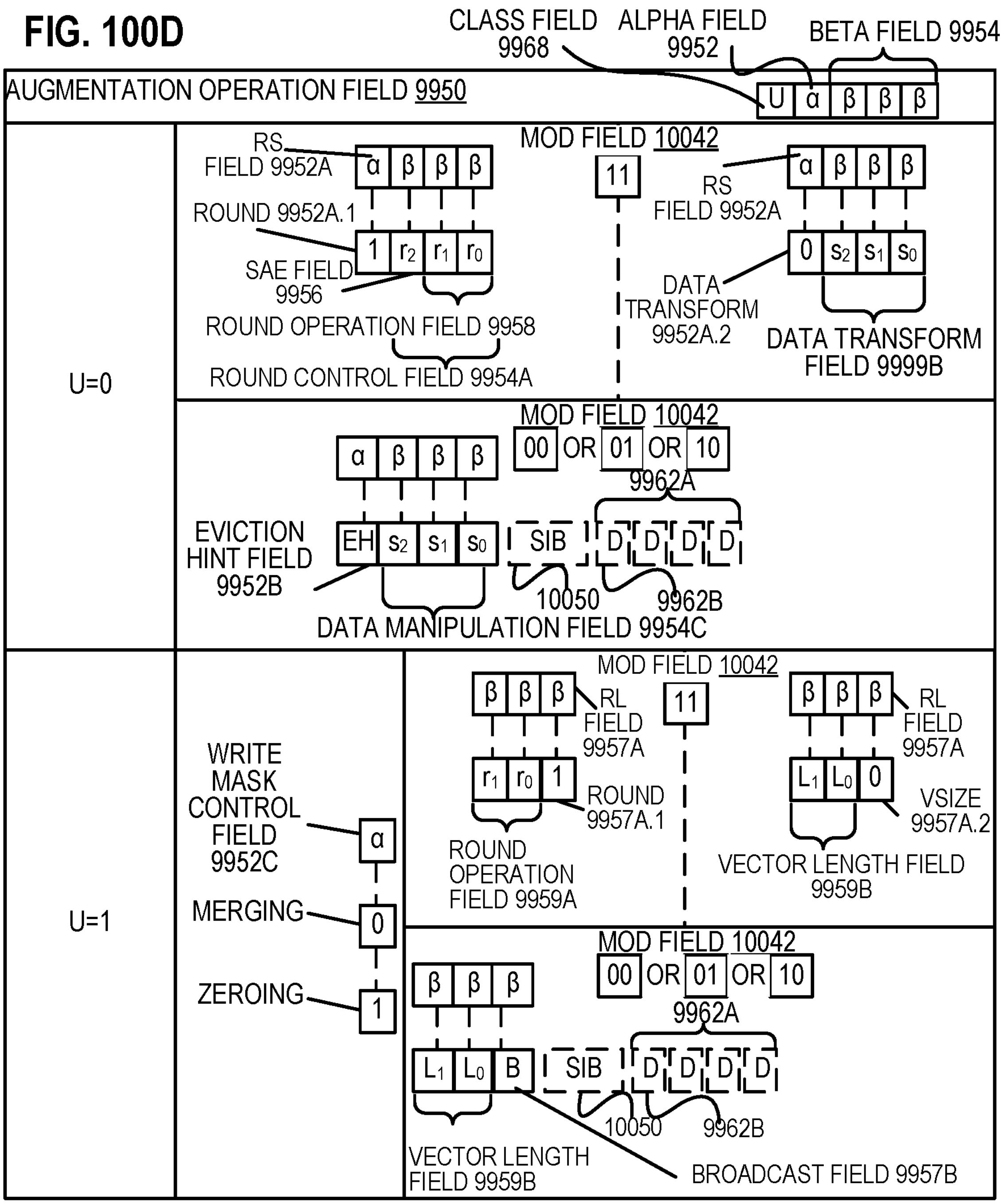

FIG. 100D is a block diagram illustrating the fields of the specific vector friendly instruction format 10000 that make up the augmentation operation field 9950 according to one embodiment of the disclosure. When the class (U) field 9968 contains 0, it signifies EVEX.U0 (class A 9968A); when it contains 1, it signifies EVEX.U1 (class B 9968B). When U=0 and the MOD field 10042 contains 11 (signifying a no memory access operation), the alpha field 9952 (EVEX byte 3, bit [7]—EH) is interpreted as the rs field 9952A. When the rs field 9952A contains a 1 (round 9952A.1), the beta field 9954 (EVEX byte 3, bits [6:4]—SSS) is interpreted as the round control field 9954A. The round control field 9954A includes a one bit SAE field 9956 and a two bit round operation field 9958. When the rs field 9952A contains a 0 (data transform 9952A.2), the beta field 9954 (EVEX byte 3, bits [6:4]—SSS) is interpreted as a three bit data transform field 9954B. When U=0 and the MOD field 10042 contains 00, 01, or 10 (signifying a memory access operation), the alpha field 9952 (EVEX byte 3, bit [7]—EH) is interpreted as the eviction hint (EH) field 9952B and the beta field 9954 (EVEX byte 3, bits [6:4]—SSS) is interpreted as a three bit data manipulation field 9954C.

When U=1, the alpha field 9952 (EVEX byte 3, bit [7]—EH) is interpreted as the write mask control (Z) field 9952C. When U=1 and the MOD field 10042 contains 11 (signifying a no memory access operation), part of the beta field 9954 (EVEX byte 3, bit [4]—$S_0$) is interpreted as the RL field 9957A; when it contains a 1 (round 9957A.1) the rest of the beta field 9954 (EVEX byte 3, bit [6-5]—$S_{2-1}$) is interpreted as the round operation field 9959A, while when the RL field 9957A contains a 0 (VSIZE 9957.A2) the rest of the beta field 9954 (EVEX byte 3, bit [6-5]—$S_{2-1}$) is interpreted as the vector length field 9959B (EVEX byte 3, bit [6-5]—$L_{1-0}$). When U=1 and the MOD field 10042 contains 00, 01, or 10 (signifying a memory access operation), the beta field 9954 (EVEX byte 3, bits [6:4]—SSS) is interpreted as the vector length field 9959B (EVEX byte 3, bit [6-5]—$L_{1-0}$) and the broadcast field 9957B (EVEX byte 3, bit [4]—B).

Exemplary Register Architecture

Figure 101:
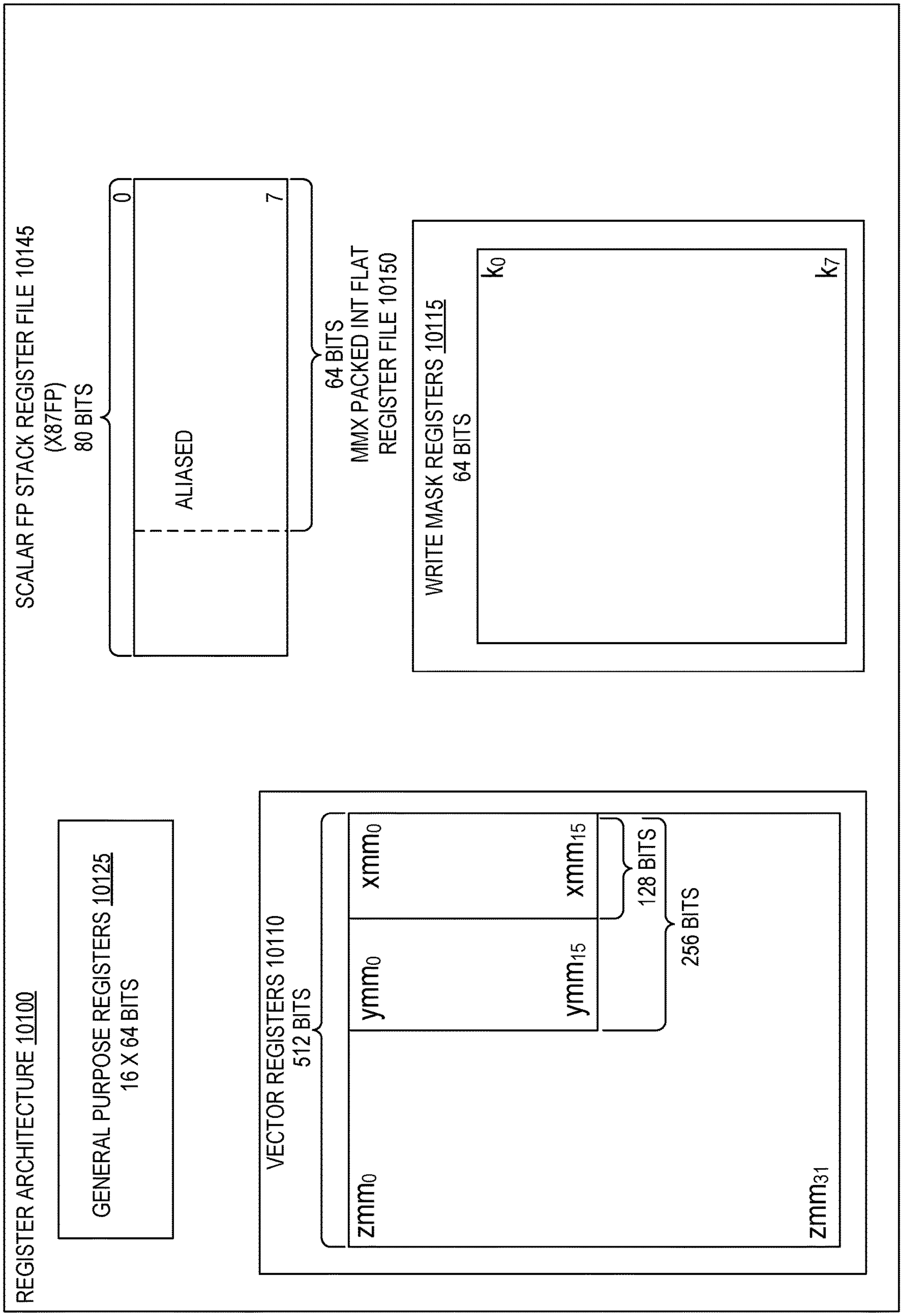

FIG. 101 is a block diagram of a register architecture 10100 according to one embodiment of the disclosure. In the embodiment illustrated, there are 32 vector registers 10110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 10000 operates on these overlaid register file as illustrated in the below tables.

| Adjustable Vector Length | Class | Operations | Registers |
|---|---|---|---|
| Instruction Templates that do not include the vector length field 9959B | A (FIG. 99A; U = 0) | 5410, 9915, 9925, 9930 | zmm registers (the vector length is 64 byte) |
| | B (FIG. 99B; U = 1) | 5412 | zmm registers (the vector length is 64 byte) |
| Instruction templates that do include the vector length field 9959B | B (FIG. 99B; U = 1) | 5417, 9927 | zmm, ymm, or xmm registers (the vector length is 64 byte, 32 byte, or 16 byte) depending on the vector length field 9959B |

In other words, the vector length field 9959B selects between a maximum length and one or more other shorter lengths, where each such shorter length is half the length of the preceding length; and instructions templates without the vector length field 9959B operate on the maximum vector length. Further, in one embodiment, the class B instruction templates of the specific vector friendly instruction format 10000 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 10115—in the embodiment illustrated, there are 8 write mask registers (k0 through k7), each 64 bits in size. In an alternate embodiment, the write mask registers 10115 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 10125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 10145, on which is aliased the MMX packed integer flat register file 10150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 102A:
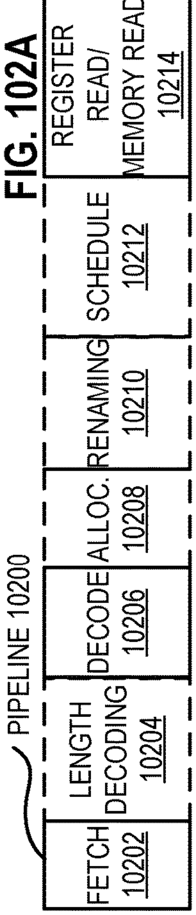
Figure 102B:
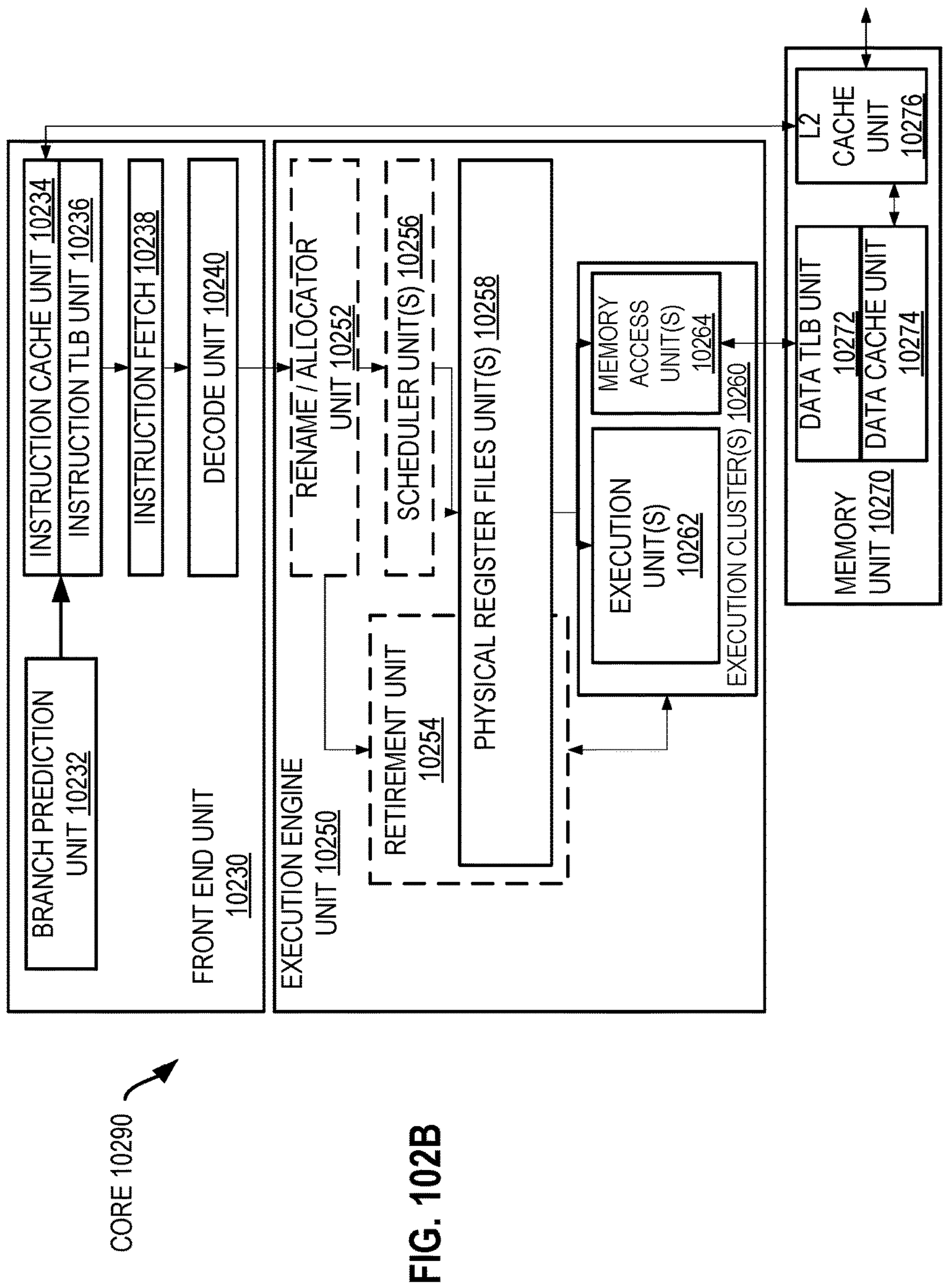

FIG. 102A is a block diagram illustrating both an exemplary in-order pipeline and an exemplary register renaming, out-of-order issue/execution pipeline according to embodiments of the disclosure. FIG. 102B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 102A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 102A, a processor pipeline 10200 includes a fetch stage 10202, a length decode stage 10204, a decode stage 10206, an allocation stage 10208, a renaming stage 10210, a scheduling (also known as a dispatch or issue) stage 10212, a register read/memory read stage 10214, an execute stage 10216, a write back/memory write stage 10218, an exception handling stage 10222, and a commit stage 10224.

FIG. 102B shows processor core 10290 including a front end unit 10230 coupled to an execution engine unit 10250, and both are coupled to a memory unit 10270. The core 10290 may be a reduced instruction set computing (RISC) core, a complex instruction set computing (CISC) core, a very long instruction word (VLIW) core, or a hybrid or alternative core type. As yet another option, the core 10290 may be a special-purpose core, such as, for example, a network or communication core, compression engine, coprocessor core, general purpose computing graphics processing unit (GPGPU) core, graphics core, or the like.

The front end unit 10230 includes a branch prediction unit 10232 coupled to an instruction cache unit 10234, which is coupled to an instruction translation lookaside buffer (TLB) 10236, which is coupled to an instruction fetch unit 10238, which is coupled to a decode unit 10240. The decode unit 10240 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 10240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 10290 includes a microcode ROM or other medium that stores microcode for certain macro-instructions (e.g., in decode unit 10240 or otherwise within the front end unit 10230). The decode unit 10240 is coupled to a rename/allocator unit 10252 in the execution engine unit 10250.

The execution engine unit 10250 includes the rename/allocator unit 10252 coupled to a retirement unit 10254 and a set of one or more scheduler unit(s) 10256. The scheduler unit(s) 10256 represents any number of different schedulers, including reservations stations, central instruction window, etc. The scheduler unit(s) 10256 is coupled to the physical register file(s) unit(s) 10258. Each of the physical register file(s) units 10258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 10258 comprises a vector registers unit, a write mask registers unit, and a scalar registers unit. These register units may provide architectural vector registers, vector mask registers, and general purpose registers. The physical register file(s) unit(s) 10258 is overlapped by the retirement unit 10254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 10254 and the physical register file(s) unit(s) 10258 are coupled to the execution cluster(s) 10260. The execution cluster(s) 10260 includes a set of one or more execution units 10262 and a set of one or more memory access units 10264. The execution units 10262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 10256, physical register file(s) unit(s) 10258, and execution cluster(s) 10260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 10264). It should also be understood that where separate pipelines are used, one or more of these pipelines may be out-of-order issue/execution and the rest in-order.

The set of memory access units 10264 is coupled to the memory unit 10270, which includes a data TLB unit 10272 coupled to a data cache unit 10274 coupled to a level 2 (L2) cache unit 10276. In one exemplary embodiment, the memory access units 10264 may include a load unit, a store address unit, and a store data unit, each of which is coupled to the data TLB unit 10272 in the memory unit 10270. The instruction cache unit 10234 is further coupled to a level 2 (L2) cache unit 10276 in the memory unit 10270. The L2 cache unit 10276 is coupled to one or more other levels of cache and eventually to a main memory.

By way of example, the exemplary register renaming, out-of-order issue/execution core architecture may implement the pipeline 10200 as follows: 1) the instruction fetch 10238 performs the fetch and length decoding stages 10202 and 10204; 2) the decode unit 10240 performs the decode stage 10206; 3) the rename/allocator unit 10252 performs the allocation stage 10208 and renaming stage 10210; 4) the scheduler unit(s) 10256 performs the schedule stage 10212; 5) the physical register file(s) unit(s) 10258 and the memory unit 10270 perform the register read/memory read stage 10214; the execution cluster 10260 perform the execute stage 10216; 6) the memory unit 10270 and the physical register file(s) unit(s) 10258 perform the write back/memory write stage 10218; 7) various units may be involved in the exception handling stage 10222; and 8) the retirement unit 10254 and the physical register file(s) unit(s) 10258 perform the commit stage 10224.

The core 10290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 10290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 10234/10274 and a shared L2 cache unit 10276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 103A:
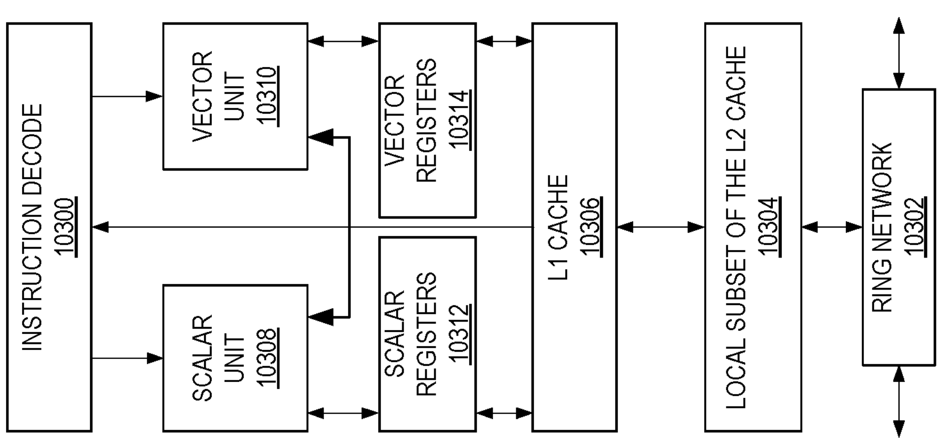
Figure 103B:
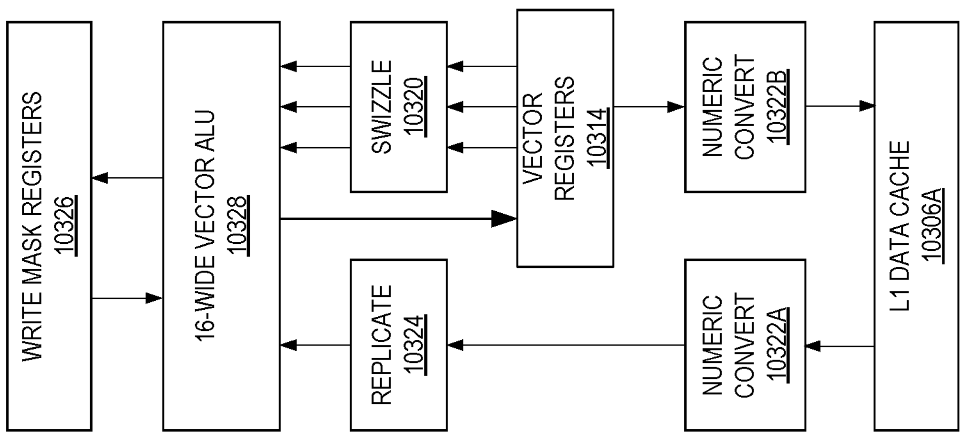

FIGS. 103A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 103A is a block diagram of a single processor core, along with its connection to the on-die interconnect network 10302 and with its local subset of the Level 2 (L2) cache 10304, according to embodiments of the disclosure. In one embodiment, an instruction decode unit 10300 supports the x86 instruction set with a packed data instruction set extension. An L1 cache 10306 allows low-latency accesses to cache memory into the scalar and vector units. While in one embodiment (to simplify the design), a scalar unit 10308 and a vector unit 10310 use separate register sets (respectively, scalar registers 10312 and vector registers 10314) and data transferred between them is written to memory and then read back in from a level 1 (L1) cache 10306, alternative embodiments of the disclosure may use a different approach (e.g., use a single register set or include a communication path that allow data to be transferred between the two register files without being written and read back).

The local subset of the L2 cache 10304 is part of a global L2 cache that is divided into separate local subsets, one per processor core. Each processor core has a direct access path to its own local subset of the L2 cache 10304. Data read by a processor core is stored in its L2 cache subset 10304 and can be accessed quickly, in parallel with other processor cores accessing their own local L2 cache subsets. Data written by a processor core is stored in its own L2 cache subset 10304 and is flushed from other subsets, if necessary. The ring network ensures coherency for shared data. The ring network is bi-directional to allow agents such as processor cores, hf caches and other logic blocks to communicate with each other within the chip. Each ring data-path is 1012-bits wide per direction.

FIG. 103B is an expanded view of part of the processor core in FIG. 103A according to embodiments of the disclosure. FIG. 103B includes an L1 data cache 10306A part of the L1 cache 10304, as well as more detail regarding the vector unit 10310 and the vector registers 10314. Specifically, the vector unit 10310 is a 16-wide vector processing unit (VPU) (see the 16-wide ALU 10328), which executes one or more of integer, single-precision float, and double-precision float instructions. The VPU supports swizzling the register inputs with swizzle unit 10320, numeric conversion with numeric convert units 10322A-B, and replication with replication unit 10324 on the memory input. Write mask registers 10326 allow predicating resulting vector writes.

Figure 104:
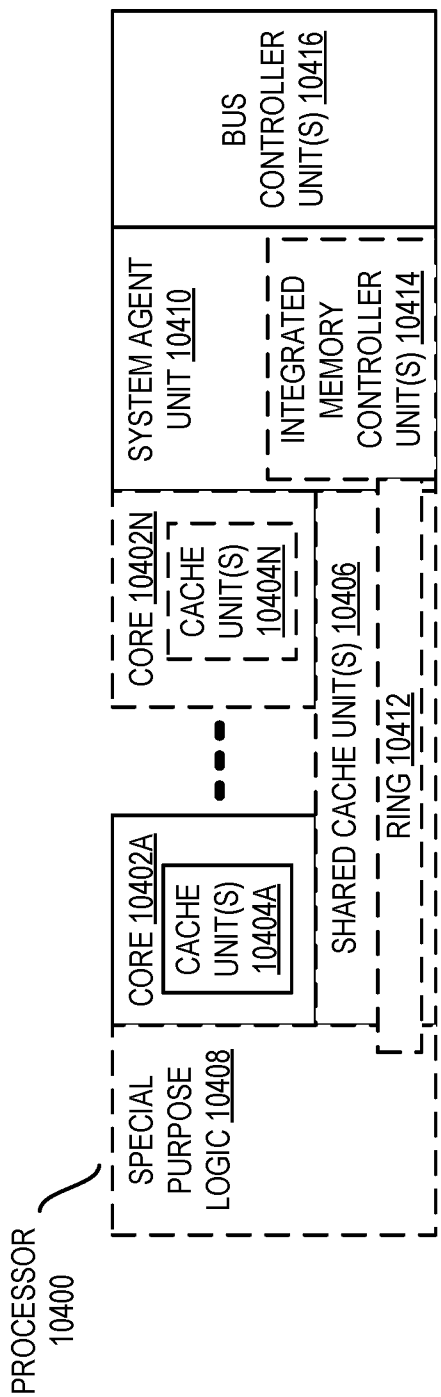

FIG. 104 is a block diagram of a processor 10400 that may have more than one core, may have an integrated memory controller, and may have integrated graphics according to embodiments of the disclosure. The solid lined boxes in FIG. 104 illustrate a processor 10400 with a single core 10402A, a system agent 10410, a set of one or more bus controller units 10416, while the optional addition of the dashed lined boxes illustrates an alternative processor 10400 with multiple cores 10402A-N, a set of one or more integrated memory controller unit(s) 10414 in the system agent unit 10410, and special purpose logic 10408.

Thus, different implementations of the processor 10400 may include: 1) a CPU with the special purpose logic 10408 being integrated graphics and/or scientific (throughput) logic (which may include one or more cores), and the cores 10402A-N being one or more general purpose cores (e.g., general purpose in-order cores, general purpose out-of-order cores, a combination of the two); 2) a coprocessor with the cores 10402A-N being a large number of special purpose cores intended primarily for graphics and/or scientific (throughput); and 3) a coprocessor with the cores 10402A-N being a large number of general purpose in-order cores. Thus, the processor 10400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 10400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 10406, and external memory (not shown) coupled to the set of integrated memory controller units 10414. The set of shared cache units 10406 may include one or more mid-level caches, such as level 2 (L2), level 3 (L3), level 4 (L4), or other levels of cache, a last level cache (LLC), and/or combinations thereof. While in one embodiment a ring based interconnect unit 10412 interconnects the integrated graphics logic 10408, the set of shared cache units 10406, and the system agent unit 10410/integrated memory controller unit(s) 10414, alternative embodiments may use any number of well-known techniques for interconnecting such units. In one embodiment, coherency is maintained between one or more cache units 10406 and cores 10402-A-N.

In some embodiments, one or more of the cores 10402A-N are capable of multi-threading. The system agent 10410 includes those components coordinating and operating cores 10402A-N. The system agent unit 10410 may include for example a power control unit (PCU) and a display unit. The PCU may be or include logic and components needed for regulating the power state of the cores 10402A-N and the integrated graphics logic 10408. The display unit is for driving one or more externally connected displays.

The cores 10402A-N may be homogenous or heterogeneous in terms of architecture instruction set; that is, two or more of the cores 10402A-N may be capable of execution the same instruction set, while others may be capable of executing only a subset of that instruction set or a different instruction set.

Exemplary Computer Architectures

FIGS. 105-108 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 105:
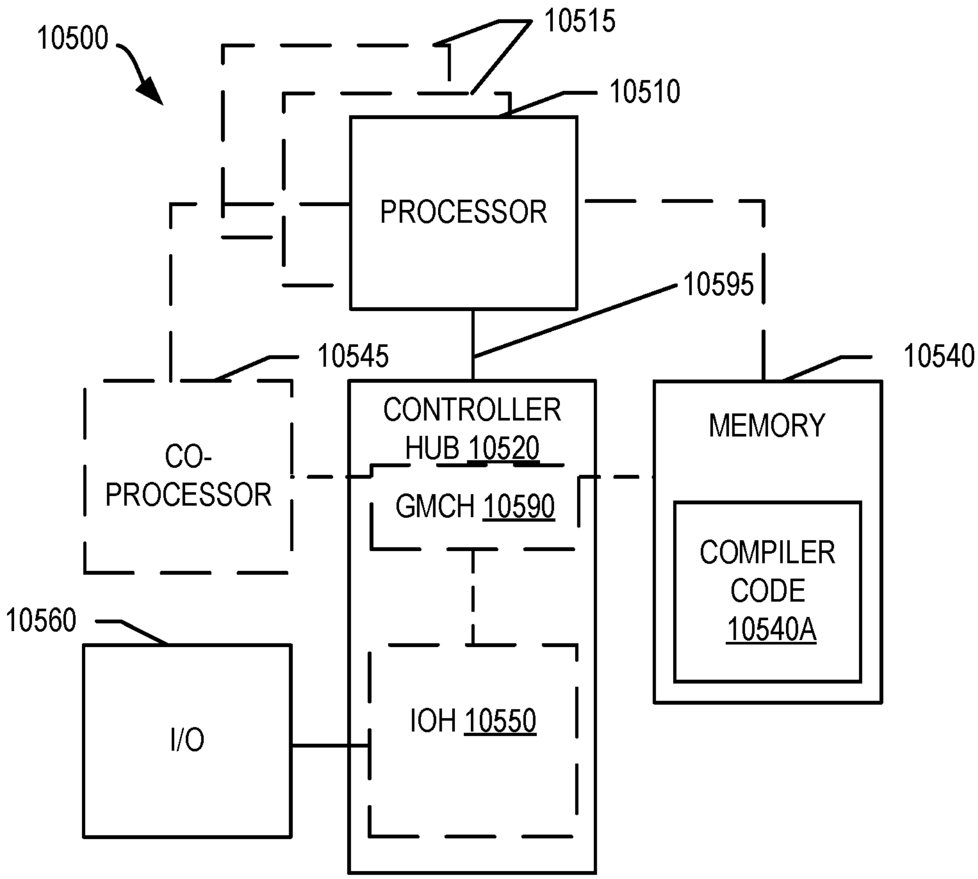

Referring now to FIG. 105, shown is a block diagram of a system 10500 in accordance with one embodiment of the present disclosure. The system 10500 may include one or more processors 10510, 10515, which are coupled to a controller hub 10520. In one embodiment the controller hub 10520 includes a graphics memory controller hub (GMCH) 10590 and an Input/Output Hub (IOH) 10550 (which may be on separate chips); the GMCH 10590 includes memory and graphics controllers to which are coupled memory 10540 and a coprocessor 10545; the IOH 10550 is couples input/output (I/O) devices 10560 to the GMCH 10590. Alternatively, one or both of the memory and graphics controllers are integrated within the processor (as described herein), the memory 10540 and the coprocessor 10545 are coupled directly to the processor 10510, and the controller hub 10520 in a single chip with the IOH 10550. Memory 10540 may include compiler code 10540A, for example, to store code that when executed causes a processor to perform any method of this disclosure.

The optional nature of additional processors 10515 is denoted in FIG. 105 with broken lines. Each processor 10510, 10515 may include one or more of the processing cores described herein and may be some version of the processor 10400.

The memory 10540 may be, for example, dynamic random access memory (DRAM), phase change memory (PCM), or a combination of the two. For at least one embodiment, the controller hub 10520 communicates with the processor(s) 10510, 10515 via a multi-drop bus, such as a frontside bus (FSB), point-to-point interface such as QuickPath Interconnect (QPI), or similar connection 10595.

In one embodiment, the coprocessor 10545 is a special-purpose processor, such as, for example, a high-throughput MIC processor, a network or communication processor, compression engine, graphics processor, GPGPU, embedded processor, or the like. In one embodiment, controller hub 10520 may include an integrated graphics accelerator.

There can be a variety of differences between the physical resources 10510, 10515 in terms of a spectrum of metrics of merit including architectural, microarchitectural, thermal, power consumption characteristics, and the like.

In one embodiment, the processor 10510 executes instructions that control data processing operations of a general type. Embedded within the instructions may be coprocessor instructions. The processor 10510 recognizes these coprocessor instructions as being of a type that should be executed by the attached coprocessor 10545. Accordingly, the processor 10510 issues these coprocessor instructions (or control signals representing coprocessor instructions) on a coprocessor bus or other interconnect, to coprocessor 10545. Coprocessor(s) 10545 accept and execute the received coprocessor instructions.

Figure 106:
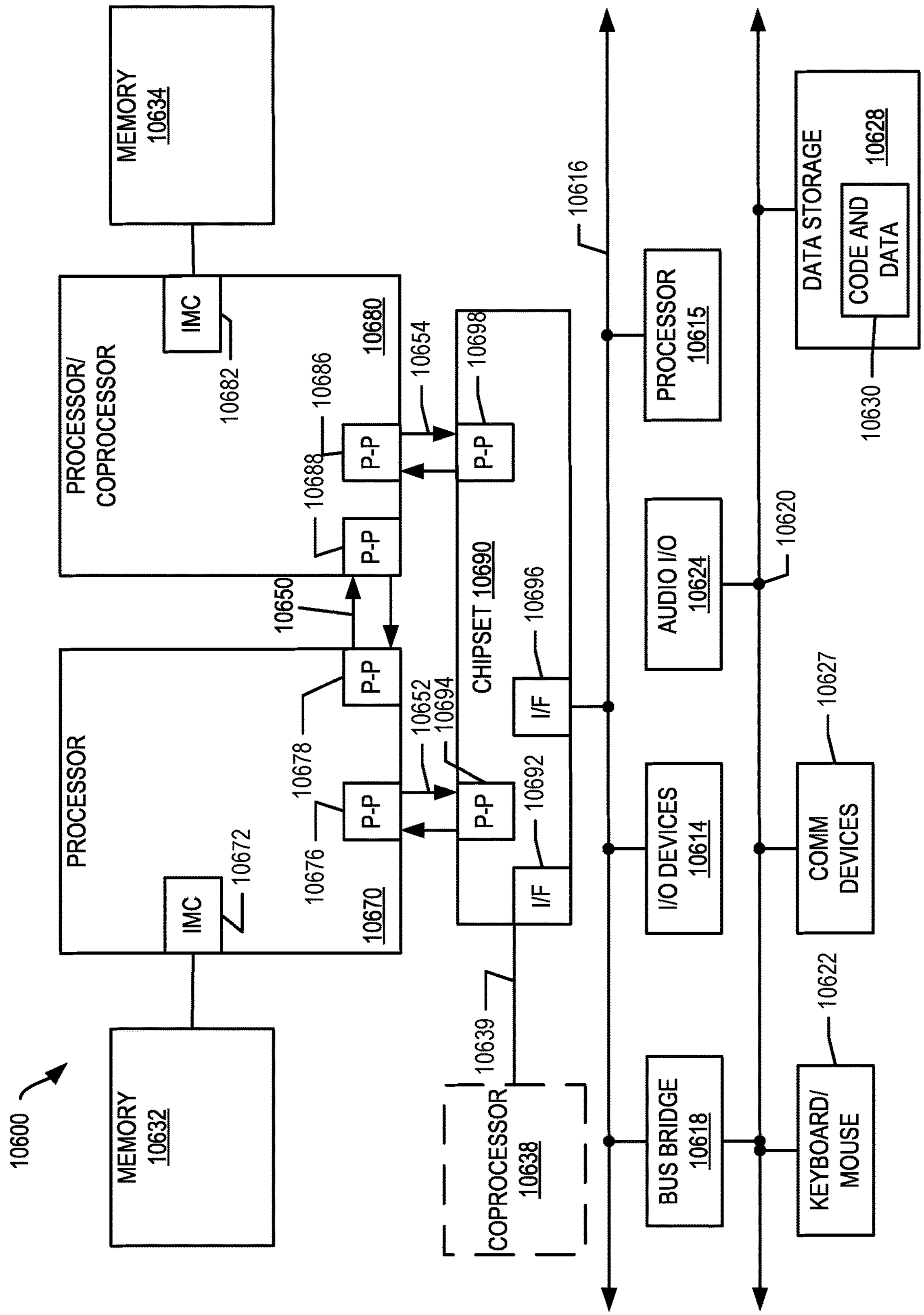

Referring now to FIG. 106, shown is a block diagram of a first more specific exemplary system 10600 in accordance with an embodiment of the present disclosure. As shown in FIG. 106, multiprocessor system 10600 is a point-to-point interconnect system, and includes a first processor 10670 and a second processor 10680 coupled via a point-to-point interconnect 10650. Each of processors 10670 and 10680 may be some version of the processor 10400. In one embodiment of the disclosure, processors 10670 and 10680 are respectively processors 10510 and 10515, while coprocessor 10638 is coprocessor 10545. In another embodiment, processors 10670 and 10680 are respectively processor 10510 coprocessor 10545.

Processors 10670 and 10680 are shown including integrated memory controller (IMC) units 10672 and 10682, respectively. Processor 10670 also includes as part of its bus controller units point-to-point (P-P) interfaces 10676 and 10678; similarly, second processor 10680 includes P-P interfaces 10686 and 10688. Processors 10670, 10680 may exchange information via a point-to-point (P-P) interface 10650 using P-P interface circuits 10678, 10688. As shown in FIG. 106, IMCs 10672 and 10682 couple the processors to respective memories, namely a memory 10632 and a memory 10634, which may be portions of main memory locally attached to the respective processors.

Processors 10670, 10680 may each exchange information with a chipset 10690 via individual P-P interfaces 10652, 10654 using point to point interface circuits 10676, 10694, 10686, 10698. Chipset 10690 may optionally exchange information with the coprocessor 10638 via a high-performance interface 10639. In one embodiment, the coprocessor 10638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 10690 may be coupled to a first bus 10616 via an interface 10696. In one embodiment, first bus 10616 may be a Peripheral Component Interconnect (PCI) bus, or a bus such as a PCI Express bus or another third generation I/O interconnect bus, although the scope of the present disclosure is not so limited.

As shown in FIG. 106, various I/O devices 10614 may be coupled to first bus 10616, along with a bus bridge 10618 which couples first bus 10616 to a second bus 10620. In one embodiment, one or more additional processor(s) 10615, such as coprocessors, high-throughput MIC processors, GPGPU's, accelerators (such as, e.g., graphics accelerators or digital signal processing (DSP) units), field programmable gate arrays, or any other processor, are coupled to first bus 10616. In one embodiment, second bus 10620 may be a low pin count (LPC) bus. Various devices may be coupled to a second bus 10620 including, for example, a keyboard and/or mouse 10622, communication devices 10627 and a storage unit 10628 such as a disk drive or other mass storage device which may include instructions/code and data 10630, in one embodiment. Further, an audio I/O 10624 may be coupled to the second bus 10620. Note that other architectures are possible. For example, instead of the point-to-point architecture of FIG. 106, a system may implement a multi-drop bus or other such architecture.

Referring now to FIG. 107, shown is a block diagram of a second more specific exemplary system 10700 in accordance with an embodiment of the present disclosure Like elements in FIGS. 106 and 107 bear like reference numerals, and certain aspects of FIG. 106 have been omitted from FIG. 107 in order to avoid obscuring other aspects of FIG. 107.

FIG. 107 illustrates that the processors 10670, 10680 may include integrated memory and I/O control logic ("CL") 10672 and 10682, respectively. Thus, the CL 10672, 10682 include integrated memory controller units and include I/O control logic. FIG. 107 illustrates that not only are the memories 10632, 10634 coupled to the CL 10672, 10682, but also that I/O devices 10714 are also coupled to the control logic 10672, 10682. Legacy I/O devices 10715 are coupled to the chipset 10690.

Referring now to FIG. 108, shown is a block diagram of a SoC 10800 in accordance with an embodiment of the present disclosure. Similar elements in FIG. 104 bear like reference numerals. Also, dashed lined boxes are optional features on more advanced SoCs. In FIG. 108, an interconnect unit(s) 10802 is coupled to: an application processor 10810 which includes a set of one or more cores 202A-N and shared cache unit(s) 10406; a system agent unit 10410; a bus controller unit(s) 10416; an integrated memory controller unit(s) 10414; a set or one or more coprocessors 10820 which may include integrated graphics logic, an image processor, an audio processor, and a video processor; an static random access memory (SRAM) unit 10830; a direct memory access (DMA) unit 10832; and a display unit 10840 for coupling to one or more external displays. In one embodiment, the coprocessor(s) 10820 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 10630 illustrated in FIG. 106, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 109 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 109 shows a program in a high level language 10902 may be compiled using an x86 compiler 10904 to generate x86 binary code 10906 that may be natively executed by a processor with at least one x86 instruction set core 10916. The processor with at least one x86 instruction set core 10916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 10904 represents a compiler that is operable to generate x86 binary code 10906 (e.g., object code) that can, with or without additional linkage processing, be executed on the processor with at least one x86 instruction set core 10916. Similarly, FIG. 109 shows the program in the high level language 10902 may be compiled using an alternative instruction set compiler 10908 to generate alternative instruction set binary code 10910 that may be natively executed by a processor without at least one x86 instruction set core 10914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 10912 is used to convert the x86 binary code 10906 into code that may be natively executed by the processor without an x86 instruction set core 10914. This converted code is not likely to be the same as the alternative instruction set binary code 10910 because an instruction converter capable of this is difficult to make; however, the converted code will accomplish the general operation and be made up of instructions from the alternative instruction set. Thus, the instruction converter 10912 represents software, firmware, hardware, or a combination thereof that, through emulation, simulation or any other process, allows a processor or other electronic device that does not have an x86 instruction set processor or core to execute the x86 binary code 10906.

What is claimed is:

1. An apparatus comprising:

a plurality of processing elements;

a network between the plurality of processing elements to transfer values between the plurality of processing elements; and a first processing element of the plurality of processing elements comprising:

a first plurality of input queues having a multiple bit width coupled to the network, at least one first output queue having the multiple bit width coupled to the network, configurable operand size operation circuitry coupled to the first plurality of input queues, and a configuration register within the first processing element to store a configuration value that causes the configurable operand size operation circuitry to switch to a first mode for a first multiple bit width from a plurality of selectable multiple bit widths of the configurable operand size operation circuitry, perform a selected operation on a plurality of first multiple bit width values from the first plurality of input queues in series to create a resultant value, and store the resultant value in the at least one first output queue.

2. The apparatus of claim 1, wherein the configurable operand size operation circuitry comprises a bit-serial adder circuit controlled by a counter that is set by the configuration value from the configuration register.

3. The apparatus of claim 1, wherein the configurable operand size operation circuitry comprises a bit-serial multiplier circuit controlled by a counter that is set by the configuration value from the configuration register.

4. The apparatus of claim 1, wherein the at least one first output queue is coupled via the network to a second processing element of the plurality of processing elements comprising:

a third plurality of input queues having the multiple bit width coupled to the network, at least one fourth output queue having the multiple bit width coupled to the network, fixed operand size operation circuitry coupled to the first plurality of input queues, and a configuration register within the second processing element to store a second configuration value that causes the fixed operand size operation circuitry to perform a selected operation on the resultant value from the first processing element to create a second resultant value, and store the resultant value in the at least one fourth output queue.

5. The apparatus of claim 1, wherein the first processing element comprises an input controller and an output controller, and, when the first plurality of input queues stores the plurality of first multiple bit width values, the input controller is to send a not empty value to the configurable operand size operation circuitry of the first processing element and when the at least one first output queue is not full, the output controller is to send a not full value to the configurable operand size operation circuitry of the first processing element, and the configurable operand size operation circuitry of the first processing element of the first processing element is to begin the selected operation on the plurality of first multiple bit width values stored in the first plurality of input queues after both the not empty value and the not full value are received.

6. The apparatus of claim 1, wherein the first processing element comprises an output controller, and, when the at least one first output queue is not full, the output controller is to send a not full value to the configurable operand size operation circuitry of the first processing element to cause the first processing element to begin the selected operation on the plurality of first multiple bit width values.

7. The apparatus of claim 1, wherein the first processing element comprises an input controller, and, when the first plurality of input queues stores the plurality of first multiple bit width values, the input controller is to send a not empty value to the configurable operand size operation circuitry of the first processing element to begin the selected operation on the plurality of first multiple bit width values.

8. The apparatus of claim 1, further comprising a bitwise, row and column accessible register file coupled to the first processing element to store the resultant value from the at least one first output queue of the first processing element.

9. A method comprising:

coupling a plurality of processing elements with a network to transfer values between the plurality of processing elements, wherein a first processing element of the plurality of processing elements comprises a first plurality of input queues having a multiple bit width coupled to the network, at least one first output queue having the multiple bit width coupled to the network, and configurable operand size operation circuitry coupled to the first plurality of input queues;

storing a configuration value in a configuration register within the first processing element that causes the configurable operand size operation circuitry to switch to a first mode for a first multiple bit width from a plurality of selectable multiple bit widths of the configurable operand size operation circuitry;

performing a selected operation, specified by the configuration value, with the configurable operand size operation circuitry on a plurality of first multiple bit width values from the first plurality of input queues in series to create a resultant value; and storing the resultant value in the at least one first output queue.

10. The method of claim 9, wherein the performing the selected operation comprises controlling a bit-serial adder circuit of the configurable operand size operation circuitry by a counter that is set by the configuration value from the configuration register.

11. The method of claim 9, wherein the performing the selected operation comprises controlling a bit-serial multiplier circuit of the configurable operand size operation circuitry by a counter that is set by the configuration value from the configuration register.

12. The method of claim 9, further comprising:

coupling the at least one first output queue via the network to a second processing element of the plurality of processing elements comprising a third plurality of input queues having the multiple bit width coupled to the network, at least one fourth output queue having the multiple bit width coupled to the network, and fixed operand size operation circuitry coupled to the first plurality of input queues;

storing a second configuration value in a configuration register within the second processing element that causes the fixed operand size operation circuitry to perform a selected operation on the resultant value from the first processing element to create a second resultant value; and storing the resultant value in the at least one fourth output queue.

13. The method of claim 9, wherein the first processing element comprises an input controller and an output controller, and, when the first plurality of input queues stores the plurality of first multiple bit width values, the input controller sends a not empty value to the configurable operand size operation circuitry of the first processing element and when the at least one first output queue is not full, the output controller sends a not full value to the configurable operand size operation circuitry of the first processing element, and the configurable operand size operation circuitry of the first processing element of the first processing element begins performing the selected operation on the plurality of first multiple bit width values stored in the first plurality of input queues after both the not empty value and the not full value are received.

14. The method of claim 9, wherein the first processing element comprises an output controller, and, when the at least one first output queue is not full, the output controller sends a not full value to the configurable operand size operation circuitry of the first processing element to cause the first processing element to begin performing the selected operation on the plurality of first multiple bit width values.

15. The method of claim 9, wherein the first processing element comprises an input controller, and, when the first plurality of input queues stores the plurality of first multiple bit width values, the input controller sends a not empty value to the configurable operand size operation circuitry of the first processing element to begin performing the selected operation on the plurality of first multiple bit width values.

16. The method of claim 9, further comprising storing the resultant value from the at least one first output queue of the first processing element into a bitwise, row and column accessible register file via the network.

17. A hardware processor comprising:

a core with a decoder to decode an instruction into a decoded instruction and an execution unit to execute the decoded instruction to perform a first operation;

a plurality of processing elements;

a network between the plurality of processing elements to transfer values between the plurality of processing elements; and a first processing element of the plurality of processing elements comprising:

- a first plurality of input queues having a multiple bit width coupled to the network,
- at least one first output queue having the multiple bit width coupled to the network,
- configurable operand size operation circuitry coupled to the first plurality of input queues, and
- a configuration register within the first processing element to store a configuration value that causes the configurable operand size operation circuitry to switch to a first mode for a first multiple bit width from a plurality of selectable multiple bit widths of the configurable operand size operation circuitry, perform a second, selected operation on a plurality of first multiple bit width values from the first plurality of input queues in series to create a resultant value, and store the resultant value in the at least one first output queue.

18. The hardware processor of claim 17, wherein the configurable operand size operation circuitry comprises a bit-serial adder circuit controlled by a counter that is set by the configuration value from the configuration register.

19. The hardware processor of claim 17, wherein the configurable operand size operation circuitry comprises a bit-serial multiplier circuit controlled by a counter that is set by the configuration value from the configuration register.

20. The hardware processor of claim 17, wherein the at least one first output queue is coupled via the network to a second processing element of the plurality of processing elements comprising:

a third plurality of input queues having the multiple bit width coupled to the network, at least one fourth output queue having the multiple bit width coupled to the network, fixed operand size operation circuitry coupled to the first plurality of input queues, and a configuration register within the second processing element to store a second configuration value that causes the fixed operand size operation circuitry to perform a third, selected operation on the resultant value from the first processing element to create a second resultant value, and store the resultant value in the at least one fourth output queue.

21. The hardware processor of claim 17, wherein the first processing element comprises an input controller and an output controller, and, when the first plurality of input queues stores the plurality of first multiple bit width values, the input controller is to send a not empty value to the configurable operand size operation circuitry of the first processing element and when the at least one first output queue is not full, the output controller is to send a not full value to the configurable operand size operation circuitry of the first processing element, and the configurable operand size operation circuitry of the first processing element of the first processing element is to begin the second, selected operation on the plurality of first multiple bit width values stored in the first plurality of input queues after both the not empty value and the not full value are received.

22. The hardware processor of claim 17, wherein the first processing element comprises an output controller, and, when the at least one first output queue is not full, the output controller is to send a not full value to the configurable operand size operation circuitry of the first processing element to cause the first processing element to begin the second, selected operation on the plurality of first multiple bit width values.

23. The hardware processor of claim 17, wherein the first processing element comprises an input controller, and, when the first plurality of input queues stores the plurality of first multiple bit width values, the input controller is to send a not empty value to the configurable operand size operation circuitry of the first processing element to begin the second, selected operation on the plurality of first multiple bit width values.

24. The hardware processor of claim 17, further comprising a bitwise, row and column accessible register file coupled to the first processing element to store the resultant value from the at least one first output queue of the first processing element.

* * * * *